United States Patent [19]

Hardt et al.

[11] Patent Number: 4,601,043

[45] Date of Patent: Jul. 15, 1986

[54] DIGITAL COMMUNICATIONS SOFTWARE CONTROL SYSTEM

[75] Inventors: Ivan E. Hardt, Cedar Rapids; Cynthia A. Bonebright, Marion; Ray C. Fuller, Hiawatha, all of Iowa

[73] Assignee: Rockwell International Corporation, El Segundo, Calif.

[21] Appl. No.: 613,665

[22] Filed: May 23, 1984

[51] Int. Cl.[4] .............................................. H04K 1/00
[52] U.S. Cl. ......................................... 375/1; 375/114
[58] Field of Search ..................... 375/1, 114, 115, 2.1, 375/2.2; 455/59, 26, 27; 370/100, 107; 364/514; 178/22.01

[56] References Cited

U.S. PATENT DOCUMENTS

| | | | |
|---|---|---|---|
| 3,825,905 | 7/1974 | Allen, Jr. | 375/114 |
| 4,267,592 | 5/1981 | Craiglow | 375/1 |
| 4,320,512 | 3/1982 | Haskell | 375/1 |
| 4,383,323 | 5/1983 | Timor | 375/1 |
| 4,494,238 | 1/1985 | Groth, Jr. | 455/315 |
| 4,512,026 | 4/1985 | Vander Meiden | 375/114 |

Primary Examiner—Robert L. Griffin
Assistant Examiner—Stephen Chin
Attorney, Agent, or Firm—George A. Montanye; H. Fredrick Hamann

[57] ABSTRACT

There is disclosed a digital communication system which utilizes software control through a universal synchronous/asynchronous receiver transmitter for providing improved communications performance in a digital frequency hopping communication system. The USART, under the control of a microprocessor and coupled to operate with a bit sync tracking circuit, is able to achieve synchronization and message processing of a demodulated digital signal during a receiving mode in a frequency hopping system, and initiate transmission and modulation on the pseudorandom hopping frequencies of the communication system. The USART functions as a data input/output device and may be multiplexed to handle the differing data rate for user and frame/burst data for transmission.

4 Claims, 2 Drawing Figures

DIGITAL COMMUNICATIONS SOFTWARE CONTROL SYSTEM

A listing of computer programs referenced in the specification is incorporated as an Appendix of this application.

BACKGROUND OF THE INVENTION

The present invention relates to a communication system, and more particularly, to a software controlled frequency hopping digital communication system.

Although digital communication systems have been available in the prior art for some time, the same have been subject to limitations in cost and complexity primarily due to the requirement for detailed hardware for providing information correlation. In such systems, wherein information is converted into a digital format, transmitted and decoded from the digital format to reconstruct the original information, complex hardware has been necessary to correlate the received digital data, especially in frequency hopping systems. Because of the increased cost and complexity of such hardware correlation techniques, digital systems have not been widely utilized in all areas of communication systems. Particularly in frequency hopping systems, the complexity of the system increases greatly as the speed of transmission and number of frequencies used is increased. Accordingly, there has been a need to develop digital systems which can be constructed at lower cost and with less complexity but are capable of improving the performance and reliability of communication in a variety of environments.

With the advent of computer control and, more importantly, the development of microprocessors for performing many of those functions previously performed with only large main-frame computers, there has been an increasing trend to incorporate microprocessor control in digital communication systems. In such instances, the emphasis on software control becomes more important, thereby resulting in continuing emphasis of performing hardware functions with software instructions. Use of software to achieve such control has the benefit of not only reducing the amount of hardware that may be necessary, but also of allowing the equipment to be modified for a variety of purposes, simply by changing the software routines. It will thus be appreciated that reliable hardware configurations compatible with software control are necessary in the search for more simplified and reliable communication systems.

In frequency hopping systems in particular, there are a plurality of functions that are otherwise unnecessary in fixed-frequency communication systems which take the system configuration even more difficult to implement under software control. In particular, frequency hopping systems require internal time synchronization with other user units in a network having multiple users and must also acquire the necessary information capable of receiving and decoding information from a transmitting system to enable a receiver to hop with the frequencies of that transmitting system. While many of the techniques used to enter such data into a communication system are conventional (e.g., PROM entry of frequency hopping pattern based upon user codes and internal time), there are still various functions which must be achieved to enable efficient software control.

In particular, a receiver must have the ability to efficiently acquire synchronization and tracking of a transmitted signal so that the receiver may frequency hop with a transmitting system. Likewise, a user must generate the appropriate codes and frequency hopping pattern consistent with that which can be understood by other users in transmitting in a frequency hopping mode. This means that the user must be able to receive a synchronization preamble in a conventionally coded data fomat transmitted in a frequency hopping system and thereafter decode that data to maintain synchronization and frequency hop with the transmitter. The system must also buffer continuous data from user input prior to its transmission at one frequency rate and thereafter transmit at a higher frequency rate to accommodate the synchronization and other codes that must be added to any message data generated by the user. All of these requirements result in a highly complex system that must meet a variety of user and system criteria.

Accordingly, the present invention has been developed to overcome the specific shortcomings of the above known and similar techniques and to provide an improved software controlled communication system specifically for use in frequency hopping systems.

SUMMARY OF THE INVENTION

In accordance with the present invention, the digital communication system disclosed herein has a configuration which allows efficient software control with a conventional microprocessor. The system is implemented by using a universal synchronous/asynchronous receiver/transmitter (USART) in connection with a bit sync tracking circuit, which are both under the control of a microprocessor to enable synchronization and tracking of frequency hopping data as well as synthesis and transmission of frequency hopping data in such a manner that efficient operation of data transmission and synchronization with a user system can be achieved under software control. The USART is coupled under software control to act as an input/output device by multiplexing so that it can be receive both user data at one frequency rate and convert that data for transmission at another frequency rate as frame/burst data typical of frequency hopping systems. The bit sync (synchronization) tracking circuit provides a check for bit sync in an incoming transmission, the presence of which is transmitted to the USART for a determination of character sync. Thereafter, if character sync is not achieved, the software in the microprocessor resets the bit sync tracking circuit to indicate that there was a false sync to allow search for a new bit sync. Once bit sync and character synchronization has been indicated by the bit tracking circuitry and the USART, the bit sync tracking circuit acts to maintain synchronization for receipt of the incoming message.

It is therefore a feature of the invention to provide an improved communication system configuration using a USART under software control.

It is a further feature of the invention to provide a communication system having a bit synchronization tracking circuit cooperating with a USART under microprocessor control to acquire synchronization in a frequency hopping mode.

It is a still further feature of the invention to provide for data receipt and output under the control of a USART at different data rates for user and frame/burst data.

Yet a further feature of the invention to provide synthesizer control in conjunction with the USART under the control of the microprocessor to insure the modulation and demodulation at the appropriate frequency hopping frequencies of a given network.

These and other objects, advantages and novel features of the invention will become apparent from the following detailed description when considered with the accompanying drawings wherein:

DETAILED DESCRIPTION OF A PREFERRED EMBODIMENT

Figure 1:
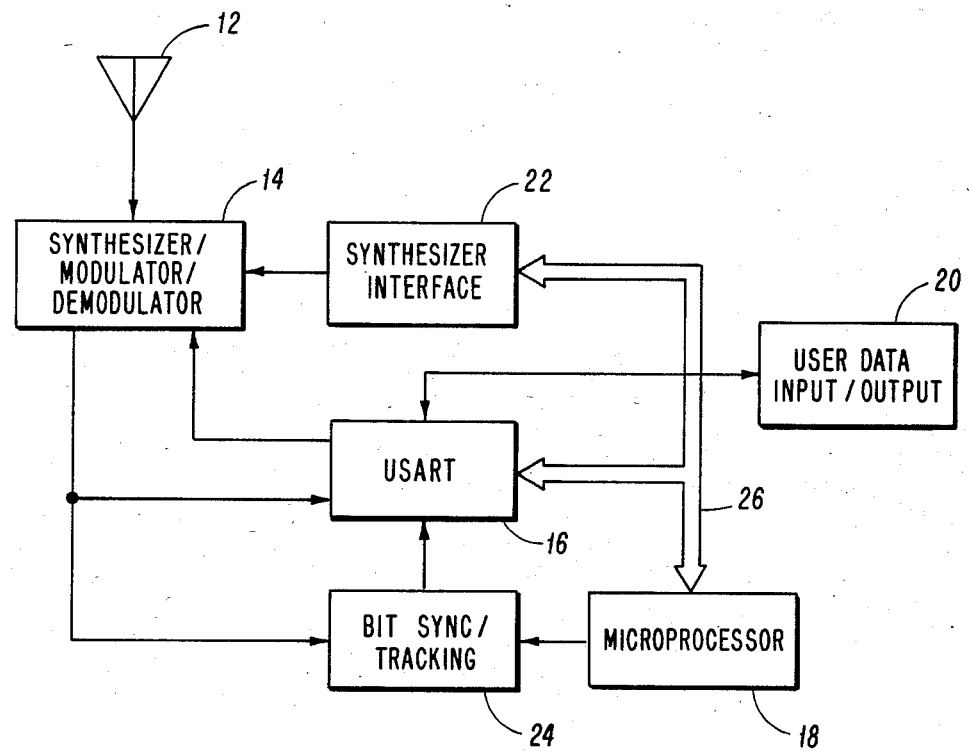
FIG. 1 is a block diagram of the configuration of the communication system in accordance with the present invention.

Referring now to FIG. 1, wherein like numerals are used to refer to like elements throughout, there is shown a schematic block diagram of the configuration of the communication system in accordance with the present invention. The system is represented to show a digitally implemented transmission and receiving system under microprocessor control in accordance with the present invention and will be described in connection with its frequency hopping mode of operation. It should be appreciated, however, that the software control of the microprocessor described herein can be modified to include other modes of operation. The detailed operation of the microprocessor as controlled by the programming is set forth in the attached Appendix A which lists the program capable of controlling the microprocessor in connection with a USART and bit sync tracking circuitry to achieve the objectives described herein.

As shown in FIG. 1, the communication system in accordance with the present invention includes a typical antenna 12 which receives and transmits data on a carrier frequency that has been modulated in a digital format. The received digital message on the carrier is coupled to a conventional synthesizer/modulator-demodulator 14 which is tuned to transmit and impose the appropriate digital modulation on a synthesized carrier in the transmitting mode and to receive and demodulate the digital information in a receive mode. The output from 14 is coupled to a conventional universal synchronous/asynchronous receiver-transmitter (USART) 16 and also as input to a bit sync-tracking circuit 24 as will subsequently be described. An output from the bit sync-tracking circuitry is provided to the USART 16 to enable transfer of the incoming message. A microprocessor 18 has an output coupled to the bit sync tracking circuitry to reset that tracking circuitry if character sync is not recognized in the USART 16 following bit sync identified by tracking circuit 24. The microprocessor 18 is coupled over a conventional bus 26 to provide required communication with the USART 16 as well as a synthesizer interface 22. Synthesizer interface 22 is likewise coupled to the synthesizer 14 so that the synthesizer can be set and controlled to provide the frequencies in the frequency hopping pattern for both transmission and reception of ditgital information. The input and output of message information is initiated and received by user data input/output device 20 which communicates user data to the USART 16 and receives demodulated data from the same USART 16. By way of example, the user data input is usually a conventional microphone or speaker together with a continuously variable scope detector (CVSD) which converts the voice data to digital format for use by the USART for the subsequent digital data transmission. Such structures are old and well-known in the art for use with the USART 16 and will therefore not be described in any greater detail. However, it should be understood that the input/output device 20 could just as well be any device capable of generating data or other information which is to be transmitted and for providing an output of received data for the user.

The microprocessor 18 may be of conventional construction and in an exemplary embodiment has been implemented as a National Semiconductor Corporation NSC-800 microprocessor. The control of the microprocessor is implemented by the program detailed in Appendix A, incorporated herein by reference, to produce the data correlation, transmission, frequency hopping and synchronization techniques set forth herein. The program is written in assembler language for the NSC-800 to provide those outputs signals for the USART 16, synthesizer interface 22 and bit sync-tracking circuit 24 to enable the frequency hopping operation and synchronization.

Figure 2:
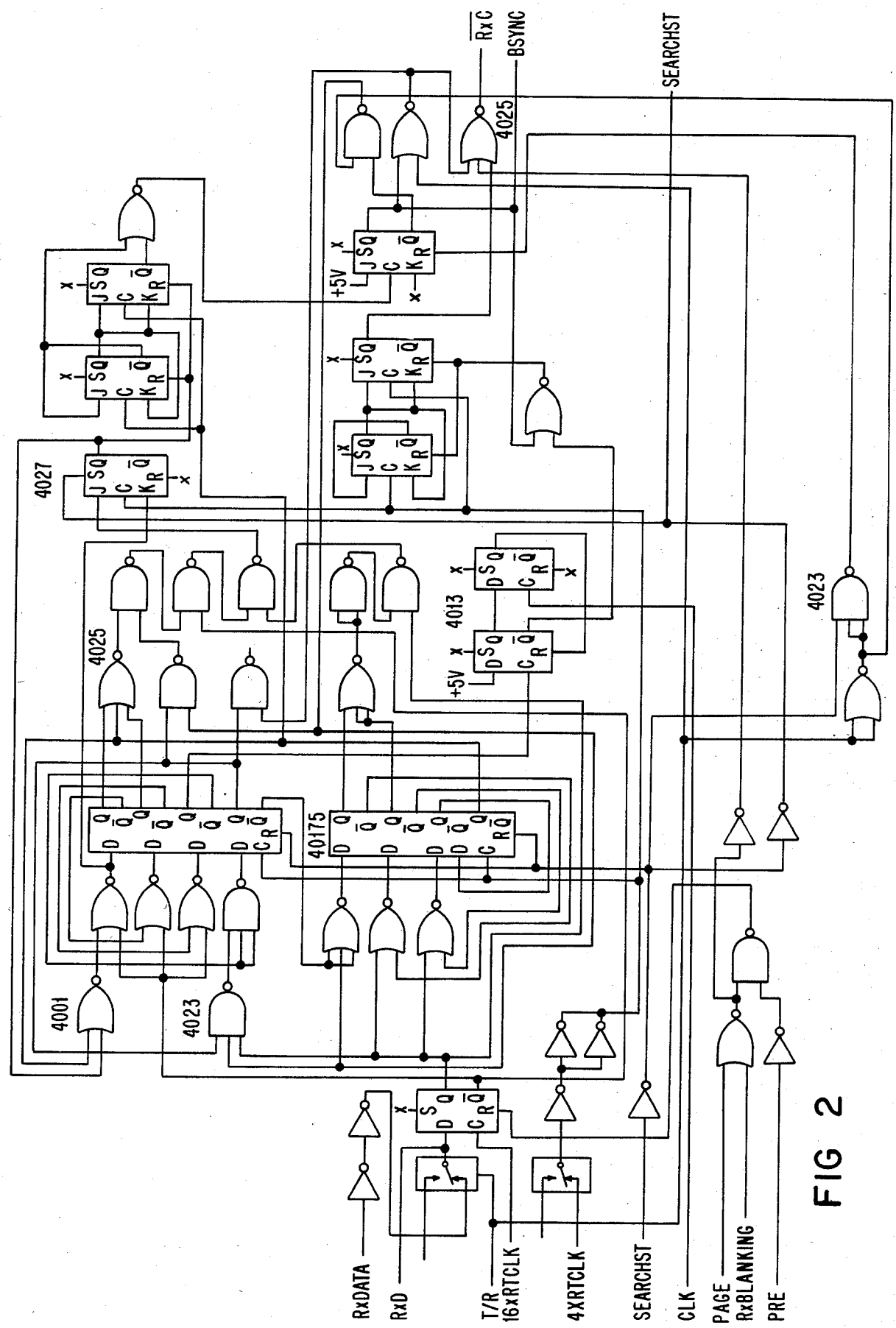
FIG. 2 is a schematic diagram showing the bit sync tracking circuitry of the present invention.

The bit sync-tracking circuit 24 is detailed more particularly in FIG. 2 and includes the specific structure set forth in detail therein. The inputs identified in the detailed diagram of FIG. 2 can be correlated with those same inputs from the microprocessor identified in the detailed program of Appendix A, with the outputs indicating bit sync-tracking being provided to the USART for further character synchronization recognition. The USART in turn transmits the appropriate signals to the microprocessor to correlate the control with the identified program for receipt of the digital information once synchronization has been acquired and for reacquiring synchronization if the same is lost during message transmission. In this regard, the data format described in the co-pending U.S. application Ser. No. 613,659, by Roger A. Pyatt, Ivan E. Hardt and Cynthia A. Bonebright, entitled "Automatic Resynchronization Technique," filed on even date herewith and assigned to the same assignee, which application is herein incorporated by reference in its entirety, can be used in the present system. This data format allows improved synchronization and resynchronization under microprocessor control for the reasons as described in detail in the aforementioned co-pending application.

While the specific functions of the bit sync tracking circuit are considered evident from the detailed circuit diagram, a brief explanation of the inputs and outputs will explain the overall function of the circuit. More particularly, the data being received is provided as input to terminal R×DATA and through a multiplexer which is controlled to be in the position shown during reception. The output R×D provides that data to the USART. The T/R input is microprocessor controlled to place the multiplexer contact between transmit and receive positions. Since the bit sync tracking circuit is being described with respect to its operation in connection with a receiver, only those details necessary for an understanding of the receive function will be explained.

The inputs 16×RTCLK and 4×RTCLK are clock inputs to control clocking time of the logic and represent inputs of 16 and 4 times the clocking rate of the real time clock, respectively. The SEARCHST is a microprocessor-controlled signal used to initiate the start cycle for sync detection and acts to reset the circuit to initiate sync search. The CLK is a hardware-implemented clocking signal while the PAGE, R×BLANK- ING and PRE signals are hardware and microprocessor signals used to initiate transmission mode operation and are otherwise unnecessary for an understanding of the present receive mode of operation.

The output $\overline{R \times C}$ is the USART control which indicates bit sync and signals the USART to receive the input data once the bit sync has been recognized by the tracking circuitry. In operation, any loss of sync will be recognized by the tracking circuitry through the output BSYNC which is detected by the microprocessor, thereby returning the system operation to a search-for-sync mode of operation. The input terminals designated with an x in FIG. 2 are tied to 5 volts for operation as described herein.

With the above configuration of FIGS. 1 and 2, the digital data transmission system in a frequency hopping environment has been significantly simplified by reducing the complexity of the hardware necessary to receive and correlate the transmitted data. The operation of the system in accordance with the progarm of Appendix A substantially reduces the need for hardware to identify synchronization and tracking of a received signal and thereby results in improved reliability, less cost, and more versatile operation. In order to understand the control of the USART and bit sync-tracking circuitry by the microprocessor, the operation of the system under program control provided by the software of Appendix A will now be described with respect to the functions performed by coupling through the bus structure 26 and to the tracking circuit 24 as shown in FIG. 1.

As in conventional systems, the communication system of the present invention may include a front panel with switches and indicators indicating the status and controlling the modes of the system. Such controls and outputs will be dependent upon the specific user requirements of the system and accordingly will not be described in detail herein, since the same are not critical to an understanding of the control exercised by the software of Appendix A. As in conventional systems, the synthesizer 14 is provided the frequency information as developed by the microprocessor 18, through the synthesizer interface 22. This information allows the synthesizer to hop at the appropriate frequencies for transmitting the digital information on the appropriate carrier.

In connection with the synthesizer, the microprocessor must receive information common to all users of the system from which the pseudorandom code which controls frequency hopping can be developed. This information is conventionally obtained by loading a RAM in the microprocessor with certain user ID data and other coded information to enable the microprocessor to subsequently develop the pseudorandom frequency hopping frequencies. Again, such load and fill is conventional in the art and is unnecessary for a further understanding of the operation of the system, it being sufficient to understand that the fill is necessary to enable the proper pseudorandom frequency hopping scheme to be developed for both transmitting and receiving digital data on the network.

As in conventional systems, there may be a variety of hardware faults which can be monitored by the microprocessor, including antenna fault, power amplifier fault, loss of synchronization, etc. These faults may be identified in a variety of ways by indicators or otherwise, or used to control certain modes of operation of the system once that fault has occurred.

As was previously noted, the USART inputs and outputs all data flowing through the communication system and makes it accessible to the microprocessor on a byte basis. The microprocessor receives interrupts from the USART in a conventional fashion to enable the flow of data between microprocessor and USART. In a specific embodiment, the microprocessor receives two interrupts from the USART, namely the RXRDY interrupt which indicates that the USART receives buffer in full and the microprocessor must retrieve a byte of that received data. The other interrupt is the TXRDY which indicates that the USART transmit buffer is empty and the microprocessor must provide an output of a byte of data to be transmitted to the USART. The USART thus handles the data to be received and transmitted and also detects a sync character which alerts the microprocessor to a possible incoming sync frame while defining the byte boundaries for the incoming data. The USART also functions in the present configuration to act as an input-output device between the users and transmitted data. In this regard, the user data must be provided at a constant rate while the receive/transmit data is provided for input and output in bursts. Furthermore, the USART must buffer paging and resynchronization data so that none is lost during transmission. Typically, the user data from input 20 may be transmitted serially via the USART at 16 kilobits per second while the frame data or transmit bursts are provided at a rate of 20 kilobits per seconds.

Within the microprocessor circuits is a real-time clock which stores and keeps track of current time as is necessary for maintaining synchronization of the internal times for users on the network. The microprocessor loads and initiates the real-time clock when time is loaded into the system from a front panel or a network command station in a conventional manner. The real-time clock will normally be powered by a back-up battery when the system is turned off so that the real-time will be maintained for subsequent sychronization even during periods of system inoperation. As with the USART 16 and synthesizer interface 22, the microprocessor may access the real-time clock conventionally through the data bus.

In operation, the system may operate in a frequency hopping mode wherein the receiver/transmitter hops at a predetermined rate of frequency changes per second. Each frequency period, defined as a frame, is that time period during which one of the hopping frequencies is employed. Each frame may be divided into a plurality of time slots or bits, in the present instance 192 time slots or bits. The first time slot allows the power amplifier to power up and down while time slots 2–31 give the receiver/transmitter time to set to a new frequency. Slot 32 allows the power amplifier time to power up while slots 33–192 contain 20 bytes of digital data. During reception, the slots 33–192 containing the 20 bytes of digitial data are the only slots looked at.

In order to initiate the hop mode, the microprocessor must select a channel or network identifier which provides a frequency plan and a variable for use in calculating the pseudorandom code necessary to develop the proper frequency hopping for all users. This network identifier is usually provided as input by the operator to the microprocessor as was the fill of frequency data to the RAM. As with conventional systems, the present system under microprocessor control is capable of receiving the entry of time from the front panel to synchronize the real-time clock or to receive the transmission of real time from a reference in the user network to establish internal time. In either event, the synchronization of internal time is necessary to enable the proper acquisition of message synchronization by the receiver during frequency hopping operation.

Turning now to the system initiation, the initialization of a frequency hop mode requires multiple functions performed by the programming of the microprocessor in accordance with that network identification and frequency information filled into the microprocessor. By way of example, the microprocessor calculates a page frequency and stores that frequency and constructs a multiple frequency table in accordance with the frequency hopping mode. In particular, by use of the network identification, a portion of the frequency information contained in the ROM/RAM fill is used to build a table of valid hopping frequencies in the microprocessor for that particular network.

As will be appreciated, the fill can be a factory fill programmed into the ROMs of the microprocessor, or a RAM located fill supplied by a portable fill gun. Once the frequency table has been built in this manner, the network identification is then used to generate an internal pseudorandom key to ultimately obtain the code necessary to control the pseudorandom number (PN) generator. The pseudorandom number generator has an output which is dependent on the data provided as input which data is provided as the frame time. Since the output of the PN generator is used to determine the hopping frequency, it will be apparent that the hopping frequency is a function of time. The frame time is calculated by reading the real-time clock and figuring a frame count to the nearest millisecond. Once the frame time has been calculated, the system may be operated in three basic modes identified as transmit, sync search, and receive. In accordance with the present programming, the receive mode can only be entered after synchronization has been achieved during the sync search mode.

Turning first to the transmit mode, the same may be entered by keying on a conventional microphone which causes the microprocessor through the USART to generate the requisite preamble before any data can be transmitted. In the present system, for example, six sync frames, a dummy frame and a start-of-message (SOM) frame are transmitted so that receivers in the network using the frequency hopping mode can achieve synchronization and hop simultaneously with the transmitter. Accordingly, immediately upon depression of a conventional push-to-talk button, the transmitter will be blanked for a predetermined number of frames so that the microprocessor can determine what synchronization frequency the first sync frame should be transmitted on and to load that frequency into the synthesizer. By way of example, each sync frame consists of six bytes for bit sync, seven bytes for character sync, one byte for character identification within the frame and six bytes of time information. The six bytes of time information are transmitted as two bytes sent three times. Each two time byte consists of the twelve least significant bits of a current frame time plus four bits of error correction information.

The sync frame is transmitted in accordance with the detailed program in such a manner that synchronization can be acquired if any two users have frame times that are within approximately ten seconds of one another. Following the sync frames, the transmitter begins hopping on the frequencies that correspond to its current frame time. Accordingly, the SOM frame is transmitted which consists of, for example, thirteen bytes of the SOM character and seven bytes of a command word. The SOM frame is an essential guard against false synchronization and, in effect, is a double check on the synchronization frame which verifies that the sync frame was received and that the bytes in the sync frame were interpretted correctly. Additionally, the SOM character identifies the last frame before data and where the command word will be found. The command word may be used to identify the origin of the message and the type of transmission as either a voice or data transmission. Thereafter, the transmission of user data occurs at the rate of twenty bytes per frame which continues until the system is unkeyed. At that time, eight frames of end-of-message (EOM) information are transmitted to identify to a receiver that the message has terminated.

As will be appreciated, in the transmit mode, all timing revolves around the internal frame mark. The internal frame mark causes the output of a new frequency to the synthesizer in accordance with the frequency hopping scheme, increments the frame time, controls the pseudorandom number generator, calculates the next hopping frequency, and determines resync/page frames as detailed below.

The resync/page frames are used to acquire resynchronization in accordance with the data format described in connection with the aforementioned co-pending application. Thus, the format is typically such that there is a transmission of twenty-four normal data frames and one resync/page frame. As will be understood, normal user data cannot be provided as output during page frames, so those frames must be inserted at predictable places in the pseudo-random number sequence so that a transmitter and receiver both know when they will occur. Since the only variable input to the pseudorandom number generator is the frame time, the resync/page frames are inserted based on a reference to a frame time of zero. When the frame time is calculated from the real-time clock, it is divided by twenty-five and the remainder is used as the page/frame position counter. In the transmit mode, these frames are used to provide an output of the sync and SOM frames in a effort to allow receivers to achieve synchronization that may have missed initial synchronization. For this purpose, four resync frames, one after each twenty-four frames of normal data, are used to define a complete resynchronization cycle. A receiver therefore has multiple chances to obtain resynchronization during message transmission. The four frames necessary to define the resynchronization include the first three sychronization frames described previously and the SOM frame.

In the synchronization search mode, in which the system spends most of its time searching to achieve synchronization with a transmitter, the system is looking to receive a synchronization frame. If the system does not obtain synchronization on a sync frame, it cannot receive a message. Thus, the system searches for the sync frame by listening to a frequency on which it expects to achieve synchronization. When the synchronization search mode is entered, the software causes the bit sync-tracking circuitry 24 to be reset and also loads the USART with a proper sync character for determining character sync. Additionally, in the sync search mode, a bit sync line (BYSNC) from the bit sync/tracking circuit 24 is monitored and if bit sync is identified for two consecutive frame marks in the USART, but a sync character has not been detected during that time, the microprocessor 18 resets the sync circuitry 24 and the USART 16.

As was noted above, the sync/page frame is transmitted as the twenty-fifth frame (after twenty-four frames of user data). Accordingly, in the synchronization search mode, the paging is observed every twenty-four frames as opposed to the twenty-five frames characteristic of the transmit and the receive mode to be described. This is necessary in order to insure that a potential receive in synchronization search would not always page at the same time that a transmitter was outputing a resynchronization frame. If such were to occur, both transmitter and receiver would be in phase and never be able to receive each other's resynchronization frames.

Turning now to the receive mode, the microprocessor is signaled that the system is receiving a synchronization frame when it gets an RXRDY signal from the USART as was previously described. The RXRDY occurs because a sync character following detection of bit sync through circuit 24, has been detected by the USART. The data byte retrieved from the USART by the microprocessor at this time contains the next eight bits immediately following the detected sync character. The microprocessor must then detect another sync character and the identification byte previously described within seven bytes or the microprocessor will abort the receive by signaling the bit sync circuit 24 and the USART 16 to be reset (SEARCHST). If, however, a sync character is detected along with the identification byte within seven bytes, then the microprocessor will begin its control for reception of the message. The microprocessor determines the transmitter's frame time and stores that frame time so that a receive frame mark in the system can use the transmitter's time to determine the hopping frequency for the synthesizer. At this point, the system searches for the start-of-message frame and must detect three of the start-of-message characters contained in the SOM frame. Additionally, the SOM frame must be detected within a predetermined number of frames for initial synchronization, and within another predetermined number of frames of resynchronization. If the start-of-message is not found within the appropriate limits, reception is again terminated and the system reverts to a search for synchronization mode.

If a start-of-message frame is properly received, the data frames following the start-of-message frame are received, and the data bytes are scanned for end-of-message character. During receipt of the data frames, the information is buffered by the USART in the manner previously indicated to provide continuous output at the desired rate for the user input/output device 20.

As will be seen from the above description, the system configuration shown in FIG. 1 utilizing the USART 16, bit sync tracking circuit 24 and microprocessor 18 enables the implementation of software control which provides an improved frequency hopping system. The USART under microprocessor control provides a plurality of functions enabling data storage and buffering and recognition of message synchronization without the requirement for complex hardware correlation as has been prevalent in the prior art. The configuration thus provides a unique implementation of digital control for state-of-the-art communication systems which may be modified by changes to the software without substantial cost or reduction in reliability. The noted configuration therefore provides improved performance and versatility for enabling improved communications in diverse environments.

Obviously, many other modifications and variations of the invention are possible in light of the above teachings. It is therefore to be understood that within the scope of the appended claims, the invention may be practiced otherwise than as specifically described.

```
1   ****************************************************************
2   *                                                               *
3   * NAME: RECEIVE READY (RXRDY)              PPS REF:             *
4   *                                                               *
5   * FILE NAME: RXRDY.SRC                                          *
6   *                                                               *
7   * FUNCTION: INTR INTERRUPT SERVICE ROUTINE DRIVEN BY RXRDY OUTPUT OF *
8   *           USART.  FETCHES A RECEIVED DATA BYTE FROM THE USART. *
9   *           SEARCHES FOR SYNC CHARACTER, DELIMIT BYTE, TIME, SOM, *
10  *           COMMAND WORD, DATA, AND EOM BYTES IN RCV MODE.      *
11  *                                                               *
12  * METHOD:  N/A                                                  *
13  *                                                               *
14  * INPUT PARAMETERS:                                             *
15  *                                                               *
16  *   NAME     DESCRIPTION           TYPE     LENGTH     RANGE    *
17  *                                                               *
18  * OUTPUT PARAMETERS:                                            *
19  *                                                               *
20  *   NAME     DESCRIPTION           TYPE     LENGTH     RANGE    *
21  *                                                               *
22  *                                                               *
23  * DATA ACCESSED OR ALTERED EXTERNAL TO MODULE:                  *
24  *                                                               *
25  *   NAME     DESCRIPTION     TYPE   LENGTH   RANGE       DIR    *
26  *   INPTR    INPUT DATA POINTER     2 BYTES              BOTH   *
27  *   RXFLGS   RCV FLAGS              1 BYTE   0,1,3,7,15  BOTH   *
```

```
28          * RXBYTS  RCV'D BYTE COUNTER              1 BYTE   0-25    BOTH   *
29          * EOMCTR  EOM BYTE COUNTER                1 BYTE   0-5     BOTH   *
30          * SOMCTR  SOM BYTE COUNTER                1 BYTE   0-20    BOTH   *
31          * TIMRXD  RCV'D TIME BYTE COUNTER         1 BYTE   0-6     BOTH   *
32          * PTTI    PTT INTERNAL FLAG               1 BIT            INPUT  *
33          * BOUNCE  PTT DEBOUNCE COUNTER            1 BYTE           BOTH   *
34          * TXFLGS  TRANSMIT MODE FLAGS             1 BYTE           OUTPUT *
35          * OUTPTR  DATA BUFFER OUTPUT POINTER      2 BYTES          BOTH   *
36          * EXITFL  EXIT RECEIVE FLAG               1 BYTE           OUTPUT *
37          * BCTR20  20 BYTE COUNTER                 1 BYTE           BOTH   *
38          * TIME1   BIT VOTE BUFFER (BYTE 1)        8 BYTES          OUTPUT *
39          * FALSE   FALSE SYNC FRAME COUNTER        1 BYTE           OUTPUT *
40          * RCVFLG  RECEIVE MODE FLAG               1 BYTE           OUTPUT *
41          * CHARLM  CHARACTER BYTE LIMIT COUNTER    1 BYTE           BOTH   *
42          * TIME2   BIT VOTE BUFFER (BYTE 2)        8 BYTES          OUTPUT *
43          * TIME3   BIT VOTE BUFFER (BYTE 3)        8 BYTES          OUTPUT *
44          * TIME4   BIT VOTE BUFFER (BYTE 4         8 BYTES          OUTPUT *
45          * RXTIME  LSB OF RX FRAME TIME            1 BYTE           OUTPUT *
46          * RXSOMC  RX SOM BYTE COUNTER             1 BYTE           BOTH   *
47          * FLTMCT  FULL TIME BYTE COUNT            1 BYTE           BOTH   *
48          * RESYNC  RESYNC MESSAGE RCV'D FLAG       1 BYTE           OUTPUT *
49          * RXCMDW  RCV'D COMMAND WORD              1 BYTE           INPUT  *
50          * RMATCH  RCV'D MATCHES                   1 BYTE           BOTH   *
51          *                                                                 *
52          * SUPPORTING MODULES:                                             *
53          * BTVOTE - PERFORMS BIT ARITHMETIC ON TIME BYTE BUFFER            *
54          * TALLY  - RECONSTRUCTS TIME BYTE FROM RESULTS IN BUFFER          *
55          * EXITRX - EXITS THE RECEIVE MODE                                 *
56          *                                                                 *
57          * COPYRIGHT 1982 ROCKWELL INTERNATIONAL                           *
58          * COLLINS TELECOMMUNICATIONS PRODUCTS DIVISION                    *
59          *                                                                 *
60          * AUTHOR: C. A. BONEBRIGHT            DATE: 05/10/82              *
61          *                                                                 *
62          * VERSION: 1.0                                                    *
63          *                                                                 *
64          * REVISION:                           DATE:                       *
65          *                                                                 *
66          ******************************************************************
67 0000
68 0000              TITLE   'RXRDY
69                   NAME    RXRDY
70                   PUBLIC  RXRDY
71                   EXTRN   UTDATA,PTTI,INPTR,RXFLGS,RXBYTS,USART,EOMBYT
72                   EXTRN   EOMCTR,EXITFL,BCTR20,SOMBYT,SOMCTR,TIMRXD
73                   EXTRN   TIME2,BTVOTE,TALLY,RXTIME,TIME1,IDELIM
74                   EXTRN   CPRTCS,RCVFLG,OUTPTR,APRTC,EXITRX
75                   EXTRN   SNCHAR,CHARLM,CPRTAS,TXFLGS,BOUNCE,BPRTCC
76                   EXTRN   PTTMSK,BITRCK,RXCLKS,REDLIM,FALSE,RESYNC
77                   EXTRN   FLTMCT,TIME3,TIME4,RXSOMC,RETX,RMATCH,RXCMDW
78 0000
79 0000
80                   CSEG
81 0000
82          * PROCEDURE RXRDY
83 0000     RXRDY:
84 0000
85          * * SAVE REGISTERS
86 0000 F5           PUSH    AF
87 0001 C5           PUSH    BC
88 0002 E5           PUSH    HL
89 0003
```

```
90                              * * FETCH USART DATA BYTE
91 0003 3A 00 00      E                 LD      A,(UTDATA)
92 0006 4F                               LD      C,A       ;DATA BYTE IN C
93 0007
94                              * * IF TX MODE
95 0007 3A 00 00      E                 LD      A,(PTTI)
96 000A CB 47                            BIT     0,A
97 000C 28 35 0043                       JR      Z,RX30
98 000E
99                              * * THEN
100                             * * * PUT DATA BYTE INTO BUFFER
101 000E 2A 00 00     E                  LD      HL,(INPTR)
102 0011 71                              LD      (HL),C
103 0012
104                             * * * INCREMENT DATA-IN POINTER
105 0012 23                              INC     HL
106 0013
107                             * * * IF POINTER > END OF BUFFER
108 0013 3E 30                           LD      A,48
109 0015 BD                              CP      L
110 0016 20 02 001A                      JR      NZ,RX20
111 0018
112                             * * * THEN
113                             * * * * SET POINTER=START OF BUFFER
114 0018 2E 00                           LD      L,0
115 001A
116                             * * * END IF
117 001A               RX20:
118 001A 22 00 00     E                  LD      (INPTR),HL
119 001D
120                             * * * IF BOUNCE IS ZERO
121 001D 3A 00 00     E                  LD      A,(BOUNCE)
122 0020 B7                               OR      A
123 0021 20 19 003C                       JR      NZ,RX22
124 0023
125                             * * * THEN
126                             * * * * IF NO PTT
127 0023 3A 00 00     E                   LD      A,(APRTC)
128 0026 E6 00        E                   AND     .LOW.PTTMSK
129 0028 CA 3B 02     C                   JP      Z,RX300
130 002B
131                             * * * * THEN
132                             * * * * * DISABLE THE RECEIVE SIDE OF THE USART
133 002B 3E 01                            LD      A,01H              ;TRANSMIT ENABLE ONLY
134 002D 32 00 00     E                   LD      (USART),A
135 0030 3E 06                            LD      A,06H
136 0032 D3 BB                            OUT     (0BBH),A           ;DISSABLE RXRDY INTERRUPT
137 0034
138                             * * * * * SET KEY DROPPED FLAG
139 0034 21 00 00     E                   LD      HL,TXFLGS
140 0037 CB FE                             SET     7,(HL)
141 0039
142                             * * * * END IF
143 0039
144                             * * * ELSE
145 0039 C3 3B 02     C                   JP      RX300
146 003C               RX22:
147                             * * * * DECREMENT BOUNCE
148 003C 21 00 00     E                   LD      HL,BOUNCE
149 003F 35                                DEC     (HL)
150 0040
151                             * * * END IF
```

```
152 0040                        RX25:
153 0040
154                             * * ELSE (RX MODE)
155 0040 C3 3B 02      C                JP      RX300
156 0043                        RX30:
157 0043
158                             * * * CASE TYPE OF BYTE
159 0043 3A 00 00      E                LD      A,(RXFLGS)
160 0046
161                             * * * WHEN BYTE=DATA  (CMD WORD REC'VD)
162 0046 CB 5F                          BIT     3,A
163 0048 CA E0 00      C                JP      Z,RX100
164 004B
165                             * * * * IF RESYNC SOM FRAME FLAG SET
166 004B CB 6F                          BIT     5,A
167 004D 28 24 0073                     JR      Z,RX40
168 004F
169                             * * * * THEN
170                             * * * * * DECREMENT RX SOM COUNTER
171 004F 3A 00 00      E                LD      A,(RXSOMC)
172 0052 3D                             DEC     A
173 0053 32 00 00      E                LD      (RXSOMC),A
174 0056
175                             * * * * * IF = 0
176 0056 20 05 005D                     JR      NZ,RX32
177 0058
178                             * * * * * THEN
179                             * * * * * * CLEAR RESYNC SOM FRAME FLAG
180 0058 21 00 00      E                LD      HL,RXFLGS
181 005B CB AE                          RES     5,(HL)
182 005D
183                             * * * * * END IF
184 005D                        RX32:
185 005D
186                             * * * * IF COUNTER = > 7
187 005D FE 07                          CP      7
188 005F DA 66 00      C                JP      C,RX34
189 0062
190                             * * * * * THEN
191                             * * * * * COMPARE DATA TO SOM BYTE
192 0062 3E 00         E                LD      A,.LOW.SOMBYT
193 0064 18 03 0069                     JR      RX36
194 0066
195                             * * * * * ELSE
196 0066                        RX34:
197 0066
198                             * * * * * COMPARE DATA TO RCV'D COMMAND WORD
199 0066 3A 00 00      E                LD      A,(RXCMDW)
200 0069
201                             * * * * * END IF
202 0069                        RX36:
203 0069
204                             * * * * IF DATA = SOM OR COMMAND WORD
205 0069 B9                             CP      C
206 006A 20 04 0070                     JR      NZ,RX38
207 006C
208                             * * * * * THEN
209                             * * * * * * INCREMENT RECEIVED MATCHES COUNTER
210 006C 21 00 00      E                LD      HL,RMATCH
211 006F 34                             INC     (HL)
212 0070
213                             * * * * END IF
```

```
214 0070                        RX38:
215 0070 C3 3B 02      C                JP      RX300
216 0073
217                             * * * * ELSE
218 0073                        RX40:
219 0073
220                             * * * * * IF TX SIDE OF USART NOT ENABLE
221 0073 CB 67                           BIT     4,A
222 0075 20 2B 00A2                      JR      NZ,RX50
223 0077
224                             * * * * * THEN
225                             * * * * * * DEC RX DATA BYTE COUNTER
226 0077 21 00 00      E                 LD      HL,RXBYTS
227 007A 35                               DEC     (HL)
228 007B
229                             * * * * * * IF 0
230 007B 20 25 00A2                      JR      NZ,RX50
231 007D
232                             * * * * * * THEN
233                             * * * * * * * SET UP OUTPUT POINTER = INPUT POINTER - 24
234 007D 3A 00 00      E                 LD      A,(INPTR)
235 0080 D6 18                            SUB     24
236 0082 30 02 0086                      JR      NC,RX45
237 0084 C6 2F                            ADD     A,47
238 0086                        RX45:
239 0086 32 00 00      E                 LD      (OUTPTR),A
240 0089
241                             * * * * * * * ENABLE TX SIDE OF USART
242 0089 2A 00 00      E                 LD      HL,(OUTPTR)
243 008C 7E                               LD      A,(HL)
244 008D 32 00 00      E                 LD      (UTDATA),A        ;PUT DATA BYTE IN USART
245 0090 3E 0B                            LD      A,0BH             ;SET INT MASK FOR RXRDY,TXRDY,& RCVERM
246 0092 D3 BB                            OUT     (0BBH),A
247 0094 3E 05                            LD      A,05H             ;ENABLE RX AND TX CLOCKS
248 0096 32 00 00      E                 LD      (USART),A
249 0099
250                             * * * * * * * INCREMENT DATA BYTE POINTER
251 0099 2C                               INC     L
252 009A 22 00 00      E                 LD      (OUTPTR),HL
253 009D
254                             * * * * * * * SET TX FLAG
255 009D 21 00 00      E                 LD      HL,RXFLGS
256 00A0 CB E6                            SET     4,(HL)
257 00A2
258                             * * * * * * END IF
259 00A2                        RX50:
260 00A2
261                             * * * * * END IF
262                             * * * * * PUT DATA BYTE INTO BUFFER
263 00A2 2A 00 00      E                 LD      HL,(INPTR)
264 00A5 71                               LD      (HL),C
265 00A6
266                             * * * * * INCREMENT DATA IN POINTER
267 00A6 23                               INC     HL
268 00A7
269                             * * * * * IF POINTER > END OF BUFFER
270 00A7 3E 30                            LD      A,48
271 00A9 BD                               CP      L
272 00AA 20 02 00AE                      JR      NZ,RX60
273 00AC
274                             * * * * * THEN
275                             * * * * * * SET POINTER=START OF BUFFER
```

```
276 00AC 2E 00              LD    L,0
277 00AE
278                  * * * * END IF
279 00AE             RX60:
280 00AE 22 00 00  E         LD    (INPTR),HL
281 00B1
282                  * * * * * IF DATA=EOM BYTE
283 00B1 3E 00     E         LD    A,.LOW.EOMBYT
284 00B3 B9                  CP    C
285 00B4 20 16 00CC          JR    NZ,RX80
286 00B6
287                  * * * * * THEN
288                  * * * * * * DEC EOM BYTE COUNTER
289 00B6 21 00 00  E         LD    HL,EOMCTR
290 00B9 35                  DEC   (HL)
291 00BA
292                  * * * * * * IF EOM COUNT > 4
293 00BA 20 10 00CC          JR    NZ,RX80
294 00BC
295                  * * * * * * THEN
296                  * * * * * * * DISABLE THE USART AND SET EXIT FLAG
297 00BC AF                  XOR   A
298 00BD 32 00 00  E         LD    (USART),A
299 00C0 2F                  CPL
300 00C1 32 00 00  E         LD    (EXITFL),A        ;EXITFL = 0FFH
301                                                  ;RCVFRM SEES EXITFL AND EXITS RCV MODE
302 00C4 *
303                  * * * * * * * RELEASE RETRANSMIT LINE
304 00C4 3E 00     E         LD    A,.LOW.RETX
305 00C6 32 00 00  E         LD    (BPRTCC),A
306 00C9
307 00C9 C3 3B 02  C         JP    RX300
308 00CC
309                  * * * * * END IF
310 00CC             RX80:
311 00CC
312                  * * * * * END IF
313                  * * * * * DEC 20-BYTE COUNTER
314 00CC 21 00 00  E         LD    HL,BCTR20
315 00CF 35                  DEC   (HL)
316 00D0
317                  * * * * * IF 20-BYTE COUNTER=0
318 00D0 C2 3B 02  C         JP    NZ,RX300
319 00D3
320                  * * * * * THEN
321                  * * * * * * RESET 20 BYTE COUNTER=20
322 00D3 3E 14               LD    A,20
323 00D5 32 00 00  E         LD    (BCTR20),A
324 00D8
325                  * * * * * * RESET EOM BYTE COUNTER=5
326 00D8 3E 05               LD    A,5
327 00DA 32 00 00  E         LD    (EOMCTR),A
328 00DD
329                  * * * * * END IF
330 00DD
331                  * * * * END IF
332 00DD             RX90:
333 00DD C3 3B 02  C         JP    RX300
334 00E0
335                  * * * WHEN BYTE=COMMAND WORD (SOM RCV'D)
336 00E0             RX100:
337 00E0 CB 57               BIT   2,A
```

```
338 00E2 28 15 00F9              JR      Z,RX120
339 00E4
340                      * * * * PERFORM BIT VOTE ON BYTE
341 00E4 21 00 00     E          LD      HL,TIME1
342 00E7 CD 00 00     E          CALL    BTVOTE
343 00EA
344                      * * * * DEC BYTE COUNTER
345 00EA 21 00 00     E          LD      HL,RXSOMC
346 00ED 35                      DEC     (HL)
347 00EE
348                      * * * * IF COUNTER = '0'
349 00EE C2 3B 02     C          JP      NZ,RX300
350 00F1
351                      * * * * THEN
352                      * * * * * SET COMMAND WORD RCV'D FLAG
353 00F1 21 00 00     E          LD      HL,RXFLGS
354 00F4 CB DE                   SET     3,(HL)
355 00F6 C3 3B 02     C          JP      RX300
356 00F9
357                      * * * * END IF
358 00F9              RX110:
359 00F9
360                      * * * WHEN BYTE=SOM (TIME RCV'D) OR TIME BYTES
361 00F9              RX120:
362 00F9 CB 4F                   BIT     1,A
363 00FB CA CF 01     C          JP      Z,RX200
364 00FE
365                      * * * * IF TIME RECEIVED
366 00FE 3A 00 00     E          LD      A,(TIMRXD)
367 0101 FE 06                   CP      6
368 0103 20 1D 0122              JR      NZ,RX130
369 0105
370                      * * * * THEN
371                      * * * * * IF DATA BYTE=SOM BYTE
372 0105 3E 00        E          LD      A,.LOW.SOMBYT
373 0107 B9                      CP      C
374 0108 20 04 010E              JR      NZ,RX125
375 010A
376                      * * * * * THEN
377                      * * * * * * INC SOM BYTE COUNTER
378 010A 21 00 00     E          LD      HL,SOMCTR
379 010D 34                      INC     (HL)
380 010E
381                      * * * * * END IF
382 010E              RX125:
383 010E
384                      * * * * * DEC RCV SOM COUNTER
385 010E 21 00 00     E          LD      HL,RXSOMC
386 0111 35                      DEC     (HL)
387 0112
388                      * * * * * IF COUNTER = '0'
389 0112 C2 3B 02     C          JP      NZ,RX300
390 0115
391                      * * * * * THEN
392                      * * * * * * SET SOM RCV'D FLAG
393 0115 21 00 00     E          LD      HL,RXFLGS
394 0118 CB D6                   SET     2,(HL)
395 011A
396                      * * * * * * INIT RXSOM COUNTER FOR COMMAND WORDS
397 011A 3E 07                   LD      A,7
```

```
393 011C 32 00 00    E           LD      (RXSOMC),A
399 011F
400                      * * * * END IF
401 011F                 RX128:
402 011F
403                      * * * * ELSE
404 011F C3 3B 02   C            JP      RX300
405 0122                 RX130:
406 0122
407                      * * * * * INCREMENT TIME BYTE COUNTER
408 0122 3C                      INC     A
409 0123 32 00 00   E            LD      (TIMRXD),A
410 0126
411                      * * * * * IF TIMRXD > 7
412 0126 FE 07                   CP      7
413 0128 38 44 016E              JR      C,RX138
414 012A
415                      * * * * * THEN
416                      * * * * * * IF TIMRXD = 67
417 012A FE 43                   CP      67
418 012C 20 05 0133              JR      NZ,RX131
419 012E
420                      * * * * * * THEN
421                      * * * * * * * SET TIMRXD = 6
422 012E 3E 06                   LD      A,6
423 0130 32 00 00   E            LD      (TIMRXD),A
424 0133
425                      * * * * * * END IF
426 0133                 RX131:
427 0133
428                      * * * * * INCREMENT FULL TIME BYTE COUNTER
429 0133 3A 00 00   E            LD      A,(FLTMCT)
430 0136 3C                      INC     A
431 0137 32 00 00   E            LD      (FLTMCT),A
432 013A
433                      * * * * * CASE OF FULL TIME BYTE COUNTER
434 013A
435                      * * * * * * WHEN COUNT = 1
436 013A FE 01                   CP      1
437 013C 20 09 0147              JR      NZ,RX132
438 013E
439                      * * * * * * * DO BIT ARITHMETIC ON 1ST TIME BYTE
440 013E 21 00 00   E            LD      HL,TIME1
441 0141 CD 00 00   E            CALL    BTVOTE
442 0144 C3 3B 02   C            JP      RX300
443 0147
444                      * * * * * * WHEN COUNT = 2
445 0147                 RX132:
446 0147 FE 02                   CP      2
447 0149 20 09 0154              JR      NZ,RX133
448 014B
449                      * * * * * * * DO BIT ARITHMETIC ON 2ND TIME BYTE
450 014B 21 00 00   E            LD      HL,TIME2
451 014E CD 00 00   E            CALL    BTVOTE
452 0151 C3 3B 02   C            JP      RX300
453 0154
454                      * * * * * * WHEN COUNT = 3
455 0154                 RX133:
456 0154 FE 03                   CP      3
457 0156 20 09 0161              JR      NZ,RX134
458 0158
459                      * * * * * * * DO BIT ARITHMETIC ON 3RD TIME BYTE
```

```
460 0158 21 00 00     E         LD      HL,TIME3
461 015B CD 00 00     E         CALL    BTVOTE
462 015E C3 3B 02     C         JP      RX300
463 0161
464                         * * * * * * ELSE (COUNT = 4)
465 0161                        RX134:
466 0161
467                         * * * * * * * SET COUNTER TO ZERO
468 0161 AF                     XOR     A
469 0162 32 00 00     E         LD      (FLTMCT),A
470 0165
471                         * * * * * * DO BIT ARITHMETIC ON 4TH TIME BYTE
472 0165 21 00 00     E         LD      HL,TIME4
473 0168 CD 00 00     E         CALL    BTVOTE
474 016B
475                         * * * * * END CASE
476 016B                        RX135:
477 016B C3 3B 02     C         JP      RX300
478 016E
479                         * * * * ELSE
480 016E                        RX128:
481 016E
482                         * * * * * IF 2ND TIME BYTE
483 016E FE 05                  CP      5
484 0170 28 3D 01AF             JR      Z,RX170
485 0172 30 0A 017E             JR      NC,RX140
486 0174 FE 03                  CP      3
487 0176 28 4E 01C6             JR      Z,RX180
488 0178 FE 01                  CP      1
489 017A 28 4A 01C6             JR      Z,RX180
490 017C
491                         * * * * * THEN
492                         * * * * * * * IF COUNT=6 & NOT RESYNC
493 017C 18 28 01A6             JR      RX150
494 017E                        RX140:
495 017E 3A 00 00     E         LD      A,(RESYNC)
496 0181 B7                     OR      A
497 0182 20 22 01A6             JR      NZ,RX150
498 0184
499                         * * * * * * * THEN
500                         * * * * * * * * IF NOT TIME MODE
501 0184 DD CB 00 4E            BIT     1,(IX)
502 0188 20 07 0191             JR      NZ,RX145
503 018A
504                         * * * * * * * * THEN
505                         * * * * * * * * * SET BIT TRACKING DISABLE
506 018A 3E 00         E        LD      A,.LOW.BITRCK
507 018C 32 00 00      E        LD      (CPRTAS),A
508 018F
509                         * * * * * * * * ELSE
510 018F 18 15 01A6             JR      RX150
511 0191                        RX145:
512 0191
513                         * * * * * * * * * SET TIMRXD = 7
514 0191 3E 07                  LD      A,7
515 0193 32 00 00      E        LD      (TIMRXD),A
516 0196
517                         * * * * * * * * * ZERO 1ST TWO TIME BYTE BIT VOTE BUFFERS
518 0196 AF                     XOR     A
519 0197 06 10                  LD      B,16
520 0199 21 00 00      E        LD      HL,TIME1
```

```
521 019C                           RX147:
522 019C 77                                LD      (HL),A
523 019D 23                                INC     HL
524 019E 10 FC 019C                        DJNZ    RX147
525 01A0
526                                * * * * * * * * INIT FULL TIME BYTE COUNTER
527 01A0 32 00 00        E                 LD      (FLTMCT),A
528 01A3
529                                * * * * * * * END IF
530 01A3
531                                * * * * * * * END IF
532 01A3 C3 3B 02        C                 JP      RX300
533 01A6                           RX150:
534 01A6
535                                * * * * * * * DO BIT ARITHMETIC ON 2ND BYTE
536 01A6 21 00 00        E                 LD      HL,TIME2
537 01A9 CD 00 00        E                 CALL    BTVOTE
538 01AC
539                                * * * * * END IF
540 01AC                           RX160:
541 01AC C3 CC 01        C                 JP      RX190   ;END IF
542 01AF
543                                * * * * ELSE
544 01AF                           RX170:
545 01AF
546                                * * * * * IF COUNT=5
547 01AF
548                                * * * * * THEN
549                                * * * * * * ENABLE RCV FRAME MARK
550 01AF 3E 00           E                 LD      A,.LOW.RXCLKS
551 01B1 32 00 00        E                 LD      (CPRTCS),A
552 01B4
553                                * * * * * * * DO BIT ARITHMETIC ON 1ST BYTE
554 01B4 21 00 00        E                 LD      HL,TIME1
555 01B7 CD 00 00        E                 CALL    BTVOTE
556 01BA
557                                * * * * * * * RECONSTRUCT 1ST TIME BYTE
558 01BA 21 00 00        E                 LD      HL,TIME1
559 01BD CD 00 00        E                 CALL    TALLY
560 01C0 32 00 00        E                 LD      (RXTIME),A
561 01C3 C3 3B 02        C                 JP      RX300
562 01C6
563                                * * * * * ELSE (1ST TIME BYTE)
564 01C6                           RX180:
565 01C6
566                                * * * * * * DO BIT ARITHMETIC ON 1ST TIME BYTE
567 01C6 21 00 00        E                 LD      HL,TIME1
568 01C9 CD 00 00        E                 CALL    BTVOTE
569 01CC
570                                * * * * * * END IF
571 01CC                           RX190:
572 01CC
573                                * * * * END IF
574 01CC C3 3B 02        C                 JP      RX300
575 01CF
576                                * * * ELSE BYTE=DELIMIT OR SYNC CHARACTER
577 01CF                           RX200:
578 01CF
579                                * * * * IF SYNC CHAR RCV'D
580 01CF CB 47                             BIT     0,A
```

```
581 01D1 28 49 021C              JR      Z,RX260
582 01D3
583                      * * * * THEN
584                      * * * * * IF RCV'D BYTE MATCHES 6 OF 8 BITS OF DEFINED DELIMIT BYTE
585 01D3 3E 00      E            LD      A,.LOW.IDELIM
586 01D5 61                      LD      H,C              ;SAVE DATA BYTE
587 01D6 A9                      XOR     C
588 01D7 28 30 0209              JR      Z,RX250
589 01D9 06 08                   LD      B,8
590 01DB 0E 03                   LD      C,3
591 01DD             RX220:
592 01DD 0F                      RRCA
593 01DE 30 03 01E3              JR      NC,RX230
594 01E0 0D                      DEC     C
595 01E1 28 04 01E7              JR      Z,RX232
596 01E3             RX230:
597 01E3 10 F8 01DD              DJNZ    RX220
598 01E5 18 22 0209              JR      RX250
599 01E7
600                      * * * * * OR NOT TIME MODE
601 01E7             RX232:
602 01E7 DD CB 00 4E             BIT     1,(IX)
603 01EB 20 23 0210              JR      NZ,RX255
604 01ED
605                      * * * * * AND 6 OF 8 BITS OF DEFINED RESYNC DELIMIT BYTE
606 01ED             RX234:
607 01ED 3E 00      E            LD      A,.LOW.REDLIM
608 01EF AC                      XOR     H
609 01F0 28 0D 01FF              JR      Z,RX240
610 01F2 06 08                   LD      B,8
611 01F4 0E 03                   LD      C,3
612 01F6             RX236:
613 01F6 0F                      RRCA
614 01F7 D2 FD 01   C            JP      NC,RX238
615 01FA 0D                      DEC     C
616 01FB 28 13 0210              JR      Z,RX255
617 01FD             RX238:
618 01FD 10 F7 01F6              DJNZ    RX236
619 01FF
620 01FF
621                      * * * * * THEN
622                      * * * * * * IF RESYNC DELIMIT
623 01FF             RX240:
624                      * * * * * * THEN
625                      * * * * * * * SET FRAME COUNT FOR FALSE SYNC = 75
626 01FF 3E 4C                   LD      A,76
627 0201 32 00 00   E            LD      (FALSE),A
628 0204
629                      * * * * * * * SET RESYNC FLAG
630 0204 3E FF                   LD      A,0FFH
631 0206 32 00 00   E            LD      (RESYNC),A
632 0209
633                      * * * * * * END IF
634 0209             RX250:
635 0209
636                      * * * * * SET DELIMIT BYTE RECV'D FLAG
637 0209 21 00 00   E            LD      HL,RXFLGS
638 020C CB CE                   SET     1,(HL)
639 020E 18 2B 023B              JR      RX300
640 0210
641                      * * * * ELSE
642 0210             RX255:
```

```
643                       * * * * * DEC SYNC CHAR LIMIT COUNTER
644 0210 21 00 00    E           LD      HL,CHARLM
645 0213 35                      DEC     (HL)
646 0214
647                       * * * * * IF LIMIT = 0
648 0214 20 25 023B              JR      NZ,RX300
649 0216
650                       * * * * * THEN
651                       * * * * * * EXIT RECEIVE MODE
652 0216 CD 00 00    E           CALL    EXITRX
653 0219
654                       * * * * * END IF
655                       * * * * END IF
656 0219 C3 3B 02    C           JP      RX300
657 021C
658                       * * * * ELSE
659 021C                  RX260:
660                       * * * * * SET RCV FLAG
661 021C 3E FF                   LD      A,0FFH
662 021E 32 00 00    E           LD      (RCVFLG),A
663 0221
664                       * * * * * CLEAR SYNC SEARCH FREQ CHANGE FLAG
665                                            ;(TO DISALLOW POSSIBLE PENDING PAGE FRAME)
666 0221 AF                      XOR     A
667 0222 32 00 00    E           LD      (PTTI),A
668 0225
669                       * * * * * IF RCV'D BYTE = SYNC CHARACTER
670 0225 3E 00       E           LD      A,.LOW.SNCHAR
671 0227 A9                      XOR     C
672 0228 20 08 0232             JR      NZ,RX270
673 022A
674                       * * * * * THEN
675                       * * * * * * SET SYNC CHARACTER RECEIVED FLAG
676 022A 21 00 00    E           LD      HL,RXFLGS
677 022D CB C6                   SET     0,(HL)
678 022F C3 3B 02    C           JP      RX300
679 0232
680                       * * * * * ELSE
681                       * * * * * * DECREMENT SYNC CHARACTER LIMIT
682 0232                  RX270:
683 0232 21 00 00    E           LD      HL,CHARLM
684 0235 35                      DEC     (HL)
685 0236
686                       * * * * * * IF LIMIT = 0
687 0236 20 03 023B              JR      NZ,RX300
688 0238
689                       * * * * * * THEN
690                       * * * * * * * EXIT RECEIVE MODE
691 0238 CD 00 00    E           CALL    EXITRX
692                       * * * * * * END IF
693 023B
694                       * * * * * END IF
695                       * * * * END IF
696                       * * * END CASE
697                       * * END IF
698 023B                  RX300:
699 023B
700                       * * RESTORE REGISTERS
701 023B E1                      POP     HL
702 023C C1                      POP     BC
703 023D F1                      POP     AF
704 023E
```

```
705                    * * ENABLE INTERRUPTS
706 023E FB                   EI
707 023F
708                    * END PROCEDURE
709 023F C9                   RET
710 0240                      END
```

ERRORS = 0000

```
APRTC  E 0016   BCTR20 E 0009   BITRCK E 001F   BOUNCE E 001C
BPRTCC E 001D   BTVOTE E 000E   CHARLM E 0019   CPRTAS E 001A
CPRTCS E 0013   EOMBYT E 0006   EOMCTR E 0007   EXITFL E 0008
EXITRX E 0017   FALSE  E 0022   FLTMCT E 0024   IDELIM E 0012
INPTR  E 0002   MEMORY M 0000   OUTPTR E 0015   PTTI   E 0001
PTTMSK E 001E   RCVFLG E 0014   REDLIM E 0021   RESYNC E 0023
RETX   E 0028   RMATCH E 0029   RX100  C 00E0   RX110  C 00F9
RX120  C 00F9   RX125  C 010E   RX128  C 011F   RX130  C 0122
RX131  C 0133   RX132  C 0147   RX133  C 0154   RX134  C 0161
RX135  C 016B   RX138  C 016E   RX140  C 017E   RX145  C 0191
RX147  C 019C   RX150  C 01A6   RX160  C 01AC   RX170  C 01AF
RX180  C 01C6   RX190  C 01CC   RX20   C 001A   RX200  C 01CF
RX22   C 003C   RX220  C 01DD   RX230  C 01E3   RX232  C 01E7
RX234  C 01ED   RX236  C 01F6   RX238  C 01FD   RX240  C 01FF
RX25   C 0040   RX250  C 0209   RX255  C 0210   RX260  C 021C
RX270  C 0232   RX30   C 0043   RX300  C 023B   RX32   C 005D
RX34   C 0066   RX36   C 0069   RX38   C 0070   RX40   C 0073
RX45   C 0086   RX50   C 00A2   RX60   C 00AE   RX80   C 00CC
RX90   C 00DD   RXBYTS E 0004   RXCLKS E 0020   RXCMDW E 002A
RXFLGS E 0003   RXRDY  C 0000   RXSOMC E 0027   RXTIME E 0010
SNCHAR E 0018   SOMBYT E 000A   SOMCTR E 000B   STACK  S 0000
TALLY  E 000F   TIME1  E 0011   TIME2  E 000D   TIME3  E 0025
TIME4  E 0026   TIMRXD E 000C   TXFLGS E 001B   USART  E 0005
UTDATA E 0000
```

```
  1    ******************************************************************
  2    *                                                                *
  3    * NAME: BCD TO BINARY (BCDBIN)              PPS REF:             *
  4    *                                                                *
  5    * FILE NAME: BCDBIN.SRC                                          *
  6    *                                                                *
  7    * FUNCTION: CONVERTS A BINARY CODED DECIMAL TO STRICT BINARY     *
  8    *                                                                *
  9    * METHOD:                                                        *
 10    *                                                                *
 11    * INPUT PARAMETERS:                                              *
 12    *                                                                *
 13    * NAME      DESCRIPTION              TYPE      LENGTH    RANGE   *
 14    *                                                                *
 15    * HL        ADDRESS OF BCD NUMBER    BCD       1 BYTE    0-99    *
 16    *                                                                *
 17    * OUTPUT PARAMETERS:                                             *
 18    *                                                                *
 19    * NAME      DESCRIPTION              TYPE      LENGTH    RANGE   *
 20    *                                                                *
 21    * ACC&B     BINARY RESULT            BINARY    1 BYTE    0-63H   *
 22    *                                                                *
 23    * DATA ACCESSED OR ALTERED EXTERNAL TO MODULE:                   *
 24    *                                                                *
 25    * NAME      DESCRIPTION              TYPE      LENGTH    DIRECTION *
 26    *                                                                *
```

```
27              * RESTRICTIONS: USED ACC,B,C,H & L REGISTERS                    *
28              *                                                               *
29              * SUPPORTING MODULES: NONE                                      *
30              *                                                               *
31              * COPYRIGHT 1982 ROCKWELL INTERNATIONAL                         *
32              * COLLINS TELCOMMUNICATIONS PRODUCT DIVISION                    *
33              *                                                               *
34              * AUTHOR: C. A. BONEBRIGHT            DATE: 5-3-82              *
35              *                                                               *
36              * VERSION: 1.0                                                  *
37              *                                                               *
38              * REVISION:                           DATE:                     *
39              *                                                               *
40              ****************************************************************
41 0000
42                      CSEG
43 0000                 TITLE    'BCDBIN'
44                      NAME     BCDBIN
45                      PUBLIC   BCDBIN
46                                         ;ADDRESS OF BCD SHOULD BE IN HL WHEN CALLED
47.                                         ;BINARY RESULT RETURNED IN ACC & B REG
48 0000
49              * PROCEDURE BCDBIN
50                                          ;ACCUMULATOR, REGISTERS B,C,H & L ARE USED
51 0000         BCDBIN:
52 0000
53              * * IF TEN'S BCD=0
54 0000 AF              XOR      A
55 0001 ED 6F           RLD              ;PUTS TEN'S DIGIT IN THE ACCUMULATOR
56 0003 B7              OR       A
57 0004 C2 0C 00   C    JP       NZ,BCD10
58 0007
59              * * THEN
60              * * * ONE'S BCD=BINARY RESULT
61 0007 ED 6F           RLD              ;PUTS ONE'S DIGIT IN THE ACCUMULATOR
62 0009 C3 14 00   C    JP       BCD30    ;TO END IF
63 000C
64              * * ELSE
65              * * * SET TEN'S BCD=COUNTER
66 000C         BCD10:
67 000C 47              LD       B,A      ;COUNTER
68 000D 0E 0A           LD       C,10     ;CONSTANT ADDEND
69 000F
70              * * * SET ONE'S BCD=PARTIAL SUM OF RESULT
71 000F ED 6F           RLD
72 0011
73              * * * DO UNTIL COUNTER=0
74 0011         BCD20:
75 0011
76              * * * * ADD 10 TO PARTIAL SUM
77 0011 81              ADD      A,C
78 0012
79              * * * END UNTIL
80 0012 10 FD 0011      DJNZ     BCD20
81 0014
82              * * END IF
83 0014         BCD30:
84 0014 47              LD       B,A      ;RESULT PLACED IN B AS WELL AS ACCUMULATOR
85 0015
86              * END PROCEDURE
87 0015 C9              RET
88 0016                 END
```

```
BCD10  C 000C    BCD20  C 0011    BCD30  C 0014    BCDBIN C 0000
MEMORY M 0000    STACK  S 0000

1 0000                                TITLE   'SUPER2
 2                                     NAME    SUPER2
 3                                     PUBLIC  SUPER2
 4                                     EXTRN   INTFRM,TXRDY,RXRDY,DATABF,PAGFRQ
 5                                     EXTRN   RCVFRM,MDCHNG
 6 0000
 7                                     CSEG
 8 0000
 9                             * PROCEDURE SUPER2
10 0000
11 0000                        SUPER2:
12 0000
13                             * * INITIALIZE FOR TRANSMIT
14 0000
15 0000 21 00 00        E              LD      HL,TXRDY            ;SET UP INTERRUPT VECTORS
16 0003 22 F0 13                       LD      (13F0H),HL
17 0006 21 00 00        E              LD      HL,RXRDY
18 0009 22 F9 13                       LD      (13F9H),HL
19 000C 21 00 00        E              LD      HL,INTFRM
20 000F 22 F6 13                       LD      (13F6H),HL
21 0012 21 00 00        E              LD      HL,MDCHNG
22 0015 22 EA 13                       LD      (13EAH),HL
23 0018 21 00 00        E              LD      HL,RCVFRM
24 001B 22 FC 13                       LD      (13FCH),HL
25 001E
26 001E 21 55 D5                       LD      HL,0D555H
27 0021 22 00 00        E              LD      (PAGFRQ),HL
28 0024
29 0024 06 20                          LD      B,20H
30 0026 AF                             XOR     A
31 0027 21 00 00        E              LD      HL,DATABF
32 002A                        SUP00:
33 002A 77                             LD      (HL),A
34 002B 3C                             INC     A
35 002C 23                             INC     HL
36 002D 10 FB 002A                     DJNZ    SUP00
37 002F
38 002F
39 002F 00                             NOP
40 0030 00                             NOP
41 0031 00                             NOP
42 0032 00                             NOP
43 0033
44                             * * END PROCEDURE
45 0033 C9                             RET
46 0034                                END

DATABF E 0003    INTFRM E 0000    MDCHNG E 0006    MEMORY M 0000
PAGFRQ E 0004    RCVFRM E 0005    RXRDY  E 0002    STACK  S 0000
SUP00  C 002A    SUPER2 C 0000    TXRDY  E 0001

1     ;********************************************************************
 2     ;*                                                                  *
 3     ;* NAME: SSINIT                    (SSINIT)                         *
 4     ;*                                                                  *
 5     ;* FILE NAME: SSINIT.SRC                                            *
 6     ;*
```

```
 7                  ;* FUNCTION:   INITIALIZATION FOR ENTERING SYNC SEARCH SUB-MODE      *
 8                  ;*                                                                    *
 9                  ;* METHOD:                                                             *
10                  ;*                                                                    *
11                  ;* INPUT PARAMETERS:                                                   *
12                  ;*                                                                    *
13                  ;* NAME      DESCRIPTION               TYPE     LENGTH     RANGE       *
14                  ;*                                                                    *
15                  ;*                                                                    *
16                  ;* OUTPUT PARAMETERS:                                                  *
17                  ;*                                                                    *
18                  ;* NAME      DESCRIPTION               TYPE     LENGTH     RANGE       *
19                  ;*                                                                    *
20                  ;*                                                                    *
21                  ;* DATA ACCESSED OR ALTERED EXTERNAL TO MODULE:                        *
22                  ;* NAME      DESCRIPTION               TYPE     LENGTH     RANGE     DIRECTION  *
23                  ;*                                                                    *
24                  ;* TXTIME    TX TIME BYTE BUFFER                4 BYTES              INPUT      *
25                  ;* PAGETX    TX PAGE COUNTER                    1 BYTE               OUTPUT     *
26                  ;* REPAGT    TX RESYNC PAGE COUNTER             1 BYTE               OUTPUT     *
27                  ;* SS1ST     SYNC SEARCH 1ST FLAG               1 BYTE               OUTPUT     *
28                  ;*                                                                    *
29                  ;* RESTRICTIONS:                                                       *
30                  ;*                                                                    *
31                  ;*       USES ACC,D,H, AND L REGISTERS                                 *
32                  ;*                                                                    *
33                  ;* SUPPORTING MODULES:                                                 *
34                  ;*                                                                    *
35                  ;*       WKEQMO - SETS DAY OF MONTH = DAY OF WEEK                      *
36                  ;*       FRMTIM - CALCULATES TX FRAME TIME                             *
37                  ;*       PAGECT - CALCULATES PAGE & RESYNC PAGE COUNTERS               *
38                  ;*                                                                    *
39                  ;* COPYRIGHT 1981 ROCKWELL INTERNATIONAL                               *
40                  ;* COLLINS TELECOMMUNICATIONS PRODUCTS DIVISION                        *
41                  ;*                                                                    *
42                  ;* AUTHOR: C. BONEBRIGHT                     DATE:  02/14/83           *
43                  ;*                                                                    *
44                  ;* VERSION:  1.0                                                       *
45                  ;*                                                                    *
46                  ;* REVISED:                                  DATE:                     *
47.                 ;*                                                                    *
48                  ;***********************************************************************/
49 0000             EJECT
50 0000
51 0000                     TITLE   'SSINIT
52                           NAME    SSINIT
53                           PUBLIC  SSINIT
54                           EXTRN   WKEQMO,FRMTIM,PAGECT,TXTIME,PAGETX,REPAGT,SS1ST
55                           CSEG
56 0000
57                  * PROCEDURE SSINIT
58 0000             SSINIT:
59 0000
60                  * * SET DAY OF MONTH = DAY OF WEEK IN RTC
61 0000 CD 00 00  E         CALL    WKEQMO
62 0003
63                  * * IF UNEQUAL FLAG SET
64 0003 B7                  OR      A
65 0004 28 17 001D          JR      Z,SS10
```

```
66 0006
67                              * * THEN
68 0006
69                              * * * RECALCULATE FRAME TIME
70 0006 F3                              DI
71 0007 CD 00 00      E                 CALL    FRMTIM
72 000A
73                              * * * CALCULATE PAGE FRAME COUNTER
74 000A 21 00 00      E                 LD      HL,TXTIME
75 000D CD 00 00      E                 CALL    PAGECT
76 0010 32 00 00      E                 LD      (PAGETX),A
77 0013 21 00 00      E                 LD      HL,REPAGT
78 0016 72                              LD      (HL),D
79 0017
80                              * * * SET SYNC SEARCH 1ST FLAG
81 0017 3E FF                           LD      A,0FFH
82 0019 32 00 00      E                 LD      (SS1ST),A
83 001C FB                              EI
84 001D
85                              * * END IF
86 001D                         SS10:
87 001D
88                              * END PROCEDURE
89 001D C9                              RET
90 001E                                 END

EJECT    0000    FRMTIM E 0001   MEMORY M 0000   PAGECT E 0002
PAGETX E 0004    REPAGT E 0005   SS10   C 001D   SS1ST  E 0006
SS1NIT C 0000    STACK  S 0000   TXTIME E 0003   WKE0M0 E 0000

1                       ****************************************************************
2                       *                                                              *
3                       * NAME: CHECK PAGE                        PPS REF:              *
4                       *                                                              *
5                       * FILE NAME: CHKPAG.SRC                                         *
6                       *                                                              *
7                       * FUNCTION: CHECKS STATUS OF PAGE AND UPDATES ACCORDINGLY.      *
8                       *                                                              *
9                       *                                                              *
10                      *                                                              *
11                      * METHOD:                                                       *
12                      *                                                              *
13                      * INPUT PARAMETERS:                                             *
14                      *                                                              *
15                      * NAME       DESCRIPTION            TYPE     LENGTH     RANGE   *
16                      *                                                              *
17                      * OUTPUT PARAMETERS:                                            *
18                      *                                                              *
19                      * NAME       DESCRIPTION            TYPE     LENGTH     RANGE   *
20                      *                                                              *
21                      *                                                              *
22                      * DATA ACCESSED OR ALTERED EXTERNAL TO MODULE:                  *
23                      *                                                              *
24                      * NAME     DESCRIPTION         TYPE     LENGTH    RANGE   DIRECTION*
25                      *                                                              *
26                      * PAGEFL   DISPLAY PAGE MODE              1 BYTE              BOTH    *
27                      * HYSTRI   PAGE HYSTERESIS COUNTER        1 BYTE              OUTPUT  *
28                      * PAGDET   TEMP STORAGE FOR PAGE DET CKT  1 BYTE              INPUT   *
29                      * DSPLPG   DISPLAY PAGE FLAG              1 BYTE              OUTPUT  *
```

```
30              * RESTOR  RESTORE DISPLAY FLAG         1 BYTE           OUTPUT    *
31              * SYSSTS+3 CONTROL DISPLAY STATUS      1 BYTE           INPUT     *
32              * SECTMR  SECOND TIMER/COUNTER         1 BYTE           OUTPUT    *
33              *                                                                 *
34              * RESTRICTIONS: USES ACCUMULATOR                                  *
35              *                                                                 *
36              * SUPPORTING MODULES: NONE                                        *
37              *                                                                 *
38              *                                                                 *
39              * COPYRIGHT 1983 ROCKWELL INTERNATIONAL                           *
40              * COLLINS TELECOMMUNICATIONS PRODUCTS DIVISION                    *
41              *                                                                 *
42              * AUTHOR: C. A. BONEBRIGHT               DATE: 01-12-83           *
43              *                                                                 *
44              * VERSION: 1.0                                                    *
45              *                                                                 *
46              * REVISION:                              DATE:                    *
47              *                                                                 *
48              *****************************************************************
49                      CSEG
50 0000                 TITLE   'CHKPAG
51                      NAME    CHKPAG
52                      PUBLIC  CHKPAG
53                      EXTRN   DSPLPG,RESTOR,SYSSTS,PAGEFL,SECTMR
54                      EXTRN   HYSTRI,PAGDET,PGDTCT,SQMSK
55 0000
56              * PROCEDURE CHKPAG
57 0000         CHKPAG:
58 0000
59              * IF PAGE FLAG NOT SET
60 0000 3A 00 00    E   LD      A,(PAGEFL)
61 0003 B7               OR      A
62 0004 20 33 0039       JR      NZ,CHK70
63 0006
64              * THEN
65              * * IF PAGE DET
66 0006 3A 00 00    E   LD      A,(PAGDET)
67 0009 E6 00      E   AND     .LOW.PGDTCT
68 000B 28 26 0033       JR      Z,CHK50         ;1 INDICATES PAGE DET.
69 000D
70              * * THEN
71              * * * INCREMENT PAGE HYSTERESIS COUNTER
72 000D 3A 00 00    E   LD      A,(HYSTRI)
73 0010 3C              INC     A
74 0011 32 00 00    E   LD      (HYSTRI),A
75 0014
76              * * * IF COUNTER = 3
77 0014 FE 03           CP      3
78 0016 20 42 005A      JR      NZ,CHK100
79 0018
80              * * * THEN
81              * * * * SET PAGE AND DISPLAY PAGE FLAG
82 0018 3E 0F           LD      A,0FH
83 001A 32 00 00    E   LD      (DSPLPG),A
84 001D 32 00 00    E   LD      (PAGEFL),A      ;DISPLAY ONLY = LOW NIBBLE
85 0020
86              * * * * INIT DISPLAY FLASH AND TONE COUNTER
87 0020 3E 01           LD      A,1
88 0022 32 00 00    E   LD      (SECTMR),A      ;INIT SECOND TIMER TO 1
89 0025
```

```
90                       * * * * IF PAGE TONE ENABLED
91  0025 3A 03 00    E          LD      A,(SYSSTS+3)
92  0028 E6 00       E          AND     .LOW.SQMSK
93  002A 28 2E 005A             JR      Z,CHK100                ;0 INDICATES DISSABLED
94  002C
95                       * * * * THEN
96                       * * * * SET TONE FLAG
97  002C 3E FF                   LD      A,0FFH
98  002E 32 00 00    E           LD      (PAGEFL),A              ;TONE FLAG = HIGH NIBBLE
99  0031
100                      * * * * END IF
101 0031             CHK20:
102                      * * * END IF
103 0031
104                      * * ELSE
105 0031 18 27 005A              JR      CHK100
106 0033             CHK50:
107 0033
108                      * * * LOAD PAGE HYSTERESIS WITH ZERO
109 0033 AF                      XOR     A
110 0034 32 00 00    E           LD      (HYSTRI),A
111 0037
112                      * * END IF
113 0037
114                      * ELSE
115 0037 18 21 005A              JR      CHK100
116 0039             CHK70:
117 0039
118                      * * IF NO PAGE DETECT
119 0039 3A 00 00    E           LD      A,(PAGDET)
120 003C E6 00       E           AND     .LOW.PGDTCT
121 003E 20 15 0055              JR      NZ,CHK80
122 0040
123                      * * THEN
124                      * * * DECREMENT PAGE HYSTERESIS
125 0040 3A 00 00    E           LD      A,(HYSTRI)
126 0043 3D                      DEC     A
127 0044 32 00 00    E           LD      (HYSTRI),A
128 0047
129                      * * * IF COUNTER = 0
130 0047 C2 5A 00    C           JP      NZ,CHK100
131 004A
132                      * * * THEN
133                      * * * CLEAR PAGE FLAG
134 004A AF                      XOR     A
135 004B 32 00 00    E           LD      (PAGEFL),A
136 004E
137                      * * * * SET RESTOR DISPLAY FLAG
138 004E 3E 0F                   LD      A,0FH
139 0050 32 00 00    E           LD      (RESTOR),A
140 0053
141                      * * * END IF
142 0053 18 05 005A              JR      CHK100
143 0055
144                      * * ELSE
145 0055             CHK80:
146 0055
147                      * * * LOAD PAGE HYSTERESIS WITH 3
148 0055 3E 03                   LD      A,3
149 0057 32 00 00    E           LD      (HYSTRI),A
```

```
150 005A
151                     * * END IF
152                     * END IF
153 005A     CHK100:
154                     * END PROCEDURE
155 005A C9             RET
156 005B                END
```

```
CHK100 C 005A   CHK20  C 0031   CHK50  C 0033   CHK70  C 0039
CHK80  C 0055   CHKPAG C 0000   DSPLPG E 0000   HYSTRI E 0005
MEMORY M 0000   PAGDET E 0006   PAGEFL E 0003   PGDTCT E 0007
RESTOR E 0001   SECTMR E 0004   SQMSK  E 0008   STACK  S 0000
SYSSTS E 0002
```

```
1      ;*****************************************************************
2      ;*                                                               *
3      ;* NAME:  TABLE BUILD     (TBLBLD)                               *
4      ;*                                                               *
5      ;* FUNCTION:  BUILDS TABLE OF LEGAL HOPPING FREQUENCIES AS ALLOWED BY FILL.  *
6      ;*                                                               *
7      ;* METHOD:                                                       *
8      ;*                                                               *
9      ;* INPUT PARAMETERS:                                             *
10     ;*                                                               *
11     ;* OUTPUT PARAMETERS:                                            *
12     ;* NAME       DESCRIPTION                  LENGTH       DIR      *
13     ;* BND1LO     INCLUDE BAND 1 LOW FREQ      2 BYTES      INPUT    *
14     ;* BND1HI     INCLUDE BAND 1 HIGH FREQ     2 BYTES      INPUT    *
15     ;* BND2LO     INCLUDE BAND 2 LOW FREQ      2 BYTES      INPUT    *
16     ;* BND2HI     INCLUDE BAND 2 HIGH FREQ     2 BYTES      INPUT    *
17     ;* BND3LO     INCLUDE BAND 3 LOW FREQ      2 BYTES      INPUT    *
18     ;* BND3HI     INCLUDE BAND 3 HIGH FREQ     2 BYTES      INPUT    *
19     ;* CHNINC     CHANNEL INCREMENT            4 BITS       INPUT    *
20     ;* INTRLV     INTERLEAVE FACTOR            4 BITS       INPUT    *
21     ;* FREQT      FREQUENCY TABLE              1024 BYTES   OUTPUT   *
22     ;* FTPTR      FREQ TABLE POINTER           2 BYTES      BOTH     *
23     ;*                                                               *
24     ;* RESTRICTIONS:  USES, ACC,B,C,D,E,H,AND L REGISTERS            *
25     ;*                                                               *
26     ;* SUPPORTING MODULES:   GDFREQ - CHECKS INCLUDE TABLE IN FILL TO FIND  *
27     ;*                                USEABLE FREQUENCIES & DETERMINES WHICH *
28     ;*                                OF THESE FREQUENCIES SHOULD BE STORED. *
29     ;*                       STRFRQ - SETS BAND BITS AND FREQ STOREE IN CHANNEL *
30     ;*                                AND STORES IN FREQUENCY TABLE. *
31     ;*                       CALPTR - CALCULATES ADDRESS OF CHANNEL BIT LOCATION *
32     ;*                                IN INCLUDE TABLE.              *
33     ;*                                                               *
34     ;* COPYRIGHT 1982 ROCKWELL INTERNATIONAL                         *
35     ;* COLLINS TELECOMMUNICATIONS PRODUCTS DIVISION                  *
36     ;* PROCESSOR TECHNOLOGY DEPARTMENT                               *
37     ;*                                                               *
38     ;* AUTHOR:  C. BONEBRIGHT                  DATE:  10-15-82       *
39     ;*                                                               *
40     ;* VERSION: 2.0                                                  *
41     ;*                                                               *
42     ;* REVISED: C. BONEBRIGHT                  DATE: 1-4-84          *
43     ;*                                                               *
44     ;*****************************************************************/
45 0000                EJECT
46 0000
```

```
 47.                       CSEG
 48 0000
 49 0000                   TITLE   'TBLBLD
 50                        NAME    TBLBLD
 51                        PUBLIC  TBLBLD
 52                        EXTRN   BND1LO,BND1HI,BND2LO,BND2HI,BND3LO,BND3HI,FREQT,FTPTR
 53                        EXTRN   CHNINC,GDFREQ,STRFRQ,CALPTR,INTRLV
 54 0000
 55              * PROCEDURE FREQUENCY TABLE BUILD
 56 0000         TBLBLD:
 57 0000
 5                * * SET CHANNEL = BAND 1 LOW FREQUENCY - 1
       ED 5B 00 00    E    LD      DE,(BND1LO)
        1B                 DEC     DE
 61 0005
 62              * * INIT FREQ TABLE POINTER TO BASE ADDRESS
 63 0005 21 00 00    E     LD      HL,FREQT
 64 0008 22 00 00    E     LD      (FTPTR),HL
 65 000B
 66              * * CALCULATE INCLUDE TABLE ADDRESS OF CHANNEL
 67 000B CD 00 00    E     CALL    CALPTR
 68 000E
 69              * * INIT CHANNEL INCREMENT COUNTER = INTERLEAVE FACTOR
 70 000E 3A 00 00    E     LD      A,(INTRLV)
 71 0011 47                LD      B,A
 72 0012
 73              * * DO UNTIL CHANNEL >  BAND 1 HIGH FREQUENCY
 74              * * OR FREQ TABLE COMPLETE
 75 0012         TBL20:
 76 0012
 77              * * * FIND GOOD FREQUENCY
 78 0012 CD 00 00    E     CALL    GDFREQ
 79 0015
 80              * * * IF FREQ < OR = BAND 1 HIGH FREQ
 81              * * * AND < MAX FREQ (87.975 MHZ)
 82 0015 21 DB 0F          LD      HL,0FDBH
 83 0018 ED 52              SBC     HL,DE
 84 001A 38 1A 0036         JR      C,TBL40
 85 001C
 86 001C 2A 00 00    E     LD      HL,(BND1HI)
 87 001F ED 52              SBC     HL,DE
 88 0021 38 13 0036         JR      C,TBL40
 89 0023
 90              * * * THEN
 91              * * * * STORE FREQUENCY
 92 0023 CD 00 00    E     CALL    STRFRQ
 93 0026
 94              * * * END IF
 95 0026
 96              * * END UNTIL
 97 0026 01 FF 03    E     LD      BC,FREQT+1023
 98 0029 37                SCF
 99 002A 3F                CCF
100 002B ED 42              SBC     HL,BC
101 002D 3A 00 00    E     LD      A,(CHNINC)      ;RESET CHANNEL INCREMENT CTR VALUE
102 0030 47                LD      B,A
103 0031 38 DF 0012         JR      C,TBL20
104 0033 C3 A8 00    C     JP      TBL500
105 0036         TBL40:
106 0036
```

```
107                   * * IF FREQUENCY TABLE NOT COMPLETE
108 0036
109                   * * THEN
110                   * * * SET CHANNEL = BAND 2 LOW FREQ - 1
111 0036 ED 5B 00 00   E      LD     DE,(BND2LO)
112 003A 1B                   DEC    DE
113 003B
114                   * * * CALCULATE INCLUDE TABLE ADDRESS OF CHANNEL
115 003B CD 00 00      E      CALL   CALPTR
116 003E
117                   * * * INIT CHANNEL INCREMENT COUNTER = INTERLEAVE FACTOR
118 003E 3A 00 00      E      LD     A,(INTRLV)
119 0041 47                   LD     B,A
120 0042
121                   * * * DO UNTIL CHANNEL > BAND 2 HIGH
122                   * * * OR FREQ TABLE COMPLETE
123 0042              TBL80:
124 0042
125                   * * * * FIND GOOD FREQUENCY
126 0042 CD 00 00      E      CALL   GDFREQ
127 0045
128                   * * * * IF FREQ < OR = BAND 2 HIGH
129                   * * * * AND < MAX FREQ (87.975 MHZ)
130 0045 21 DB 0F            LD     HL,0FDBH
131 0048 ED 52               SBC    HL,DE
132 004A 38 1A 0066          JR     C,TBL100
133 004C
134 004C 2A 00 00      E     LD     HL,(BND2HI)
135 004F ED 52               SBC    HL,DE
136 0051 38 13 0066          JR     C,TBL100
137 0053
138                   * * * * THEN
139                   * * * * STORE FREQUENCY
140 0053 CD 00 00      E     CALL   STRFRQ
141 0056
142                   * * * * END IF
143 0056
144                   * * * END UNTIL
145 0056 01 FF 03      E     LD     BC,FREQT+1023
146 0059 37                  SCF
147 005A 3F                  CCF
148 005B ED 42               SBC    HL,BC
149 005D 3A 00 00      E     LD     A,(CHNINC)        ;RESET CHANNEL INCREMENT CTR VALUE
150 0060 47                  LD     B,A
151 0061 38 DF 0042          JR     C,TBL80
152 0063 C3 A8 00      C     JP     TBL500
153 0066              TBL100:
154 0066
155                   * * * IF FREQ TABLE NOT COMPLETE
156 0066
157                   * * * THEN
158                   * * * * SET CHANNEL = BAND 3 LOW FREQ - 1
159 0066 ED 5B 00 00   E     LD     DE,(BND3LO)
160 006A 1B                  DEC    DE
161 006B
162                   * * * * CALCULATE INCLUDE TABLE ADDRESS OF CHANNEL
163 006B CD 00 00      E     CALL   CALPTR
164 006E
165                   * * * * INIT CHANNEL INCREMENT COUNTER = INTERLEAVE FACTOR
```

```
166 006E 3A 00 00    E         LD      A,(INTRLV)
167 0071 47                    LD      B,A
168 0072
169                  * * * * DO UNTIL CHANNEL > BAND 3 HIGH
170                  * * * * OR FREQ TABLE COMPLETE
171 0072             TBL120:
172 0072
173                  * * * * * FIND GOOD FREQUENCY
174 0072 CD 00 00    E         CALL    GDFREQ
175 0075
176                  * * * * * IF FREQ < OR = BAND 3 HIGH
177                  * * * * * AND < MAX FREQ (87.975 MHZ)
178 0075 21 DB 0F              LD      HL,0FDBH
179 0078 ED 52                 SBC     HL,DE
180 007A 38 1A 0096            JR      C,TBL140
181 007C
182 007C 2A 00 00    E         LD      HL,(BND3HI)
183 007F ED 52                 SBC     HL,DE
184 0081 38 13 0096            JR      C,TBL140
185 0083
186                  * * * * * THEN
187                  * * * * * * STORE FREQUENCY
188 0083 CD 00 00    E         CALL    STRFRQ
189 0086
190                  * * * * * END IF
191 0086
192                  * * * * END UNTIL
193 0086 01 FF 03    E         LD      BC,FREQT+1023
194 0089 37                    SCF
195 008A 3F                    CCF
196 008B ED 42                 SBC     HL,BC
197 008D 3A 00 00    E         LD      A,(CHNINC)
198 0090 47                    LD      B,A
199 0091 38 DF 0072            JR      C,TBL120
200 0093 C3 A8 00    C         JP      TBL500
201 0096             TBL140:
202 0096
203                  * * * * IF FREQ TABLE NOT COMPLETE
204 0096
205                  * * * * THEN
206                  * * * * * REPLICATE TABLE
207 0096 ED 5B 00 00 E         LD      DE,(FTPTR)
208 009A 21 00 04    E         LD      HL,FREQT+1024
209 009D 37                    SCF
210 009E 3F                    CCF
211 009F ED 52                 SBC     HL,DE
212 00A1 44                    LD      B,H
213 00A2 4D                    LD      C,L
214 00A3 21 00 00    E         LD      HL,FREQT
215 00A6 ED B0                 LDIR
216 00A8
217                  * * * * END IF
218                  * * * END IF
219                  * * END IF
220 00A8
221.                 * END PROCEEDURE
222 00A8             TBL500:
223 00A8 C9                    RET
224 00A9                       END
```

| | | | |
|---|---|---|---|
| BND1HI E 0001 | BND1LO E 0000 | BND2HI E 0003 | BND2LO E 0002 |
| BND3HI E 0005 | BND3LO E 0004 | CALPTR E 000B | CHNINC E 0008 |
| EJECT    0000 | FREQT E 0006 | FTPTR E 0007 | GDFREQ E 0009 |

```
 1        ;****************************************************************
 2        ;*                                                              *
 3        ;* NAME:    ERROR CORRECTION          (ERRCOR)                  *
 4        ;*                                                              *
 5        ;* FILE NAME:  ERRCOR.SRC                                       *
 6        ;*                                                              *
 7        ;* FUNCTION:   CODES THE 2 LSB'S OF TIME WITH ERROR CORRECTION BITS FOR *
 8        ;*             DATA TRANSMISSION.                               *
 9        ;*                                                              *
10        ;* METHOD: N/A                                                  *
11        ;*                                                              *
12        ;* INPUT PARAMETERS:                                            *
13        ;*                                                              *
14        ;* NAME      DESCRIPTION           TYPE    LENGTH    RANGE      *
15        ;*                                                              *
16        ;* HL        2 LSB'S OF FRAME TIME                              *
17        ;*                                                              *
18        ;* OUTPUT PARAMETERS:                                           *
19        ;*                                                              *
20        ;* NAME      DESCRIPTION           TYPE    LENGTH    RANGE      *
21        ;*                                                              *
22        ;* HL        FRAME TIME - 4 MSBITS + ERROR CORRECTION BITS      *
23        ;*                                                              *
24        ;* DATA ACCESSED OR ALTERED EXTERNAL TO MODULE:                 *
25        ;* NAME      DESCRIPTION           TYPE    LENGTH    RANGE    DIRECTION *
26        ;*                                                              *
27        ;*                                                              *
28        ;*                                                              *
29        ;*                                                              *
30        ;* RESTRICTIONS:                                                *
31        ;*                                                              *
32        ;*     USES ACC,B,C,H, AND L REGISTERS                          *
33        ;*     DESTROYS THE 4 MSBITS OF TIME AND REPLACES THEM WITH ERROR *
34        ;*         CORRECTION BITS.                                     *
35        ;*                                                              *
36        ;* SUPPORTING MODULES:                                          *
37        ;*                                                              *
38        ;*         NONE                                                 *
39        ;*                                                              *
40        ;* COPYRIGHT 1981 ROCKWELL INTERNATIONAL                        *
41        ;* COLLINS TELECOMMUNICATIONS PRODUCTS DIVISION                 *
42        ;*                                                              *
43        ;* AUTHOR: C. BONEBRIGHT                     DATE:  09/17/82    *
44        ;*                                                              *
45        ;* VERSION: 1.0                                                 *
46        ;*                                                              *
47        ;* REVISED:                                  DATE:              *
48        ;*                                                              *
49        ;****************************************************************/
50 0000   EJECT
51 0000
52 0000            TITLE   'ERRCOR'
53                 NAME    ERRCOR
54                 PUBLIC  ERRCOR
55                 CSEG
56 0000
57        * PROCEDURE ERROR CORRECTION
58 0000   ERRCOR:
```

```
59 0000
60                         * * RESET BITS 12-15
61 0000
62 0000 3E 0F                    LD      A,0FH
63 0002 A4                       AND     H
64 0003 67                       LD      H,A
65 0004
66                         * * AND BOTH BYTES WITH 1ST PATTERN AND DETERMINE PARITY
67 0004
68 0004 0E 00                    LD      C,0             ;INIT ODD COUNTER
69 0006 3E 59                    LD      A,059H
70 0008 A5                       AND     L
71 0009
72                         * * IF PARITY IS ODD IN 1ST BYTE
73 0009 EA 0D 00      C          JP      PE,ER30
74 000C
75                         * * THEN
76                         * * * INC COUNTER
77 000C 0C                       INC     C               ;INCREMENT ODD COUNTER
78 000D
79                         * * END IF
80 000D                   ER30:
81                         * * IF PARITY IS ODD IN 2ND BYTE
82 000D 3E 07                    LD      A,07H
83 000F A4                       AND     H
84 0010 EA 14 00      C          JP      PE,ER50
85 0013
86                         * * THEN
87                         * * * INC COUNTER
88 0013 0C                       INC     C               ;INCREMENT ODD COUNTER
89 0014
90                         * * END IF
91 0014                   ER50:
92 0014
93                         * * IF # OF 1'S IS ODD
94 0014 CB 41                    BIT     0,C
95 0016 28 02 001A               JR      Z,ER60
96 0018
97                         * * THEN
98                         * * * SET BIT 12
99 0018 CB E4                    SET     4,H
100 001A
101                        * * END IF
102 001A                  ER60:
103                        * * AND BYTES WITH 2ND PATTERN AND DETERMINE PARITY
104 001A
105 001A 0E 00                   LD      C,0
106 001C 3E EB                   LD      A,0EBH
107 001E A5                      AND     L
108 001F
109                        * * IF PARITY IS ODD IN 1ST BYTE
110 001F EA 23 00      C         JP      PE,ER80
111 0022
112                        * * THEN
113                        * * * INC COUNTER
114 0022 0C                      INC     C
115 0023
116                        * * END IF
117 0023                  ER80:
118 0023
119                        * * IF PARITY IS ODD IN 2ND BYTE
```

```
120 0023 3E 01                  LD      A,01H
121 0025 A4                     AND     H
122 0026 EA 2A 00    C          JP      PE,ER100
123 0029
124                      * * THEN
125                      * * * INC COUNTER
126 0029 0C                     INC     C
127 002A
128                      * * END IF
129 002A                 ER100:
130 002A
131                      * * IF # OF 1'S IS ODD
132 002A CB 41                  BIT     0,C
133 002C 28 02 0030              JR      Z,ER110
134 002E
135                      * * THEN
136                      * * * SET BIT 13
137 002E CB EC                  SET     5,H
138 0030
139                      * * END IF
140 0030                 ER110:
141 0030
142                      * * AND BYTES WITH 3RD PATTERN AND DETERMINE PARITY
143 0030 0E 00                  LD      C,0
144 0032 3E D6                  LD      A,0D6H
145 0034 A5                     AND     L
146 0035
147                      * * IF PARITY IS ODD IN 1ST BYTE
148 0035 EA 39 00    C          JP      PE,ER130
149 0038
150                      * * THEN
151                      * * * INC COUNTER
152 0038 0C                     INC     C
153 0039
154                      * * END IF
155 0039                 ER130:
156 0039
157                      * * IF PARITY IS ODD 2ND BYTE
158 0039 3E 03                  LD      A,03H
159 003B A4                     AND     H
160 003C EA 40 00    C          JP      PE,ER150
161 003F
162                      * * THEN
163                      * * * INCREMENT COUNTER
164 003F 0C                     INC     C
165 0040
166                      * * END IF
167 0040                 ER150:
168 0040
169                      * * IF # OF 1'S IS ODD
170 0040 CB 41                  BIT     0,C
171 0042 28 02 0046              JR      Z,ER160
172 0044
173                      * * THEN
174                      * * * SET BIT 14
175 0044 CB F4                  SET     6,H
176 0046
177                      * * END IF
178 0046                 ER160:
179                      * * AND BYTES WITH 4TH PATTERN AND DETERMINE PARITY
180 0046 0E 00                  LD      C,0
181 0048 3E AC                  LD      A,0ACH
```

```
182 004A A5                    AND     L
183 004B
184                    * * IF PARTIY IS ODD IN 1ST BYTE
185 004B EA 4F 00   C           JP      PE,ER180
186 004E
187                    * * THEN
188                    * * * SET COUNTER = 1
189 004E 0C                    INC     C
190 004F
191                    * * END IF
192 004F              ER180:
193 004F
194                    * * IF PARITY IS ODD IN 2ND BYTE
195 004F 3E 07                 LD      A,07H
196 0051 A4                    AND     H
197 0052 EA 56 00   C           JP      PE,ER200
198 0055
199                    * * THEN
200                    * * * INCREMENT COUNTER
201 0055 0C                    INC     C
202 0056
203                    * * END IF
204 0056              ER200:
205 0056
206                    * * IF # OF 1'S IS ODD
207 0056 CB 41                 BIT     0,C
208 0058 28 02 005C            JR      Z,ER210
209 005A
210                    * * THEN
211                    * * * SET BIT 15
212 005A CB FC                 SET     7,H
213 005C
214                    * * END IF
215 005C              ER210:
216 005C
217                    * END PROCEDURE
218 005C C9                    RET
219 005D                       END
```

ERRORS = 0000

```
EJECT   0000    ER100 C 002A   ER110 C 0030   ER130 C 0039
ER150 C 0040    ER160 C 0046   ER180 C 004F   ER200 C 0056
ER210 C 005C    ER30  C 000D   ER50  C 0014   ER60  C 001A
ER80  C 0023    ERRCOR C 0000  MEMORY M 0000  STACK S 0000
```

```
 1      ;**********************************************************************  *
 2      ;*                                                                        *
 3      ;* NAME:  TALLY                    (TALLY)                                *
 4      ;*                                                                        *
 5      ;* FILE NAME:  TALLY.SRC                                                  *
 6      ;*                                                                        *
 7      ;* FUNCTION:  RECONSTRUCTS THE RECEIVED TIME BYTE OR COMMAND WORD FROM THE *
 8      ;*            BIT VOTE BUFFERS AND PLACES IT IN THE ACCUMULATOR.          *
 9      ;*                                                                        *
10      ;* METHOD:                                                                *
11      ;*                                                                        *
12      ;* INPUT PARAMETERS:                                                      *
13      ;*                                                                        *
14      ;* NAME       DESCRIPTION               TYPE    LENGTH    RANGE           *
```

```
15          ;*                                                                           *
16          ;* HL       BIT VOTE BUFFER ADDRESS   BINARY   2 BYTES   TIME1 OR TIME2      *
17          ;*                                                                           *
18          ;* OUTPUT PARAMETERS:                                                        *
19          ;*                                                                           *
20          ;* NAME     DESCRIPTION              TYPE     LENGTH    RANGE                *
21          ;*                                                                           *
22          ;* ACC      RECONSTRUCTED TIME BYTE  BINARY   1 BYTE    0-FF                 *
23          ;*                                                                           *
24          ;* DATA ACCESSED OR ALTERED EXTERNAL TO MODULE:                              *
25          ;* NAME     DESCRIPTION              TYPE     LENGTH    RANGE    DIRECTION   *
26          ;*                                                                           *
27          ;* TIME1    TIME BYTE 1 BUFFER                8 BYTES            INPUT       *
28          ;* TIME2    TIME BYTE 2 BUFFER                8 BYTES            INPUT       *
29          ;*                                                                           *
30          ;* RESTRICTIONS:                                                             *
31          ;*                                                                           *
32          ;*       USES ACC,B,C,H, AND L REGISTERS                                     *
33          ;*                                                                           *
34          ;* SUPPORTING MODULES:                                                       *
35          ;*                                                                           *
36          ;*       NONE                                                                *
37          ;*                                                                           *
38          ;* COPYRIGHT 1981 ROCKWELL INTERNATIONAL                                     *
39          ;* COLLINS TELECOMMUNICATIONS PRODUCTS DIVISION                              *
40          ;*                                                                           *
41          ;* AUTHOR:  C. BONEBRIGHT                      DATE:  05/17/82               *
42          ;*                                                                           *
43          ;* VERSION: 1.0                                                              *
44          ;*                                                                           *
45          ;* REVISED:                                    DATE:                         *
46          ;*                                                                           *
47          ;*****************************************************************************/
48 0000    EJECT
49 0000
50 0000            TITLE   'TALLY
51                 NAME    TALLY
52                 PUBLIC  TALLY
53                 CSEG
54 0000
55          ;* PROCEDURE TALLY
56 0000    TALLY:
57 0000
58          ;* SET UP COUNTER
59 0000 06 08      LD      B,8
60 0002
61          ;* DO REPEAT 8 TIMES (8 BITS)
62 0002    TAL00:
63 0002
64          ;* * PUT CORRECT VALUE INTO CARRY BIT
65 0002 7E         LD      A,(HL)
66 0003 FE 10      CP      16
67 0005 79         LD      A,C
68 0006
69          ;* * PUT BIT INTO BYTE AND SAVE
70 0006 17         RLA
71 0007 4F         LD      C,A
72 0008
73          ;* * INCREMENT BIT POINTER
74 0008 23         INC     HL
75 0009
76          ;* END REPEAT
```

```
77 0009 10 F7 0002              DJNZ    TAL00
78 000B
79                      ;* PLACE CONSTRUCTED TIME BYTE IN ACCUMULATOR
80 000B 79                      LD      A,C
81 000C
82                      ;END PROCEDURE
83 000C C9                      RET
84 000D                         END

ERRORS = 0000

EJECT   0000    MEMORY M 0000   STACK S 0000    TAL00 C 0002
TALLY  C 0000
 1              ***********************************************************
 2              *                                                         *
 3              * NAME: PN GENERATOR (PNGEN)              PPS REF:        *
 4              *                                                         *
 5              * FILE NAME: PNGEN.SRC                                    *
 6              *                                                         *
 7              * FUNCTION: TAKES THE PN KEY AND FRAME TIME AS INPUTS TO FORM A *
 8              *           PSUEDO-RANDOM SEQUENCE (CODE). THE CODE IS THEN USED *
 9              *           AS AN ADDRESS TO FETCH A FREQUENCY FROM THE TABLE. *
10              *                                                         *
11              * METHOD:   N/A                                           *
12              *                                                         *
13              * INPUT PARAMETERS:                                       *
14              *                                                         *
15              * NAME         DESCRIPTION          TYPE    LENGTH   RANGE *
16              *                                                         *
17              * DE           THE 2 MSB'S OF TIME BYTES    2 BYTES       *
18              *   (TIME BYTES CAN BE BOUND1,2,3 TXTIME OR RXTIME)       *
19              * HL           THE 2 LSB'S OF TIME BYTES    2 BYTES  0-65,534 *
20              *                                                         *
21              * OUTPUT PARAMETERS:                                      *
22              *                                                         *
23              * NAME         DESCRIPTION          TYPE    LENGTH   RANGE *
24              *                                                         *
25              * DE           FREQUENCY                    2 BYTES  0-2319+BAND *
26              *                                                    BITS + FREQ *
27              *                                                    STROBE *
28              *                                                         *
29              * DATA ACCESSED OR ALTERED EXTERNAL TO MODULE:            *
30              *                                                         *
31              * NAME    DESCRIPTION       TYPE    LENGTH   RANGE   DIRECTION *
32              * PNKEY   PN KEY                    2 BYTES           INPUT *
33              * PNCYCL  # OF CYCLES IN PN         1 BYTE            INPUT *
34              * FREQT   TABLE OF FREQUENCIES      1K BYTES          INPUT *
35              *                                                         *
36              * RESTRICTIONS: USES ACC,B,D,E,H & L REGISTERS            *
37              *                                                         *
38              * SUPPORTING MODULES:  NONE                               *
39              *                                                         *
40              * COPYRIGHT 1982 ROCKWELL INTERNATIONAL                   *
41              * COLLINS TELECOMMUNICATIONS PRODUCTS DIVISION            *
42              *                                                         *
43              * AUTHOR: C. A BONEBRIGHT             DATE: 8-11-82       *
44              *                                                         *
45              * VERSION: 1.0                                            *
46              *                                                         *
47.             * REVISION:                          DATE:                *
```

```
48                    *                                                                 *
49                    ************************************************************
50                    *                                                                 *
51                            CSEG
52 0000
53 0000               TITLE      'PNGEN'
54                    NAME       PNGEN
55                    PUBLIC     PNGEN
56                    EXTRN      PNCYCL,PNKEY,FREQT
57 0000
58                    ;* PROCEDURE PNGEN
59 0000      PNGEN:
60                                ;DE HAS THE 2 MOST SIGNIFICANT BYTES OF TIME
61                                ;HL HAS THE 2 LSB'S OF TIME
62 0000
63                    ;* * EXCLUSIVE OR PNKEY WITH THE 2 MSB'S OF TIME
64 0000 3A 00 00    E   LD    A,(PNKEY)
65 0003 AB              XOR   E
66 0004 5F              LD    E,A
67 0005 3A 01 00    E   LD    A,(PNKEY+1)
68 0008 AA              XOR   D
69 0009 57              LD    D,A
70                                                    ;'NEW' PNKEY IS IN DE REG PAIR
71 000A
72 000A 06 00       E   LD    B,.LOW.PNCYCL           ;PN CYCLE COUNTER
73 000C
74                    ;* * DO UNTIL CYCLE COUNTER = 0
75 000C      PN10:
76 000C
77                    ;* * * IF LS BIT OF FRAME TIME = '1'
78 000C CB 45           BIT   0,L
79 000E 28 06 0016      JR    Z,PN20
80 0010
81                    ;* * * THEN
82                    ;* * * * XOR FRAME TIME WITH PN KEY
83 0010 7D              LD    A,L
84 0011 AB              XOR   E
85 0012 6F              LD    L,A
86 0013 7C              LD    A,H
87 0014 AA              XOR   D
88 0015 67              LD    H,A
89 0016
90                    ;* * * END IF
91 0016      PN20:
92 0016
93                    ;* * * ROTATE FRAME TIME 1 BIT RIGHT
94 0016 CB 3C           SRL   H
95 0018 CB 1D           RR    L
96 001A D2 1F 00    C   JP    NC,PN30
97 001D CB FC           SET   7,H
98 001F      PN30:
99 001F
100                   ;* * * DEC CYCLE COUNTER
101 001F
102                   ;* * END UNTIL
103 001F 10 EB 000C     DJNZ  PN10
104 0021
105                   ;* * CLEAR LS BIT SO ADDRESS IS ON EVEN BYTE
106 0021 CB 85          RES   0,L
107 0023
108                   ;* * ADAPT PN CODE TO ADDRESS A FREQUENCY IN THE TABLE
```

```
109                                              ;ADDRESS OF FREQ NOW IN HL
110 0023 3E 03              LD      A,03H        ;LIMIT TO 1K
111 0025 A4                 AND     H
112 0026 16 00      E       LD      D,.HIGH.FREQT
113 0028 B2                 OR      D            ;HIGH ORDER ADDRESS OF FREQ. TABLE
114 0029 67                 LD      H,A
115                 ;* * FETCH FREQUENCY WITH BAND BITS FROM TABLE
116 002A 5E                 LD      E,(HL)       ;FETCH LSB OF FREQ.
117 002B 23                 INC     HL
118 002C 56                 LD      D,(HL)       ;FREQ NOW IN DE
119 002D
120                 ;* END PROCEDURE
121 002D
122 002D C9                 RET
123 002E                    END

FREQT  E 0002   MEMORY M 0000   PN10   C 000C   PN20   C 0016
PN30   C 001F   PNCYCL E 0000   PNGEN  C 0000   PNKEY  E 0001
STACK  S 0000

1       ************************************************************************
  2       *                                                                      *
  3       * NAME: FRAME TIME (FRMTIM)                      PPS REF:              *
  4       *                                                                      *
  5       * FILE NAME: FRMTIM.SRC                                                *
  6       *                                                                      *
  7       * FUNCTION: CALCULATE FRAME TIME FROM RTC TIME                         *
  8       *                                                                      *
  9       * METHOD:                                                              *
 10       *                                                                      *
 11       * INPUT PARAMETERS:                                                    *
 12       * NAME         DESCRIPTION         TYPE      LENGTH      RANGE         *
 13       *                                                                      *
 14       * OUTPUT PARAMETERS:                                                   *
 15       * NAME         DESCRIPTION         TYPE      LENGTH      RANGE         *
 16       *                                                                      *
 17       * DATA ACCESSED OR ALTERED EXTERNAL TO MODULE:                         *
 18       *                                                                      *
 19       * NAME         DESCRIPTION         TYPE      LENGTH      RANGE    DIR. *
 20       * TXTIME   TRANSMIT FRAME TIME    BINARY    4 BYTES   0-63,000,000 OUTPUT *
 21       *                                                                      *
 22       * RESTRICTIONS: USES ACC,B,C,D,E,H & L REGISTERS                       *
 23       *                                                                      *
 24       * SUPPORTING MODULES:                                                  *
 25       * BCDBIN - CONVERTS BCD'S TO BINARY                                    *
 26       *                                                                      *
 27       * COPYRIGHT 1982 ROCKWELL INTERNATIONAL                                *
 28       * COLLINS TELECOMMUNICATIONS PRODUCTS DIVISION                         *
 29       *                                                                      *
 30       * AUTHOR: C. A. BONEBRIGHT              DATE: MAY 4, 1982              *
 31       *                                                                      *
 32       * VERSION: 1.0                                                         *
 33       *                                                                      *
 34       * REVISION:                             DATE:                          *
 35       *                                                                      *
 36       ************************************************************************
 37 0000
 38                         CSEG
 39 0000
 40 0000                    TITLE   'FRMTIM
 41                         NAME    FRMTIM
 42                         PUBLIC  FRMTIM
 43                         EXTRN   DAYOWK,HUNDRD
```

```
 44                         EXTRN   STAT,TXTIME,BCDBIN,WKAREA
 45 0000
 46                   * PROCEDURE FRMTIM
 47 0000              FRMTIM:
 48 0000
 49                   * * ZERO FRAME TIME BYTES
 50 0000 21 00 00             LD      HL,0
 51 0003 22 00 00    E        LD      (TXTIME),HL
 52 0006 22 02 00    E        LD      (TXTIME+2),HL
 53 0009
 54                   * * READ RTC
 55 0009              FRM20:
 56 0009 21 00 00    E        LD      HL,WKAREA
 57 000C 06 08                LD      B,8          ;THIS REG GETS DECREMENTED TWICE EACH
 58                                                ;PASS IN THE LOOP BELOW, SO LOOP WILL
 59                                                ;BE EXECUTED 4 TIMES, NOT 8.
 60 000E 0E FF       E        LD      C,.LOW.HUNDRD-1
 61 0010              FRM25:
 62 0010 0C                   INC     C
 63 0011 ED A2                INI                  ;READ 100'S, 10'S, & 1'S OF SECONDS, MINUTES & HOURS
 64 0013 DB 00       E        IN      A,(.LOW.STAT)
 65 0015 CB 47                BIT     0,A          ;IF STATUS BIT SET
 66 0017 20 F0 0009           JR      NZ,FRM20     ;THEN READ AGAIN
 67 0019 10 F5 0010           DJNZ    FRM25
 68 001B DB 00       E        IN      A,(.LOW.DAYOWK)    ;READ DAY OF WEEK
 69 001D 47                   LD      B,A
 70 001E DB 00       E        IN      A,(.LOW.STAT)
 71 0020 CB 47                BIT     0,A
 72 0022 20 E5 0009           JR      NZ,FRM20
 73 0024
 74                   * * IF DAY OF WEEK NOT EQUAL TO 0
 75 0024 05                   DEC     B
 76 0025 78                   LD      A,B
 77 0026 B7                   OR      A
 78 0027 28 17 0040           JR      Z,FRM50
 79 0029
 80                   * * THEN
 81                   * * * DO UNTIL DAYS=0
 82 0029
 83 0029              FRM30:
 84                   * * * * ADD 9,000,000 FRAMES
 85 0029 2A 00 00    E        LD      HL,(TXTIME)
 86 002C 11 40 54             LD      DE,5440H
 87 002F 19                   ADD     HL,DE
 88 0030 22 00 00    E        LD      (TXTIME),HL
 89 0033 2A 02 00    E        LD      HL,(TXTIME+2)
 90 0036 11 89 00             LD      DE,0089H
 91 0039 ED 5A                ADC     HL,DE
 92 003B 22 02 00    E        LD      (TXTIME+2),HL
 93 003E
 94                   * * * END UNTIL
 95 003E 10 E9 0029           DJNZ    FRM30
 96 0040
 97                   * * END IF
 98 0040              FRM50:
 99 0040
100                   * * FETCH HOURS AND CONVERT TO BINARY
101 0040 21 03 00    E        LD      HL,WKAREA+3
102 0043 CD 00 00    E        CALL    BCDBIN
103 0046
104                   * * IF HOURS NOT EQUAL TO 0
105 0046 B7                   OR      A
```

```
106 0047 28 17 0060              JR      Z,FRM100
107 0049
108                      * * THEN
109                      * * * DO UNTIL HOURS = 0
110 0049                 FRM60:
111                      * * * * ADD 375,000 FRAMES
112 0049 2A 00 00    E           LD      HL,(TXTIME)
113 004C 11 D8 83                LD      DE,0B8D8H
114 004F 19                      ADD     HL,DE
115 0050 22 00 00    E           LD      (TXTIME),HL
116 0053 2A 02 00    E           LD      HL,(TXTIME+2)
117 0056 11 05 00                LD      DE,0005H
118 0059 ED 5A                   ADC     HL,DE
119 005B 22 02 00    E           LD      (TXTIME+2),HL
120 005E
121                      * * * END UNTIL
122 005E 10 E9 0049              DJNZ    FRM60
123 0060
124                      * * END IF
125 0060                 FRM100:
126 0060
127                      * * FETCH MINUTES AND CONVERT TO BINARY
128 0060 21 02 00    E           LD      HL,WKAREA+2
129 0063 CD 00 00    E           CALL    BCDBIN
130 0066
131                      * * IF MINUTES NOT EQUAL TO 0
132 0066 B7                      OR      A
133 0067 28 1A 0083              JR      Z,FRM150
134 0069
135                      * * THEN
136                      * * * DO UNTIL MINUTES=0
137 0069 2A 00 00    E           LD      HL,(TXTIME)
138 006C 11 6A 18                LD      DE,186AH
139 006F                 FRM110:
140 006F
141                      * * * ADD 6250 FRAMES
142 006F 19                      ADD     HL,DE
143 0070 30 0C 007E              JR      NC,FRM130
144 0072 7C                      LD      A,H     ;SAVE HL
145 0073 4D                      LD      C,L
146 0074 21 02 00    E           LD      HL,TXTIME+2
147 0077 34                      INC     (HL)
148 0078 20 02 007C              JR      NZ,FRM120
149 007A 23                      INC     HL
150 007B 34                      INC     (HL)
151 007C                 FRM120:
152 007C 67                      LD      H,A
153 007D 69                      LD      L,C     ;RESTORE HL
154 007E                 FRM130:
155 007E
156                      * * * END UNTIL
157 007E 10 EF 006F              DJNZ    FRM110
158 0080 22 00 00    E           LD      (TXTIME),HL
159 0083
160                      * * END IF
161 0083                 FRM150:
162 0083
163                      * * FETCH SECONDS AND CONVERT TO BINARY
164 0083 21 01 00    E           LD      HL,WKAREA+1
165 0086 CD 00 00    E           CALL    BCDBIN
166 0089
167                      * * IF SECONDS > 5
```

```
168 0089 FE 06              CP      6
169 008B 38 1E 00AB         JR      C,FRM200
170 008D
171                   * * THEN
172                   * * * DO UNTIL SECONDS < 6
173 008D 11 71 02           LD      DE,0271H
174 0090 2A 00 00    E      LD      HL,(TXTIME)
175 0093              FRM160:
176 0093
177                   * * * * ADD 625 FRAMES
178 0093 19                  ADD     HL,DE
179 0094 30 0C 00A2          JR      NC,FRM180
180 0096 44                  LD      B,H
181 0097 4D                  LD      C,L
182 0098 21 02 00    E       LD      HL,TXTIME+2
183 009B 34                  INC     (HL)
184 009C 20 02 00A0          JR      NZ,FRM170
185 009E 23                  INC     HL
186 009F 34                  INC     (HL)
187 00A0              FRM170:
188 00A0 60                  LD      H,B
189 00A1 69                  LD      L,C
190 00A2              FRM180:
191 00A2
192                   * * * END UNTIL
193 00A2 D6 06               SUB     6
194 00A4 FE 06               CP      6
195 00A6 30 EB 0093          JR      NC,FRM160
196 00A8 22 00 00    E       LD      (TXTIME),HL
197 00AB
198                   * * END IF
199 00AB              FRM200:
200 00AB
201                   * * IF SECONDS NOT EQUAL TO 0
202 00AB B7                  OR      A
203 00AC 28 1B 00C9          JR      Z,FRM250
204 00AE
205                   * * THEN
206                   * * * DO UNTIL SECONDS=0
207 00AE 2A 00 00    E       LD      HL,(TXTIME)
208 00B1 11 68 00            LD      DE,0068H
209 00B4              FRM210:
210 00B4
211                   * * * * ADD 104 FRAMES
212 00B4 19                  ADD     HL,DE
213 00B5 30 0C 00C3          JR      NC,FRM230
214 00B7 44                  LD      B,H
215 00B8 4D                  LD      C,L
216 00B9 21 02 00    E       LD      HL,TXTIME+2
217 00BC 34                  INC     (HL)
218 00BD 20 02 00C1          JR      NZ,FRM220
219 00BF 23                  INC     HL
220 00C0 34                  INC     (HL)
221 00C1 60           FRM220: LD     H,B
222 00C2 69                  LD      L,C
223 00C3              FRM230:
224 00C3
225                   * * * END UNTIL
226 00C3 3D                  DEC     A
227 00C4 20 EE 00B4          JR      NZ,FRM210
228 00C6 22 00 00    E       LD      (TXTIME),HL
229 00C9
230                   * * END IF
```

```
231 00C9                       FRM250:
232 00C9
233                            * * FETCH HUNDREDS OF SECONDS AND CONVERT
234 00C9 21 00 00      E             LD      HL,WKAREA
235 00CC CD 00 00      E             CALL    BCDBIN
236 00CF
237                            * * IF HUNDREDS OF SEC > 23
238 00CF FE 18                       CP      24
239 00D1 38 1E 00F1                  JR      C,FRM300
240 00D3
241                            * * THEN
242                            * * * DO UNTIL < 24
243 00D3 2A 00 00      E             LD      HL,(TXTIME)
244 00D6 11 19 00                    LD      DE,0019H
245 00D9                       FRM260:
246 00D9
247                            * * * * ADD 25 FRAMES
248 00D9 19                          ADD     HL,DE
249 00DA 30 0C 00E8                  JR      NC,FRM280
250 00DC 44                          LD      B,H
251 00DD 4D                          LD      C,L
252 00DE 21 02 00      E             LD      HL,TXTIME+2
253 00E1 34                          INC     (HL)
254 00E2 20 02 00E6                  JR      NZ,FRM270
255 00E4 23                          INC     HL
256 00E5 34                          INC     (HL)
257 00E6                       FRM270:
258 00E6 60                          LD      H,B
259 00E7 69                          LD      L,C
260 00E8                       FRM280:
261 00E8
262                            * * * END UNTIL
263 00E8 D6 18                       SUB     24
264 00EA FE 18                       CP      24
265 00EC 30 EB 00D9                  JR      NC,FRM260
266 00EE 22 00 00      E             LD      (TXTIME),HL
267 00F1
268                            * * END IF
269 00F1                       FRM300:
270 00F1
271                            * * IF HUNDREDS OF SECONDS NOT EQUAL TO 0
272 00F1 B7                          OR      A
273 00F2 28 14 0108                  JR      Z,FRM350
274 00F4
275                            * * THEN
276                            * * * ADD HUNDREDS OF SECONDS TO FRAME TIME
277 00F4 2A 00 00      E             LD      HL,(TXTIME)
278 00F7 5F                          LD      E,A
279 00F8 16 00                       LD      D,0
280 00FA 19                          ADD     HL,DE
281 00FB 22 00 00      E             LD      (TXTIME),HL
282 00FE 30 08 0108                  JR      NC,FRM350
283 0100 21 02 00      E             LD      HL,TXTIME+2
284 0103 34                          INC     (HL)
285 0104 20 02 0108                  JR      NZ,FRM350
286 0106 23                          INC     HL
287 0107 34                          INC     (HL)
288 0108
289                            * * END IF
290 0108                       FRM350:
```

FRMTIM 6

```
291 0108 C9                    RET
292 0109                       END

ERRORS = 0000

ECDBIN E 0004   DAYOWK E 0000   FRM100 C 0060   FRM110 C 006F
FRM120 C 007C   FRM130 C 007E   FRM150 C 0083   FRM160 C 0093
FRM170 C 00A0   FRM180 C 00A2   FRM20  C 0009   FRM200 C 00AB
FRM210 C 00B4   FRM220 C 00C1   FRM230 C 00C3   FRM25  C 0010
FRM250 C 00C9   FRM260 C 00D9   FRM270 C 00E6   FRM280 C 00E8
FRM30  C 0029   FRM300 C 00F1   FRM350 C 0108   FRM50  C 0040
FRM60  C 0049   FRMTIM C 0000   HUNDRD E 0001   MEMORY M 0000
STACK  S 0000   STAT   E 0002   TXTIME E 0003   WKAREA E 0005
```

```
  1    *****************************************************************
  2    *                                                               *
  3    * NAME: MINUTE BOUNDARY                    FPS REF:             *
  4    *                                                               *
  5    * FILE NAME: MINBND.SRC                                         *
  6    *                                                               *
  7    * FUNCTION: CALCULATES THE LAST THREE 10 SECOND BOUNDARIES IN TIME AND *
  8    *           THEN FINDS THE CORRESPONDING FREQUENCIES.           *
  9    * METHOD:                                                       *
 10    *                                                               *
 11    * INPUT PARAMETERS:                                             *
 12    *                                                               *
 13    * NAME      DESCRIPTION                 TYPE    LENGTH   RANGE  *
 14    *                                                               *
 15    * OUTPUT PARAMETERS:                                            *
 16    *                                                               *
 17    * NAME      DESCRIPTION                 TYPE    LENGTH   RANGE  *
 18    *                                                               *
 19    * DATA ACCESSED OR ALTERED EXTERNAL TO MODULE:                  *
 20    *                                                               *
 21    * NAME                                                          *
 22    * TXTIME    TX FRAME TIME          BINARY   4 BYTES  0-63,000,000 INPUT *
 23    * BOUND1    1ST (LASTEST) BOUNDARY BINARY   4 BYTES           OUTPUT*
 24    * BOUND2    2ND 10 SEC BOUNDARY    BINARY   4 BYTES           OUTPUT*
 25    * BOUND3    3RD (EARLIEST) BOUNDARY BINARY  4 BYTES           OUTPUT*
 26    *                                                               *
 27    * RESTRICTIONS:  USES ACC,B,C,D,E,H & L REGISTERS               *
 28    *                                                               *
 29    * SUPPORTING MODULES:                                           *
 30    *   PNGEN - PSUEDORAMDOMLY FETCHES FREQ FROM TABLE              *
 31    *                                                               *
 32    * COPYRIGHT 1982 ROCKWELL INTERNATIONAL                         *
 33    * COLLINS TELECOMMUNICATIONS PRODUCTS DIVISION                  *
 34    *                                                               *
 35    * AUTHOR: C. A. BONEBRIGHT              DATE: 05-03-82          *
 36    *                                                               *
 37    * VERSION: 1.0                                                  *
 38    *                                                               *
 39    * REVISION:                             DATE:                   *
 40    *                                                               *
 41    *****************************************************************
 42 0000
 43                    CSEG
```

```
44 0000                         TITLE    'MINBND   ?TIME-OF-DAY KEY'
45                              NAME     MINBND
46                              PUBLIC   MINBND
47                              EXTRN    TXTIME,BOUND1,BOUND2,BOUND3,FNGEN
48 0000
49                      * PROCEDURE MINBND
50 0000                 MINBND:
51 0000
52                      * * ZERO ALL THE BOUNDARY LSB'S
53 0000 AF                      XOR      A
54 0001 32 00 00    E           LD       (BOUND1),A
55 0004 32 00 00    E           LD       (BOUND2),A
56 0007 32 00 00    E           LD       (BOUND3),A
57 000A
58                      * * FETCH CURRENT TIME AND SET=1ST BOUNDARY
59 000A 21 01 00    E           LD       HL,TXTIME+1
60 000D 11 01 00    E           LD       DE,BOUND1+1
61 0010 01 03 00                LD       BC,3
62 0013 ED B0                   LDIR
63 0015
64                      * * ZERO BITS 1 AND 0 AND STORE OF 2ND LSB
65 0015 3A 01 00    E           LD       A,(BOUND1+1)
66 0018 E6 FC                   AND      0FCH
67 001A 32 01 00    E           LD       (BOUND1+1),A
68 001D
69                      * * SUBTRACT 1024 FRAMES AND STORE IN 2ND BOUNDARY
70 001D D6 04                   SUB      04H           ;APPROX 10 SECONDS
71 001F 32 01 00    E           LD       (BOUND2+1),A
72 0022 2A 02 00    E           LD       HL,(BOUND1+2)
73 0025
74                      * * IF CARRY
75 0025 30 01 0028              JR       NC,MIN20
76 0027
77                      * * THEN
78                      * * * DECREMENT 2 MSB'S
79 0027 2B                      DEC      HL
80 0028
81                      * * END IF
82 0028                 MIN20:
83 0028
84                      * * STORE MSB'S OF 2ND BOUNDARY
85 0028 22 02 00    E           LD       (BOUND2+2),HL
86 002B
87                      * * SUBTRACT 1024 FRAMES (FROM 2ND) AND STORE IN 3RD BOUNDARY
88 002B D6 04                   SUB      04H
89 002D 32 01 00    E           LD       (BOUND3+1),A
90 0030
91                      * * IF CARRY
92 0030 30 01 0033              JR       NC,MIN50
93 0032
94                      * * THEN
95                      * * * DECREMENT 2 MSB'S
96 0032 2B                      DEC      HL
97 0033
98                      * * END IF
99 0033                 MIN50:
100 0033
101                     * * STORE MSB'S OF 3RD BOUNDARY
102 0033 22 02 00   E           LD       (BOUND3+2),HL
103 0036
104                     * * CALCULATE BOUNDARY FREQUENCIES
105 0036 ED 5B 02 00 E           LD       DE,(BOUND1+2)
```

```
106 003A 2A 00 00        E      LD      HL,(BOUND1)
107 003D CD 00 00        E      CALL    PNGEN
108 0040 ED 53 00 00     E      LD      (BOUND1),DE
109 0044
110 0044 ED 5B 02 00     E      LD      DE,(BOUND3+2)
111 0048 2A 00 00        E      LD      HL,(BOUND3)
112 004B CD 00 00        E      CALL    PNGEN
113 004E ED 53 00 00     E      LD      (BOUND3),DE
114 0052
115 0052 ED 5B 02 00     E      LD      DE,(BOUND2+2)
116 0056 2A 00 00        E      LD      HL,(BOUND2)
117 0059 CD 00 00        E      CALL    PNGEN
118 005C ED 53 00 00     E      LD      (BOUND2),DE
119 0060
120                             * END PROCEDURE
121 0060                        MIN60:
122 0060 C9                     RET
123 0061                        END

ERRORS = 0000

BOUND1 E 0001    BOUND2 E 0002    BOUND3 E 0003    MEMORY M 0000
MIN20  C 0023    MIN50  C 0033    MIN60  C 0060    MINBND C 0000
PNGEN  E 0004    STACK  S 0000    TXTIME E 0000
```

```
 1      ***********************************************************************
 2      *                                                                     *
 3      * NAME: INCREMENT FRAME TIME (INCTIM)          PPS REF:                *
 4      *                                                                     *
 5      * FILE NAME: INCTIM.SRC                                                *
 6      *                                                                     *
 7      * FUNCTION: SUBROUTINE FOR INCREMENTING EITHER THE TRANSMIT OR RECEIVE *
 8      *           FRAME TIME, PAGE COUNTER, AND RESYNC PAGE COUNTER         *
 9      *                                                                     *
10      * METHOD:                                                              *
11      *                                                                     *
12      * INPUT PARAMETERS:                                                    *
13      *                                                                     *
14      * NAME    DESCRIPTION              TYPE       LENGTH       RANGE       *
15      *                                                                     *
16      * HL      ADDRESS OF LSB OF FRAME TIME         2 BYTES                *
17      * ACC     VALUE OF PAGE COUNT                  1 BYTE       0 - 24     *
18      * B       VALUE OF RESYNC PAGE COUNTER         1 BYTE       0 - 3      *
19      *                                                                     *
20      * OUTPUT PARAMETERS:                                                   *
21      *                                                                     *
22      * NAME    DESCRIPTION              TYPE       LENGTH       RANGE       *
23      *                                                                     *
24      * ACC     NEW PAGE COUNT VALUE                 1 BYTE                  *
25      * B       NEW RESYNC PAGE COUNTER VALUE        1 BYTE                  *
26      *                                                                     *
27      * DATA ACCESSED OR ALTERED EXTERNAL TO MODULE:                         *
28      *                                                                     *
29      * NAME              DESCRIPTION     TYPE    LENGTH    RANGE   DIRECTION *
30      *                                                                     *
31      * TXTIME OR RXTIME  FRAME TIME              4 BYTES           BOTH     *
32      * PAGETX OR PAGERX  PAGE FRAME CTR'S        1 BYTE            BOTH     *
33      * REPAGT OR REPAGR  RESYNC PAGE CTR'S       1 BYTE            BOTH     *
34      * SECTMR            SECOND TIMER/COUNTER    1 BYTE            OUTPUT   *
35      *                                                                     *
36      * RESTRICTIONS: USES ACCUMULATOR, B, H & L REGISTERS                   *
```

```
37                *                                                              *
38                * SUPPORTING MODULES: NONE                                     *
39                *                                                              *
40                * COPYRIGHT 1982 ROCKWELL INTERNATIONAL                        *
41                * COLLINS TELECOMMUNICATIONS PRODUCTS DIVISION                 *
42                *                                                              *
43                * AUTHOR: C. A. BONEBRIGHT              DATE: 6-7-82           *
44                *                                                              *
45                * VERSION: 1.0                                                 *
46                *                                                              *
47.               * REVISION:                             DATE:                  *
48                *                                                              *
49                ****************************************************************
50                           CSEG
51 0000
52 0000                    TITLE    'INCTIM
53                          NAME     INCTIM
54                          PUBLIC   INCTIM
55                          EXTRN    SECTMR
56 0000
57                * PROCEDURE INCTIM
58 0000           INCTIM:
59 0000
60                * * INCREMENT FRAME TIME
61 0000
62 0000 34                 INC      (HL)          ;LSB
63 0001 20 0A 000D         JR       NZ,INC20
64 0003 23                 INC      HL            ;2ND LSB
65 0004 34                 INC      (HL)
66 0005 20 06 000D         JR       NZ,INC20
67 0007 23                 INC      HL            ;3RD LSB
68 0008 34                 INC      (HL)
69 0009 20 02 000D         JR       NZ,INC20
70 000B 23                 INC      HL            ;MSB
71 000C 34                 INC      (HL)
72 000D           INC20:
73                * * INCREMENT PAGE COUNTER
74 000D 3C                 INC      A
75 000E
76                * * IF PAGE COUNTER = 25
77 000E FE 19              CP       25
78 0010 20 0D 001F         JR       NZ,INC30
79 0012
80                * * THEN
81                * * * INCREMENT RESYNC PAGE COUNTER
82 0012 04                 INC      B
83 0013 3E 04              LD       A,4
84 0015
85                * * * IF RESYNC PAGE CTR = 4
86 0015
87 0015 B8                 CP       B
88 0016 20 06 001E         JR       NZ,INC25
89 0018
90                * * * THEN
91                * * * * RESET TO 0
92 0018
93 0018 06 00              LD       B,0
94 001A
95                * * * * INCREMENT SECOND TIMER/COUNTER
96 001A 21 00 00    E      LD       HL,SECTMR
97 001D 34                 INC      (HL)
98 001E
99                * * * END IF
```

```
100 001E
101 001E              INC25:
102                   * * * RESET TO 0
103 001E AF                   XOR    A
104 001F
105                   * * END IF
106 001F              INC30:
107 001F
108                   * END PROCEDURE
109 001F C9                   RET
110 0020                      END
```

ERRORS = 0000

INC20  C 000D   INC25 C 001E   INC30 C 001F   INCTIM C 0000

INCTIM

MEMORY M 0000   SECTMR E 0000   STACK S 0000

```
 1    ************************************************************
 2    *                                                          *
 3    *  NAME:  RECEIVE FRAME MARK        (RCVFRM)               *
 4    *                                                          *
 5    *  FILE NAME:  RCVFRM.SRC                                  *
 6    *                                                          *
 7    *  FUNCTION:  RSTA INTERRUPT SERVICE ROUTINE.  INCREMENT RE- *
 8    *             CEIVED FRAME TIME.  CALCULATES AND OUTPUTS HOPPING *
 9    *             FREQUENCIES WHEN IN RECEIVE MODE ONLY.       *
10    *                                                          *
11    *  METHOD:                                                 *
12    *                                                          *
13    *  INPUT PARAMETERS:                                       *
14    *                                                          *
15    *  OUTPUT PARAMETERS:  NONE                                *
16    *                                                          *
17    *  DATA ACCESSED OR ALTERED EXTERNAL TO MODULE:            *
18    *                                                          *
19    *    NAME     DESCRIPTION          TYPE    LENGTH  RANGE  DIRECTION *
20    *                                                          *
21    *  RXTIME    RX FRAME TIME         4 BYTES         BOTH    *
22    *  PAGERX    RX PAGE COUNTER       1 BYTE          BOTH    *
23    *  NXTFRQ    HOPPING FREQUENCY     2 BYTES         BOTH    *
24    *  PAGDET    PAGE DETECT BUFFER    1 BYTE          OUTPUT  *
25    *  REPAGR    RCV RESYNC PAGE CTR   1 BYTE          BOTH    *
26    *  TXTIME    TX FRAME TIME         4 BYTES         BOTH    *
27    *  PAGETX    TX PAGE COUNTER       1 BYTE          BOTH    *
28    *  REPAGT    TX RESYNC PAGE CTR    1 BYTE          BOTH    *
29    *  RXFLGS    RECEIVE MODE FLAG     1 BYTE          BOTH    *
30    *  SOMCTR    SOM RCV BYTE COUNTER  1 BYTE          BOTH    *
31    *  RESYNC    RESYNC FLAG           1 BYTE          INPUT   *
32    *  FALSE     FALSE SYNC FRAME COUNTER 1 BYTE       BOTH    *
33    *  EXITFL    EXIT RECEIVE FLAG     1 BYTE          BOTH    *
34    *  PAGFRQ    PAGE FREQ BUFFER      2 BYTES         INPUT   *
35    *  TIME1     BIT VOTE BUFFERS      8 BYTES         OUTPUT  *
36    *  VALSOM    VALID SOM RCV'D FLAG  1 BYTE          BOTH    *
37    *  RXSOMC    RCV SOM BYTE COUNTER  1 BYTE          OUTPUT  *
38    *  NCSTCT    NCS TONE COUNTER      1 BYTE          BOTH    *
39    *  RMATCH    RECEIVED BYTE MATCHES 1 BYTE          BOTH    *
```

```
40                  *  MISSOM    MISSED SOM FRAMES      1 BYTE        BOTH      *
41                  *  RESFLG    RESYNC SOM FLAGS       1 BYTE        BOTH      *
42                  *                                                           *
43                  *  RESTRICTIONS:                                             *
44                  *                                                           *
45                  *  SUPPORTING MODULES:                                       *
46                  *     PNGEN - PSUEDORANDOMLY FETCHES FREQUECIES FROM FREQ TABLE *
47                  *     INCTIM - INCREMENTS FRAME TIME AND PAGE COUNTERS      *
48                  *     EXITRX - EXITS THE RECEIVE MODE                       *
49                  *     CHKPAG - CHECKS PAGE STATUS & UPDATES IF NECESSARY    *
50                  *                                                           *
51                  *  COPYRIGHT 1982   ROCKWELL INTERNATIONAL                   *
52                  *  COLLINS TELECOMMUNICATIONS PRODUCTS DIVISION              *
53                  *                                                           *
54                  *  AUTHOR:  C A BONEBRIGHT       DATE:  JUNE 18, 1982        *
55                  *                                                           *
56                  *  VERSION:  1.0                                             *
57                  *                                                           *
58                  *  REVISION:                     DATE:                       *
59                  *                                                           *
60                  *************************************************************
61 0000
62 0000                       TITLE   'RCVFRM
63                             NAME    RCVFRM
64                             PUBLIC  RCVFRM
65                             EXTRN   BPRTC,PAGDET,NXTFRQ,BPRTA,CPRTCS,CPRTCC
66                             EXTRN   BPRTBC,RXTIME,PAGERX,RXFLGS,SOMCTR
67                             EXTRN   FALSE,PAGFRQ,VALSOM,RXSOMC,TIME1,APRTBS
68                             EXTRN   PNGEN,INCTIM,PAGETX,TXTIME,EXITRX,BPRTCS
69                             EXTRN   CPRTAC,EXITFL,REPAGT,REPAGR,RESYNC,RETX
70                             EXTRN   BOTHAB,RXSTRB,BITRCK,CHKPAG,TONE,NCSTCT
71                             EXTRN   RMATCH,MISSOM,RESFLG
72 0000
73                  * PROCEDURE RCVFRM
74                             CSEG
75 0000              RCVFRM:
76 0000
77                  * * SAVE REGISTERS AND STATUS
78 0000 F5                     PUSH    AF
79 0001 E5                     PUSH    HL
80 0002
81                  * * READ AND STORE PAGE DETECT
82 0002 3A 00 00  E             LD      A,(BPRTC)
83 0005 32 00 00  E             LD      (PAGDET),A
84 0008
85                  * * OUTPUT FREQUENCY TO SYNTH
86 0008 2A 00 00  E             LD      HL,(NXTFRQ)
87 000B 22 00 00  E             LD      (BPRTA),HL
88 000E
89                  * * RESET INTERRUPT FLIP FLOPS (INTFRM & RCVFRM)
90 000E 3E 00    E             LD      A,.LOW.BOTHAB
91 0010 32 00 00  E             LD      (CPRTCS),A
92 0013 32 00 00  E             LD      (CPRTCC),A
93 0016
94                  * * SAVE REMAINING REGISTERS
95 0016 D5                     PUSH    DE
96 0017 C5                     PUSH    BC              ;NEEDED FOR PNGEN FUNCTION
97 0018
98                  * * REMOVE FREQUENCY LATCH BIT
99 0018 3E 00    E             LD      A,.LOW.RXSTRB
100 001A 32 00 00 E             LD      (BPRTBC),A
101 001D
```

```
102                    * * INCREMENT RX FRAME TIME AND PAGE COUNTER
103 001D 21 00 00    E       LD      HL,RXTIME
104 0020 3A 00 00    E       LD      A,(REPAGR)
105 0023 47                  LD      B,A
106 0024 3A 00 00    E       LD      A,(PAGERX)
107 0027 CD 00 00    E       CALL    INCTIM
108 002A 32 00 00    E       LD      (PAGERX),A
109 002D 78                  LD      A,B
110 002E 32 00 00    E       LD      (REPAGR),A
111 0031
112                    * * ENABLE INTERRUPTS
113 0031 FB                  EI
114 0032
115                    * * CALCULATE NEXT HOPPING FREQUENCY
116 0032 ED 5B 02 00 E       LD      DE,(RXTIME+2)
117 0036 2A 00 00    E       LD      HL,(RXTIME)
118 0039 CD 00 00    E       CALL    PNGEN           ;FREQUENCY RETURNS IN DE REGULAR PAIR
119 003C ED 53 00 00 E       LD      (NXTFRQ),DE
120 0040
121                    * * IF VALID SOM NOT RECEIVED
122 0040 3A 00 00    E       LD      A,(VALSOM)
123 0043 B7                  OR      A
124 0044 20 46 008C          JR      NZ,RC70
125 0046
126                    * * THEN
127                    * * * IF SOM CHARACTER COUNT > TWO
128 0046 3A 00 00    E       LD      A,(SOMCTR)
129 0049 FE 03               CP      3
130 004B 38 18 0065          JR      C,RC50
131 004D
132                    * * * THEN
133                    * * * * SET VALID SOM RECEIVED FLAG
134 004D
135 004D 3E FF               LD      A,0FFH
136 004F 32 00 00    E       LD      (VALSOM),A
137 0052
138                    * * * * SET RE-TX LINE
139 0052 3E 00       E       LD      A,.LOW.RETX
140 0054 32 00 00    E       LD      (BPRTCS),A
141 0057
142                    * * * * IF INITIAL SYNC
143 0057 3A 00 00    E       LD      A,(RESYNC)
144 005A B7                  OR      A
145 005B 20 05 0062          JR      NZ,RC40
146 005D
147                    * * * * THEN
148                    * * * * * RE-ENABLE BIT TRACKING
149 005D 3E 00       E       LD      A,.LOW.BITRCK
150 005F 32 00 00    E       LD      (CPRTAC),A
151 0062
152                    * * * * END IF
153 0062             RC40:
154 0062
155                    * * * ELSE
156 0062 C3 F9 00    C       JP      RC120
157 0065             RC50:
158 0065
159                    * * * * CLEAR SOM CHAR COUNT
160 0065 AF                  XOR     A
161 0066 32 00 00    E       LD      (SOMCTR),A
162 0069
163                    * * * * CLEAR SOM & CMD WORD RCV'D FLAGS
```

```
164 0069 21 00 00    E          LD      HL,RXFLGS
165 006C CB 96                  RES     2,(HL)
166 006E CB 9E                  RES     3,(HL)
167 0070
168                     * * * * INIT RCV SOM COUNTER
169 0070 3E 0D                  LD      A,13
170 0072 32 00 00    E          LD      (RXSOMC),A
171 0075
172                     * * * * ZERO COMMAND WORD BIT VOTE BUFFER
173 0075 AF                     XOR     A
174 0076 21 00 00    E          LD      HL,TIME1
175 0079 06 08                  LD      B,8
176 007B                 RC55:
177 007B 77                     LD      (HL),A
178 007C 23                     INC     HL
179 007D 10 FC 007B             DJNZ    RC55
180 007F
181                     * * * * DECREMENT RCV FRAME COUNT
182 007F 21 00 00    E          LD      HL,FALSE
183 0082 35                     DEC     (HL)
184 0083
185                     * * * * IF COUNT > 7 FOR REG SYNC OR > 75 FOR RESYNC
186 0083 20 74 00F9             JR      NZ,RC120
187 0085
188                     * * * * THEN (FALSE SYNC)
189                     * * * * * SET EXIT FLAG
190 0085 3E FF                  LD      A,0FFH
191 0087 32 00 00    E          LD      (EXITFL),A
192 008A
193                     * * * * END IF
194 008A                 RC60:
195 008A
196                     * * * END IF
197 008A
198                     * * ELSE
199 008A 18 6D 00F9             JR      RC120
200 008C                 RC70:
201 008C
202                     * * * CASE OF RESYNC SOM FLAGS
203 008C 3A 00 00    E          LD      A,(RESFLG)
204 008F
205                     * * * WHEN FLAGS = '0'
206 008F B7                     OR      A
207 0090 20 2C 00BE             JR      NZ,RC95
208 0092
209                     * * * * IF FRAME AFTER PAGE FRAME
210 0092 3A 00 00    E          LD      A,(PAGERX)
211 0095 FE 01                  CP      1
212 0097 20 05 009E             JR      NZ,RC80
213 0099
214                     * * * * THEN
215                     * * * * * CHECK PAGE & UPDATE STATUS
216 0099 CD 00 00    E          CALL    CHKPAG
217 009C 18 5B 00F9             JR      RC115
218 009E
219                     * * * * ELSE
220 009E                 RC80:
221 009E
222                     * * * * * IF PAGE FRAME
223 009E FE 18                  CP      24
224 00A0 20 57 00F9             JR      NZ,RC115
```

```
225 00A2
226                        * * * * * THEN
227                        * * * * * IF RESYNC SOM FRAME & NOT TIME MODE
228 00A2 3A 00 00      E           LD    A,(REPAGR)
229 00A5 FE 03                     CP    3
230 00A7 20 0D 00B6                JR    NZ,RC85
231 00A9 DD CB 00 4E               BIT   1,(IX)
232 00AD 20 07 00B6                JR    NZ,RC85
233 00AF
234                        * * * * * THEN
235                        * * * * * * SET SOM NEXT FLAG
236 00AF 21 00 00      E           LD    HL,RESFLG
237 00B2 CB C6                     SET   0,(HL)
238 00B4 18 43 00F9                JR    RC115
239 00B6
240                        * * * * * ELSE
241 00B6                   RC85:
242                        * * * * * * FETCH PAGE FREQUENCY
243 00B6 2A 00 00      E           LD    HL,(PAGFRQ)
244 00B9 22 00 00      E           LD    (NXTFRQ),HL
245 00BC
246                        * * * * * END IF
247                        * * * * END IF
248                        * * * END IF
249 00BC                   RC90:
250 00BC 18 3B 00F9                JR    RC115
251 00BE
252                        * * * WHEN POST SOM RESYNC FLAG SET
253 00BE                   RC95:
254 00BE CB 4F                     BIT   1,A
255 00C0 28 24 00E6                JR    Z,RC110
256 00C2
257                        * * * * CLEAR FLAG
258 00C2 AF                        XOR   A
259 00C3 32 00 00      E           LD    (RESFLG),A
260 00C6
261                        * * * * IF RCV'D MATCHES ARE LESS THAN 5
262 00C6 3A 00 00      E           LD    A,(RMATCH)
263 00C9 FE 05                     CP    5
264 00CB D2 E0 00      C           JP    NC,RC100
265 00CE
266                        * * * * THEN
267                        * * * * INCREMENT MISSED SOM COUNTER
268 00CE 3A 00 00      E           LD    A,(MISSOM)
269 00D1 3C                        INC   A
270 00D2 32 00 00      E           LD    (MISSOM),A
271 00D5
272                        * * * * * IF COUNTER = 2
273 00D5 FE 02                     CP    2
274 00D7 20 20 00F9                JR    NZ,RC115
275 00D9
276                        * * * * * THEN
277                        * * * * * * SET EXIT RCV FLAG
278 00D9 3E FF                     LD    A,0FFH
279 00DB 32 00 00      E           LD    (EXITFL),A
280 00DE 18 19 00F9                JR    RC115
281 00E0
282                        * * * * END IF
283 00E0
284                        * * * * ELSE
285 00E0                   RC100:
286 00E0
287                        * * * * * SET MISSED SOM COUNTER = 0
```

```
288 00E0 AF                       XOR    A
289 00E1 32 00 00     E           LD     (MISSOM),A
290 00E4 18 13 00F9               JR     RC115
291 00E6
292                      * * * END IF
293 00E6              RC105:
294 00E6
295                      * * * ELSE (SOM NEXT FLAG IS SET)
296 00E6              RC110:
297 00E6
298                      * * * * CLEAR FLAG & SET POST SOM FLAG
299 00E6 3E 02                    LD     A,02H
300 00E8 32 00 00     E           LD     (RESFLG),A
301 00EB
302                      * * * * INIT RX SOM & MATCH COUNTERS
303 00EB 3E 14                    LD     A,20
304 00ED 32 00 00     E           LD     (RXSOMC),A
305 00F0 AF                       XOR    A
306 00F1 32 00 00     E           LD     (RMATCH),A
307 00F4
308                      * * * * SET RESYNC SOM FRAME FLAG
309 00F4 21 00 00     E           LD     HL,RXFLGS
310 00F7 CB EE                    SET    5,(HL)
311 00F9
312                      * * * END CASE
313 00F9              RC115:
314 00F9
315                      * * END IF
316 00F9              RC120:
317 00F9
318                      * * IF EXIT FLAG SET
319 00F9 3A 00 00     E           LD     A,(EXITFL)
320 00FC B7                       OR     A
321 00FD 28 3A 0139               JR     Z,RC130
322 00FF
323                      * * THEN
324                      * * * DISABLE INTERRUPTS
325 00FF F3                       DI
326 0100
327                      * * * DECREMENT TX FRAME TIME, PAGE COUNTER AND RESYNC COUNTER
328 0100 2A 00 00     E           LD     HL,(TXTIME)
329 0103 2B                       DEC    HL
330 0104 22 00 00     E           LD     (TXTIME),HL
331 0107 3E FF                    LD     A,0FFH
332 0109 BD                       CP     L
333 010A 20 0A 0116               JR     NZ,RC125
334 010C BC                       CP     H
335 010D 20 07 0116               JR     NZ,RC125
336 010F 2A 02 00     E           LD     HL,(TXTIME+2)
337 0112 2B                       DEC    HL
338 0113 22 02 00     E           LD     (TXTIME+2),HL
339 0116              RC125:
340 0116 3A 00 00     E           LD     A,(PAGETX)
341 0119 B7                       OR     A
342 011A 20 13 012F               JR     NZ,RC128
343 011C 3E 18                    LD     A,24
344 011E 32 00 00     E           LD     (PAGETX),A
345 0121 3A 00 00     E           LD     A,(REPAGT)
346 0124 B7                       OR     A
347 0125 20 02 0129               JR     NZ,RC126
348 0127 3E 04                    LD     A,4
```

```
349 0129                    RC126:
350 0129 3D                         DEC     A
351 012A 32 00 00     E             LD      (REPAGT),A
352 012D 18 04 0133                 JR      RC129
353 012F                    RC128:
354 012F 3D                         DEC     A
355 0130 32 00 00     E             LD      (PAGETX),A
356 0133
357                         * * * EXIT THE RECEIVE MODE
358 0133                    RC129:
359 0133 CD 00 00     E             CALL    EXITRX
360 0136
361                         * * ELSE
362 0136 C3 4D 01     C             JP      RC140
363 0139                    RC130:
364                         * * * INCREMENT TX FRAME TIME AND PAGE COUNTER
365 0139 21 00 00     E             LD      HL,TXTIME
366 013C 3A 00 00     E             LD      A,(REPAGT)
367 013F 47                         LD      B,A
368 0140 3A 00 00     E             LD      A,(PAGETX)
369 0143 CD 00 00     E             CALL    INCTIM
370 0146 32 00 00     E             LD      (PAGETX),A
371 0149 78                         LD      A,B
372 014A 32 00 00     E             LD      (REPAGT),A
373 014D
374                         * * END IF
375 014D                    RC140:
376 014D
377                         * * IF NCS TONE COUNTER <> 0
378 014D 3A 00 00     E             LD      A,(NCSTCT)
379 0150 B7                         OR      A
380 0151 28 0B 015E                 JR      Z,RC200
381 0153
382                         * * THEN
383                         * * * DECREMENT COUNTER
384 0153 3D                         DEC     A
385 0154 32 00 00     E             LD      (NCSTCT),A
386 0157
387                         * * * IF RESULT = 0
388 0157 20 05 015E                 JR      NZ,RC200
389 0159
390                         * * * THEN
391                         * * * * DISABLE TONE
392 0159 3E 00        E             LD      A,.LOW.TONE
393 015B 32 00 00     E             LD      (APRTBS),A
394 015E
395                         * * * END IF
396                         * * END IF
397 015E                    RC200:
398 015E
399                         * * RESTORE REGISTERS
400 015E
401 015E C1                         POP     BC
402 015F D1                         POP     DE
403 0160 E1                         POP     HL
404 0161 F1                         POP     AF
405 0162
406                         * END PROCEDURE
407 0162 FB                         EI
```

```
408 0163 C9                    RET
409 0164                       END

ERRORS = 0000

APRTBS E 0010    BITRCK E 001F    BOTHAB E 001D    BPRTA  E 0003
BPRTBC E 0006    BPRTC  E 0000    BPRTCS E 0016    CHKPAG E 0020
CPRTAC E 0017    CPRTCC E 0005    CPRTCS E 0004    EXITFL E 0018
EXITRX E 0015    FALSE  E 000B    INCTIM E 0012    MEMORY M 0000
MISSOM E 0024    NCSTCT E 0022    NXTFRQ E 0002    PAGDET E 0001
PAGERX E 0008    PAGETX E 0013    PAGFRQ E 000C    PNGEN  E 0011
RC100  C 00E0    RC105  C 00E6    RC110  C 00E6    RC115  C 00F9
RC120  C 00F9    RC125  C 0116    RC126  C 0129    RC128  C 012F
RC129  C 0133    RC130  C 0139    RC140  C 014D    RC200  C 015E
RC40   C 0062    RC50   C 0065    RC55   C 007B    RC60   C 008A
RC70   C 008C    RC80   C 009E    RC85   C 00B6    RC90   C 00BC
RC95   C 00BE    RCVFRM C 0000    REPAGR E 001A    REPAGT E 0019
RESFLG E 0025    RESYNC E 001B    RETX   E 001C    RMATCH E 0023
RXFLGS E 0009    RXSOMC E 000E    RXSTRB E 001E    RXTIME E 0007
SOMCTR E 000A    STACK  S 0000    TIME1  E 000F    TONE   E 0021
TXTIME E 0014    VALSOM E 000D
```

```
  1  *********************************************************************
  2  *                                                                   *
  3  * NAME: HOP MODE (HOP)              PPS REF:                         *
  4  *                                                                   *
  5  * FILE NAME: HOP.SRC                                                 *
  6  *                                                                   *
  7  * FUNCTION: SUPERVISOR FOR EXECUTING HOP AND TIME MODES. PREFORMS INITIAL- *
  8  *           IZATION & DOES OVERHEAD FUNCTIONS FOR EACH SUB-MODE OF OPERA- *
  9  *           TION IN HOP AND TIME (TRANSMIT, RECEIVE & SYNC SEARCH)   *
 10  *                                                                   *
 11  * METHOD:                                                            *
 12  *                                                                   *
 13  * INPUT PARAMETERS:                                                  *
 14  *                                                                   *
 15  * NAME     DESCRIPTION              TYPE      LENGTH     RANGE       *
 16  *                                                                   *
 17  *                                                                   *
 18  * OUTPUT PARAMETERS:                                                 *
 19  *                                                                   *
 20  * NAME     DESCRIPTION              TYPE      LENGTH     RANGE       *
 21  *                                                                   *
 22  *                                                                   *
 23  * DATA ACCESSED OR ALTERED EXTERNAL TO MODULE:                       *
 24  *                                                                   *
 25  * NAME     DESCRIPTION        TYPE      LENGTH     RANGE    DIRECTION*
 26  *                                                                   *
 27  *    (DATA USED FOR INTIALIZATION OR ONE TIME INITIALIZED)           *
 28  *                                                                   *
 29  * PNKEY    PN GENERATOR KEY              2 BYTES          OUTPUT     *
 30  * TXCMDW   TX COMMAND WORD               1 BYTE           OUTPUT     *
 31  * RESYNC   RESYNC RECEIVED FLAG          1 BYTE           OUTPUT     *
 32  * SSPAGE   SYNC SEARCH PAGE COUNTER      1 BYTE           OUTPUT     *
 33  * RESTOR   RESTORE DISPLAY FLAG          1 BYTE           OUTPUT     *
 34  * INPTR    DATA BUFFER INPUT POINTER     2 BYTES          OUTPUT     *
 35  * OUTPTR   DATA BUFFER OUTPUT POINTER    2 BYTES          OUTPUT     *
 36  * PAGFRQ   PAGE FREQUENCY FOR NET        2 BYTES          OUTPUT     *
 37  * TIM1ST   TIME 1ST FLAG (FOR TX MODE)   1 BYTE           OUTPUT     *
 38  * TXFRST   TRANSMIT 1ST INTFRM FLAG      1 BYTE           OUTPUT     *
```

```
39          * PRNTID  PRESET NET ID                      2 BYTES      INPUT    *
40          * FILL    ROM FREQUENCY PLANS (FILL)       104 BYTES      INPUT    *
41          * FILLT   RAM FREQUENCY PLANS (FILL)       112 BYTES      INPUT    *
42          * INCADD  START ADDRESS OF INCLUDE TABLE     2 BYTES      OUTPUT   *
43          * INCEND  END ADDRESS OF INCLUDE TABLE       2 BYTES      OUTPUT   *
44          * PRFREQ  PRESET FREQUENCY                   2 BYTES      INPUT    *
45          * BINFRQ  BINARY EQUIV OF FREQ (CHANNEL)     2 BYTES      INPUT    *
46          * SS1ST   SYNC SEARCH 1ST FLAG               1 BYTE       OUTPUT   *
47.         * MISSOM  MISSED SOM COUNTER                 1 BYTE       OUTPUT   *
48          * RESFLG  RESYNC SOM FLAGS                   1 BYTE       OUTPUT   *
49          * SAMPLE  SAMPLE TIME COUNTER                1 BYTE       OUTPUT   *
50          *                                                                  *
51          *            (DATA PERIODICALLY MONITORED OR ALTERED)              *
52          *                                                                  *
53          * RCVFLG  RECEIVE MODE FLAG                  1 BYTE       INPUT    *
54          * PTTI    PTT INTERNAL FLAG                  1 BIT(0)     INPUT    *
55          * FLTFLG  CONTROL FAULT REGISTER             1 BYTE       OUTPUT   *
56          * SYSSTS  SYSTEM STATUS REGISTER             1 BYTE       INPUT    *
57          * RXTIME  RCV FRAME TIME                     4 BYTES      OUTPUT   *
58          * TXTIME  TRANSMIT FRAME TIME                4 BYTES      INPUT    *
59          * PAGERX  RCV PAGE COUNTER                   1 BYTE       OUTPUT   *
60          * PAGETX  TX PAGE COUNTER                    1 BYTE       OUTPUT   *
61          * REPAGR  RESYNC RECEIVE PAGE COUNTER        1 BYTE       OUTPUT   *
62          * REPAGT  RESYNC TRANSMIT PAGE COUNTER       1 BYTE       BOTH     *
63          * DSPLPG  DISPLAY PAGE FLAG                  1 BYTE       OUTPUT   *
64          * PAGEFL  DISPLAY PAGE MODE FLAG             1 BYTE       OUTPUT   *
65          * HYSTRI  PAGE HYSTERISIS COUNTER            1 BYTE       OUTPUT   *
66          * SS1ST   SYNC SEARCH 1ST FLAG               1 BYTE       OUTPUT   *
67          * EOMFLG  EOM RECEIVE FLAG                   1 BYTE       BOTH     *
68          * TIMRXD  RCV'D TIME BYTE COUNTER            1 BYTE       INPUT    *
69          * TIME1   BIT VOTE BUFFERS (1ST BYTE)        8 BYTES      INPUT    *
70          * TIME2   BIT VOTE BUFFERS (2ND BYTE)        8 BYTES      INPUT    *
71          * TIME3   BIT VOTE BUFFERS (3RD BYTE)        8 BYTES      INPUT    *
72          * TIME4   BIT VOTE BUFFERS (4TH BYTE)        8 BYTES      INPUT    *
73          * ERRTBL  ERROR CORRECTION TABLE            32 BYTES      INPUT    *
74          * TIMDAT+2 MEMORY IMAGE OF DAY               1 BYTE       BOTH     *
75          * VALSOM  VALID SOM RCV'D FLAG               1 BYTE       INPUT    *
76          * RXCMDW  RCV'D COMMAND WORD                 1 BYTE       OUTPUT   *
77          * NCSTCT  NCS TONE COUNTER                   1 BYTE       OUTPUT   *
78          *                                                                  *
79          * RESTRICTIONS:                                                    *
80          *                                                                  *
81          * SUPPORTING MODULES: TBLBLD - BUILDS HOPPING FREQUENCY TABLE      *
82          *                     FRMTIM - CALCULATES FRAME TIME               *
83          *                     MINBND - CALCULATES MINUTE BOUNDARIES        *
84          *                     PAGECT - CALCULATES PAGE COUNTER             *
85          *                     FTRTC  - CONVERTS FRAME TIME TO REAL TIME    *
86          *                     LKDATA - DATA FIND MODULE (CONTROL)          *
87          *                     BDMBIN - CONVERTS BCD FREQ TO CHANNEL (CONTROL) *
88          *                     BNDBTS - SETS BAND BITS IN CHANNEL           *
89          *                     WKEQMO - SETS DAY OF MONTH EQUAL TO DAY OF WEEK *
90          *                     DISPLY - UPDATES THE DISPLAY (CONTROL)       *
91          *                     TALLY  - TALLIES BIT VOTES TO DETERMINE BYTE *
92          *                     ERRCOR - ENCODES ERROR CORRECTION INTO TIME BYTES *
93          *                     ONEFRQ - BUILDS SINGLE FREQ HOPPING TABLE FOR TIME *
94          *                     PGDSPT - DISPLAY PAGE (AND TONE IF ENABLED)  *
95          *                     SSINIT - SYNC SEARCH INITIALIZATION          *
96          *                     CHKTIM - CHECK FOR AND DISPLAY UPDATE OF TIME *
97          *                     INCTIM - INCREMENT FRAME TIME                *
98          *                     RDTIME - READ DAY, HOUR, & MINUTES OF RTC (CONTROL) *
99          *                     CHKINC - CHECKS INCLUDE TABLE CHECK SUM      *
```

```
100                    *         RXFLTS - CHECKS RECEIVE FAULTS              *
101                    *         TXFLTS - CHECKS TRANSMIT FAULTS             *
102                    *         DSPFLT - DISPLAYS HOP FAULTS                *
103                    *         FETPLN - FETCHES SELECTED FREQUENCY PLAN & STORES *
104                    *                                                      *
105                    * COPYRIGHT 1982 ROCKWELL INTERNATIONAL                *
106                    * COLLINS TELECOMMUNICATIONS PRODUCTS DIVISION         *
107                    *                                                      *
108                    * AUTHOR: C. A. BONEBRIGHT             DATE: 05-07-82  *
109                    *                                                      *
110                    * VERSION: 1.1                                         *
111                    *                                                      *
112                    * REVISION: C.A.BONEBRIGHT             DATE: 01-05-84  *
113                    *                                                      *
114                    ********************************************************
115                              CSEG
116 0000                         TITLE   'HOP'
117                              NAME    HOP
118                              PUBLIC  HOP
119                              EXTRN   SSIST,CPRTAS,APRTBC,APRTBS,PTTI,RCVFLG
120                              EXTRN   FRNTIM,TXTIME,PAGECT,MINBND,WKEQMD
121                              EXTRN   TIMRXD,EOMFLG,RXTIME,DSPLFG,APRTCC,RXCLKS
122                              EXTRN   FTRTC,USART,CPRTCS,CPRTCC,PAGETX,PAGERX
123                              EXTRN   DATABF,INPTR,OUTPTR,TALLY,SYSSTS,NCSTCT
124                              EXTRN   TIME1,TIME2,UTDATA,PAGFRQ,SNCHAR,ONEFRQ
125                              EXTRN   CPRTAC,ERRCOR,ERRTBL,PNKEY,PRNTID,LKDATA
126                              EXTRN   FILL,TBLBLD,RESTOR,DISPLY,BND1LO,TONE
127                              EXTRN   BITRCK,HOPMSK,TRLINE,BITSNC,SRCHST,NCSTRU
128                              EXTRN   FLTFLG,RESYNC,REPAGR,REPAGT,SSPAGE,PAGEFL
129                              EXTRN   PRFREQ,BDMBIN,BINFRQ,BNDBTS,HYSTRI,PGDSPT
130                              EXTRN   TXFRST,SSINIT,CHKTIM,TIMEDT,TIME3,TIME4,INCTIM
131                              EXTRN   RDTIME,TIM1ST,RSTINT,VALSOM,RXCMDW,CWDATA
132                              EXTRN   BPRTCC,BPRTCS,TXCMDW,NONNCS,SQLDIS,TXTRCK,RETX
133                              EXTRN   FILLID,FILLT,INCT,CSTAT,INCADD,CHKINC,INCTBL
134                              EXTRN   RXFLTS,TXFLTS,DSPFLT,MISSOM,RESFLG,SAMPLE
135                              EXTRN   INCEND,FETPLN
136 0000
137                    * PROCEDURE HOP
138 0000               HOP:
139 0000
140                    * * SET INTERRUPT MODE
141 0000 F3                      DI
142 0001 ED 56                   IM      1
143 0003
144                    * * FETCH PAGE FREQUENCY
145 0003 21 00 00    E           LD      HL,PRFREQ
146 0006 CD 00 00    E           CALL    LKDATA
147 0009
148                    * * CONVERT TO BINARY CHANNEL VALUE
149 0009 CD 00 00    E           CALL    BDMBIN
150 000C
151                    * * SET BAND BITS
152 000C ED 5B 00 00 E           LD      DE,(BINFRQ)           ;CHANNEL VALUE
153 0010 CD 00 00    E           CALL    BNDBTS
154 0013
155                    * * SET PAGE BIT, FREQ STROBE BIT, AND STORE
156 0013 CB F2                   SET     6,D                   ;SET PAGE BIT
157 0015 CB FA                   SET     7,D                   ;SET FREQ STROBE BIT
158 0017 ED 53 00 00 E           LD      (PAGFRQ),DE
159 001B
160                    * * IF TIME MODE
```

```
161 001B DD CB 00 4E              BIT    1,(IX)
162 001F 28 08 0029               JR     Z,HOP00
163 0021
164                         * * THEN
165                         * * * BUILD SINGLE FREQ HOP TABLE
166 0021 CB B2                    RES    6,D                ;DE HAS PAGE FREQ (CLEARS PAGE BIT)
167 0023 CD 00 00       E         CALL   ONEFRQ
168 0026 C3 B0 00       C         JP     HOP15
169 0029
170                         * * ELSE
171 0029                    HOP00:
172 0029
173                         * * * IF FILL ID = 0
174 0029 3A 00 00       E         LD     A,(FILLID)
175 002C B7                       OR     A
176 002D 20 2C 005B               JR     NZ,HOP04
177 002F 3A 01 00       E         LD     A,(FILLID+1)
178 0032 B7                       OR     A
179 0033 20 26 005B               JR     NZ,HOP04
180 0035
181                         * * * THEN
182                         * * * * USE ROM FILL
183 0035                    HOP01:
184 0035
185                         * * * * FETCH FREQ PLAN # FROM DISPLAY
186 0035 21 00 00       E         LD     HL,PRNTID
187 0038 CD 00 00       E         CALL   LKDATA
188 003B 23                       INC    HL
189 003C 7E                       LD     A,(HL)
190 003D E6 0F                    AND    0FH
191 003F B7                       OR     A
192 0040
193                         * * * * STORE START & END ADDRESS OF INCLUDE TABLE
194 0040 21 00 00       E         LD     HL,INCTBL
195 0043 22 00 00       E         LD     (INCADD),HL
196 0046 01 22 01                 LD     BC,290
197 0049 09                       ADD    HL,BC
198 004A 22 00 00       E         LD     (INCEND),HL
199 004D
200                         * * * * LOCATE PLAN IN FILL
201 004D 21 00 00       E         LD     HL,FILL
202 0050 01 0D 00                 LD     BC,13              ;LENGTH OF FREQ PLAN
203 0053
204                         * * * * FETCH PLAN AND PLACE IN RAM
205 0053 CD 00 00       E         CALL   FETPLN
206 0056
207                         * * * * BUILD A HOPPING FREQUENCY TABLE
208 0056 CD 00 00       E         CALL   TBLBLD
209 0059
210 0059 18 55 00B0               JR     HOP15
211 005B
212                         * * * ELSE
213 005B                    HOP04:
214                         * * * * USE RAM FILL
215                         * * * * CHECK INCLUDE TABLE CHECK SUM
216 005B CD 00 00       E         CALL   CHKINC
217 005E
218                         * * * * IF CHECK SUM NOT VALID (NOT ZERO)
219 005E B7                       OR     A
220 005F 28 0F 0070               JR     Z,HOP07
221 0061
```

```
222                  * * * * THEN
223                  * * * * * DO WHILE MODE = HOP
224 0061             HOP06:
225                  * * * * * * DISPLAY CONTROL MODULE FAULT
226 0061 21 00 00  E       LD    HL,FLTFLG
227 0064 CB EE             SET   5,(HL)
228 0066 21 0B 00  E       LD    HL,SYSSTS+11
229 0069 CB DE             SET   3,(HL)                    ;HOPFLT FLAG
230 006B CD 00 00  E       CALL  CSTAT
231 006E
232                  * * * * END WHILE
233 006E 18 F1 0061        JR    HOP06
234 0070
235                  * * * * ELSE
236 0070             HOP07:
237                  * * * * * STORE START & END INCLUDE TABLE ADDRESS
238 0070 21 00 00  E       LD    HL,INCT
239 0073 22 00 00  E       LD    (INCADD),HL
240 0076 01 22 01          LD    BC,290
241 0079 09                ADD   HL,BC
242 007A 22 00 00  E       LD    (INCEND),HL
243 007D
244                  * * * * * FETCH FREQ PLAN # FROM DISPLAY
245 007D 21 00 00  E       LD    HL,PRNTID
246 0080 CD 00 00  E       CALL  LKDATA
247 0083 23                INC   HL
248 0084 7E                LD    A,(HL)
249 0085 E6 0F             AND   0FH
250 0087 B7                OR    A
251 0088
252                  * * * * * LOCATE PLAN IN FILL
253 0088 21 00 00  E       LD    HL,FILLT
254 008B 01 0E 00          LD    BC,14                     ;LENGTH OF FREQ PLAN
255 008E
256                  * * * * * FETCH PLAN AND PLACE IN RAM
257 008E CD 00 00  E       CALL  FETPLN
258 0091
259                  * * * * * CHECK FREQ PLAN CHECK SUM
260 0091 21 00 00  E       LD    HL,BND1LO
261 0094 AF                XOR   A
262 0095 06 0E             LD    B,14
263 0097             HOP10:
264 0097 86                ADD   A,(HL)
265 0098 23                INC   HL
266 0099 10 FC 0097        DJNZ  HOP10
267 009B
268                  * * * * * IF CHECK SUM NOT VALID (NOT ZERO)
269 009B B7                OR    A
270 009C 28 0F 00AD        JR    Z,HOP12
271 009E
272                  * * * * * THEN
273                  * * * * * * DO WHILE MODE = HOP
274 009E             HOP11:
275                  * * * * * * * DISPLAY CONTROL MODULE FAULT
276 009E 21 00 00  E       LD    HL,FLTFLG
277 00A1 CB EE             SET   5,(HL)
278 00A3 21 0B 00  E       LD    HL,SYSSTS+11
279 00A6 CB DE             SET   3,(HL)
280 00A8 CD 00 00  E       CALL  CSTAT
281 00AB
282                  * * * * END WHILE
283 00AB 18 F1 009E        JR    HOP11
```

```
284 00AD
285                    * * * * ELSE
286 00AD               HOP12:
287 00AD
288                    * * * * * BUILD A HOPPING FREQ TABLE
289 00AD CD 00 00  E           CALL    TBLBLD
290 00B0
291                    * * * * * END IF
292                    * * * * END IF
293                    * * * END IF
294                    * * END IF
295 00B0               HOP15:
296 00B0
297                    * * FETCH VARIABLE 0-99 FROM CONTROL
298 00B0 21 00 00  E           LD      HL,FRNTID
299 00B3 CD 00 00  E           CALL    LKDATA
300 00B6 7E                    LD      A,(HL)
301 00B7
302                    * * GENERATE PNKEY
303 00B7 07                    RLCA                    ;ROTATE VARIABLE LEFT ONCE
304 00B8 32 00 00  E           LD      (PNKEY),A       ;STORE AS LSB OF INTERNAL PN KEY
305 00BB 0F                    RRCA
306 00BC 0F                    RRCA
307 00BD 0F                    RRCA                    ;ROTATE SAME VARIABLE A NET OF RIGHT TWICE
308 00BE 47                    LD      B,A             ;STORE IN REG B
309 00BF 23                    INC     HL
310 00C0 7E                    LD      A,(HL)          ;FETCH FREQ PLAN FROM NET ID
311 00C1 A8                    XOR     B               ;XOR ROTATED VARIABLE WITH FREQ PLAN
312 00C2 CB 47                 BIT     0,A             ;IF BIT 0 IS A '1'
313 00C4 CA CB 00  C           JP      Z,HOP17
314 00C7 0F                    RRCA                    ;THEN ROTATE RIGHT (BIT 0 BECOMES BIT 7)
315 00C8 C3 D5 00  C           JP      HOP18
316 00CB               HOP17:
317 00CB 47                    LD      B,A
318 00CC E6 F0                 AND     0F0H            ;ELSE
319 00CE C2 D5 00  C           JP      NZ,HOP18            ;IF TOP NIBBLE = 0
320 00D1 7E                    LD      A,(HL)
321 00D2 E6 F0                 AND     0F0H            ;THEN SET TOP NIBBLE = FREQ PLAN (BCD)
322 00D4 B0                    OR      B               ;END IF
323                   HOP18:                           ;END IF
324 00D5
325                    * * XOR DATA/VOICE PRIVACY KEY WITH INTERNAL PNKEY
326 00D5 2A 00 00  E           LD      HL,(PRFREQ)     ;FETCH DATA-VOICE PRIVACY KEY
327 00D8 AC                    XOR     H               ;MSB OF INTERNAL PNKEY IS IN ACC
328 00D9 32 01 00  E           LD      (PNKEY+1),A     ;STORE AS MSB OF FINAL PN KEY
329 00DC 3A 00 00  E           LD      A,(PNKEY)       ;FETCH MSB OF INTERNAL PNKEY
330 00DF AD                    XOR     L
331 00E0 32 00 00  E           LD      (PNKEY),A       ;STORE AS LSB OF FINAL PN KEY
332                    * * IF NCS MODE BIT SET (BY CONTROL)
333 00E3 3A 00 00  E           LD      A,(SYSSTS)
334 00E6 CB 67                 BIT     4,A
335 00E8 28 04 00EE            JR      Z,HOP19
336 00EA
337                    * * THEN
338                    * * * SET NCS BITS TO TRUE VALUE
339 00EA 3E 00     E           LD      A,.LOW.NCSTRU
340 00EC 18 02 00F0            JR      HOP19B
341 00EE
342                    * * ELSE
343 00EE               HOP19:
344 00EE
```

```
345                         * * SET NCS BITS TO FALSE VALUE
346 00EE 3E 00      E            LD    A,.LOW.NONNCS
347 00F0
348                         * * END IF
349 00F0                    HOP19B:
350 00F0 32 00 00   E            LD    (TXCMDW),A
351 00F3
352                         * * INIT FLAGS, COUNTERS, AND POINTERS
353 00F3 3E 00      E            LD    A,.LOW.RXCLKS
354 00F5 32 00 00   E            LD    (CPRTCC),A            ;LOWER RCV CLOCK START LINE
355 00F8 3E 00      E            LD    A,.LOW.BITRCK
356 00FA F6 00      E            OR    .LOW.TXTRCK
357 00FC 32 00 00   E            LD    (CPRTAC),A            ;RESET BIT TRACKING DISABLE
358                                                          ;AND TX TRACKING ENABLE
359 00FF 32 00 00   E            LD    (SS1ST),A             ;SET SYNC SEARCH 1ST FLAG
360 0102 3E 00      E            LD    A,.LOW.RETX
361 0104 32 00 00   E            LD    (BPRTCC),A            ;RESET RETRANSMIT LINE
362 0107 3E 00      E            LD    A,.LOW.HOPMSK
363 0109 32 00 00   E            LD    (CPRTAS),A            ;SET HOP LINE = 1
364 010C 3E 00      E            LD    A,.LOW.TRLINE
365 010E 32 00 00   E            LD    (APRTBC),A            ;SET T/R LINE = 0
366 0111 3E 00      E            LD    A,.LOW.SRCHST
367 0113 32 00 00   E            LD    (CPRTCS),A            ;SET SEARCH START LINE HIGH
368 0116 AF                      XOR   A
369 0117 32 00 00   E            LD    (PTTI),A              ;CLEAR INTERNAL PTT
370 011A 32 00 00   E            LD    (TXFRST),A            ;CLEAR TX FIRST FLAG
371 011D 32 00 00   E            LD    (RCVFLG),A            ;CLEAR RECEIVE FLAG
372 0120 32 00 00   E            LD    (RESYNC),A            ;CLEAR RESYNC RCVD FLAG
373 0123 32 00 00   E            LD    (SSPAGE),A            ;INIT SYNC SEARCH PAGE CTR
374 0126 32 00 00   E            LD    (DSPLPG),A            ;CLEAR DISPLAY PAGE FLAG
375 0129 32 00 00   E            LD    (PAGEFL),A            ;CLEAR PAGE MODE FLAG
376 012C 32 00 00   E            LD    (RESTOR),A            ;CLEAR RESTORE DISPLAY FLAG
377 012F 32 00 00   E            LD    (HYSTRI),A            ;INIT PAGE HYSTERESIS TO 0
378 0132 32 00 00   E            LD    (TIM1ST),A            ;CLEAR TIME MODE 1ST FLAG
379 0135 32 00 00   E            LD    (NCSTCT),A            ;ZERO NCS TONE COUNTER
380 0138 32 00 00   E            LD    (MISSOM),A            ;ZERO MISSED SOM COUNTER
381 013B 32 00 00   E            LD    (RESFLG),A            ;RESYNC SOM FLAGS
382 013E 21 00 00   E            LD    HL,DATABF
383 0141 22 00 00   E            LD    (INPTR),HL            ;INIT DATA BUFFER POINTERS
384 0144 22 00 00   E            LD    (OUTPTR),HL           ;(HIGH ORDER ADDRESS)
385 0147 3E 14                   LD    A,20
386 0149 32 00 00   E            LD    (SAMPLE),A            ;SET SAMPLE TIMER = 20
387 014C
388                         * * INITIALIZE USART (SINGLE SYNC, HUNT MODE)
389 014C 3E 40                   LD    A,40H                 ;SOFTWARE RESET
390 014E 32 00 00   E            LD    (USART),A
391 0151 3E 8C                   LD    A,8CH                 ;MODE WORD
392 0153 32 00 00   E            LD    (USART),A
393 0156 3E 00      E            LD    A,.LOW.SNCHAR         ;SYNC CHARACTER
394 0158 32 00 00   E            LD    (USART),A
395 015B 3E 10                   LD    A,10H                 ;ERROR RESET
396 015D 32 00 00   E            LD    (USART),A
397 0160 3E 00      E            LD    A,.LOW.BITSNC         ;PRELOAD DATA REGISTER
398 0162 32 00 00   E            LD    (UTDATA),A
399 0165
400 0165
401                         * * SET DAY OF MONTH = DAY OF WEEK IN THE RTC
402 0165
403 0165 CD 00 00   E            CALL  WKEQMO
404 0168
405 *                       * * CALCULATE FRAME TIME
406 0168 CD 00 00   E            CALL  FRMTIM
```

```
407 016B
408                  * * CALCULATE PAGE FRAME POSITION COUNTER
409 016B 21 00 00    E      LD      HL,TXTIME
410 016E CD 00 00    E      CALL    PAGECT
411 0171 32 00 00    E      LD      (PAGETX),A
412 0174 21 00 00    E      LD      HL,REPAGT
413 0177 72                 LD      (HL),D
414 0178
415                  * * CALCULATE LAST 3 MINUTE BOUNDARIES
416 0178 CD 00 00    E      CALL    MINBND
417 017B
418                  * * DISABLE SQUELCH
419 017B 3E 00       E      LD      A,.LOW.SQLDIS
420 017D 32 00 00    E      LD      (APRTCC),A
421 0180
422                  * * RESET INTERNAL FRAME MARK INTERRUPT FLIP FLOP
423 0180 3E 00       E      LD      A,.LOW.RSTINT
424 0182 32 00 00    E      LD      (CPRTCS),A
425 0185 32 00 00    E      LD      (CPRTCC),A
426 0188
427                  * * ENABLE INTERRUPTS
428 0188 3E 04              LD      A,04H               ;ENABLE INTFRM
429 018A D3 BB              OUT     (0BBH),A            ;SET INTERRUPT MASK
430 018C FB                 EI
431 018D
432                  * * CASE OF MODE
433                  * * WHEN MODE = HOP
434 018D DD CB 00 4E        BIT     1,(IX)
435 0191 C2 10 03    C      JP      NZ,HOP400
436 0194
437                  * * * DO WHILE IN HOP
438 0194             HOP20:
439 0194
440                  * * * * CASE OF HOP SUB-MODE
441                  * * * * WHEN TRANSMIT
442 0194 3A 00 00    E      LD      A,(PTTI)
443 0197 CB 47              BIT     0,A
444 0199 28 2C 01C7         JR      Z,HOP50
445 019B
446                  * * * * * RESET PAGE HYSTERESIS COUNTER
447 019B AF                 XOR     A
448 019C 32 00 00    E      LD      (HYSTRI),A
449 019F
450                  * * * * CLEAR DISPLAY PAGE MODE FLAGS
451 019F 32 00 00    E      LD      (PAGEFL),A
452 01A2 32 00 00    E      LD      (DSPLPG),A
453 01A5
454                  * * * * DISABLE TONE
455 01A5 3E 00       E      LD      A,.LOW.TONE
456 01A7 32 00 00    E      LD      (APRTBS),A
457 01AA
458                  * * * * CLEAR DISPLAY OF PAGE
459 01AA 21 00 00    E      LD      HL,FLTFLG
460 01AD CB B6              RES     6,(HL)
461 01AF CD 00 00    E      CALL    DISPLY
462 01B2
463                  * * * * * DO UNTIL NO PTTI
464 01B2             HOP40:
465 01B2
466                  * * * * * * CHECK TRANSMIT FAULTS
467 01B2 CD 00 00    E      CALL    TXFLTS
```

```
468 01B5
469                          * * * * * IF FAULT
470 01B5 B7                          OR      A
471 01B6 28 06 01BE                  JR      Z,HOP45
472 01B8
473                          * * * * * * THEN
474                          * * * * * * * DISPLAY FAULT
475 01B8 3A 00 00    E               LD      A,(REPAGT)
476 01BB CD 00 00    E               CALL    DSPFLT
477 01BE
478                          * * * * * * END IF
479 01BE             HOP45:
480                          * * * * END UNTIL
481 01BE 3A 00 00    E               LD      A,(PTTI)
482 01C1 CB 47                       BIT     0,A
483 01C3 20 ED 01B2                  JR      NZ,HOP40
484 01C5
485 01C5 18 CD 0194                  JR      HOP20                           ;TO END OF CASE
486 01C7
487                          * * * WHEN RECEIVE
488 01C7             HOP50:
489 01C7 3A 00 00    E               LD      A,(RCVFLG)
490 01CA B7                          OR      A
491 01CB CA DD 02    C               JP      Z,HOP200
492 01CE
493                          * * * * DO UNTIL TIME RECEIVED OR EOM
494 01CE             HOP60:
495 01CE
496                          * * * * END UNTIL
497 01CE 3A 00 00    E               LD      A,(EOMFLG)
498 01D1 B7                          OR      A
499 01D2 C2 D6 02    C               JP      NZ,HOP160
500 01D5 3A 00 00    E               LD      A,(TIMRXD)
501 01D8 FE 06                       CP      6
502 01DA 28 02 01DE                  JR      Z,HOP70
503 01DC 18 F0 01CE                  JR      HOP60
504 01DE
505                          * * * * * IF TIME RECEIVED
506 01DE             HOP70:
507 01DE
508                          * * * * * THEN
509                          * * * * * * TRANSFER 2 MSB'S OF TX TIME TO RX TIME
510 01DE F3                          DI
511 01DF 2A 02 00    E               LD      HL,(TXTIME+2)
512 01E2 22 02 00    E               LD      (RXTIME+2),HL
513 01E5
514                          * * * * * * RECONSTRUCT 2ND TIME BYTE
515 01E5 21 00 00    E               LD      HL,TIME2
516 01E8 CD 00 00    E               CALL    TALLY
517 01EB 32 01 00    E               LD      (RXTIME+1),A
518 01EE
519                          * * * * * * CONSTRUCT ERROR CORRECTION BITS
520 01EE 2A 00 00    E               LD      HL,(RXTIME)
521 01F1 54                          LD      D,H
522 01F2 CD 00 00    E               CALL    ERRCOR
523 01F5
524                          * * * * * IF CORRECTION BITS NOT EQUAL RCV'D COR. BITS
525 01F5 7A                          LD      A,D
526 01F6 AC                          XOR     H
527 01F7 28 1A 0213                  JR      Z,HOP73
528 01F9
529                          * * * * * * THEN
```

```
530                          * * * * * * CORRECT BIT IN ERROR
531 01F9 21 00 00    E       LD      HL,ERRTBL
532 01FC 0F                  RRCA
533 01FD 0F                  RRCA
534 01FE 0F                  RRCA                    ;BIT CORRECTION NIBBLE X 2
535 01FF 85                  ADD     A,L
536 0200 6F                  LD      L,A
537 0201 30 01 0204          JR      NC,HOP72
538 0203 24                  INC     H
539 0204            HOP72:
540 0204 5E                  LD      E,(HL)          ;FETCH CORRECTION CODE FROM TABLE
541 0205 23                  INC     HL
542 0206 56                  LD      D,(HL)
543 0207 3A 00 00    E       LD      A,(RXTIME)
544 020A AB                  XOR     E
545 020B 32 00 00    E       LD      (RXTIME),A
546 020E 3A 01 00    E       LD      A,(RXTIME+1)
547 0211 AA                  XOR     D
548 0212 57                  LD      D,A
549 0213
550                          * * * * * * END IF
551 0213
552 0213            HOP73:
553 0213
554                          * * * * * * REPLACE ERROR CORRECTION BITS WITH TIME BITS
555 0213 3E 0F                LD      A,0FH          ;MASK OFF CORRECTION BITS
556 0215 A2                   AND     D
557 0216 57                   LD      D,A            ;D HAS 4 LSB'S OF RXTIME + 1
558 0217 2A 00 00    E        LD      HL,(TXTIME)
559 021A 3E F0                LD      A,0F0H         ;MASK OFF 4 LSB'S
560 021C A4                   AND     H
561 021D B2                   OR      D              ;ACCUMULATOR HAS RXTIME+1
562 021E 32 01 00    E        LD      (RXTIME+1),A   ;STORE TIME BYTE
563 0221
564                          * * * * * * CASE RCV'D TIME VS INTERNAL TIME
565                          * * * * * * WHEN RCV'D BITS 10 AND 11 = '1' AND INTERNAL TIME BIT 11='0'
566 0221 CB 5F                BIT     3,A
567 0223 28 1D 0242           JR      Z,HOP74
568 0225 CB 57                BIT     2,A            ;3 = '1'
569 0227 28 32 025B           JR      Z,HOP76
570 0229 CB 5C                BIT     3,H            ;3 = 2 = '1'
571 022B 20 2E 025B           JR      NZ,HOP76
572 022D
573                          * * * * * * SUBTRACT 4096 FRAMES FROM TIME
574 022D 16 10                LD      D,10H
575 022F 92                   SUB     D              ;SUBTRACT 40 SECONDS
576 0230 21 01 00    E        LD      HL,RXTIME+1
577 0233 77                   LD      (HL),A
578 0234 D2 5B 02    C        JP      NC,HOP76
579 0237 23                   INC     HL
580 0238 7E                   LD      A,(HL)
581 0239 D6 01                SUB     1
582 023B 77                   LD      (HL),A
583 023C 30 1D 025B           JR      NC,HOP76
584 023E 23                   INC     HL
585 023F 35                   DEC     (HL)
586 0240 18 19 025B           JR      HOP76
587 0242
588                          * * * * * * WHEN RCV'D BITS 10 AND 11 = '0' AND INTERNAL TIME BIT 11='1'
589 0242            HOP74:
590 0242 CB 57                BIT     2,A
591 0244 20 15 025B           JR      NZ,HOP76
```

```
592 0246 CB 5C                BIT    3,H
593 0248 28 11 025B           JR     Z,HOP76
594 024A
595                    * * * * * * ADD 4096 FRAMES TO TIME
596 024A C6 10                ADD    A,10H          ;ADD 40 SECONDS
597 024C 21 01 00      E      LD     HL,RXTIME+1
598 024F 77                   LD     (HL),A
599 0250 30 09 025B           JR     NC,HOP76
600 0252 23                   INC    HL
601 0253 7E                   LD     A,(HL)
602 0254 C6 01                ADD    A,1
603 0256 77                   LD     (HL),A
604 0257 30 02 025B           JR     NC,HOP76
605 0259 23                   INC    HL
606 025A 34                   INC    (HL)
607 025B
608                    * * * * * END CASE
609 025B               HOP76:
610 025B
611                    * * * * * * CALCULATE PAGE FRAME POSITION COUNTER
612 025B 21 00 00      E      LD     HL,RXTIME
613 025E CD 00 00      E      CALL   PAGECT
614 0261 32 00 00      E      LD     (PAGERX),A
615 0264 21 00 00      E      LD     HL,REPAGR
616 0267 72                   LD     (HL),D
617 0268
618                    * * * * * * ENABLE RCVFRM INTERRUPT
619 0268 3E 09                LD     A,09H                         ;RXRDY AND RCVFRM
620 026A F3                   DI
621 026B D3 BB                OUT    (0BBH),A
622 026D FB                   EI
623 026E
624                    * * * * * * DO UNTIL COMMAND WORD RCV'D OR EOM
625 026E               HOP80:
626 026E
627.                   * * * * * * END UNTIL
628 026E 3A 00 00      E      LD     A,(EOMFLG)
629 0271 B7                   OR     A
630 0272 20 62 02D6           JR     NZ,HOP160
631 0274 3A 00 00      E      LD     A,(VALSOM)
632 0277 B7                   OR     A
633 0278 20 02 027C           JR     NZ,HOP85
634 027A 18 F2 026E           JR     HOP80
635 027C
636                    * * * * * * IF COMMAND WORD RCV'D
637 027C               HOP85:
638 027C
639                    * * * * * * THEN
640                    * * * * * * * RECONSTRUCT COMMAND WORD
641 027C 21 00 00      E      LD     HL,TIME1
642 027F CD 00 00      E      CALL   TALLY
643 0282 32 00 00      E      LD     (RXCMDW),A
644 0285
645                    * * * * * * * IF DATA
646 0285 E6 F0                AND    0F0H
647 0287 EE 00         E      XOR    .LOW.CWDATA
648 0289 3E 08                LD     A,08H
649 028B 20 05 0292           JR     NZ,HOP90
650 028D
651                    * * * * * * * THEN
652                    * * * * * * * * SET HW FOR DATA
```

```
653 028D 32 00 00      E         LD      (BPRTCC),A
654 0290 18 03 0295              JR      HOP95
655 0292
656                           * * * * * * ELSE
657 0292                      HOP90:
658 0292
659                           * * * * * * * SET HARDWARE FOR VOICE
660 0292 32 00 00      E         LD      (BPRTCS),A
661 0295
662                           * * * * * * END IF
663 0295                      HOP95:
664 0295
665                           * * * * * * DO UNTIL EOM
666 0295                      HOP100:
667 0295
668                           * * * * * * CHECK RECEIVE FAULTS
669 0295 CD 00 00      E         CALL    RXFLTS
670 0298
671                           * * * * * * IF FAULT
672 0298 B7                       OR      A
673 0299 28 08 02A3               JR      Z,HOP110
674 029B
675                           * * * * * * THEN
676                           * * * * * * * DISPLAY FAULT
677 029B 3A 00 00      E         LD      A,(REPAGR)
678 029E CD 00 00      E         CALL    DSPFLT
679 02A1 18 0D 02B0              JR      HOP130
680 02A3
681                           * * * * * * ELSE
682 02A3                      HOP110:
683 02A3
684                           * * * * * * * IF IN NCS MODE
685 02A3 3A 00 00      E         LD      A,(SYSSTS)
686 02A6 CB 67                    BIT     4,A
687 02A8 28 06 02B0               JR      Z,HOP120
688 02AA
689                           * * * * * * * THEN
690                           * * * * * * * * ACTIVATE PAGE DISPLAY & TONE IF REQ'D
691 02AA 21 00 00      E         LD      HL,REPAGR
692 02AD CD 00 00      E         CALL    PGDSPT
693 02B0
694                           * * * * * * * END IF
695 02B0                      HOP120:
696 02B0
697                           * * * * * * END IF
698 02B0                      HOP130:
699 02B0
700                           * * * * * END UNTIL
701 02B0 3A 00 00      E         LD      A,(EOMFLG)
702 02B3 B7                       OR      A
703 02B4 CA 95 02      C         JP      Z,HOP100
704 02B7
705                           * * * * * IF NCS MESSAGE RCV'D
706 02B7 3A 00 00      E         LD      A,(RXCMDW)
707 02BA E6 0F                    AND     0FH
708 02BC EE 00        E          XOR     .LOW.NCSTRU
709 02BE 20 16 02D6               JR      NZ,HOP150
710 02C0
711                           * * * * * THEN
712                           * * * * * * IF NCS MODE
713 02C0 3A 00 00      E         LD      A,(SYSSTS)
```

```
714 02C3 CB 67                    BIT     4,A
715 02C5 28 0C 02D3               JR      Z,HOP140
716 02C7
717                      * * * * * * * THEN
718                      * * * * * * * ENABLE TONE AND INIT COUNTER
719 02C7 3E 00        E           LD      A,.LOW.TONE
720 02C9 32 00 00     E           LD      (APRTBC),A
721 02CC 3E 0A                    LD      A,10
722 02CE 32 00 00     E           LD      (NCSTCT),A
723 02D1 18 03 02D6               JR      HOP150
724 02D3
725                      * * * * * * * ELSE (NOT NCS MODE)
726 02D3                 HOP140:
727 02D3
728                      * * * * * * * UPDATE FRAME TIME AND RTC
729 02D3 CD 00 00     E           CALL    FTRTC
730 02D6
731                      * * * * * * END IF
732                      * * * * * * END IF
733 02D6                 HOP150:
734 02D6
735                      * * * * * END IF
736 02D6                 HOP160:
737 02D6
738                      * * * * * CLEAR EOM FLAG
739 02D6 AF                       XOR     A
740 02D7 32 00 00     E           LD      (EOMFLG),A
741 02DA C3 94 01     C           JP      HOP20
742 02DD
743                      * * * * ELSE SYNC SEARCH
744 02DD                 HOP200:
745 02DD
746                      * * * * * INITIALIZE SYNC SEARCH MODE
747 02DD CD 00 00     E           CALL    SSINIT
748 02E0
749                      * * * * * DO WHILE IN SYNC SEARCH
750 02E0                 HOP210:
751 02E0 3A 00 00     E           LD      A,(RCVFLG)
752 02E3 B7                       OR      A
753 02E4 C2 94 01     C           JP      NZ,HOP20
754 02E7 3A 00 00     E           LD      A,(PTTI)
755 02EA CB 47                    BIT     0,A
756 02EC C2 94 01     C           JP      NZ,HOP20
757 02EF
758                      * * * * * * CHECK RECEIVE FAULTS
759 02EF CD 00 00     E           CALL    RXFLTS
760 02F2
761                      * * * * * * IF FAULT
762 02F2 B7                       OR      A
763 02F3 28 08 02FD               JR      Z,HOP220
764 02F5
765                      * * * * * * THEN
766                      * * * * * * DISPLAY FAULT
767 02F5 3A 00 00     E           LD      A,(REPAGT)
768 02F8 CD 00 00     E           CALL    DSPFLT
769 02FB 18 0D 030A               JR      HOP240
770 02FD
771                      * * * * * * ELSE
772 02FD                 HOP220:
773 02FD
774                      * * * * * * IF IN NCS MODE
```

```
775 02FD 3A 00 00      E          LD      A,(SYSSTS)
776 0300 CB 67                    BIT     4,A
777 0302 28 06 030A               JR      Z,HOP230
778 0304
779                    * * * * * * THEN
780                    * * * * * * * ACTIVATE PAGE DISPLAY & TONE IF REQ'D
781 0304 21 00 00      E          LD      HL,REPAGT
782 0307 CD 00 00      E          CALL    PGDSPT
783 030A
784                    * * * * * * END IF
785 030A              HOP230:
786 030A
787                    * * * * * END IF
788 030A              HOP240:
789 030A
790                    * * * * END WHILE
791 030A              HOP250:
792 030A C3 E0 02      C          JP      HOP210
793 030D
794                    * * * END CASE
795 030D              HOP300:
796 030D
797                    * * * END WHILE
798 030D C3 94 01      C          JP      HOP20
799 0310
800                    * * WHEN MODE = TIME
801 0310
802                    * * * DO WHILE IN TIME
803 0310              HOP400:
804 0310
805                    * * * * CASE OF TIME SUBMODE
806                    * * * * WHEN RECEIVE
807 0310 3A 00 00      E          LD      A,(RCVFLG)
808 0313 B7                       OR      A
809 0314 CA F9 03      C          JP      Z,HOP500
810 0317
811                    * * * * * DO UNTIL TIME TRANSFERRED OR EOM
812 0317              HOP410:
813 0317
814                    * * * * * * SKIP CODE FOR TIME TONE  (CODE LEFT IN SOFTWARE IN CASE THE
815                    ;                                    TONE IS DESIRED IN THE FUTURE)
816 0317 18 18 0331               JR      HOP416
817 0319
818                    * * * * * * IMPLEMENT TIME TONE
819                    * * * * * * IF NOT DAY = 0
820 0319 3A 02 00      E          LD      A,(TIMEDT+2)
821 031C B7                       OR      A
822 031D 28 12 0331               JR      Z,HOP416
823 031F
824                    * * * * * * THEN
825                    * * * * * * * CASE OF TX RESYNC PAGE COUNTER
826 031F 3A 00 00      E          LD      A,(REPAGT)
827 0322
828                    * * * * * * * WHEN COUNTER = 0
829 0322 B7                       OR      A
830 0323 20 07 032C               JR      NZ,HOP414
831 0325
832                    * * * * * * * * ENABLE TONE
833 0325 3E 00         E          LD      A,,LOW.TONE
834 0327 32 00 00      E          LD      (APRTBC),A
835 032A 18 05 0331               JR      HOP416
```

```
836 032C
837                        * * * * * * * WHEN COUNTER NOT 0
838 032C                   HOP414:
839 032C
840                        * * * * * * * * DISABLE TONE
841 032C 3E 00        E          LD      A,.LOW.TONE
842 032E 32 00 00     E          LD      (APRTBS),A
843 0331
844                        * * * * * * * END CASE
845                        * * * * * * END IF
846 0331                   HOP416:
847 0331
848                        * * * * * END UNTIL
849 0331 3A 00 00     E          LD      A,(EOMFLG)
850 0334 B7                       OR      A
851 0335 C2 F2 03     C          JP      NZ,HOP470
852 0338 3A 00 00     E          LD      A,(TIMRXD)
853 033B FE 06                    CP      6
854 033D 28 02 0341              JR      Z,HOP420
855 033F 18 D6 0317              JR      HOP410
856 0341
857                        * * * * * IF TIME TRANSFERRED
858 0341                   HOP420:
859 0341
860                        * * * * * THEN
861                        * * * * * * DISABLE TONE
862 0341 3E 00        E          LD      A,.LOW.TONE
863 0343 32 00 00     E          LD      (APRTBS),A
864 0346
865                        * * * * * * DISABLE INTERRUPTS
866 0346 F3                       DI
867                        * * * * * * RECONSTRUCT 1ST TIME BYTE
868 0347 21 00 00     E          LD      HL,TIME1
869 034A CD 00 00     E          CALL    TALLY
870 034D 32 00 00     E          LD      (RXTIME),A
871 0350
872                        * * * * * * RECONSTRUCT 2ND TIME BYTE
873 0350 21 00 00     E          LD      HL,TIME2
874 0353 CD 00 00     E          CALL    TALLY
875 0356 32 01 00     E          LD      (RXTIME+1),A
876 0359
877                        * * * * * * RECONSTRUCT 3RD TIME BYTE
878 0359 21 00 00     E          LD      HL,TIME3
879 035C CD 00 00     E          CALL    TALLY
880 035F 32 02 00     E          LD      (RXTIME+2),A
881 0362
882                        * * * * * * RECONSTRUCT 4TH TIME BYTE
883 0362 21 00 00     E          LD      HL,TIME4
884 0365 CD 00 00     E          CALL    TALLY
885 0368 32 03 00     E          LD      (RXTIME+3),A
886 036B
887                        * * * * * * CALCULATE PAGE FRAME POSITION COUNTERS
888 036B 21 00 00     E          LD      HL,RXTIME
889 036E CD 00 00     E          CALL    PAGECT
890 0371 32 00 00     E          LD      (PAGERX),A
891 0374 21 00 00     E          LD      HL,REPAGR
892 0377 72                       LD      (HL),D
893 0378
894                        * * * * * * INCREMENT FRAME TIME TWICE
895 0378 21 00 00     E          LD      HL,RXTIME
896 037B 3A 00 00     E          LD      A,(REPAGR)
```

```
897 037E 47                         LD      B,A
898 037F 3A 00 00        E          LD      A,(PAGERX)
899 0382 CD 00 00        E          CALL    INCTIM
900 0385 CD 00 00        E          CALL    INCTIM
901 0388 32 00 00        E          LD      (PAGERX),A
902 038B 78                         LD      A,B
903 038C 32 00 00        E          LD      (REPAGR),A
904 038F
905                                 * * * * * * ENABLE RCV FRAME MARK INTERRUPT & RXRDY
906 038F 3E 09                      LD      A,09H                   ;RXRDY & RCVFRM
907 0391 D3 BB                      OUT     (0BBH),A
908 0393 FB                         EI
909 0394
910                                 * * * * * * ZERO TIME BIT BUFFER
911 0394 AF                         XOR     A
912 0395 21 00 00        E          LD      HL,TIME1
913 0398 06 08                      LD      B,8
914 039A                   HOP423:
915 039A 77                         LD      (HL),A
916 039B 23                         INC     HL
917 039C 10 FC 039A                 DJNZ    HOP423
918 039E
919                                 * * * * * * DO UNTIL COMMAND WORD RCV'D OR EOM
920 039E                   HOP425:
921 039E
922                                 * * * * * * END UNTIL
923 039E 3A 00 00        E          LD      A,(EOMFLG)
924 03A1 B7                         OR      A
925 03A2 20 4E 03F2                 JR      NZ,HOP470
926 03A4 3A 00 00        E          LD      A,(VALSOM)
927 03A7 B7                         OR      A
928 03A8 20 02 03AC                 JR      NZ,HOP430
929 03AA 18 F2 039E                 JR      HOP425
930 03AC
931                                 * * * * * * IF COMMAND WORD RCV'D
932 03AC                   HOP430:
933 03AC
934                                 * * * * * * THEN
935                                 * * * * * * * RECONSTRUCT COMMAND WORD
936 03AC 21 00 00        E          LD      HL,TIME1
937 03AF CD 00 00        E          CALL    TALLY
938 03B2 32 00 00        E          LD      (RXCMDW),A
939 03B5
940                                 * * * * * * * IF DATA
941 03B5 E6 F0                      AND     0F0H
942 03B7 EE 00           E          XOR     .LOW.CWDATA
943 03B9 3E 08                      LD      A,08H
944 03BB 20 05 03C2                 JR      NZ,HOP435
945 03BD
946                                 * * * * * * * THEN
947                                 * * * * * * * * SET HW FOR DATA
948 03BD 32 00 00        E          LD      (BPRTCC),A
949 03C0 18 03 03C5                 JR      HOP438
950 03C2
951                                 * * * * * * * ELSE
952 03C2                   HOP435:
953 03C2
954                                 * * * * * * * * SET HARDWARE FOR VOICE
955 03C2 32 00 00        E          LD      (BPRTCS),A
```

```
956 03C5
957                 * * * * * * END IF
958 03C5            HOP438:
959 03C5
960                 * * * * * DO UNTIL EOM
961 03C5            HOP440:
962 03C5
963                 * * * * * * CHECK RECEIVE FAULTS
964 03C5 CD 00 00    E       CALL    RXFLTS
965 03C8
966                 * * * * * * IF FAULT
967 03C8 B7                   OR      A
968 03C9 28 08 03D3           JR      Z,HOP450
969 03CB
970                 * * * * * * THEN
971                 * * * * * * DISPLAY FAULT
972 03CB 3A 00 00    E       LD      A,(REPAGR)
973 03CE CD 00 00    E       CALL    DSPFLT
974 03D1 18 03 03D6          JR      HOP460
975 03D3
976                 * * * * * * ELSE
977 03D3            HOP450:
978 03D3
979                 * * * * * * * DISPLAY TIME
980 03D3 CD 00 00    E       CALL    CHKTIM
981 03D6
982                 * * * * * * END IF
983 03D6
984                 * * * * * END UNTIL
985 03D6            HOP460:
986 03D6 3A 00 00    E       LD      A,(EOMFLG)
987 03D9 B7                   OR      A
988 03DA 28 E9 03C5          JR      Z,HOP440
989 03DC
990                 * * * * * IF DAY IS SET TO '0'
991 03DC 3A 02 00    E       LD      A,(TIMEDT+2)
992 03DF B7                   OR      A
993 03E0 20 10 03F2          JR      NZ,HOP470
994 03E2
995                 * * * * * * THEN
996                 * * * * * * UPDATE FRAME TIME & RTC
997 03E2 CD 00 00    E       CALL    FTRTC
998 03E5
999                 * * * * * * DISPLAY NEW TIME
1000 03E5 3E 01               LD      A,1
1001 03E7 32 02 00   E       LD      (TIMEDT+2),A       ;GET RID OF '0' IN DAY REG
1002 03EA 1E 03               LD      E,3
1003 03EC CD 00 00   E       CALL    RDTIME
1004 03EF CD 00 00   E       CALL    DISPLY
1005 03F2
1006                * * * * * END IF
1007 03F2           HOP470:
1008 03F2
1009                * * * * END IF
1010 03F2
1011                * * * * CLEAR EOM FLAG
1012 03F2 AF                 XOR     A
1013 03F3 32 00 00   E       LD      (EOMFLG),A
1014 03F6 C3 10 03   C       JP      HOP400
```

```
1015 03F9
1016                        * * * * WHEN TRANSMIT
1017 03F9                   HOP500:
1018 03F9 3A 00 00    E            LD      A,(PTTI)
1019 03FC CB 47                    BIT     0,A
1020 03FE 28 20 0420               JR      Z,HOP550
1021 0400
1022                        * * * * * DISABLE TONE
1023 0400 3E 00       E            LD      A,.LOW.TONE
1024 0402 32 00 00    E            LD      (APRTBS),A
1025 0405
1026                        * * * * * DO UNTIL NO PTTI
1027 0405                   HOP510:
1028 0405
1029                        * * * * * * CHECK TRANSMIT FAULTS
1030 0405 CD 00 00    E            CALL    TXFLTS
1031 0408
1032                        * * * * * * IF FAULT
1033 0408 B7                       OR      A
1034 0409 28 08 0413               JR      Z,HOP520
1035 040B
1036                        * * * * * * THEN
1037                        * * * * * * * DISPLAY FAULT
1038 040B 3A 00 00    E            LD      A,(REPAGT)
1039 040E CD 00 00    E            CALL    DSPFLT
1040 0411 18 03 0416               JR      HOP530
1041 0413
1042                        * * * * * * ELSE
1043 0413                   HOP520:
1044 0413
1045                        * * * * * * * DISPLAY TIME
1046 0413 CD 00 00    E            CALL    CHKTIM
1047 0416
1048                        * * * * * * END IF
1049 0416                   HOP530:
1050 0416
1051                        * * * * * END UNTIL
1052 0416 3A 00 00    E            LD      A,(PTTI)
1053 0419 CB 47                    BIT     0,A
1054 041B 20 E8 0405               JR      NZ,HOP510
1055 041D C3 10 03    C            JP      HOP400
1056 0420
1057                        * * * * ELSE SYNC SEARCH (DEFAULT)
1058 0420                   HOP550:
1059 0420
1060                        * * * * * INIT SYNC SEARCH SUBMODE
1061 0420 CD 00 00    E            CALL    SSINIT
1062 0423
1063                        * * * * * DO WHILE IN SYNC SEARCH
1064 0423                   HOP560:
1065 0423 3A 00 00    E            LD      A,(RCVFLG)
1066 0426 B7                       OR      A
1067 0427 C2 10 03    C            JP      NZ,HOP400
1068 042A 3A 00 00    E            LD      A,(PTTI)
1069 042D CB 47                    BIT     0,A
1070 042F C2 10 03    C            JP      NZ,HOP400
1071 0432
1072                        * * * * * CHECK RECEIVE FAULTS
1073 0432 CD 00 00    E            CALL    RXFLTS
```

```
1074 0435
1075                        * * * * * * IF FAULT
1076 0435 B7                       OR      A
1077 0436 28 08 0440               JR      Z,HOP565
1078 0438
1079                        * * * * * * THEN
1080                        * * * * * * DISPLAY FAULT
1081 0438 3A 00 00   E             LD      A,(REPAGT)
1082 043B CD 00 00   E             CALL    DSPFLT
1083 043E 18 1D 045D               JR      HOP590
1084 0440
1085                        * * * * * * ELSE
1086 0440                  HOP565:
1087 0440
1088                        * * * * * * DISPLAY TIME
1089 0440 CD 00 00   E             CALL    CHKTIM
1090 0443
1091                        * * * * * * SKIP CODE FOR TIME TONE  (CODE LEFT IN SOFTWARE IN CASE THE
1092                        ;                                     TONE IS DESIRED IN THE FUTURE)
1093 0443 18 18 045D               JR      HOP580
1094 0445
1095                        * * * * * * IMPLEMENT TIME TONE
1096                        * * * * * * IF NOT DAY = 0
1097 0445 3A 02 00   E             LD      A,(TIMEDT+2)
1098 0448 B7                       OR      A
1099 0449 28 12 045D               JR      Z,HOP580
1100 044B
1101                        * * * * * * THEN
1102                        * * * * * * * CASE OF TX RESYNC PAGE COUNTER
1103 044B 3A 00 00   E             LD      A,(REPAGT)
1104 044E
1105                        * * * * * * * WHEN COUNTER = 0
1106 044E B7                       OR      A
1107 044F 20 07 0458               JR      NZ,HOP570
1108 0451
1109                        * * * * * * * * ENABLE TONE
1110 0451 3E 00       E             LD      A,.LOW.TONE
1111 0453 32 00 00    E             LD      (APRTBC),A
1112 0456 18 05 045D                JR      HOP580
1113 0458
1114                        * * * * * * * * WHEN COUNTER NOT 0
1115 0458                  HOP570:
1116 0458
1117                        * * * * * * * * DISABLE TONE
1118 0458 3E 00       E             LD      A,.LOW.TONE
1119 045A 32 00 00    E             LD      (APRTBS),A
1120 045D
1121                        * * * * * * * END CASE
1122                        * * * * * * END IF
1123 045D                  HOP580:
1124 045D
1125                        * * * * * * END IF
1126 045D                  HOP590:
1127 045D
1128                        * * * * * END WHILE
1129 045D 18 C4 0423               JR      HOP560
1130 045F
1131                        * * * * END CASE
1132 045F
```

```
1133                        * * * END WHILE
1134 045F                   HOP600:
1135 045F C3 10 03    C              JP        HOP400
1136 0462
1137                        * * END CASE
1138 0462
1139                        * * * * END IF
1140 0462
1141                        * END PROCEDURE
1142 0462                             END

ERRORS = 0000

APRTBC E 0002    APRTBS E 0003    APRTCC E 000F    BDMBIN E 003C
BINFRQ E 003D    BITRCK E 002F    BITSNC E 0032    BND1LO E 002D
BNDBTS E 003E    BPRTCC E 004E    BPRTCS E 004F    CHKINC E 005A
CHKTIM E 0043    CPRTAC E 0023    CPRTAS E 0001    CPRTCC E 0014
CPRTCS E 0013    CSTAT  E 0058    CWDATA E 004D    DATABF E 0017
DISPLY E 002C    DSPFLT E 005E    DSPLPG E 000E    EOMFLG E 000C
ERRCOR E 0024    ERRTBL E 0025    FETPLN E 0063    FILL   E 0029
FILLID E 0055    FILLT  E 0056    FLTFLG E 0035    FRMTIM E 0006
FTRTC  E 0011    HOP    C 0000    HOP00  C 0029    HOP01  C 0035
HOP04  C 005B    HOP06  C 0061    HOP07  C 0070    HOP10  C 0097
HOP100 C 0295    HOP11  C 009E    HOP110 C 02A3    HOP12  C 00AD
HOP120 C 02B0    HOP130 C 02B0    HOP140 C 02D3    HOP15  C 00B0
HOP150 C 02D6    HOP160 C 02D6    HOP17  C 00CB    HOP18  C 00D5
HOP19  C 00EE    HOP19B C 00F0    HOP20  C 0194    HOP200 C 02DD
HOP210 C 02E0    HOP220 C 02FD    HOP230 C 030A    HOP240 C 030A
HOP250 C 030A    HOP300 C 030D    HOP40  C 01B2    HOP400 C 0310
HOP410 C 0317    HOP414 C 032C    HOP416 C 0331    HOP420 C 0341
HOP423 C 039A    HOP425 C 039E    HOP430 C 03AC    HOP435 C 03C2
HOP438 C 03C5    HOP440 C 03C5    HOP45  C 01BE    HOP450 C 03D3
HOP460 C 03D6    HOP470 C 03F2    HOP50  C 01C7    HOP500 C 03F9
HOP510 C 0405    HOP520 C 0413    HOP530 C 0416    HOP550 C 0420
HOP560 C 0423    HOP565 C 0440    HOP570 C 0458    HOP580 C 045D
HOP590 C 045D    HOP60  C 01CE    HOP600 C 045F    HOP70  C 01DE
HOP72  C 0204    HOP73  C 0213    HOP74  C 0242    HOP76  C 025B
HOP80  C 026E    HOP85  C 027C    HOP90  C 0292    HOP95  C 0295
HOPMSK E 0030    HYSTRI E 003F    INCADD E 0059    INCEND E 0062
INCT   E 0057    INCTBL E 005B    INCTIM E 0047    INPTR  E 0018
LKDATA E 0028    MEMORY M 0000    MINBND E 0009    MISSOM E 005F
NCSTCT E 001C    NCSTRU E 0034    NONNCS E 0051    ONEFRQ E 0022
OUTPTR E 0019    PAGECT E 0008    PAGEFL E 003A    PAGERX E 0016
PAGETX E 0015    PAGFRQ E 0020    PGDSPT E 0040    PNKEY  E 0026
PRFREQ E 003B    PRNTID E 0027    PTTI   E 0004    RCVFLG E 0005
RDTIME E 0048    REPAGR E 0037    REPAGT E 0038    RESFLG E 0060
RESTOR E 002B    RESYNC E 0036    RETX   E 0054    RSTINT E 004A
RXCLKS E 0010    RXCMDW E 004C    RXFLTS E 005C    RXTIME E 000D
SAMPLE E 0061    SNCHAR E 0021    SQLDIS E 0052    SRCHST E 0033
SS1ST  E 0000    SSINIT E 0042    SSPAGE E 0039    STACK  S 0000
SYSSTS E 001B    TALLY  E 001A    TBLBLD E 002A    TIM1ST E 0049
TIME1  E 001D    TIME2  E 001E    TIME3  E 0045    TIME4  E 0046
TIMEDT E 0044    TIMRXD E 000B    TONE   E 002E    TRLINE E 0031
TXCMDW E 0050    TXFLTS E 005D    TXFRST E 0041    TXTIME E 0007
TXTRCK E 0053    USART  E 0012    UTDATA E 001F    VALSOM E 004B
WKEQMO E 000A
```

```
*************************************************************************
*                                                                       *
* NAME: INTERNAL FRAME MARK  (INTFRM)          PPS REF:                 *
*                                                                       *
* FILE NAME: INTFRM.SRC                                                 *
*                                                                       *
* FUNCTION: RSTB INTERRUPT SERVICE ROUTINE. INCREMENTS FRAME TIME AND   *
*           PAGE COUNTER. CALCULATES AND OUTPUTS HOPPING FREQUENCY WHEN *
*           IN TRANSMIT OR SYNC SEARCH. OVERSEES OUTPUT OF RESYNC DATA  *
*           WHEN IN TRANSMIT. CHECKS FOR PAGE DETECT WHILE IN SYNC SEARCH.*
*                                                                       *
* METHOD:                                                               *
*                                                                       *
* INPUT PARAMETERS:                                                     *
*                                                                       *
* NAME    DESCRIPTION            TYPE        LENGTH      RANGE          *
* DE'     CURRENT FRAME CHANNEL              2 BYTES                    *
*                                                                       *
* OUTPUT PARAMETERS:                                                    *
*                                                                       *
* NAME    DESCRIPTION            TYPE        LENGTH      RANGE          *
* DE'     NEXT FRAME CHANNEL                 2 BYTES                    *
*                                                                       *
* DATA ACCESSED OR ALTERED EXTERNAL TO MODULE:                          *
*                                                                       *
* NAME     DESCRIPTION          TYPE    LENGTH    RANGE    DIRECTION*
* TXTIME   TX FRAME TIME                4 BYTES            BOTH     *
* PAGETX   TX PAGE COUNTER              1 BYTE             BOTH     *
* SEARCH   SYNC SEARCH FREQUENCY        2 BYTES            BOTH     *
* PAGDET   TEMP PAGE DETECT BUFFER      1 BYTE             OUTPUT   *
* PTTI     PTT INTERNAL FLAG & FREQ CHNG FLA 1 BYTE        BOTH     *
* TIMRXD   RCV'D TIME BYTES COUNTER     1 BYTE             INPUT    *
* REPAGT   TRANSMIT RESYNC PAGE COUNTER 1 BYTE             BOTH     *
* SYNCTR   SYNC FRAME COUNTER           1 BYTE             BOTH     *
* TMCALC   CALCULATE SYNC TIME FLAG     1 BYTE             OUTPUT   *
* SNCTIM   SYNC TIME BUFFER             2 BYTES            BOTH     *
* BOUND1   MOST RECENT BOUNDARY FREQ    2 BYTES            BOTH     *
* BOUND2   2ND BOUNDARY FREQ            2 BYTES            BOTH     *
* BOUND3   EARLIEST BOUNDARY FREQ       2 BYTES            BOTH     *
* TXFLGS   TRANSMIT MODE FLAGS          1 BYTE             INPUT    *
* LEGAL    RESYNC LEGAL FLAG            1 BYTE             BOTH     *
* OUTPTR   DATA BUFFER OUTPUT POINTER   2 BYTES            OUTPUT   *
* TXSOMC   TRANSMIT SOM BYTE COUNTER    1 BYTE             OUTPUT   *
* SNCBYT   SYNC BYTE COUNTER            1 BYTE             OUTPUT   *
* RCVFLG   RECEIVE FLAG                 1 BYTE             INPUT    *
* SS1ST    SYNC SEARCH 1ST FLAG         1 BYTE             INPUT    *
* SSPAGE   SYNC SEARCH PAGE COUNTER     1 BYTE             BOTH     *
* RESYNC   RESYNC FLAG                  1 BYTE             OUTPUT   *
* INPTR    DATA BUFFER INPUT POINTER    2 BYTES            OUTPUT   *
* EXITFL   EXIT RECEIVE FLAG            1 BYTE             OUTPUT   *
* RXFLGS   RECEIVE MODE FLAGS           1 BYTE             OUTPUT   *
* SOMCTR   SOM RCV COUNTER              1 BYTE             OUTPUT   *
* RXBYTS   RCV BYTE COUNTER             1 BYTE             OUTPUT   *
* BCTR20   20 BYTE COUNTER              1 BYTE             OUTPUT   *
* EOMCTR   EOM RCV COUNTER              1 BYTE             OUTPUT   *
* FALSE    FALSE SYNC FRAME CTR         1 BYTE             OUTPUT   *
* CHARLM   CHARACTER LIMIT COUNTER      1 BYTE             OUTPUT   *
* PAGFRQ   PAGE FREQ BUFFER             2 BYTES            INPUT    *
```

```
59            * TIME1   BIT VOTE BUFFERS                  16 BYTES      OUTPUT  *
60            * DATABF  START ADDRESS OF DATA BUFFER       2 BYTES      INPUT   *
61            * FRQCAL  FREQUENCY CALCULATED FLAG          1 BYTE       BOTH    *
62            * TXFRST  TX FIRST INTFRM FLAG               1 BYTE       BOTH    *
63            * BSTORE  BIT SYNC VALUE STORAGE             1 BYTE       BOTH    *
64            * FRAMES  FULL FRAME COUNT                   4 BYTES      OUTPUT  *
65            * RXSOMC  RX SOM COUNTER                     1 BYTE       OUTPUT  *
66            * VALSOM  VALID SOM RCV'D FLAG               1 BYTE       OUTPUT  *
67            * NCSTCT  NCS TONE COUNTER                   1 BYTE       BOTH    *
68            *                                                                 *
69            * RESTRICTIONS:  USES ALTERNATE REGISTER BANK                     *
70            *                                                                 *
71            * SUPPORTING MODULES: PNGEN - PSUEDO-RANDOMLY FETCHES FREQUENCY FROM TABLE *
72            *                    INCTIM - INCREMENTS FRAME TIME AND PAGE COUNTER      *
73            *                    MINBND - CALCULATES 10 SEC BOUNDARIES                *
74            *                    WKEQMO - SETS RTC DAY OF MONTH = RTC DAY OF WEEK     *
75            *                    ERRCOR - ENCODES 2 LSB'S OF TIME WITH ERROR CORRECTION *
76            *                    CHKPAG - CHECKS STATUS OF PAGE AND UPDATES IF NECESSARY *
77            *                                                                 *
78            * COPYRIGHT 1982 ROCKWELL INTERNATIONAL                           *
79            * COLLINS TELECOMMUNICATIONS PRODUCTS DIVISION                    *
80            *                                                                 *
81            * AUTHOR: C. A. BONEBRIGHT              DATE: 5-7-82              *
82            *                                                                 *
83            * VERSION: 1.0                                                    *
84            *                                                                 *
85            * REVISION:                             DATE:                     *
86            *                                                                 *
87            *****************************************************************
88                          CSEG
89 0000
90 0000                      TITLE   'INTFRM
91                           NAME    INTFRM
92                           PUBLIC  INTFRM
93                           EXTRN   BPRTC,PAGDET,PTTI,BPRTBC,BPRTA,TXTIME
94                           EXTRN   PAGETX,SYNCTR,PNGEN,USART,BOUND2,BOUND3,BOUND1,NXTFRQ
95                           EXTRN   RCVFLG,SS1ST,MINBND,SEARCH,DATABF,INPTR,OUTPTR,TIMRXD
96                           EXTRN   BCTR20,RXFLGS,CPRTCS,CPRTCC,DAYOMO,WKEQMO,INCTIM,APRTBS
97                           EXTRN   PAGFRQ,RXBYTS,EOMCTR,SOMCTR,FALSE,CPRTAC,CPRTAS,APRTBC
98                           EXTRN   SNCTIM,TIME1,CHARLM,TXFLGS,ERRCOR,SYSSTS,SSPAGE,SNCHAR
99                           EXTRN   RXSTRB,RSTINT,SRCHST,EXITFL,SNCBYT,VALSOM,RXSOMC,RMTDOT
100                          EXTRN   REPAGT,TMCALC,SOMBYT,BITSNC,UTDATA,TXSOMC,RESYNC,LEGAL
101                          EXTRN   FRQCAL,CHKPAG,TXFRST,BSYNC,BSTORE,CPRTA,FRAMES
102                          EXTRN   NCSTCT,TONE
103 0000
104           * PROCEDURE INTFRM
105 0000      INTFRM:
106 0000
107           * * SAVE ACCUMULATOR AND STATUS
108 0000 08              EX      AF,AF'
109 0001
110           * * READ AND STORE PAGE DETECT
111 0001 3A 00 00   E    LD      A,(BPRTC)
112 0004 32 00 00   E    LD      (PAGDET),A
113 0007
114           * * SAVE REGISTERS
115 0007 D9              EXX
116 0008
```

```
117                            * * IF TX OR SYNC SEARCH FREQ    CHANGE
118 0008 3A 00 00    E            LD      A,(PTTI)
119 000B B7                       OR      A
120 000C 28 33 0041               JR      Z,IN10
121 000E
122                            * * THEN
123 000E
124                            * * * RESET SYNC SEARCH FREQ. CHANGE FLAG
125 000E 21 00 00    E            LD      HL,PTTI
126 0011 CB 96                    RES     2,(HL)
127 0013
128                            * * * IF TX FIRST FLAG IS SET
129 0013 3A 00 00    E            LD      A,(TXFRST)
130 0016 B7                       OR      A
131 0017 28 02 001B               JR      Z,IN2
132 0019
133                            * * * THEN
134                            * * * * SET THE PAGE FLAG
135 0019 CB F2                    SET     6,D
136 001B
137                            * * * END IF
138 001B                       IN2:
139 001B
140                            * * * OUTPUT FREQ. TO SYNTH
141 001B ED 53 00 00  E            LD      (BPRTA),DE
142 001F
143                            * * * IF PAGE FRAME & NOT IN TRANSMIT
144 001F CB 72                    BIT     6,D
145 0021 28 19 003C               JR      Z,IN5
146 0023 CB 46                    BIT     0,(HL)           ;ADDRESS FOR PTTI IN HL
147 0025 20 15 003C               JR      NZ,IN5
148 0027
149                            * * * THEN
150                            * * * * RESET USART
151 0027 3A 00 00    E            LD      A,(UTDATA)
152 002A 3E 10                    LD      A,10H
153 002C 32 00 00    E            LD      (USART),A
154 002F 3E 84                    LD      A,84H
155 0031 32 00 00    E            LD      (USART),A
156 0034
157                            * * * * RESET SYNC CIRCUITRY
158 0034 3E 00       E            LD      A,.LOW.SRCHST
159 0036 32 00 00    E            LD      (CPRTCS),A
160 0039 32 00 00    E            LD      (CPRTCC),A
161 003C
162                            * * * END IF
163 003C                       IN5:
164 003C
165                            * * REMOVE FREQ. LATCH BIT
166 003C 3E 00       E            LD      A,.LOW.RXSTRB
167 003E 32 00 00    E            LD      (BPRTBC),A
168 0041
169                            * * END IF
170 0041                       IN10:
171 0041
172                            * * RESET INTERRUPT FLIP FLOP
173 0041 3E 00       E            LD      A,.LOW.RSTINT
174 0043 32 00 00    E            LD      (CPRTCS),A
```

```
175 0046 32 00 00    E           LD      (CPRTCC),A
176 0049
177                        * * IF NOT IN RCV MODE WITH TIME RCV'D
178 0049 3A 00 00    E           LD      A,(TIMRXD)
179 004C FE 06                    CP      6
180 004E 28 15 0065               JR      Z,IN50
181 0050
182                        * * THEN
183                        * * * INCREMENT TX FRAME TIME AND PAGE COUNTER
184 0050 21 00 00    E           LD      HL,TXTIME
185 0053 3A 00 00    E           LD      A,(REPAGT)
186 0056 47                       LD      B,A
187 0057 3A 00 00    E           LD      A,(PAGETX)
188 005A CD 00 00    E           CALL    INCTIM
189 005D 4F                       LD      C,A              ;SAVE PAGE COUNT IN REGISTER C
190 005E 32 00 00    E           LD      (PAGETX),A
191 0061 78                       LD      A,B
192 0062 32 00 00    E           LD      (REPAGT),A
193 0065
194                        * * END IF
195 0065              IN50:
196 0065
197                        * * ENABLE INTERRUPTS
198 0065 FB                       EI
199 0066
200                        * * IF TX
201 0066 3A 00 00    E           LD      A,(PTTI)
202 0069 E6 01                    AND     1
203 006B CA 40 02    C           JP      Z,IN220
204 006E
205                        * * THEN
206                        * * * OUTPUT BAND INFO TO HPA
207 006E CB 62                    BIT     4,D
208 0070 3E 00       E           LD      A,.LOW.RMTDOT
209 0072 28 06 007A              JR      Z,IN55
210 0074 32 00 00    E           LD      (APRTBS),A
211 0077 C3 7D 00    C           JP      IN57
212 007A              IN55:
213 007A 32 00 00    E           LD      (APRTBC),A
214 007D              IN57:
215 007D
216                        * * * IF 10 SECOND BOUNDARY
217 007D 3A 00 00    E           LD      A,(TXTIME)
218 0080 B7                       OR      A
219 0081 20 29 00AC              JR      NZ,IN60
220 0083 3A 01 00    E           LD      A,(TXTIME+1)
221 0086 E6 03                    AND     03H
222 0088 20 22 00AC              JR      NZ,IN60
223 008A
224                        * * * THEN
225                        * * * * REDEFINE BOUNDARIES
226 008A 2A 00 00    E           LD      HL,(BOUND2)
227 008D 22 00 00    E           LD      (BOUND3),HL
228 0090 2A 00 00    E           LD      HL,(BOUND1)
229 0093 22 00 00    E           LD      (BOUND2),HL
230 0096 2A 00 00    E           LD      HL,(TXTIME)
231 0099 ED 5B 02 00 E           LD      DE,(TXTIME+2)
232 009D CD 00 00    E           CALL    PNGEN
```

```
233 00A0 ED 53 00 00   E              LD      (BOUND1),DE
234 00A4
235                               * * * SET FREQUENCY CALCULATED FLAG
236 00A4 3E FF                       LD      A,0FFH
237 00A6 32 00 00    E               LD      (FRQCAL),A
238 00A9
239                               * * * ELSE
240 00A9 C3 B0 00    C               JP      IN70
241 00AC                          IN60:
242                               * * * * CLEAR FREQUENCY CALCULATED FLAG
243 00AC AF                          XOR     A
244 00AD 32 00 00    E               LD      (FRQCAL),A
245 00B0
246                               * * * END IF
247 00B0                          IN70:
248 00B0
249                               * * * IF SYNC FRAMES SENT
250 00B0 3A 00 00    E               LD      A,(SYNCTR)
251 00B3 B7                          OR      A
252 00B4 C2 D1 01    C               JP      NZ,IN110
253 00B7
254                               * * * THEN
255                               * * * * IF TIME CALCULATION FLAG IS SET
256 00B7 3A 00 00    E               LD      A,(TMCALC)
257 00BA B7                          OR      A
258 00BB 28 29 00E6                  JR      Z,IN80
259 00BD
260                               * * * * THEN
261                               * * * * * IF TXFLGS = 3
262 00BD 3A 00 00    E               LD      A,(TXFLGS)
263 00C0 FE 03                       CP      3
264 00C2 20 15 00D9                  JR      NZ,IN75
265 00C4
266                               * * * * * THEN
267                               * * * * * * LOAD TXTIME INTO FRAMES (FOR TIME MODE)
268 00C4 2A 00 00    E               LD      HL,(TXTIME)
269 00C7 22 00 00    E               LD      (FRAMES),HL
270 00CA 2A 02 00    E               LD      HL,(TXTIME+2)
271 00CD 22 02 00    E               LD      (FRAMES+2),HL
272 00D0
273                               * * * * * * LOAD LSB OF TIME INTO USART
274 00D0 3A 00 00    E               LD      A,(FRAMES)
275 00D3 32 00 00    E               LD      (UTDATA),A
276 00D6
277                               * * * * * ELSE
278 00D6 C3 E2 00    C               JP      IN77
279 00D9                          IN75:
280                               * * * * * * READ FRAME TIME CALCULATE ERROR CORRECTION BITS, AND STORE
281 00D9 2A 00 00    E               LD      HL,(TXTIME)
282 00DC CD 00 00    E               CALL    ERRCOR
283 00DF 22 00 00    E               LD      (SNCTIM),HL
284 00E2
285                               * * * * * END IF
286 00E2                          IN77:
287 00E2
288                               * * * * CLEAR FLAG
289 00E2 AF                          XOR     A
290 00E3 32 00 00    E               LD      (TMCALC),A
```

```
291 00E6
292                            * * * * END IF
293 00E6                       IN80:
294 00E6
295                            * * * * IF PAGE FRAME
296 00E6 3A 00 00    E          LD    A,(PAGETX)
297 00E9 4F                     LD    C,A
298 00EA FE 18                  CP    24
299 00EC C2 58 01    C          JP    NZ,IN850
300 00EF
301                            * * * * THEN
302                            * * * * * IF DATA MODE
303 00EF 3A 00 00    E          LD    A,(TXFLGS)
304 00F2 FE 28                  CP    28H
305 00F4 C2 3A 01    C          JP    NZ,IN840
306 00F7
307                            * * * * * THEN
308                            * * * * * * SET LEGAL FLAG
309 00F7 3E FF                  LD    A,0FFH
310 00F9 32 00 00    E          LD    (LEGAL),A
311 00FC
312                            * * * * * * IF RESYNC PAGE COUNT = 3
313 00FC 3A 00 00    E          LD    A,(REPAGT)
314 00FF FE 03                  CP    3
315 0101 C2 18 01    C          JP    NZ,IN800
316 0104
317                            * * * * * * THEN
318                            * * * * * * * IF FREQUENCY NOT ALREADY CALCULATED
319 0104 3A 00 00    E          LD    A,(FRQCAL)
320 0107 B7                     OR    A
321 0108 C2 A7 03    C          JP    NZ,IN300
322 010B
323                            * * * * * * * THEN
324                            * * * * * * * * CALCULATE FREQ AS USUAL
325 010B ED 5B 02 00 E          LD    DE,(TXTIME+2)
326 010F 2A 00 00    E          LD    HL,(TXTIME)
327 0112 CD 00 00    E          CALL  PNGEN
328 0115 C3 A7 03    C          JP    IN300
329 0118
330                            * * * * * * * END IF
331 0118
332                            * * * * * * ELSE
333 0118                       IN800:
334 0118
335                            * * * * * * * SET TIME CALCULATION FLAG
336 0118 06 FF                  LD    B,0FFH
337 011A 21 00 00    E          LD    HL,TMCALC
338 011D 70                     LD    (HL),B
339 011E
340                            * * * * * * * CASE OF RESYNC PAGE COUNT
341                            * * * * * * * WHEN COUNT = 0
342 011E B7                     OR    A
343 011F 20 07 0128             JR    NZ,IN810
344 0121
345                            * * * * * * * * FREQ = 3RD BOUNDARY
346 0121 ED 5B 00 00 E          LD    DE,(BOUND3)
347 0125 C3 A7 03    C          JP    IN300
348 0128
```

```
349                           * * * * * * * WHEN COUNT = 1
350 0128 FE 01        IN810:  CP      1
351 012A 20 07 0133           JR      NZ,IN820
352 012C
353                           * * * * * * * FREQ = 2ND BOUNDARY
354 012C ED 5B 00 00  E       LD      DE,(BOUND2)
355 0130 C3 A7 03     C       JP      IN300
356 0133
357                           * * * * * * * ELSE (COUNT = 2)
358 0133              IN820:
359 0133
360                           * * * * * * * FREQ = 1ST BOUNDARY
361 0133 ED 5B 00 00  E       LD      DE,(BOUND1)
362 0137
363                           * * * * * * END CASE
364 0137              IN830:
365 0137
366                           * * * * * END IF
367 0137              IN835:
368 0137 C3 A7 03     C       JP      IN300
369 013A
370                           * * * * ELSE
371 013A              IN840:
372                           * * * * * IF KEY DROPPED OR EOM MODE
373 013A CB 77                BIT     6,A             ;EOM MODE FLAG
374 013C 20 05 0143           JR      NZ,IN845
375 013E CB 7F                BIT     7,A             ;KEY DROPPED FLAG
376 0140 CA BD 01     C       JP      Z,IN910
377 0143
378                           * * * * * THEN
379                           * * * * * * IF FREQUENCY NOT ALREADY CALCULATED
380 0143              IN845:
381 0143 3A 00 00     E       LD      A,(FRQCAL)
382 0146 B7                   OR      A
383 0147 20 0A 0153           JR      NZ,IN848
384 0149
385                           * * * * * * THEN
386                           * * * * * * * CALCULATE FREQ AS USUAL
387 0149 ED 5B 02 00  E       LD      DE,(TXTIME+2)
388 014D 2A 00 00     E       LD      HL,(TXTIME)
389 0150 CD 00 00     E       CALL    PNGEN
390 0153
391                           * * * * * * END IF
392 0153              IN848:
393 0153
394                           * * * * * * SET PAGE BIT (TO INHIBIT TRANSMISSION OF ANY DATA)
395 0153 CB F2                SET     6,D             ;SET PAGE BIT
396 0155
397                           * * * * * END IF
398 0155
399                           * * * * END IF
400 0155 C3 A7 03     C       JP      IN300
401 0158
402                           * * * ELSE
403 0158              IN850:
404 0158
405                           * * * * IF FRAME AFTER PAGE (PAGE CT = 0) AND LEGAL RESYNC
406 0158 B7                   OR      A
```

```
407 0159 20 3D 0198              JR      NZ,IN890
408 015B 3A 00 00      E         LD      A,(LEGAL)
409 015E B7                      OR      A
410 015F 28 37 0198              JR      Z,IN890
411 0161
412                    * * * * * THEN
413                    * * * * * * DECREMENT DATA BUFFER OUT POINTER
414 0161 2A 00 00      E         LD      HL,(OUTPTR)
415 0164 AF                      XOR     A            ;LOAD ACC W/0
416 0165 BD                      CP      L
417 0166 20 02 016A              JR      NZ,IN860
418 0168 2E 30                   LD      L,48
419 016A                  IN860:
420 016A 2B                      DEC     HL
421 016B 22 00 00      E         LD      (OUTPTR),HL
422 016E
423                    * * * * * IF RESYNC PAGE COUNT = 0
424 016E
425 016E 3A 00 00      E         LD      A,(REPAGT)
426 0171 B7                      OR      A
427 0172 20 12 0186              JR      NZ,IN870
428 0174
429                    * * * * * THEN
430                    * * * * * * WRITE SOM BYTE IN USART
431 0174 3E 00         E         LD      A,.LOW.SOMBYT
432 0176 32 00 00      E         LD      (UTDATA),A
433 0179
434                    * * * * * * SET UP TXFLGS FOR SOM
435 0179 3E 18                   LD      A,18H
436 017B 32 00 00      E         LD      (TXFLGS),A
437 017E
438                    * * * * * * INIT SOM BYTE COUNTER
439 017E 3E 13                   LD      A,19
440 0180 32 00 00      E         LD      (TXSOMC),A
441 0183
442                    * * * * * ELSE
443 0183 C3 8D 01      C         JP      IN910
444 0186                  IN870:
445 0186
446                    * * * * * * WRITE BIT SYNC BYTE INTO USART
447 0186 3E 00         E         LD      A,.LOW.BITSNC
448 0188 32 00 00      E         LD      (UTDATA),A
449 018B
450                    * * * * * * SET SYNC FRAME FLAGS FOR TXRDY
451 018B 3E 05                   LD      A,5
452 018D 32 00 00      E         LD      (TXFLGS),A
453 0190
454                    * * * * * * INIT BYTE COUNTER
455 0190 3E 13                   LD      A,19
456 0192 32 00 00      E         LD      (SNCBYT),A
457 0195
458                    * * * * * END IF
459 0195                  IN890:
460 0195 C3 8D 01      C         JP      IN910
461 0198
462                    * * * * ELSE
463 0198                  IN890:
464 0198
```

```
465                         * * * * * * IF 2ND FRAME AFTER PAGE AND LEGAL RESYNC
466 0198 FE 01                         CP      1
467 019A 20 21 01BD                    JR      NZ,IN910
468 019C 3A 00 00      E               LD      A,(LEGAL)
469 019F B7                            OR      A
470 01A0 28 1B 01BD                    JR      Z,IN910
471 01A2
472                         * * * * * * THEN
473 01A2                    IN895:
474 01A2
475                         * * * * * * CLEAR LEGAL RESYNC FLAG
476 01A2 AF                            XOR     A
477 01A3 32 00 00      E               LD      (LEGAL),A
478 01A6
479                         * * * * * * PUT DATA BYTE INTO USART
480 01A6 2A 00 00      E               LD      HL,(OUTPTR)
481 01A9 7E                            LD      A,(HL)
482 01AA 32 00 00      E               LD      (UTDATA),A
483 01AD
484                         * * * * * * INC DATA OUT PTR
485 01AD 23                            INC     HL
486 01AE 3E 30                         LD      A,48
487 01B0 BD                            CP      L
488 01B1 20 02 01B5                    JR      NZ,IN900
489 01B3 2E 00                         LD      L,0
490 01B5                    IN900:
491 01B5 22 00 00      E               LD      (OUTPTR),HL
492 01B8
493                         * * * * * * SET TXFLGS BACK TO DATA MODE
494 01B8 3E 28                         LD      A,28H
495 01BA 32 00 00      E               LD      (TXFLGS),A
496 01BD
497                         * * * * * * END IF
498 01BD
499                         * * * * * END IF
500 01BD                    IN910:
501 01BD
502                         * * * * * IF FREQUENCY NOT ALREADY CALCULATED
503 01BD 3A 00 00      E               LD      A,(FRQCAL)
504 01C0 B7                            OR      A
505 01C1 C2 A7 03      C               JP      NZ,IN300
506 01C4
507                         * * * * * THEN
508                         * * * * * CALCULATE NEXT FREQ
509 01C4 ED 5B 02 00   E               LD      DE,(TXTIME+2)
510 01C8 2A 00 00      E               LD      HL,(TXTIME)
511 01CB CD 00 00      E               CALL    PNGEN
512 01CE
513                         * * * * * END IF
514 01CE
515                         * * * END IF
516 01CE
517                         * * * ELSE
518                                            ;LEAVE NEXT FREQ IN DE ALTERNATE PAIR
519 01CE C3 A7 03      C               JP      IN300
520 01D1                    IN110:
521 01D1
522                         * * * * READ FRAME TIME, CALCULATE ERROR CORRECTION BITS, AND STORE
```

```
523 01D1 57                        LD    D,A          ;SAVE SYNC FRAME COUNTER
524 01D2 2A 00 00     E            LD    HL,(TXTIME)
525 01D5 CD 00 00     E            CALL  ERRCOR
526 01D8 22 00 00     E            LD    (SNCTIM),HL
527 01DB 7A                        LD    A,D          ;RESTORE SYNC FRAME COUNTER
528 01DC
529                        * * * * CASE OF SYNC FRAME COUNT
530                        * * * * WHEN COUNT = 5
531 01DC FE 05                     CP    5
532 01DE 20 13 01F3                JR    NZ,IN120
533 01E0
534                        * * * * * ENABLE TX CLOCK IN USART
535 01E0 3E 01                     LD    A,01H
536 01E2 32 00 00     E            LD    (USART),A
537 01E5
538                        * * * * * ENABLE INTERRUPTS
539 01E5 F3                        DI
540 01E6 3E 07                     LD    A,07H
541 01E8 D3 BB                     OUT   (0BBH),A
542 01EA FB                        EI
543 01EB
544                        * * * * * FETCH MIDDLE BOUNDARY
545 01EB 7A                        LD    A,D          ;RESTORE COUNTER
546 01EC ED 5B 00 00  E            LD    DE,(BOUND2)
547 01F0 C3 39 02     C            JP    IN200
548 01F3
549                        * * * * WHEN COUNT=6 OR 3
550 01F3              IN120:
551 01F3 FE 06                     CP    6
552 01F5 28 04 01FB                JR    Z,IN130
553 01F7 FE 03                     CP    3
554 01F9 20 0E 0209                JR    NZ,IN140
555 01FB
556                        * * * * * FETCH EARLIEST BOUNDARY
557 01FB              IN130:
558 01FB ED 5B 00 00  E            LD    DE,(BOUND3)
559 01FF
560                        * * * * * CLEAR TX FIRST FLAG
561 01FF AF                        XOR   A
562 0200 32 00 00     E            LD    (TXFRST),A
563 0203 3A 00 00     E            LD    A,(SYNCTR)   ;RESTORE ACC W/ COUNTER
564 0206 C3 39 02     C            JP    IN200
565 0209
566                        * * * * WHEN COUNT=4 OR 1
567 0209              IN140:
568 0209 FE 04                     CP    4
569 020B 28 07 0214                JR    Z,IN145
570 020D FE 01                     CP    1
571 020F 20 24 0235                JR    NZ,IN160
572 0211 C3 2E 02     C            JP    IN150
573 0214
574                        * * * * * IF COUNT = 4 AND TIME MODE
575 0214              IN145:
576 0214 DD CB 00 4E              BIT   1,(IX)
577 0218 28 14 022E               JR    Z,IN150
578 021A
579                        * * * * * THEN
580                        * * * * * * WRITE LSB OF TXTIME TO USART
```

```
581 021A 57                      LD    D,A              ;SAVE COUNTER
582 021B 3A 00 00    E           LD    A,(TXTIME)
583 021E 32 00 00    E           LD    (UTDATA),A
584 0221 7A                      LD    A,D              ;RESTORE ACC W/ COUNTER
585 0222
586                  * * * * * LOAD TXTIME INTO FRAMES
587 0222 2A 00 00    E           LD    HL,(TXTIME)
588 0225 22 00 00    E           LD    (FRAMES),HL
589 0228 2A 02 00    E           LD    HL,(TXTIME+2)
590 022B 22 02 00    E           LD    (FRAMES+2),HL
591 022E
592                  * * * * END IF
593 022E             IN150:
594 022E
595                  * * * * FETCH LATEST BOUNDARY
596 022E ED 5B 00 00 E           LD    DE,(BOUND1)
597 0232 C3 39 02    C           JP    IN200
598 0235
599                  * * * ELSE COUNT=2
600 0235             IN160:
601 0235
602                  * * * * FETCH MIDDLE BOUNDARY
603 0235 ED 5B 00 00 E           LD    DE,(BOUND2)
604 0239
605                  * * * END CASE
606 0239             IN200:
607 0239
608                  * * * DECREMENT SYNC FRAME COUNT
609 0239 3D                      DEC   A
610 023A 32 00 00    E           LD    (SYNCTR),A
611 023D
612                  * * * END IF
613 023D             IN210:
614 023D
615                  * * * STORE NEXT FREQ
616                           ;LEAVE NEXT FREQUENCY IN DE ALTERNATE REG. PAIR
617 023D C3 A7 03    C           JP    IN300
618 0240
619                  * * ELSE
620 0240             IN220:
621 0240
622                  * * * IF SYNC SEARCH
623 0240 3A 00 00    E           LD    A,(RCVFLG)
624 0243 B7                      OR    A
625 0244 C2 A7 03    C           JP    NZ,IN300
626 0247
627                  * * * THEN
628                  * * * * IF SYNC SEARCH 1ST FLAG IS SET
629 0247 3A 00 00    E           LD    A,(SS1ST)
630 024A B7                      OR    A
631 024B CA E4 02    C           JP    Z,IN230
632 024E
633                  * * * * THEN
634                  * * * * * CLEAR FLAG
635 024E AF                      XOR   A
636 024F 32 00 00    E           LD    (SS1ST),A
637 0252
638                  * * * * * CLEAR RESYNC FLAG
```

```
639 0252 32 00 00        E        LD      (RESYNC),A
640 0255
641                               * * * * * SET PAGE COUNTER = 21
642 0255 3E 03                    LD      A,03H
643 0257 32 00 00        E        LD      (SSPAGE),A
644 025A
645                               * * * * * CALC MINUTE BOUNDARY FREQUENCIES
646 025A CD 00 00        E        CALL    MINBND
647 025D
648                               * * * * * STORE PRESENT SEARCH FREQUENCY
649 025D ED 5B 00 00     E        LD      DE,(BOUND2)
650 0261 ED 53 00 00     E        LD      (SEARCH),DE
651 0265
652                               * * * * * SET SYNC SEARCH FREQ CHANGE FLAG
653 0265 21 00 00        E        LD      HL,PTTI
654 0268 CB D6                    SET     2,(HL)
655 026A
656                               * * * * * RESET RCV FLAGS AND COUNTERS
657 026A 21 00 00        E        LD      HL,DATABF
658 026D 22 00 00        E        LD      (INPTR),HL
659 0270 22 00 00        E        LD      (OUTPTR),HL
660 0273 AF                       XOR     A
661 0274
662 0274 21 00 00        E        LD      HL,TIME1
663 0277 06 20                    LD      B,32
664 0279                 IN225:
665 0279 77                       LD      (HL),A
666 027A 23                       INC     HL
667 027B 10 FC 0279               DJNZ    IN225
668 027D
669 027D 32 00 00        E        LD      (TIMRXD),A
670 0280 32 00 00        E        LD      (EXITFL),A
671 0283 32 00 00        E        LD      (RXFLGS),A
672 0286 32 00 00        E        LD      (SOMCTR),A
673 0289 32 00 00        E        LD      (BSTORE),A
674 028C 32 00 00        E        LD      (VALSOM),A
675 028F 3E 0D                    LD      A,13
676 0291 32 00 00        E        LD      (RXSOMC),A        ;# OF SOM BYTES SENT
677 0294 3E 16                    LD      A,22
678 0296 32 00 00        E        LD      (RXBYTS),A
679 0299 3E 14                    LD      A,20
680 029B 32 00 00        E        LD      (BCTR20),A
681 029E 3E 05                    LD      A,5
682 02A0 32 00 00        E        LD      (EOMCTR),A
683 02A3 3E 08                    LD      A,8
684 02A5 32 00 00        E        LD      (FALSE),A
685 02A8 3D                       DEC     A
686 02A9 32 00 00        E        LD      (CHARLM),A        ;SET CHARLM = 7
687 02AC 2A 00 00        E        LD      HL,(BOUND2)
688 02AF 22 00 00        E        LD      (NXTFRQ),HL       ;LOAD NEXT RCV FREQ WITH BOUND2
689 02B2
690                               * * * * * DISABLE INTERRUPTS
691 02B2 F3                       DI
692 02B3
693                               * * * * * INITIALIZE USART FOR SINGLE SYNC, HUNT MODE
694 02B3
695 02B3 3E 40                    LD      A,40H             ;RESET USART
696 02B5 32 00 00        E        LD      (USART),A
```

```
697 02B8 3E 8C              LD      A,8CH               ;MODE WORD
698 02BA 32 00 00      E    LD      (USART),A
699 02BD 3E 00         E    LD      A,.LOW.SNCHAR       ;SYNC WORD
700 02BF 32 00 00      E    LD      (USART),A
701 02C2 3E 10              LD      A,10H               ;ERROR RESET
702 02C4 32 00 00      E    LD      (USART),A
703 02C7 3E 84              LD      A,84H               ;USART COMMAND WORD
704 02C9 32 00 00      E    LD      (USART),A
705 02CC
706                         * * * * ENABLE INTERRUPTS
707 02CC 3E 05              LD      A,5
708 02CE D3 BB              OUT     (0BBH),A            ;INTFRM & RXRDY
709 02D0 FB                 EI
710 02D1
711                         * * * * TOGGLE SEARCH START LINE TO RESET SYNC CIRCUITRY
712 02D1 3E 00         E    LD      A,.LOW.SRCHST
713 02D3 32 00 00      E    LD      (CPRTCC),A
714 02D6 00                 NOP
715 02D7 00                 NOP
716 02D8 00                 NOP
717 02D9 32 00 00      E    LD      (CPRTCS),A
718 02DC 00                 NOP
719 02DD 00                 NOP
720 02DE 32 00 00      E    LD      (CPRTCC),A
721 02E1
722                         * * * * ELSE
723 02E1 C3 A7 03      C    JP      IN300
724 02E4                    IN230:
725 02E4
726                         * * * * * IF BIT SYNC LINE = '1'
727 02E4 3A 00 00      E    LD      A,(CPRTA)
728 02E7 E6 00         E    AND     .LOW.BSYNC
729 02E9 28 21 030C         JR      Z,IN235
730 02EB
731                         * * * * * AND USART NOT IN SYNC DET
732 02EB 3A 00 00      E    LD      A,(USART)
733 02EE E6 40              AND     40H
734 02F0 20 1A 030C         JR      NZ,IN235
735 02F2
736                         * * * * * THEN
737                         * * * * * * IF BIT SYNC WAS PRESENT LAST FRAME
738 02F2 3A 00 00      E    LD      A,(BSTORE)
739 02F5 EE FF              XOR     0FFH
740 02F7 32 00 00      E    LD      (BSTORE),A
741 02FA 20 14 0310         JR      NZ,IN240
742 02FC
743                         * * * * * * THEN
744                         * * * * * * * RESET SYNC CIRCUITRY
745 02FC 3E 00         E    LD      A,.LOW.SRCHST
746 02FE 32 00 00      E    LD      (CPRTCS),A
747 0301 32 00 00      E    LD      (CPRTCC),A
748 0304
749                         * * * * * * * RE-ENTER HUNT MODE
750 0304 3E 84              LD      A,84H
751 0306 32 00 00      E    LD      (USART),A
752 0309
753                         * * * * * * END IF
754 0309 C3 10 03      C    JP      IN240
```

```
755 030C
756                    * * * * * ELSE
757 030C               IN235:
758 030C
759                    * * * * * * LOAD '0' IN BIT SYNC STORAGE
760 030C AF                    XOR     A
761 030D 32 00 00   E          LD      (BSTORE),A
762 0310
763                    * * * * * END IF
764 0310               IN240:
765 0310
766                    * * * * * IF MINUTE BOUNDARY
767 0310 3A 00 00   E          LD      A,(TXTIME)
768 0313 B7                    OR      A
769 0314 20 49 035F            JR      NZ,IN260
770 0316 3A 01 00   E          LD      A,(TXTIME+1)
771 0319 E6 03                 AND     03H
772 031B 20 42 035F            JR      NZ,IN260
773 031D
774                    * * * * * THEN
775 031D
776                    * * * * * * TOGGLE SEARCH START LINE
777 031D 3E 00      E          LD      A,.LOW.SRCHST
778 031F 32 00 00   E          LD      (CPRTCS),A
779 0322 32 00 00   E          LD      (CPRTCC),A
780 0325
781                    * * * * * * SET DAY OF MONTH = DAY OF WEEK
782 0325 CD 00 00   E          CALL    WKEQMO
783 0328
784                    * * * * * * IF UNEQUAL FLAG SET
785 0328 B7                    OR      A
786 0329 CA 39 03   C          JP      Z,IN250
787 032C
788                    * * * * * * THEN
789                    * * * * * * * ZERO FRAME TIME AND PAGE COUNT
790 032C 21 00 00              LD      HL,0
791 032F 22 00 00   E          LD      (TXTIME),HL
792 0332 22 02 00   E          LD      (TXTIME+2),HL
793 0335 AF                    XOR     A
794 0336 32 00 00   E          LD      (PAGETX),A
795 0339
796                    * * * * * * END IF
797 0339               IN250:
798 0339
799                    * * * * * * REDEFINE & STORE NEW BOUNDARY FREQUENCIES
800 0339 2A 00 00   E          LD      HL,(BOUND2)
801 033C 22 00 00   E          LD      (BOUND3),HL      ;BOUND2 => BOUND3
802 033F 2A 00 00   E          LD      HL,(BOUND1)
803 0342 22 00 00   E          LD      (BOUND2),HL      ;BOUND1 => BOUND2 = SEARCH
804 0345 22 00 00   E          LD      (SEARCH),HL
805 0348 2A 00 00   E          LD      HL,(TXTIME)
806 034B ED 5B 02 00 E         LD      DE,(TXTIME+2)
807 034F CD 00 00   E          CALL    PNGEN
808 0352 ED 53 00 00 E         LD      (BOUND1),DE
809 0356
810                    * * * * * * FETCH NEW SEARCH FREQUENCY
811 0356 ED 5B 00 00 E         LD      DE,(BOUND2)
812                                    ;LEAVE IN ALTERNATE DE PAIR
```

```
813 035A
814                           * * * * * SET SYNC SEARCH FREQ. CHANGE FLAG
815 035A 21 00 00    E                LD    HL,PTTI
816 035D CB D6                         SET   2,(HL)
817 035F
818                           * * * * * END IF
819 035F                      IN260:
820 035F
821                           * * * * * INCREMENT SYNC SEARCH PAGE COUNTER
822 035F 3A 00 00    E                LD    A,(SSPAGE)
823 0362 3C                            INC   A
824 0363 FE 18                         CP    24
825 0365 20 01 0368                    JR    NZ,IN265
826 0367 AF                            XOR   A
827 0368                      IN265:
828 0368 32 00 00    E                LD    (SSPAGE),A
829 036B
830                           * * * * * IF NOT TIME MODE (NO PAGING IN TIME MODE)
831 036B DD CB 00 4E           BIT   1,(IX)
832 036F 20 36 03A7                    JR    NZ,IN290
833 0371
834                           * * * * * THEN
835                           * * * * * * IF PAGE FRAME
836 0371 FE 17                          CP    23
837 0373 20 1C 0391                    JR    NZ,IN270
838 0375
839                           * * * * * * THEN
840                           * * * * * * DISABLE INTERRUPTS
841 0375 F3                             DI
842                           * * * * * * * IF  RCV FLAG NOT SET
843 0376 3A 00 00    E                 LD    A,(RCVFLG)
844 0379 B7                             OR    A
845 037A 20 0C 0388                    JR    NZ,IN267
846 037C
847                           * * * * * * * THEN
848                           * * * * * * * FETCH PAGE FREQ.
849 037C ED 5B 00 00  E                LD    DE,(PAGFRQ)
850 0380
851                           * * * * * * * SET SYNC SEARCH FREQ. CHANGE FLAG
852 0380 21 00 00    E                 LD    HL,PTTI
853 0383 CB D6                          SET   2,(HL)
854 0385 C3 8D 03    C                  JP    IN268
855 0388
856                           * * * * * * ELSE
857 0388                      IN267:
858 0388
859                           * * * * * * * SET PAGE COUNTER = 21
860 0388 3E 15                          LD    A,21
861 038A 32 00 00    E                 LD    (SSPAGE),A
862 038D
863                           * * * * * * * END IF
864 038D                      IN268:
865 038D
866 038D FB                             EI
867 038E C3 A7 03    C                  JP    IN300
868 0391
869                           * * * * * ELSE
870 0391                      IN270:
```

```
871 0391
872                         * * * * * * IF LAST FRAME WAS PAGE FRAME
873 0391 B7                         OR      A
874 0392 20 0C 03A0                 JR      NZ,IN275
875 0394
876                         * * * * * * THEN
877                         * * * * * * * FETCH SEARCH FREQ.
878 0394 ED 5B 00 00   E             LD      DE,(SEARCH)
879 0398
880                         * * * * * * * SET SYNC SEARCH FREQ. CHANGE FLAG
881 0398 21 00 00     E             LD      HL,PTTI
882 039B CB D6                      SET     2,(HL)
883 039D
884                         * * * * * * ELSE
885 039D C3 A7 03     C             JP      IN300
886 03A0                    IN275:
887 03A0
888                         * * * * * * * IF TWO FRAMES AFTER PAGE FRAME
889 03A0 FE 01                      CP      1
890 03A2 20 03 03A7                 JR      NZ,IN300
891 03A4
892                         * * * * * * * THEN
893                         * * * * * * * * CHECK PAGE AND UPDATE STATUS
894 03A4 CD 00 00     E             CALL    CHKPAG
895 03A7
896                         * * * * * * * END IF
897                         * * * * * * END IF
898                         * * * * * END IF
899                         * * * * END IF
900 03A7                    IN290:
901 03A7
902                         * * * END IF
903                         * * * END IF
904                         * * END IF
905 03A7                    IN300:
906 03A7
907                         * * IF NCS TONE COUNTER <> 0
908 03A7 3A 00 00     E             LD      A,(NCSTCT)
909 03AA B7                         OR      A
910 03AB 28 0B 03B8                 JR      Z,IN320
911 03AD
912                         * * THEN
913                         * * * DECREMENT COUNTER
914 03AD 3D                         DEC     A
915 03AE 32 00 00     E             LD      (NCSTCT),A
916 03B1
917                         * * * IF RESULT = 0
918 03B1 20 05 03B8                 JR      NZ,IN320
919 03B3
920                         * * * THEN
921                         * * * * DISABLE TONE
922 03B3 3E 00        E             LD      A,.LOW.TONE
923 03B5 32 00 00     E             LD      (APRTBS),A
924 03B8
925                         * * * END IF
926                         * * END IF
927 03B8                    IN320:
928 03B8
```

```
929                          * * RESTORE REGISTERS
930 03B8 D9                          EXX
931 03B9 08                          EX      AF,AF'
932 03BA
933                          * END PROCEDURE
934 03BA FB                          EI
935 03BB C9                          RET
936 03BC                             END
```

ERRORS = 0000

```
APRTBC E 0025   APRTBS E 001D   BCTR20 E 0016   BITSNC E 0039
BOUND1 E 000C   BOUND2 E 000A   BOUND3 E 000B   BPRTA  E 0004
BPRTBC E 0003   BPRTC  E 0000   BSTORE E 0042   BSYNC  E 0041
CHARLM E 0028   CHKPAG E 003F   CPRTA  E 0043   CPRTAC E 0023
CPRTAS E 0024   CPRTCC E 0019   CPRTCS E 0018   DATABF E 0012
DAYOMO E 001A   EOMCTR E 0020   ERRCOR E 002A   EXITFL E 0031
FALSE  E 0022   FRAMES E 0044   FRQCAL E 003E   IN10   C 0041
IN110  C 01D1   IN120  C 01F3   IN130  C 01FB   IN140  C 0209
IN145  C 0214   IN150  C 022E   IN160  C 0235   IN2    C 001B
IN200  C 0239   IN210  C 023D   IN220  C 0240   IN225  C 0279
IN230  C 02E4   IN235  C 030C   IN240  C 0310   IN250  C 0339
IN260  C 035F   IN265  C 0368   IN267  C 0388   IN268  C 038D
IN270  C 0391   IN275  C 03A0   IN290  C 03A7   IN300  C 03A7
IN320  C 03B8   IN5    C 003C   IN50   C 0065   IN55   C 007A
IN57   C 007D   IN60   C 00AC   IN70   C 00B0   IN75   C 00D9
IN77   C 00E2   IN80   C 00E6   IN800  C 0118   IN810  C 0128
IN820  C 0133   IN830  C 0137   IN835  C 0137   IN840  C 013A
IN845  C 0143   IN848  C 0153   IN850  C 0158   IN860  C 016A
IN870  C 0186   IN880  C 0195   IN890  C 0198   IN895  C 01A2
IN900  C 01B5   IN910  C 01BD   INCTIM E 001C   INPTR  E 0013
INTFRM C 0000   LEGAL  E 003D   MEMORY M 0000   MINBND E 0010
NCSTCT E 0045   NXTFRQ E 000D   OUTPTR E 0014   PAGDET E 0001
PAGETX E 0006   PAGFRQ E 001E   PNGEN  E 0008   PTTI   E 0002
RCVFLG E 000E   REPAGT E 0036   RESYNC E 003C   RMTDOT E 0035
RSTINT E 002F   RXBYTS E 001F   RXFLGS E 0017   RXSOMC E 0034
RXSTRB E 002E   SEARCH E 0011   SNCBYT E 0032   SNCHAR E 002D
SNCTIM E 0026   SOMBYT E 0038   SOMCTR E 0021   SRCHST E 0030
SS1ST  E 000F   SSPAGE E 002C   STACK  S 0000   SYNCTR E 0007
SYSSTS E 002B   TIME1  E 0027   TIMRXD E 0015   TMCALC E 0037
TONE   E 0046   TXFLGS E 0029   TXFRST E 0040   TXSOMC E 003B
TXTIME E 0005   USART  E 0009   UTDATA E 003A   VALSOM E 0033
WKEQMO E 001B
```

- ECMDEF

```
 1 0000                      TITLE   'ECMDEF'
 2                           NAME    ECMDEF
 3                           PUBLIC  FREQT,DATABF,FILLT,TIME1,TIME2,TXTIME,RXTIME
 4                           PUBLIC  WKAREA,BOUND1,BOUND2,BOUND3,PAGFRQ,NXTFRQ,SEARCH
 5                           PUBLIC  SNCTIM,INPTR,OUTPTR,PTTI,SS1ST,RCVFLG,FILLID,INCT
 6                           PUBLIC  EOMFLG,DSPLPG,RXFLGS,TXFLGS,TIMRXD,PAGETX
 7                           PUBLIC  PAGERX,SYNCTR,BCTR20,RXBYTS,EOMCTR,SOMCTR,TXEOMC
 8                           PUBLIC  TXSOMC,DAYOMO,DAYOWK,MINUTE,HUNDRD,STAT,USART,UTDATA
 9                           PUBLIC  APRTBC,APRTBS,APRTC,BPRTA,BPRTB,BPRTBC,BPRTCC,BPRTCS
10                           PUBLIC  CPRTCC,CPRTCS,SQMSK,EOMBYT,SOMBYT,DELIMT,SNCHAR,BITSNC
11                           PUBLIC  SNCBYT,PAGDET,BPRTC,DUMMY,TXDUM,FALSE,ADDRA,ADDRB,ADDRC
12                           PUBLIC  BDDRA,BDDRB,BDDRC,CDDRC,AMODE,BMODE,CMODE,CLKRST
```

```
13                 PUBLIC  FTPTR,HIBLOW,HIBHI,CHNINC,CHARLM,DELCHN
14                 PUBLIC  INCCHN,ERRTBL,PNKEY,PNCYCL,DATMSK,RMTDOT,NCSTCT,INCADD
15                 PUBLIC  HOPMSK,BITRCK,PAFLT,ANTFLT,TRLINE,TONE,PTTMSK,PAGE
16                 PUBLIC  PGDTCT,RSTINT,RSTRCV,RXCLKS,SRCHST,RXSTRB,BOTHAB
17                 PUBLIC  BND1LO,BND1HI,BND2LO,BND2HI,BND3LO,BND3HI,RETX
18                 PUBLIC  EOM,EOMFRM,EXITFL,SSPAGE,REDLIM,IDELIM,RESYNC,FRQCAL
19                 PUBLIC  REPAGT,REPAGR,TMCALC,LEGAL,FILL,PAGEFL,RESTOR,BOUNCE
20                 PUBLIC  HYSTRI,SECTMR,NCSTRU,TXFRST,BSTORE,BSYNC,CPRTA
21                 PUBLIC  TIME3,TIME4,TBYTCT,FRAMES,TIM1ST,FLTMCT,VALSOM,RXSOMC
22                 PUBLIC  RXCMDW,TXCMDW,NONNCS,CWDATA,CVOICE,TXTRCK,SQLDIS,INCTBL
23                 PUBLIC  BATFLT,DFFLGS,RMATCH,MISSOM,RESFLG,SAMPLE,INTRLV,INCEND
24                 PUBLIC  FROMSK,INTABP,CIIF,FPCKSM
25 0000
26 0000
27                 * ECCM DEFINITION MODULE
28 0000
29                 * * TABLES AND BUFFERS
30                         DSEG
31 0000            ECMDEF:
32 0000
33 0000            FREQT:  DS    1024   ;TABLE OF 512 HOPPING FREQUENCIES
34 0400            DATABF: DS    48     ;DATA BUFFER
35 0430            FILLID: DS    2      ;FILL IDENTIFICATION CODE
36 0432            INCT:   DS    291    ;FILL INCLUDE TABLE
37 0555            FILLT:  DS    112    ;FILL FREQUENCY PLANS TABLE
38 05C5            TIME1:  DS    8      ;BIT BUFFER FOR 1ST TIME BYTE
39 05CD            TIME2:  DS    8      ;BIT BUFFER FOR 2ND TIME BYTE
40 05D5            TIME3:  DS    8      ;BIT BUFFER FOR 3RD TIME BYTE
41 05DD            TIME4:  DS    8      ;BIT BUFFER FOR 4TH TIME BYTE
42 05E5            TXTIME: DS    4      ;INTERNAL FRAME TIME
43 05E9            RXTIME: DS    4      ;RECEIVED FRAME TIME
44 05ED            WKAREA: DS    4      ;WORK AREA BUFFER
45 05F1            BOUND1: DS    4      ;1ST (LATEST) MINUTE BOUNDARY
46 05F5            BOUND2: DS    4      ;2ND MINUTE BOUNDARY
47 05F9            BOUND3: DS    4      ;3RD (EARLIEST) MINUTE BOUNDARY
48 05FD            PAGFRQ: DS    2      ;PAGE FREQUENCY STORAGE
49 05FF            NXTFRQ: DS    2      ;NEXT RX HOPPING FREQUENCY
50 0601            SEARCH: DS    2      ;SYNC SEARCH FREQUENCY
51 0603            SNCTIM: DS    2      ;2 LSB'S OF FRAME TIME + 2
52 0605            FRAMES: DS    4      ;FULL FRAME COUNT FOR TIME MODE
53 0609            PNKEY:  DS    2      ;PN GENERATOR KEY
54 060B
55 060B            BND1LO: DS    2      ;BAND 1 LOW FREQ
56 060D            BND1HI: DS    2      ;BAND 1 HIGH FREQ
57 060F            BND2LO: DS    2      ;BAND 2 LOW FREQ
58 0611            BND2HI: DS    2      ;BAND 2 HIGH FREQ
59 0613            BND3LO: DS    2      ;BAND 3 LOW FREQ
60 0615            BND3HI: DS    2      ;BAND 3 HIGH FREQ
61 0617            CIIF:   DS    1      ;CHANNEL INCREMENT & INTERLEAVE FACTOR
62 0618            FPCKSM: DS    1      ;FREQUENCY PLAN CHECK SUM
63 0619            CHNINC: DS    1      ;CHANNEL INCREMENT
64 061A            INTRLV: DS    1      ;INTERLEAVE FACTOR
65 061B            FROMSK: DS    1      ;FREQUENCY MASK POINTER FOR INCLUDE TABLE
66 061C
67 061C            RXCMDW: DS    1      ;RECEIVED COMMAND WORD STORAGE
68 061D            TXCMDW: DS    1      ;TRANSMIT COMMAND WORD STORAGE
69 061E            PAGDET: DS    1      ;PAGE DETECT QUICK TEMP STORAGE
70 061F            EOM:    DS    1      ;CURRENT EOM BYTE STORAGE
71 0620            DELIMT: DS    1      ;DELIMIT BYTE BUFFER
72 0621            BSTORE: DS    1      ;BIT SYNC STATE STORAGE
```

```
73 0622
74 0622
75              * * POINTERS
76 0622
77 0622         INPTR:  DS      2       ;DATA BUFFER INPUT POINTER
78 0624         OUTPTR: DS      2       ;DATA BUFFER OUTPUT POINTER
79 0626         FTPTR:  DS      2       ;FREQ TABLE POINTER FOR TABLE BUILD
80 0628         INCADD: DS      2       ;START ADDRESS OF INCLUDE TABLE
81 062A         INCEND: DS      2       ;END ADDRESS OF INCLUDE TABLE
82 062C         INTABP: DS      2       ;BYTE POINTER FOR INCLUDE TABLE
83 062E
84              * * FLAGS
85 062E
86 062E         PTTI:   DS      1       ;INTERNAL PTT & SYNC SEARCH FREQUENCY CHANGE
87 062F         SS1ST:  DS      1       ;SYNC SEARCH 1ST FLAG
88 0630         RCVFLG: DS      1       ;RECEIVE MODE INDICATOR
89 0631         EOMFLG: DS      1       ;END OF MESSAGE FLAG
90 0632         DSPLPG: DS      1       ;DISPLAY PAGE FLAG
91 0633         RXFLGS: DS      1       ;RECEIVE MODE FLAGS
92                                      ;BIT 0 - SYNC CHARACTER
93                                      ;BIT 1 - DELIMIT
94                                      ;BIT 2 - SOM
95                                      ;BIT 3 - COMMAND WORD
96                                      ;BIT 4 - TX USART
97                                      ;BIT 5 - RESYNC SOM FRAME
98 0634         TXFLGS: DS      1       ;TRANSMIT MODE FLAGS
99                                      ;BITS 0 - 2   SYNC FRAME COUNT
100                                     ;BIT 3 - DUMMY FRAME FLAG
101                                     ;BIT 4 - SOM FLAG
102                                     ;BIT 5 - DATA FLAG
103                                     ;BIT 6 - EOM FLAG
104                                     ;BIT 7 - KEY (PTT) DROPPED FLAG
105 0635        EXITFL: DS      1       ;EXIT FLAG, USED IN RCVFRM
106 0636        RESYNC: DS      1       ;RESYNC FLAG
107 0637        TMCALC: DS      1       ;CALCULAT SYNC TIME & ERROR CORRECTION FLAG
108 0638        LEGAL:  DS      1       ;RESYNC FRAME LEGAL FLAG
109 0639        PAGEFL: DS      1       ;IN DISPLAY PAGE MODE; CURRENTLY RECEIVING PAGE
110 063A        RESTOR: DS      1       ;RESTORE DISPLAY FLAG (WHEN PAGE ACTIVITY CEASES)
111 063B        FRQCAL: DS      1       ;FREQUENCY ALREADY CALCULATED FLAG (10 SEC BOUNDARY)
112 063C        TXFRST: DS      1       ;TRANSMIT FIRST FLAG - FOR 1ST PASS OF INTFRM
113 063D        TIM1ST: DS      1       ;FIRST TIME TRANSMISSION FLAG IN TIME MODE
114                                     ;TIME IS SENT TWICE, THREE FRAMES EACH TX
115 063E        VALSOM: DS      1       ;VALID SOM RCV'D FLAG
116 063F
117 063F        DFFLGS: DS      1       ;DISPLAY/FAULT FLAGS
118                                     ;BIT 0 - BATTERY FAULT
119                                     ;BIT 1 - R/T FAULT
120                                     ;BIT 2 - DISPLAY MESSAGE
121                                     ;BIT 3 - DISPLAY FAULT
122                                     ;BIT 4 - MESSAGE DISPLAYED
123                                     ;BIT 5 - FAULT DISPLAYED
124                                     ;BIT 6 - KEY INHIBIT
125                                     ;BIT 7 - DISPLAY NET ID
126 0640
127 0640        RESFLG: DS      1       ;RESYNC SOM FRAME FLAGS
128                                     ;BIT 0 - RESYNC SOM FRAME NEXT
129                                     ;BIT 1 - POST SOM FRAME
130 0641
131 0641
```

```
132                * * COUNTERS
133 0641
134 0641          TIMRXD:  DS     1       ;TIME BYTES RECEIVED COUNTER
135 0642          PAGETX:  DS     1       ;TX PAGE FRAME POSITION COUNTER
136 0643          PAGERX:  DS     1       ;RX PAGE FRAME POSITION COUNTER
137 0644          SNCBYT:  DS     1       ;SYNC BYTE COUNTER (TXRDY)
138 0645          SYNCTR:  DS     1       ;SYNC FRAME COUNTER TX (INTFRM)
139 0646          BCTR20:  DS     1       ;20 BYTE COUNTER
140 0647          RXBYTS:  DS     1       ;RECEIVED DATA BYTES COUNTER
141 0648          EOMCTR:  DS     1       ;EOM RECEIVED BYTES COUNTER
142 0649          SOMCTR:  DS     1       ;SOM RECEIVED BYTES COUNTER
143 064A          TXEOMC:  DS     1       ;TX EOM BYTE COUNTER
144 064B          TXSOMC:  DS     1       ;TX SOM BYTE COUNTER
145 064C          RXSOMC:  DS     1       ;RX SOM BYTE AND CMD WD COUNTER
146 064D          TXDUM:   DS     1       ;TX DUMMY BYTE COUNTER
147 064E          FALSE:   DS     1       ;RCV FRAME COUNTER FOR FALSE SYNC PROTECTION
148 064F          CHARLM:  DS     1       ;CHAR LIMIT COUNTER FOR FALSE CHAR SYNC PROTECTION
149 0650          EOMFRM:  DS     1       ;EOM FRAME COUNTER (FOR TX MODE)
150 0651          SSPAGE:  DS     1       ;SYNC SEARCH PAGE FRAME COUNTER
151 0652          REPAGT:  DS     1       ;RESYNC PAGE COUNTER FOR TX TIME
152 0653          REPAGR:  DS     1       ;RESYNC PAGE COUNTER FOR RX TIME
153 0654          BOUNCE:  DS     1       ;DEBOUNCE (FOR PTT) COUNTER
154 0655          HYSTRI:  DS     1       ;PAGE HYSTERESIS COUNTER
155 0656          SECTMR:  DS     1       ;SECOND TIMER/COUNTER FOR PAGE TONE
156 0657          TBYTCT:  DS     1       ;TIME BYTE COUNTER FOR TX'ING IN TIME MODE (TXRDY)
157 0658          FLTMCT:  DS     1       ;FULL TIME COUNT FOR RCV'ING TIME IN TIME MODE (RXRDY)
158 0659          NCSTCT:  DS     1       ;NCS TONE COUNTER (TIMES DURATION OF TONE IN FRAMES)
159 065A          RMATCH:  DS     1       ;RECEIVED BYTE MATCHES
160 065B          MISSOM:  DS     1       ;MISSED SOM FRAMES COUNTER
161 065C          SAMPLE:  DS     1       ;SAMPLE TIME COUNTER (FOR FAULTS)
162 065D
163 065D
164                * * ADDRESSES
165 065D
166                         * *  RTC  * *
167 065D
168 1406          DAYOMO   EQU    1406H   ;DAY OF MONTH RTC REGISTER
169 1405          DAYOWK   EQU    1405H   ;DAY OF WEEK RTC REGISTER
170 1403          MINUTE   EQU    1403H   ;MINUTE RTC REGISTER
171 1401          HUNDRD   EQU    1401H   ;HUNDREDTHS OF SECONDS RTC REGISTER
172 1412          CLKRST   EQU    1412H   ;RTC RESET REGISTER
173 1414          STAT     EQU    1414H   ;STATUS RTC BIT REGISTER
174 065D
175 065D
176                         * *  USART  * *
177 065D
178 1C01          USART    EQU    1C01H   ;USART COMMAND & MODE REGISTER
179 1C00          UTDATA   EQU    1C00H   ;USART DATA REGISTER
180 065D
181 065D
182                         * *  PORTS  * *
183 065D
184                         ;831A
185 065D
186 1809          APRTBC   EQU    1809H   ;PORT B - BIT CLEAR
187 180D          APRTBS   EQU    180DH   ;PORT B - BIT SET
188 1802          APRTC    EQU    1802H   ;PORT C - R/W
189 1804          ADDRA    EQU    1804H   ;PORT A DATA DIRECTION REGISTER (DDR)
190 1805          ADDRB    EQU    1805H   ;PORT B DDR
```

```
191 1806              ADDRC   EQU     1806H   ;PORT C DDR
192 1807              AMODE   EQU     1807H   ;MODE DEFINITON REGISTER
193 065D
194                                   ;831B
195 065D
196 1820              BPRTA   EQU     1820H   ;PORT A - R/W
197 1821              BPRTB   EQU     1821H   ;PORT B - R/W
198 1829              BPRTBC  EQU     1829H   ;PORT B - BIT CLEAR
199 1822              BPRTC   EQU     1822H   ;PORT C - R/W
200 182A              BPRTCC  EQU     182AH   ;PORT C - BIT CLEAR
201 182E              BPRTCS  EQU     182EH   ;PORT C - BIT SET
202 1824              BDDRA   EQU     1824H   ;PORT A DATA DIRECTION REGISTER (DDR)
203 1825              BDDRB   EQU     1825H   ;PORT B DDR
204 1826              BDDRC   EQU     1826H   ;PORT C DDR
205 1827              BMODE   EQU     1827H   ;MODE DEFINITON REGISTER
206 065D
207                                   ;831C
208 065D
209 184A              CPRTCC  EQU     184AH   ;PORT C - BIT CLEAR
210 184E              CPRTCS  EQU     184EH   ;PORT C - BIT SET
211 1846              CDDRC   EQU     1846H   ;PORT C - PORT C DDR
212 1847              CMODE   EQU     1847H   ;MODE DEFINITION REGISTER
213 1848              CPRTAC  EQU     1848H
214 184C              CPRTAS  EQU     184CH
215 1844              CDDRA   EQU     1844H
216 1840              CPRTA   EQU     1840H   ;PORT A - R/W
217 065D
218 065D
219              * * CONSTANTS
220 065D
221 0004              SQMSK   EQU     04H     ;BIT MASK  FOR PAGE TONE ENABLE
222 0008              SQLDIS  EQU     08H     ;PORT MASK FOR SQUELCH DISABLE
223 00E4              EOMBYT  EQU     0E4H    ;EOM BYTE VALUE
224 00A2              SOMBYT  EQU     0A2H    ;SOM BYTE VALUE
225 0083              IDELIM  EQU     83H     ;DELIMITER BYTE VALUE
226 0024              REDLIM  EQU     24H     ;RESYNC DELIMITER BYTE VALUE
227 005A              SNCHAR  EQU     5AH     ;SYNC CHARACTER
228 00AA              BITSNC  EQU     0AAH    ;BIT SYNC PATTERN
229 0033              DUMMY   EQU     33H     ;DUMMY FRAME CHARACTER
230 000B              NCSTRU  EQU     0BH     ;VALUE FOR NCS BITS WHEN IN NCS MODE
231 0004              NONNCS  EQU     04H     ;VALUE FOR NCS BITS WHEN NON NCS
232 0040              CWDATA  EQU     40H     ;VALUE FOR DATA/VOICE BITS WHEN DATA MODE
233 00B0              CVOICE  EQU     0B0H    ;VALUE FOR DATA/VOICE BITS WHEN VOICE MODE
234 2A3C              HIBLOW  EQU     02A3CH  ;HI BAND, LOW HALF BAND (52.0 MHZ)
235 3ED8              HIHI    EQU     03ED8H  ;HI BAND, HI HALF BAND (81.5 MHZ)
236 0B78              DELCHN  EQU     0B78H   ;DELETE CHANNEL VALUE
237 0C48              INCCHN  EQU     0C48H   ;INCLUDE CHANNEL VALUE
238 0010              PNCYCL  EQU     10H     ;# OF PN CYCLES IN PN GENERATOR
239 0002              HOPMSK  EQU     02H     ;PORT MASK TO SET OR CLEAR HOP LINE
240 0004              DATMSK  EQU     04H     ;PORT MASK FOR DATA LINE (INPUT)
241 0001              BITRCK  EQU     01H     ;PORT MASK FOR BIT TRACKING DISSABLE
242 0002              PAFLT   EQU     02H     ;PORT MASK FOR PA FAULT
243 0001              ANTFLT  EQU     01H     ;PORT MASK FOR ANTENNA FAULT
244 0010              TRLINE  EQU     10H     ;PORT MASK FOR T/R LINE
245 0004              TONE    EQU     04H     ;PORT MASK FOR NOT TONE
246 0001              PTTMSK  EQU     01H     ;PORT MASK FOR PTT LINE FROM HANDSET
247 0040              PAGE    EQU     40H     ;PORT MASK FOR PAGE LINE
248 0001              PGDTCT  EQU     01H     ;PORT MASK FOR PAGE DETECT
249 0008              RSTINT  EQU     08H     ;PORT MASK FOR RESET INTERNAL FRAME MARK
250 0004              RSTRCV  EQU     04H     ;PORT MASK FOR RESET RECEIVE FRAME MARK
```

```
251 000C              BOTHAB  EQU    0CH       ;PORT MASK TO RESET BOTH RST A & B
252 0002              RXCLKS  EQU    02H       ;PORT MASK FOR RECEIVE CLOCK START
253 0001              SRCHST  EQU    01H       ;PORT MASK FOR SEARCH START
254 0080              RXSTRB  EQU    80H       ;PORT MASK FOR RECEIVE STROBE (FREQ LATCH)
255 0004              BSYNC   EQU    04H       ;PORT MASK FOR BIT SYNC
256 0020              TXTRCK  EQU    20H       ;PORT MASK FOR TX TRACKING ENABLE
257 0002              RMTDOT  EQU    02H       ;PORT MASK FOR REMOTE DATA OUT
258 0002              RETX    EQU    02H       ;PORT MASK FOR RETRANSMIT LINE
259 0004              BATFLT  EQU    04H       ;PORT MASK FOR BATTERY FAULT
260 065D
261 065D
262 6E6A              FILL    EQU    6E6AH     ;START ADDRESS OF FREQUENCY PLANS
263 6ED2              INCTBL  EQU    6ED2H     ;START ADDRESS OF INCLUDE TABLE
264 065D
265 065D
266                           * * BIT ERROR CORRECTION TABLE
267 065D
268                           CSEG
269 0000
270 0000 00           ERRTBL: DB     00H
271 0001 00                   DB     00H
272 0002 00                   DB     00H
273 0003 10                   DB     10H       ;BIT 12
274 0004 00                   DB     00H
275 0005 20                   DB     20H       ;BIT 13
276 0006 01                   DB     01H
277 0007 00                   DB     00H       ;BIT 0
278 0008 00                   DB     00H
279 0009 40                   DB     40H       ;BIT 14
280 000A 10                   DB     10H
281 000B 00                   DB     00H       ;BIT 4
282 000C 02                   DB     02H
283 000D 00                   DB     00H       ;BIT 1
284 000E 40                   DB     40H
285 000F 00                   DB     00H       ;BIT 6
286 0010 00                   DB     00H
287 0011 80                   DB     80H       ;BIT 15
288 0012 00                   DB     00H
289 0013 04                   DB     04H       ;BIT 10
290 0014 20                   DB     20H
            ECMDEF
291 0015 00                   DB     00H       ;BIT 5
292 0016 08                   DB     08H
293 0017 00                   DB     00H       ;BIT 3
294 0018 04                   DB     04H
295 0019 00                   DB     00H       ;BIT 2
296 001A 00                   DB     00H
297 001B 02                   DB     02H       ;BIT 9
298 001C 80                   DB     80H
299 001D 00                   DB     00H       ;BIT 7
300 001E 00                   DB     00H
301 001F 01                   DB     01H       ;BIT 8
302 0020
303 0020
304 0020                      END
```

ERRORS = 0000

```
ADDRA    1804    ADDRB    1805    ADDRC    1806    AMODE    1807
ANTFLT   0001    APRTBC   1809    APRTBS   180D    APRTC    1802
BATFLT   0004    BCTR20 D 0646    BDDRA    1824    BDDRB    1825
BDDRC    1826    BITRCK   0001    BITSNC   00AA    BMODE    1827
BND1HI D 060D    BND1LO D 060B    BND2HI D 0611    BND2LO D 060F
BND3HI D 0615    BND3LO D 0613    BOTHAB   000C    BOUNCE D 0654
BOUND1 D 05F1    BOUND2 D 05F5    BOUND3 D 05F9    BPRTA    1820
BPRTB    1821    BPRTBC   1829    BPRTC    1822    BPRTCC   182A
BPRTCS   182E    BSTORE D 0621    BSYNC    0004    CDDRA    1844
CDDRC    1846    CHARLM D 064F    CHNINC D 0619    CIIF   D 0617
CLKRST   1412    CMODE    1847    CPRTA    1840    CPRTAC   1848
CPRTAS   184C    CPRTCC   184A    CPRTCS   184E    CVOICE   00B0
CWDATA   0040    DATABF D 0400    DATMSK   0004    DAYOMO   1406
DAYOWK   1405    DELCHN   0B78    DELIMT D 0620    DFFLGS D 063F
DSPLPG D 0632    DUMMY    0033    ECMDEF D 0000    EOM    D 061F
EOMBYT   00E4    EOMCTR D 0648    EOMFLG D 0631    EOMFRM D 0650
ERRTBL C 0000    EXITFL D 0635    FALSE  D 064E    FILL     6E6A
FILLID D 0430    FILLT  D 0555    FLTMCT D 0658    FPCKSM D 0618
FRAMES D 0605    FREQT  D 0000    FRQCAL D 063B    FRQMSK D 061B
FTPTR  D 0626    HIBHI    3ED8    HIBLOW   2A3C    HOPMSK   0002
HUNDRD   1401    HYSTRI D 0655    IDELIM   0083    INCADD D 0628
INCCHN   0C48    INCEND D 062A    INCT   D 0432    INCTBL   6ED2
INPTR  D 0622    INTABP D 062C    INTRLV D 061A    LEGAL  D 0638
MEMORY M 0000    MINUTE   1403    MISSOM D 065B    NCSTCT D 0659
NCSTRU   000B    NONNCS   0004    NXTFRQ D 05FF    OUTPTR D 0624
PAFLT    0002    PAGDET D 061E    PAGE     0040    PAGEFL D 0639
PAGERX D 0643    PAGETX D 0642    PAGFRQ D 05FD    PGDTCT   0001
PNCYCL.  0010    PNKEY  D 0609    PTTI   D 062E    PTTMSK   0001
RCVFLG D 0630    REDLIM   0024    REPAGR D 0653    REPAGT D 0652
RESFLG D 0640    RESTOR D 063A    RESYNC D 0636    RETX     0002
RMATCH D 065A    RMTDOT   0002    RSTINT   0008    RSTRCV   0004
RXBYTS D 0647    RXCLKS   0002    RXCMDW D 061C    RXFLGS D 0633
RXSOMC D 064C    RXSTRB   0080    RXTIME D 05E9    SAMPLE D 065C
SEARCH D 0601    SECTMR D 0656    SNCBYT D 0644    SNCHAR   005A
SNCTIM D 0603    SOMBYT   00A2    SOMCTR D 0649    SQLDIS   0008
SQMSK    0004    SRCHST   0001    SS1ST  D 062F    SSPAGE D 0651
STACK  S 0000    STAT     1414    SYNCTR D 0645    TBYTCT D 0657
TIM1ST D 063D    TIME1  D 05C5    TIME2  D 05CD    TIME3  D 05D5
TIME4  D 05DD    TIMRXD D 0641    TMCALC D 0637    TONE     0004
TRLINE   0010    TXCMDW D 061D    TXDUM  D 064D    TXEOMC D 064A
TXFLGS D 0634    TXFRST D 063C    TXSOMC D 064B    TXTIME D 05E5
TXTRCK   0020    USART    1C01    UTDATA   1C00    VALSOM D 063E
WKAREA D 05ED
```

```
 1      **********************************************************************
 2      *                                                                    *
 3      * NAME: CALCULATE POINTER   (CALPTR)          PPS REF:                *
 4      *                                                                    *
 5      * FILE NAME: CALPTR.SRC                                               *
 6      *                                                                    *
 7      * FUNCTION: CALCULATE ADDRESS OF CHANNEL BIT LOCATION IN INCLUDE TABLE.*
 8      *                                                                    *
 9      * METHOD: N/A                                                         *
10      *                                                                    *
11      * INPUT PARAMETERS:                                                   *
12      * NAME        DESCRIPTION               TYPE    LENGTH     RANGE      *
13      * DE     CHANNEL (WITHOUT BAND BITS, PAGE, OR RCV STROBE)  06CC-0FDB  *
14      *                                                                    *
15      * OUTPUT PARAMETERS:                                                  *
16      * NAME        DESCRIPTION               TYPE    LENGTH     RANGE      *
17      *                                                                    *
18      * DATA ACCESSED OR ALTERED EXTERNAL TO MODULE:                        *
```

```
19     *                                                                    *
20     * NAME           DESCRIPTION           LENGTH           DIR.          *
21     * INCT OR INCTBL RAM OR ROM INCLUDE TABLE   290 BYTES   INPUT         *
22     * INCADD         START ADDRESS OF INC TABLE  2 BYTES    INPUT         *
23     *                                                                    *
24     * RESTRICTIONS: USES ACC,B,C,D,E,H & L REGISTERS                      *
25     *                                                                    *
26     * SUPPORTING MODULES:  NONE                                           *
27     *                                                                    *
28     * COPYRIGHT 1984 ROCKWELL INTERNATIONAL                               *
29     * COLLINS TELECOMMUNICATIONS PRODUCTS DIVISION                        *
30     *                                                                    *
31     * AUTHOR: C. A. BONEBRIGHT             DATE: JAN 3, 1984              *
32     *                                                                    *
33     * VERSION: 1.0                                                        *
34     *                                                                    *
35     * REVISION:                            DATE:                          *
36     *                                                                    *
37     **********************************************************************
38 0000
39                         CSEG
40 0000
41 0000                    TITLE   'CALPTR
42                         NAME    CALPTR
43                         PUBLIC  CALPTR
44                         EXTRN   INCADD,WKAREA,FRQMSK,INTABP
45 0000
46                 * PROCEDURE CALPTR
47 0000           CALPTR:
48                 * * SAVE COPY OF CHANNEL
49 0000 ED 53 00 00  E     LD      (WKAREA),DE           ;SAVE CHANNEL
50 0004
51                 * * SUBTRACT FREQ OFFSET FROM CHANNEL
52 0004 7B                 LD      A,E
53 0005 D6 CC              SUB     0CCH
54 0007 5F                 LD      E,A
55 0008 7A                 LD      A,D
56 0009 DE 06              SBC     A,6
57 000B 57                 LD      D,A
58 000C
59                 * * FETCH INCLUDE TABLE ADDRESS
60 000C
61 000C 2A 00 00   E       LD      HL,(INCADD)
62 000F 4B                 LD      C,E                   ;MUST SAVE 3 LSBITS
63 0010
64                 * * IF CHANNEL < 6CCH (30.0MHZ)
65 0010 30 05 0017          JR      NC,CAL10
66 0012
67                 * * THEN
68                 * * * SUBTRACT 1 FROM INCLUDE TABLE ADDRESS
69 0012 2B                 DEC     HL
70 0013
71                 * * * SET FREQ MASK = 80H
72 0013 3E 80              LD      A,80H
73 0015 18 13 002A         JR      CAL60
74                                                ;THIS ASSUMES CHANNEL = 6CBH * * * *
75 0017
76                 * * ELSE
77 0017           CAL10:
```

```
 78 0017
 79                          * * * DIVIDE BY 8
 80 0017 06 03                       LD      B,3
 81 0019              CAL20:
 82 0019 CB 3A                       SRL     D
 83 001B CB 1B                       RR      E
 84 001D 10 FA 0019                  DJNZ    CAL20
 85 001F
 86                          * * * ADD DIVIDEND TO INCLUDE TABLE ADDRESS
 87 001F 19                          ADD     HL,DE
 88 0020
 89                          * * * FETCH 3 LSBITS OF CHANNEL
 90 0020 79                          LD      A,C
 91 0021 E6 07                       AND     07H
 92 0023 3C                          INC     A
 93 0024 47                          LD      B,A
 94 0025
 95                          * * * CONSTRUCT FREQUENCY MASK
 96 0025 AF                          XOR     A
 97 0026 37                          SCF
 98 0027              CAL40:
 99 0027 17                          RLA
100 0028 10 FD 0027                  DJNZ    CAL40
101 002A
102                          * * END IF
103 002A              CAL60:
104 002A
105.                         * * STORE MASK & POINTER
106 002A 32 00 00  E                 LD      (FRQMSK),A
107 002D 22 00 00  E                 LD      (INTABP),HL
108 0030
109                          * * RESTORE CHANNEL
110 0030 ED 5B 00 00  E              LD      DE,(WKAREA)
111 0034
112                          * END PROCEDURE
113 0034 C9                          RET
114 0035                             END
```

ERRORS = 0000

```
CAL10  C 0017   CAL20  C 0019   CAL40  C 0027   CAL60  C 002A
CALPTR C 0000   FRQMSK E 0002   INCADD E 0000   INTABP E 0003
MEMORY M 0000   STACK  S 0000   WKAREA E 0001
```

```
  1          ******************************************************************
  2          *                                                                *
  3          * NAME: FETCH FREQUENCY PLAN   (FETPLN)        PPS REF:          *
  4          *                                                                *
  5          * FILE NAME: FETPLN.SRC                                          *
  6          *                                                                *
  7          * FUNCTION: TRANSFER FREQUENCY PLAN FROM FILL TO SPECIAL PLACE IN RAM AND *
  8          *           SEPERATE OUT THE CHANNEL INCREMENT NIBBLE FROM THE   *
  9          *           INTERLEAVE FACTOR NIBBLE AND STORE (SEPERATELY).     *
 10          *                                                                *
 11          * METHOD: N/A                                                    *
 12          *                                                                *
 13          * INPUT PARAMETERS:                                              *
 14          * NAME    DESCRIPTION                TYPE      LENGTH    RANGE   *
 15          * HL      RAM OR ROM FILL TABLE ADDRESS        2 BYTES   N/A     *
```

```
16              * BC      LENGTH OF FREQUENCY PLAN              1 BYTE    13 OR 14        *
17              *                                                                          *
18              * OUTPUT PARAMETERS:                                                       *
19              * NAME      DESCRIPTION              TYPE       LENGTH    RANGE            *
20              *                                                                          *
21              * DATA ACCESSED OR ALTERED EXTERNAL TO MODULE:                             *
22              *                                                                          *
23              * NAME        DESCRIPTION              LENGTH              DIR.            *
24              * BND1LO      BAND 1 LOW FREQ          2 BYTES             BOTH            *
25              * CHNINC      CHANNEL INCREMENT        1 BYTE              BOTH            *
26              * INTRLV      INTERLEAVE FACTOR        1 BYTE              OUTPUT          *
27              * CIIF        CHAN INC & INTLV FACTOR  1 BYTE              INPUT           *
28              *                                                                          *
29              * RESTRICTIONS: USES ACC,B,C,D,E,H & L REGISTERS                           *
30              *                                                                          *
31              * SUPPORTING MODULES:  NONE                                                *
32              *                                                                          *
33              * COPYRIGHT 1984 ROCKWELL INTERNATIONAL                                    *
34              * COLLINS TELECOMMUNICATIONS PRODUCTS DIVISION                             *
35              *                                                                          *
36              * AUTHOR: C. A. BONEBRIGHT            DATE: JAN 5, 1984                    *
37              *                                                                          *
38              * VERSION: 1.0                                                             *
39              *                                                                          *
40              * REVISION:                           DATE:                                *
41              *                                                                          *
42              ***************************************************************************
43 0000
44                      CSEG
45 0000
46 0000                 TITLE   'FETPLN'
47                      NAME    FETPLN
48                      PUBLIC  FETPLN
49                      EXTRN   BND1LO,CHNINC,INTRLV,CIIF
50 0000
51              * PROCEDURE FETCH FREQUENCY PLAN
52 0000         FETPLN:
53 0000
54              * * FETCH PLAN & PLACE IN RAM
55 0000 28 04 0006      JR      Z,FET40
56 0002         FET20:
57 0002 09              ADD     HL,BC
58 0003 3D              DEC     A
59 0004 20 FC 0002      JR      NZ,FET20
60 0006         FET40:
61 0006 11 00 00    E   LD      DE,BND1LO
62 0009 ED B0          LDIR
63 000B
64              * * EXTRACT INTERLEAVE FACTOR
65 000B AF              XOR     A
66 000C 21 00 00    E   LD      HL,CIIF
67 000F ED 6F           RLD
68 0011
69              * * IF INTERLEAVE FACTOR = 0
70 0011 20 02 0015      JR      NZ,FET60
71 0013
72              * * THEN
73              * * * SET INTERLEAVE FACTOR = 16
74 0013 3E 10           LD      A,10H
```

```
75 0015
76                          * * END IF
77 0015                     FET60:
78 0015
79                          * * STORE FACTOR
80 0015 32 00 00    E           LD      (INTRLV),A
81 0018
82                          * * EXTRACT CHANNEL INCREMENT
83 0018 ED 6F                   RLD
84 001A
85                          * * IF CHANNEL INCREMENT = 0
86 001A 20 02 001E              JR      NZ,FET80
87 001C
88                          * * THEN
89                          * * * SET CHANNEL INCREMENT = 16
90 001C 3E 10                   LD      A,10H
91 001E
92                          * * END IF
93 001E                     FET80:
94 001E 32 00 00    E           LD      (CHNINC),A
95 0021
96                          * * RESTORE 'CIIF' BYTE (FOR CHECK SUM PURPOSES)
97 0021 ED 6F                   RLD
98 0023
99                          * END PROCEDURE
100 0023 C9                      RET
101 0024                         END

ERRORS = 0000

BND1LO E 0000   CHNINC E 0001   CIIF   E 0003   FET20  C 0002
FET40  C 0006   FET60  C 0015   FET80  C 001E   FETPLN C 0000
INTRLV E 0002   MEMORY M 0000   STACK  S 0000
```

```
 1     *******************************************************************
 2     *                                                                 *
 3     * NAME: PAGE DISPLAY AND TONE MODULE          PPS REF:            *
 4     *                                                                 *
 5     * FILE NAME: PGDSPT.SRC                                           *
 6     *                                                                 *
 7     * FUNCTION: SUBROUTINE FOR DISPLAYING PAGE ON THE FRONT PANEL WHENEVER A *
 8     *           PAGE SIGNAL IS DETECTED AND PRODUCING A PAGE TONE ONLY WHEN *
 9     *           THE TONE IS ENABLED.                                  *
10     *                                                                 *
11     * METHOD:                                                         *
12     *                                                                 *
13     * INPUT PARAMETERS:                                               *
14     *                                                                 *
15     * NAME     DESCRIPTION              TYPE      LENGTH     RANGE    *
16     * HL   ADDRESS OF RESYNC PAGE COUNTER (EITHER REPAGT OR REPAGR)   *
17     *                                                                 *
18     * OUTPUT PARAMETERS:                                              *
19     *                                                                 *
20     * NAME     DESCRIPTION              TYPE      LENGTH     RANGE    *
21     *                                                                 *
22     *                                                                 *
23     * DATA ACCESSED OR ALTERED EXTERNAL TO MODULE:                    *
```

```
24      *                                                                          *
25      * NAME      DESCRIPTION            TYPE    LENGTH    RANGE    DIRECTION *
26      *                                                                          *
27      * PAGEFL    DISPLAY PAGE MODE              1 BYTE             INPUT      *
28      * REPAGR    RCV RESYNC PAGE COUNTER        1 BYTE             INPUT      *
29      * REPAGT    TX RESYNC PAGE COUNTER         1 BYTE             INPUT      *
30      * DSPLPG    DISPLAY PAGE FLAG              1 BYTE             BOTH       *
31      * RESTOR    RESTORE DISPLAY FLAG           1 BYTE             BOTH       *
32      * FLTFLG    FALUT REGISTER FOR CNTRL       1 BYTE             OUTPUT     *
33      * SECTMR    SECOND TIMER/COUNTER           1 BYTE             BOTH       *
34      *                                                                          *
35      * RESTRICTIONS: USES ACC,B,H AND L REGISTERS                               *
36      *                                                                          *
37      * SUPPORTING MODULES:                                                      *
38      *            DO - DATA OUT; OUTPUTS DATA TO THE DISPLAY (CONTROL)          *
39      *                                                                          *
40      * COPYRIGHT 1983 ROCKWELL INTERNATIONAL                                    *
41      * COLLINS TELECOMMUNICATIONS PRODUCTS DIVISION                             *
42      *                                                                          *
43      * AUTHOR: C. A. BONEBRIGHT              DATE: 01-11-83                     *
44      *                                                                          *
45      * VERSION: 1.0                                                             *
46      *                                                                          *
47      * REVISION:                             DATE:                              *
48      *                                                                          *
49      **************************************************************************
50              CSEG
51 0000         TITLE   'PGDSPT'
52              NAME    PGDSPT
53              PUBLIC  PGDSPT
54              EXTRN   DSPLPG,RESTOR,DO,FLTFLG,PAGEFL,SECTMR
55              EXTRN   APRTBC,APRTBS,TONE,PAGELG,NETID
56 0000
57      * PROCEDURE PGDSPT
58 0000 PGDSPT:
59 0000
60      * * IF PAGE DISPLAY FLAG SET
61 0000 3A 00 00    E      LD    A,(DSPLPG)
62 0003 B7                 OR    A
63 0004 28 12 0018         JR    Z,PT10
64 0006
65      * * THEN
66      * * * DISPLAY PAGE
67 0006 21 00 00    E      LD    HL,FLTFLG
68 0009 CB F6              SET   6,(HL)
69 000B 11 00 00    E      LD    DE,PAGELG
70 000E CD 00 00    E      CALL  DO
71 0011
72      * * * CLEAR FLAG
73 0011 AF                 XOR   A
74 0012 32 00 00    E      LD    (DSPLPG),A
75 0015
76      * * ELSE
77 0015 C3 99 00    C      JP    PT100
78 0018 PT10:
79 0018
80      * * * IF RESTORE DISPLAY FLAG IS SET
81 0018 3A 00 00    E      LD    A,(RESTOR)
82 001B B7                 OR    A
```

```
83 001C 28 16 0034                  JR      Z,PT20
84 001E
85                       * * * THEN
86                       * * * DISABLE TONE
87 001E 3E 00         E             LD      A,.LOW.TONE
88 0020 32 00 00      E             LD      (APRTBS),A
89 0023
90                       * * * * RESTORE DISPLAY
91 0023 21 00 00      E             LD      HL,FLTFLG
92 0026 CB B6                       RES     6,(HL)
93 0028 11 00 00      E             LD      DE,NETID
94 002B CD 00 00      E             CALL    DO
95 002E
96                       * * * * CLEAR RESTORE FLAG
97 002E AF                          XOR     A
98 002F 32 00 00      E             LD      (RESTOR),A
99 0032
100                      * * * ELSE
101 0032 18 65 0099               JR      PT100
102 0034                 PT20:
103 0034
104                      * * * * IF PAGE FLAG IS SET
105 0034 3A 00 00      E            LD      A,(PAGEFL)
106 0037 B7                         OR      A
107 0038 28 5F 0099                 JR      Z,PT100
108 003A
109                      * * * * THEN
110                      * * * * * CASE OF SECOND TIMER VALUE
111 003A
112                      * * * * * WHEN SECOND = 0 OR 2
113 003A 3A 00 00      E            LD      A,(SECTMR)
114 003D B7                         OR      A
115 003E 28 04 0044                 JR      Z,PT30
116 0040 FE 02                      CP      2
117 0042 20 33 0077                 JR      NZ,PT80
118 0044
119                      * * * * * * IF PAGE TONE FLAG SET
120 0044                 PT30:
121 0044 3A 00 00      E            LD      A,(PAGEFL)
122 0047 CB 7F                      BIT     7,A
123 0049 28 4E 0099                 JR      Z,PT100
124 004B
125                      * * * * * * THEN
126 004B
127                      * * * * * * CASE TONE ON/OFF (RESYNC PAGE COUNTER)
128 004B 7E                         LD      A,(HL)
129 004C
130                      * * * * * * WHEN TONE ON/OFF = 0
131 004C B7                         OR      A
132 004D 20 07 0056                 JR      NZ,PT40
133 004F
134                      * * * * * * ENABLE TONE
135 004F 3E 00         E            LD      A,.LOW.TONE
136 0051 32 00 00      E            LD      (APRTBC),A
137 0054
138 0054 18 43 0099                 JR      PT100
139 0056
140                      * * * * * * WHEN TONE ON/OFF = 1
```

```
141 0056                        PT40:
142 0056 FE 01                          CP      1
143 0058 20 07 0061                     JR      NZ,PT50
144 005A
145                             * * * * * * * DISABLE TONE
146 005A 3E 00          E               LD      A,.LOW.TONE
147 005C 32 00 00       E               LD      (APRTBS),A              ;BIT 2
148 005F
149 005F 18 38 0099                     JR      PT100
150 0061
151                             * * * * * * WHEN TONE ON/OFF = 2
152 0061                        PT50:
153 0061 FE 02                          CP      2
154 0063 20 07 006C                     JR      NZ,PT60
155 0065
156                             * * * * * * * ENABLE TONE
157 0065 3E 00          E               LD      A,.LOW.TONE
158 0067 32 00 00       E               LD      (APRTBC),A
159 006A
160 006A 18 2D 0099                     JR      PT100
161 006C
162                             * * * * * * WHEN TONE ON/OFF = 3
163 006C                        PT60:
164 006C FE 03                          CP      3
165 006E 20 29 0099                     JR      NZ,PT100
166 0070
167                             * * * * * * * DISABLE TONE
168 0070 3E 00          E               LD      A,.LOW.TONE
169 0072 32 00 00       E               LD      (APRTBS),A
170 0075
171                             * * * * * * * END CASE
172 0075                        PT70:
173 0075 18 22 0099                     JR      PT100
174 0077
175                             * * * * * * END IF
176 0077
177                             * * * * * WHEN SECONDS > 11
178 0077                        PT80:
179 0077 FE 0B                          CP      11
180 0079 38 07 0082                     JR      C,PT85
181 007B
182                             * * * * * SET SECONDS = 0FFH
183 007B 3E FF                          LD      A,0FFH
184 007D 32 00 00       E               LD      (SECTMR),A
185 0080
186 0080 18 17 0099                     JR      PT100
187 0082
188                             * * * * * WHEN SECONDS = 5
189 0082                        PT85:
190 0082 FE 05                          CP      5
191 0084 20 05 008B                     JR      NZ,PT90
192 0086
193                             * * * * * SET RESTORE DISPLAY FLAG
194 0086 32 00 00       E               LD      (RESTOR),A
195 0089
196 0089 18 0E 0099                     JR      PT100
197 008B
198                             * * * * * WHEN SECONDS = 9
199 008B                        PT90:
```

```
200 008B FE 09                        CP       9
201 008D 20 05 0094                   JR       NZ,PT95
202 008F
203                       * * * * * SET DISPLAY PAGE FLAG
204 008F 32 00 00      E              LD       (DSPLPG),A
205 0092
206 0092 18 05 0099                   JR       PT100
207 0094
208                       * * * * * ELSE
209 0094                  PT95:
210                       * * * * * DISABLE TONE
211 0094 3E 00         E              LD       A,.LOW.TONE
212 0096 32 00 00      E              LD       (APRTBS),A
213 0099
214                       * * * * END CASE
215 0099
216                       * * * END IF
217 0099
218                       * * END IF
219 0099
220                       * * END IF
221 0099                  PT100:
222 0099
223                       * END PROCEDURE
224 0099 C9                            RET
225 009A                               END

ERRORS = 0000

APRTBC E 0006    AFRTBS E 0007    DO       E 0002    DSPLPG E 0000
FLTFLG E 0003    MEMORY M 0000    NETID    E 000A    PAGEFL E 0004
PAGELG E 0009    PGDSPT C 0000    PT10     C 0018    PT100  C 0099
PT20   C 0034    PT30   C 0044    PT40     C 0056    PT50   C 0061
PT60   C 006C    PT70   C 0075    PT80     C 0077    PT85   C 0082
PT90   C 008B    PT95   C 0094    RESTOR   E 0001    SECTMR E 0005
STACK  S 0000    TONE   E 0008
```

```
 1     ;***********************************************************************
 2     ;*                                                                     *
 3     ;* NAME: WEEK EQUAL MONTH                (WKEQMO)                      *
 4     ;*                                                                     *
 5     ;* FILE NAME:  WKEQMO.SRC                                              *
 6     ;*                                                                     *
 7     ;* FUNCTION:  SET RTC'S DAY OF MONTH REGISTER EQUAL TO THE DAY OF THE  *
 8     ;*            WEEK REGISTER, IF NOT ALREADY EQUAL. (AND SET ACCUMULATOR)*
 9     ;*                                                                     *
10     ;* METHOD:  N/A                                                        *
11     ;*                                                                     *
12     ;* INPUT PARAMETERS:                                                   *
13     ;*                                                                     *
14     ;* NAME       DESCRIPTION              TYPE    LENGTH     RANGE        *
15     ;*                                                                     *
16     ;* OUTPUT PARAMETERS:                                                  *
17     ;*                                                                     *
18     ;* NAME       DESCRIPTION              TYPE    LENGTH     RANGE        *
19     ;* ACC        'NOT EQUAL FLAG'                 1 BYTE     00 OR FF(HEX)*
20     ;*                                                                     *
```

```
21              ;* DATA ACCESSED OR ALTERED EXTERNAL TO MODULE:                       *
22              ;*                                                                    *
23              ;* NAME      DESCRIPTION              TYPE    LENGTH  RANGE  DIRECTION *
24              ;*                                                                    *
25              ;* DAYOWK    RTC'S DAY OF WEEK REG.                   1-7    INPUT    *
26              ;* DAYOMO    RTC'S DAY OF MONTH REG.                  1-31   OUTPUT   *
27              ;* STAT      RTS'S STATUS REGISTER                           INPUT    *
28              ;*                                                                    *
29              ;* RESTRICTIONS:   USES ACC AND H,L REGISTERS                         *
30              ;*                 REWRITES DAY OF MONTH REGISTER IN RTC              *
31              ;*                                                                    *
32              ;* SUPPORTING MODULES:    NONE                                        *
33              ;*                                                                    *
34              ;* COPYRIGHT 1982 ROCKWELL INTERNATIONAL                              *
35              ;* COLLINS TELECOMMUNICATIONS PRODUCT DIVISION                        *
36              ;*                                                                    *
37              ;* AUTHOR:  C A BONEBRIGHT                    DATE:  6/15/82          *
38              ;*                                                                    *
39              ;* VERSION:  1.0                                                      *
40              ;*                                                                    *
41              ;* REVISION:                                  DATE:                   *
42              ;*                                                                    *
43              ;*********************************************************************
44 0000
45 0000
46 0000                  TITLE   'WKEQMO
47.                      NAME    WKEQMO
48                       PUBLIC  WKEQMO
49                       EXTRN   DAYOWK,DAYOMO,STAT
50 0000
51                       CSEG
52 0000
53              * PROCEDURE WKEQMO
54 0000         WKEQMO:
55 0000
56              * * READ DAY OF MONTH AND DAY OF WEEK
57 0000
58 0000 DB 00        E           IN      A,(.LOW.DAYOWK)
59 0002 6F                       LD      L,A
60 0003 DB 01        E           IN      A,(.LOW.DAYOWK+1)
61 0005 67                       LD      H,A
62 0006 DB 00        E           IN      A,(.LOW.STAT)
63 0008 CB 47                    BIT     0,A
64 000A C2 00 00     C           JP      NZ,WKEQMO
65 000D
66              * * IF DAY OF MONTH DOES NOT EQUAL DAY OF WEEK
67 000D
68 000D 7D                       LD      A,L              ;DAY OF WEEK
69 000E BC                       CP      H
70 000F CA 19 00     C           JP      Z,WK20
71              * * THEN
72 0012
73              * * * SET DAY OF MONTH = DAY OF WEEK AND SET ACCUMULATOR
74 0012
75 0012 D3 00        E           OUT     (.LOW.DAYOMO),A
76 0014 3E FF                    LD      A,0FFH
77 0016 C3 1A 00     C           JP      WK30
78              * * ELSE
79 0019
```

```
80 0019                    WK20:
81                         * * * CLEAR ACCUMULATOR
82 0019
83 0019 AF                         XOR     A
84                         * * END IF
85 001A
86 001A                    WK30:
87                         * END PROCEDURE
88 001A
89 001A C9                         RET
90 001B                            END

ERRORS = 0000

DAYOMO E 0001   DAYOWK E 0000   MEMORY M 0000   STACK  S 0000
STAT   E 0002   WK20   C 0019   WK30   C 001A   WKEQMO C 0000
```

```
 1      ;*********************************************************************
 2      ;*                                                                   *
 3      ;* NAME:  BIT VOTE              BTVOTE                               *
 4      ;*                                                                   *
 5      ;* FILE NAME:  BTVOTE.SRC                                            *
 6      ;*                                                                   *
 7      ;* FUNCTION:  TAKE A VOTE ON THE 1 / 0 VALUE OF ALL 8 BITS OF THE    *
 8      ;*            PASSED TIME BYTE.  THIS CREATES A BYTE VOTE VALUE FOR EACH BIT *
 9      ;*                                                                   *
10      ;* METHOD:  N/A                                                      *
11      ;*                                                                   *
12      ;* INPUT PARAMETERS:                                                 *
13      ;*                                                                   *
14      ;*    NAME      DESCRIPTION             TYPE      LENGTH    RANGE    *
15      ;*                                                                   *
16      ;*    C         DATA BYTE               BINARY    1 BYTE    0-FF     *
17      ;*    HL        BIT VOTE BUFFER ADDRESS BINARY    2 BYTES            *
18      ;*                                                                   *
19      ;* OUTPUT PARAMETERS:                                                *
20      ;*                                                                   *
21      ;*    NAME      DESCRIPTION             TYPE      LENGTH    RANGE    *
22      ;*                                                                   *
23      ;* RESTRICTIONS:                                                     *
24      ;*                                                                   *
25      ;* DATA ACCESSED OR ALTERED EXTERNAL TO MODULE:                      *
26      ;*                                                                   *
27      ;*    NAME      DESCRIPTION             TYPE      LENGTH  RANGE  DIRECTION *
28      ;*                                                                   *
29      ;*    TIME1     TIME BYTE 1 BUFFER                8 BYTES        OUTPUT *
30      ;*    TIME2     TIME BYTE 2 BUFFER                8 BYTES        OUTPUT *
31      ;*    TIME3     TIME BYTE 3 BUFFER                8 BYTES        OUTPUT *
32      ;*    TIME4     TIME BYTE 4 BUFFER                8 BYTES        OUTPUT *
33      ;*                                                                   *
34      ;* RESTRICTIONS:                                                     *
35      ;*                                                                   *
36      ;*     USES ACC,B,C,H,AND L REGISTERS                                *
37      ;*                                                                   *
38      ;* SUPPORTING MODULES:                                               *
39      ;*     NONE                                                          *
40      ;* COPYRIGHT 1981 ROCKWELL INTERNATIONAL                             *
```

```
41                      ;* COLLINS TELECOMMUNICATIONS PRODUCTS DIVISION              *
42                      ;*                                                            *
43                      ;* AUTHOR:  C. BONEBRIGHT                  DATE:  05/13/82    *
44                      ;*                                                            *
45                      ;* VERSION:  1.0                                              *
46                      ;*                                                            *
47                      ;* REVISED:                                DATE:              *
48                      ;*                                                            *
49                      ;*************************************************************/
50 0000                 EJECT
51 0000                         TITLE  'BTVOTE
52 0000
53                              NAME    BTVOTE
54                              PUBLIC  BTVOTE
55 0000
56                              CSEG
57 0000
58                      ;* PROCEDURE BTVOTE
59 0000                 BTVOTE:
60                      ;* FETCH TIME BYTE
61 0000 79                      LD      A,C
62 0001
63                      ;* DO REPEAT 8 TIMES
64 0001 06 08                   LD      B,8
65 0003
66                      ;* * IF BIT=1
67 0003                 BV00:
68 0003 17                      RLA
69 0004 D2 0B 00   C            JP      NC,BV10
70 0007
71                      ;* * THEN
72                      ;* * * ADD ONE TO BIT BUFFER
73 0007 34                      INC     (HL)
74 0008 C3 0C 00   C            JP      BV20
75 000B
76                      ;* * ELSE
77 000B                 BV10:
78 000B
79                      ;* * * SUBTRACT ONE FROM BIT BUFFER
80 000B 35                      DEC     (HL)
81 000C
82                      ;* * END IF
83 000C                 BV20:
84 000C
85                      ;* * INCREMENT BIT BUFFER POINTER
86 000C 23                      INC     HL
87 000D
88                      ;* END REPEAT
89 000D 10 F4 0003              DJNZ    BV00
90 000F
91                      ;* END PROCEDURE
92 000F C9                      RET
93 0010                         END

ERRORS = 0000

BTVOTE C 0000    BV00   C 0003    BV10    C 000B    BV20    C 000C
EJECT    0000    MEMORY M 0000    STACK   S 0000
```

```
;*********************************************************************
;*                                                                   *
;*      NAME:  RECEIVE FAULTS    (RXFLTS)     PPS REF                *
;*                                                                   *
;*      FILE NAME: RXFLTS.SRC                                        *
;*                                                                   *
;*      FUNCTION: CHECKS STATUS OF FAULTS FOR RECEIVER OR SYNC       *
;*                SEARCH HOP & TIME MODES AND SETS FLAGS TO REFLECT  *
;*                STATUS.                                            *
;*                                                                   *
;*      METHOD: N/A                                                  *
;*                                                                   *
;*      INPUT PARAMETERS:                                            *
;*                                                                   *
;*      NAME       DESCRIPTION              TYPE    LENGTH   RANGE   *
;*      NONE                                                         *
;*                                                                   *
;*      OUTPUT PARAMETERS:                                           *
;*                                                                   *
;*      NAME       DESCRIPTION              TYPE    LENGTH   RANGE   *
;*      A          STATUS OF FAULTS (DFFLTS)  BOOLEAN 1 BYTE   N/A   *
;*                                                                   *
;*      DATA ACESSED OR ALTERED EXTERNAL TO MODULE:                  *
;*                                                                   *
;*      NAME       DESCRIPTION          TYPE   LENGTH RANGE  DIRECT  *
;*      DFFLGS     DISPAY/FAULT FLAGS   BOOLEAN 1 BYTE  N/A    BOTH  *
;*                                                                   *
;*      RESTRICTIONS: USES ACCUMULATOR                               *
;*                                                                   *
;*      SUPPORTING MODULES: NONE                                     *
;*                                                                   *
;*      COPYRIGHT 1983 ROCKWELL INTERNATIONAL                        *
;*      COLLINS TELECOMMUNICATIONS PRODUCT DIVISION                  *
;*                                                                   *
;*      AUTHOR:  C A BONEBRIGHT         DATE:  JULY 19, 1983         *
;*                                                                   *
;*      VERSION: 1.0                                                 *
;*                                                                   *
;*      REVISION:                       DATE:                        *
;*                                                                   *
;*********************************************************************

CSEG
                TITLE   'RXFLTS
                NAME    RXFLTS
                PUBLIC  RXFLTS
                EXTRN   BATFLT,DFFLGS,APRTC

;* PROCEDURE RECEIVE FAULTS
RXFLTS:

;* * IF BATTERY = FAULT
                LD      A,(APRTC)
                AND     .LOW.BATFLT
                JR      Z,RXF20

;* * THEN
        ;* * * IF BATTERY FAULT NOT ALREADY SET
```

```
59 0007 3A 00 00      E         LD      A,(DFFLGS)
60 000A E6 01                   AND     01H
61 000C 20 12 0020              JR      NZ,RXF50
62 000E
63                              ;* * * THEN
64                              ;* * * * SET DISPLAY BATTERY FAULT FALG AND KEY INHIBIT FLAG
65 000E 3E 45                   LD      A,45H
66 0010 32 00 00      E         LD      (DFFLGS),A
67 0013
68                              ;* * * END IF
69 0013 18 0B 0020              JR      RXF50
70 0015
71                              ;* * ELSE
72 0015                 RXF20:
73 0015
74                              ;* * * IF FAULT FLAGS SET
75 0015 3A 00 00      E         LD      A,(DFFLGS)
76 0018 B7                      OR      A
77 0019 28 05 0020              JR      Z,RXF40
78 001B
79                              ;* * * THEN
80                              ;* * * * SET DISPLAY NET ID FLAG & CLEAR KEY INHIBIT & FAULT FLAGS
81 001B 3E 80                   LD      A,80H
82 001D 32 00 00      E         LD      (DFFLGS),A
83 0020
84                              ;* * * END IF
85 0020                 RXF40:
86 0020
87                              ;* * END IF
88 0020                 RXF50:
89 0020
90                              ;* END PROCEDURE
91 0020 C9                      RET
92 0021                         END

ERRORS = 0000

APRTC   E 0002   BATFLT E 0000   DFFLGS E 0001   MEMORY M 0000
RXF20   C 0015   RXF40  C 0020   RXF50  C 0020   RXFLTS C 0000
STACK   S 0000
```

```
 1     ********************************************************************
 2     *                                                                  *
 3     * NAME: EXIT RECEIVE (EXITRX)              PPS REF:                *
 4     *                                                                  *
 5     * FILE NAME: EXITRX.SRC                                            *
 6     *                                                                  *
 7     * FUNCTION: DOES IMMEDIATELY NECESSARY HOUSEKEEPING TO EXIT THE RECEIVE *
 8     *           MODE. IE:SETS & CLEARS FLAGS, DISABLES USART & RCVFRM INTER- *
 9     *           RUPTS, LOWERS RECEIVE CLOCK START & RE-ENABLES BIT TRACKING. *
10     *                                                                  *
11     * METHOD: N/A                                                      *
12     *                                                                  *
13     * INPUT PARAMETERS:                                                *
14     * NAME       DESCRIPTION         TYPE      LENGTH     RANGE        *
15     *                                                                  *
16     * OUTPUT PARAMETERS:                                               *
17     * NAME       DESCRIPTION         TYPE      LENGTH     RANGE        *
```

```
 18              *                                                              *
 19              * DATA ACCESSED OR ALTERED EXTERNAL TO MODULE:                 *
 20              *                                                              *
 21              * NAME     DESCRIPTION        TYPE     LENGTH   RANGE    DIR.  *
 22              * RCVFLG   RECEIVE MODE FLAG  BINARY   1 BYTE   0,0FFH   OUTPUT *
 23              * EOMFLG   END OF MESSAGE FLAG BINARY  1 BYTE   0,0FFH   OUTPUT *
 24              * TIMRXD   RCV'D TIME BTYE CTR BINARY  1 BYTE   0-6      OUTPUT *
 25              * SS1ST    SYNC SEARCH 1ST FLAG BOOLEAN 1 BYTE  0,0FFH   OUTPUT *
 26              * MISSOM   MISSED SOM COUNTER BINARY   1 BYTE   0-2      OUTPUT *
 27              * RESFLG   RESYNC SOM FLAGS   BOOLEAN  1 BYTE   N/A      OUTPUT *
 28              *                                                              *
 29              * RESTRICTIONS: USES ACC                                       *
 30              *                                                              *
 31              * SUPPORTING MODULES:                                          *
 32              * NONE                                                         *
 33              *                                                              *
 34              * COPYRIGHT 1982 ROCKWELL INTERNATIONAL                        *
 35              * COLLINS TELECOMMUNICATIONS PRODUCTS DIVISION                 *
 36              *                                                              *
 37              * AUTHOR: C. A. BONEBRIGHT          DATE: JUNE 29, 1982        *
 38              *                                                              *
 39              * VERSION: 1.0                                                 *
 40              *                                                              *
 41              * REVISION:                    DATE:                           *
 42              *                                                              *
 43              ****************************************************************
 44 0000
 45 0000                   TITLE   'EXITRX
 46                        NAME    EXITRX
 47.                       PUBLIC  EXITRX
 48                        EXTRN   RCVFLG,EOMFLG,USART,CPRTCC,CPRTAC,TIMRXD
 49                        EXTRN   BITRCK,RXCLKS,CPRTCS,SRCHST,SS1ST,MISSOM,RESFLG
 50 0000
 51                        CSEG
 52 0000
 53 0000
 54              * PROCECURE EXITRX
 55 0000         EXITRX:
 56 0000
 57              * * RESET RCV CLOCK START LINE (= '0')
 58 0000 3E 00         E   LD      A,.LOW.RXCLKS         ;LOWER RX CLOCK START
 59 0002 32 00 00      E   LD      (CPRTCC),A
 60 0005
 61              * * SET EOM FLAG & SYNC SEARCH 1ST FLAG
 62 0005 3E FF             LD      A,0FFH
 63 0007 32 00 00      E   LD      (EOMFLG),A
 64 000A 32 00 00      E   LD      (SS1ST),A
 65 000D
 66              * * SET SEARCH START LINE HIGH TO INHIBIT RXCLK
 67 000D 3E 00         E   LD      A,.LOW.SRCHST
 68 000F 32 00 00      E   LD      (CPRTCS),A
 69 0012
 70              * * CLEAR RECEIVE AND RESYNC SOM FRAME FLAGS
 71 0012 AF               XOR     A
 72 0013 32 00 00      E   LD      (RCVFLG),A
 73 0016 32 00 00      E   LD      (RESFLG),A
 74 0019
 75              * * CLEAR TIME BYTES RECEIVED & MISSED SOM COUNTERS
```

```
76 0019 32 00 00       E         LD      (TIMRXD),A
77 001C 32 00 00       E         LD      (MISSOM),A
78 001F
79                         * * DISABLE USART & RCVFRM INTERRUPTS
80 001F 32 00 00       E         LD      (USART),A           ;WRITE 00H TO COMMAND REGISTER
81 0022 3E 04                    LD      A,4
82 0024 D3 BB                    OUT     (0BBH),A            ;ENABLE INTERNAL FRAME MARK ONLY
83 0026
84                         * * RE-ENABLE BIT TRACKING
85 0026 3E 00          E         LD      A,.LOW.BITRCK
86 0028 32 00 00       E         LD      (CPRTAC),A
87 002B
88                         * END PROCEDURE
89 002B C9                       RET
90 002C                          END

ERRORS = 0000

BITRCK E 0006    CPRTAC E 0004    CPRTCC E 0003    CPRTCS E 0008
EOMFLG E 0001    EXITRX C 0000    MEMORY M 0000    MISSOM E 000B
RCVFLG E 0000    RESFLG E 000C    RXCLKS E 0007    SRCHST E 0009
SS1ST  E 000A    STACK  S 0000    TIMRXD E 0005    USART  E 0002
```

```
*****************************************************************
*                                                                *
* NAME:  CHECK INCLUDE TABLE    (CHKINC)          PPS REF        *
*                                                                *
* FILE NAME:  CHKINC.SRC                                         *
*                                                                *
* FUNCTION:  PERFORMS CHECK SUM CHECK ON INCLUDE TABLE AND SETS A3*
*            FAULT IN FLTFLG IF SUM IS BAD.                      *
*                                                                *
* METHOD: MODULO 8 CHECK SUM                                     *
*                                                                *
* INPUT PARAMETERS:  NONE                                        *
*                                                                *
* OUTPUT PARAMETERS:                                             *
*    NAME    DESCRIPTION         TYPE   LENGTH   RANGE    DIR    *
*                                                                *
*    ACC     GOOD CHECK SUM IF =0       1 BYTE   0-FFH           *
*                                                                *
* DATA ACCESSED OR ALTERED EXTERNAL TO MODULE:                   *
*    NAME    DESCRIPTION         TYPE   LENGTH   RANGE    DIR    *
*                                                                *
*    FLTFLG  FAULT FLAG                 1 BIT(5)          OUTPUT *
*    INCT    INCLUDE TABLE (RAM)        291 BYTES         INPUT  *
*                                                                *
* RESTRICTIONS:  USES ACC,B,C,H,& L REGISTERS                    *
*                                                                *
* SUPPORTING MODULES:  NONE                                      *
*                                                                *
* COPYRIGHT 1983 ROCKWELL INTERNATIONAL                          *
* COLLINS TELECOMMUNICATIONS PRODUCT DIVISION                    *
*                                                                *
* AUTHOR:  C A BONEBRIGHT            DATE:  4/13/83              *
*                                                                *
```

```
34                    * VERSION: 1.1                                              *
35                    *                                                           *
36                    * REVISION:  C A BONEBRIGHT            DATE: 01/06/84       *
37                    *                                                           *
38                    **************************************************************
39 0000
40                            CSEG
41 0000                       TITLE   'CHKINC
42                            NAME    CHKINC
43                            PUBLIC  CHKINC
44                            EXTRN   INCT,FLTFLG
45 0000
46                    * PROCEDURE CHECK INCLUDE TABLE
47 0000               CHKINC:
48 0000
49                    * * INIT REGISTERS
50 0000 AF                    XOR     A
51 0001 21 00 00   E           LD      HL,INCT
52 0004 01 23 01              LD      BC,291
53 0007
54                    * * DO UNTIL ALL INCLUDE TABLE BYTES ADDED
55 0007               CIN05:
56 0007 86                    ADD     A,(HL)
57 0008 23                    INC     HL
58 0009 0D                    DEC     C
59 000A 20 FB 0007            JR      NZ,CIN05
60 000C 05                    DEC     B
61 000D
62                    * * END UNTIL
63 000D F2 07 00    C          JP      P,CIN05
64 0010
65                    * * IF CHECK SUM NOT VALID (NOT ZERO)
66 0010 B7                    OR      A
67 0011 28 05 0018            JR      Z,CIN10
68 0013
69                    * * THEN
70 0013
71                    * * * SET A3 FAULT FLAG
72 0013 21 00 00    E          LD      HL,FLTFLG
73 0016 CB EE                 SET     5,(HL)
74 0018
75                    * * END IF
76 0018               CIN10:
77 0018 C9                    RET
78 0019
79                    * END PROCEDURE
80 0019
81 0019                       END

ERRORS = 0000

CHKINC C 0000    CIN05  C 0007    CIN10 C 0018    FLTFLG E 0001
INCT   E 0000    MEMORY M 0000    STACK S 0000
```

```
****************************************************************
*                                                              *
* NAME: TRANSMIT READY (TXRDY)              PPS REF            *
*                                                              *
* FILE NAME: TXRDY.SRC                                         *
*                                                              *
* FUNCTION: RSTC INTERRUPT SERVICE ROUTINE DRIVEN BY TXRDY OUTPUT OF *
*           USART. OUTPUTS A DATA BYTE (TO BE TRANSMITTED) TO THE   *
*           USART. CONSTRUCTS SYNC, TIME, RESYNC, DUMMY, SOM, AND EOM *
*           FRAMES IN TRANSMIT MODES.                          *
*                                                              *
* METHOD:                                                      *
*                                                              *
* INPUT PARAMETERS:                                            *
*                                                              *
* NAME         DESCRIPTION           TYPE     LENGTH   RANGE   *
*                                                              *
*                                                              *
* OUTPUT PARAMETERS:                                           *
*                                                              *
* NAME         DESCRIPTION           TYPE     LENGTH   RANGE   *
*                                                              *
*                                                              *
* DATA ACCESSED OR ALTERED EXTERNAL TO MODULE:                 *
*                                                              *
* NAME         DESCRIPTION      TYPE     LENGTH   RANGE   DIR  *
*                                                              *
* TXFLGS   TX FLAGS                      1 BYTE   0-6,16  BOTH *
* SNCBYT   SYNC FRAME BYTE COUNTER       1 BYTE   0-20    BOTH *
* TXEOMC   TX EOM COUNTER                1 BYTE   0-21    BOTH *
* TXSOMC   TX SOM COUNTER                1 BYTE   0-19    BOTH *
* PTTI     PTT INTERNAL FLAG             1 BIT            BOTH *
* OUTPTR   DATA BUFFER OUTPUT POINTER    2 BYTES          BOTH *
* INPTR    DATA BUFFER INPUT POINTER     2 BYTES          INPUT*
* EOM      EOM BYTE BUFFER (TX)          1 BYTE           BOTH *
* EOMFRM   EOM FRAME COUNTER (TX)        1 BYTE           BOTH *
* SS1ST    SYNC SEARCH 1ST FLAG          1 BYTE           OUTPUT*
* TXDUM    DUMMY BYTE COUNTER (TX)       1 BYTE           BOTH *
* SNCTIM   SYNC FRAME TIME BYTES (TX)    2 BYTES          INPUT*
* DELIMT   DELIMIT BYTE BUFFER           1 BYTE           BOTH *
* TIM1ST   TIME FIRST SYNC FRAME FLAG    1 BYTE           BOTH *
* FRAMES   FULL FRAME COUNT              4 BYTES          INPUT*
* TXCMDW   TX COMMAND WORD BUFFER        1 BYTE           INPUT*
* TBYTCT   TIME BYTE COUNTER             1 BYTE           BOTH *
* SAMPLE   SAMPLE TIME COUNTER           1 BYTE           BOTH *
*                                                              *
* SUPPORTING MODULES:   NONE                                   *
*                                                              *
* COPYRIGHT 1982 ROCKWELL INTERNATIONAL                        *
* COLLINS TELECOMMUNICATIONS PRODUCTS DIVISION                 *
*                                                              *
* AUTHOR: C. A. BONEBRIGHT              DATE: MAY 12, 1982     *
*                                                              *
* VERSION: 1.1                                                 *
*                                                              *
* REVISION: 1.1  EOM HPA MODE FIX       DATE: MARCH 8, 1984    *
*                                                              *
****************************************************************
```

```
59 0000                              TITLE    'TXRDY
60 0000                              NAME     TXRDY
61                                   PUBLIC   TXRDY
62                                   EXTRN    PTTI,TXFLGS,INPTR,OUTPTR,EOMBYT,UTDATA
63                                   EXTRN    TXEOMC,APRTBC,SS1ST,SOMBYT,TXSOMC,SNCBYT
64                                   EXTRN    SNCTIM,DELIMT,SNCHAR,BITSNC,BPRTC
65                                   EXTRN    DUMMY,TXDUM,USART,TRLINE,EOM,EOMFRM,TXCMDW
66                                   EXTRN    REDLIM,TBYTCT,FRAMES,TIM1ST,CPRTAC,CPRTAS,TXTRCK
67                                   EXTRN    SAMPLE,ADDRA
68
69 0000
70                                   CSEG
71 0000
72                              * PROCEDURE TXRDY
73 0000                         TXRDY:
74 0000
75                              * * SAVE REGISTERS
76 0000 F5                              PUSH     AF
77 0001 E5                              PUSH     HL
78 0002
79                              * * IF TRANSMIT
80 0002 3A 00 00        E              LD       A,(PTTI)
81 0005 CB 47                          BIT      0,A
82 0007 CA 86 01        C              JP       Z,TX200
83 000A
84                              * * THEN
85                              * * * IF SYNC FRAMES SENT
86 000A 3A 00 00        E              LD       A,(TXFLGS)
87 000D CB 5F                          BIT      3,A
88 000F CA F1 00        C              JP       Z,TX100
89 0012
90                              * * * THEN
91                              * * * * CASE TYPE OF BYTE
92 0012
93                              * * * * WHEN BYTE = DATA
94 0012                         TX20:
95 0012 CB 6F                          BIT      5,A
96 0014 28 3C 0052                     JR       Z,TX50
97 0016
98                              * * * * * FETCH AND OUTPUT DATA BYTE FROM BUFFER
99 0016 2A 00 00        E              LD       HL,(OUTPTR)
100 0019 7E                            LD       A,(HL)
101 001A 32 00 00       E              LD       (UTDATA),A
102 001D
103                             * * * * * INC DATA OUT PTR
104 001D 23                            INC      HL
105 001E
106                             * * * * * IF POINTER > END OF BUFFER
107 001E 3E 30                         LD       A,48
108 0020 BD                            CP       L
109 0021 20 02 0025                    JR       NZ,TX30
110 0023
111                             * * * * * THEN
112                             * * * * * * SET POINTER=BEGINNING OF BUFFER
113 0023 2E 00                         LD       L,0
114 0025
115                             * * * * * END IF
116 0025                        TX30:
```

```
117 0025 22 00 00    E          LD      (OUTPTR),HL
118 0028
119                             * * * * * IF DATA OUT PTR=DATA IN POINTER
120 0028 3A 00 00    E          LD      A,(INPTR)
121 002B BD                     CP      L
122 002C 20 17 0045             JR      NZ,TX35
123 002E
124                             * * * * * THEN
125                             * * * * * * SET EOM FLAG
126 002E 3E 48                  LD      A,48H
127 0030 32 00 00    E          LD      (TXFLGS),A
128 0033
129                             * * * * * * LOAD INITIAL EOM BYTE VALUE
130 0033 3E 00       E          LD      A,.LOW.EOMBYT
131 0035 32 00 00    E          LD      (EOM),A
132 0038
133                             * * * * * * DISABLE TX TRACKING
134 0038 3E 00       E          LD      A,.LOW.TXTRCK
135 003A 32 00 00    E          LD      (CPRTAC),A
136 003D
137                             * * * * * * SET SAMPLE COUNTER = 20
138 003D 3E 14                  LD      A,20
139 003F 32 00 00    E          LD      (SAMPLE),A
140 0042 C3 99 01    C          JP      TX250
141 0045
142                             * * * * * ELSE
143 0045             TX35:
144 0045
145                             * * * * * * DECREMENT SAMPLE TIME COUNTER
146 0045 21 00 00    E          LD      HL,SAMPLE
147 0048 35                     DEC     (HL)
148 0049
149                             * * * * * * IF SAMPLE COUNTER = '0'
150 0049 C2 99 01    C          JP      NZ,TX250
151 004C
152                             * * * * * * THEN
153                             * * * * * * SET COUNTER = '20'
154 004C 3E 14                  LD      A,20
155 004E 77                     LD      (HL),A
156 004F
157                             * * * * * * END IF
158                             * * * * * END IF
159 004F             TX40:
160 004F C3 99 01    C          JP      TX250
161 0052
162                             * * * * WHEN BYTE = EOM
163 0052             TX50:
164 0052 CB 77                  BIT     6,A
165 0054 28 3A 0090             JR      Z,TX55
166 0056
167                             * * * * * OUTPUT EOM BYTE TO USART
168 0056 3A 00 00    E          LD      A,(EOM)
169 0059 32 00 00    E          LD      (UTDATA),A
170 005C
171                             * * * * * DEC TXEOM BYTE COUNTER
172 005C 21 00 00    E          LD      HL,TXEOMC
173 005F 35                     DEC     (HL)
174 0060
```

```
175                     * * * * * IF COUNTER=0
176 0060 C2 99 01   C            JP      NZ,TX250
177 0063
178                     * * * * * THEN
179                     * * * * * * DEC EOM FRAME COUNTER
180 0063 21 00 00   E            LD      HL,EOMFRM
181 0066 35                      DEC     (HL)
182 0067
183                     * * * * * * IF COUNTER <> 0
184 0067 28 0C 0075              JR      Z,TX52
185 0069
186                     * * * * * * THEN
187                     * * * * * * * ROTATE EOM BYTE
188 0069 07                      RLCA
189 006A 32 00 00   E            LD      (EOM),A
190 006D
191                     * * * * * * * RESET EOM BYTE COUNTER
192 006D 3E 14                   LD      A,20
193 006F 32 00 00   E            LD      (TXEOMC),A
194 0072
195                     * * * * * * ELSE
196 0072 C3 99 01   C            JP      TX250
197 0075            TX52:
198 0075
199                     * * * * * * * CLEAR PTTI
200 0075 AF                      XOR     A
201 0076 32 00 00   E            LD      (PTTI),A
202 0079
203                     * * * * * * * OUTPUT "0" ON T/R LINE
204 0079 3E 00       E            LD      A,.LOW.TRLINE
205 007B 32 00 00   E            LD      (APRTBC),A
206 007E
207                     * * * * * * * REWRITE TEST LINE TO AN INPUT
208 007E AF                      XOR     A
209 007F 32 00 00   E            LD      (ADDRA),A
210 0082
211                     * * * * * * * DISABLE TXRDY
212 0082 32 00 00   E            LD      (USART),A           ;WRITE 00H
213 0085 3E 04                   LD      A,04H               ;INTFRM ONLY
214 0087 D3 BB                   OUT     (0BBH),A
215 0089
216                     * * * * * * * SET SYNC SEARCH 1ST FLAG
217 0089 2F                      CPL
218 008A 32 00 00   E            LD      (SS1ST),A
219 008D
220                     * * * * * * END IF
221 008D C3 99 01   C            JP      TX250
222 0090
223                     * * * * * END IF
224 0090
225                     * * * * WHEN BYTE = SOM
226 0090            TX55:
227 0090 CB 67                   BIT     4,A
228 0092 CA DD 00   C            JP      Z,TX60
229 0095
230                     * * * * DEC BYTE COUNTER
231 0095 21 00 00   E            LD      HL,TXSOMC
232 0098 35                      DEC     (HL)
```

```
233 0099
234                         * * * * * IF COUNTER = '0' & NOT RESYNC
235 0099 20 2F 00CA                 JR      NZ,TX57
236 009B 3A 00 00     E             LD      A,(DELIMT)
237 009E EE 00        E             XOR     .LOW.REDLIM
238 00A0 28 28 00CA                 JR      Z,TX57
239 00A2
240                         * * * * * THEN
241                         * * * * * * IF DATA MODE
242 00A2 3A 00 00     E             LD      A,(BPRTC)
243 00A5 E6 04                      AND     04H
244 00A7 C2 AF 00     C             JP      NZ,TX55B
245 00AA
246                         * * * * * * THEN
247                         * * * * * * * SET TX TRACKING ENABLE
248 00AA 3E 00        E             LD      A,.LOW.TXTRCK
249 00AC 32 00 00     E             LD      (CPRTAS),A
250 00AF
251                         * * * * * * END IF
252 00AF              TX55B:
253 00AF
254                         * * * * * * SET DATA FLAG
255 00AF 3E 28                      LD      A,28H
256 00B1 32 00 00     E             LD      (TXFLGS),A
257 00B4
258                         * * * * * * SET DATA OUT POINTER = IN POINTER - 26
259 00B4 3A 00 00     E             LD      A,(INPTR)
260 00B7 D6 18                      SUB     24
261 00B9 30 02 00BD               JR      NC,TX56
262 00BB C6 2F                      ADD     A,47
263 00BD              TX56:
264 00BD 32 00 00     E             LD      (OUTPTR),A
265 00C0
266                         * * * * * * SET DELIMIT BYTE VALUE TO RESYNC VALUE
267 00C0 3E 00        E             LD      A,.LOW.REDLIM
268 00C2 32 00 00     E             LD      (DELIMT),A
269 00C5
270                         * * * * * * SET SAMPLE TIME COUNTER = 20
271 00C5 3E 14                      LD      A,20
272 00C7 32 00 00     E             LD      (SAMPLE),A
273 00CA
274                         * * * * * END IF
275 00CA              TX57:
276                         * * * * * CASE OF SOM BYTE COUNTER
277 00CA
278                         * * * * * WHEN COUNTER < 7
279 00CA 3E 06                      LD      A,6
280 00CC BE                         CP      (HL)
281 00CD 38 06 00D5                 JR      C,TX58
282 00CF
283                         * * * * * * OUTPUT COMMAND WORD
284 00CF 3A 00 00     E             LD      A,(TXCMDW)
285 00D2 C3 D7 00     C             JP      TX59
286 00D5
287                         * * * * * ELSE (COUNT > 6)
288 00D5              TX58:
289 00D5
290                         * * * * * * OUTPUT SOM BYTE TO USART
```

```
291 00D5 3E 00        E         LD      A,.LOW.SOMBYT
292 00D7
293                             * * * * END CASE
294 00D7                        TX59:
295 00D7 32 00 00     E         LD      (UTDATA),A
296 00DA C3 99 01     C         JP      TX250
297 00DD
298                             * * * * WHEN BYTE=DUMMY (SYNC FRAME CT=0)
299 00DD                        TX60:
300 00DD
301                             * * * * * OUTPUT DUMMY BYTE TO USART
302 00DD 3E 00        E         LD      A,.LOW.DUMMY
303 00DF 32 00 00     E         LD      (UTDATA),A
304 00E2
305                             * * * * * DECREMENT TXDUM BYTE COUNTER
306 00E2 21 00 00     E         LD      HL,TXDUM
307 00E5 35                     DEC     (HL)
308 00E6
309                             * * * * * IF COUNTER=0
310 00E6 C2 99 01     C         JP      NZ,TX250
311 00E9
312                             * * * * * THEN
313                             * * * * * * SET SOM FLAG
314 00E9 3E 18                  LD      A,18H
315 00EB 32 00 00     E         LD      (TXFLGS),A
316 00EE
317                             * * * * * END IF
318 00EE                        TX90:
319 00EE C3 99 01     C         JP      TX250
320 00F1
321                             * * * * END CASE
322 00F1
323                             * * * ELSE (SYNC FRAME BYTES)
324 00F1                        TX100:
325 00F1
326                             * * * * IF TIME MODE & TXFLGS NOT = 4
327 00F1 DD CB 00 4E            BIT     1,(IX)
328 00F5 28 32 0129             JR      Z,TX108
329 00F7 3A 00 00     E         LD      A,(TXFLGS)
330 00FA FE 04                  CP      4
331 00FC 28 2B 0129             JR      Z,TX108
332 00FE
333                             * * * * THEN
334                             * * * * * CASE OF TIME BYTE COUNTER
335 00FE 3A 00 00     E         LD      A,(TBYTCT)
336 0101
337                             * * * * * WHEN COUNTER = 1
338 0101 FE 01                  CP      1
339 0103 20 05 010A             JR      NZ,TX101
340 0105
341                             * * * * * * OUTPUT LSB OF TIME
342 0105 3A 00 00     E         LD      A,(FRAMES)
343 0108 18 19 0123             JR      TX105
344 010A
345                             * * * * * WHEN COUNTER = 2
346 010A                        TX101:
347 010A FE 02                  CP      2
348 010C 20 05 0113             JR      NZ,TX102
```

```
349 010E
350                         * * * * * OUTPUT 2ND BYTE OF TIME
351 010E  3A 01 00    E          LD      A,(FRAMES+1)
352 0111  18 10 0123             JR      TX105
353 0113
354                         * * * * * WHEN COUNTER = 3
355 0113                        TX102:
356 0113  FE 03                   CP      3
357 0115  20 05 011C              JR      NZ,TX103
358 0117
359                         * * * * * OUTPUT 3RD BYTE OF TIME
360 0117  3A 02 00    E          LD      A,(FRAMES+2)
361 011A  18 07 0123             JR      TX105
362 011C
363                         * * * * * ELSE (COUNTER = 4)
364 011C                        TX103:
365 011C
366                         * * * * * RESET COUNTER TO ZERO
367 011C  AF                      XOR     A
368 011D  32 00 00    E          LD      (TBYTCT),A
369 0120
370                         * * * * * OUTPUT MSB OF TIME
371 0120  3A 03 00    E          LD      A,(FRAMES+3)
372 0123
373                         * * * * * END CASE
374 0123                        TX105:
375 0123
376                         * * * * * INC TIME BYTE COUNT
377 0123  21 00 00    E          LD      HL,TBYTCT
378 0126  34                      INC     (HL)
379 0127  18 2E 0157             JR      TX150
380 0129
381                         * * * * ELSE
382 0129                        TX108:
383 0129
384                         * * * * * IF SYNC BYTE < 7
385 0129  3A 00 00    E          LD      A,(SNCBYT)
386 012C  FE 07                   CP      7
387 012E  30 16 0146             JR      NC,TX120
388 0130
389                         * * * * * THEN
390                         * * * * * * CASE SYNC BYTES 6 THRU 1
391 0130
392                         * * * * * * WHEN BYTE COUNT = 5,3, OR 1
393 0130  FE 06                   CP      6
394 0132  28 0D 0141              JR      Z,TX110
395 0134  FE 04                   CP      4
396 0136  28 09 0141              JR      Z,TX110
397 0138  FE 02                   CP      2
398 013A  28 05 0141              JR      Z,TX110
399 013C
400                         * * * * * * OUTPUT 2ND BYTE OF SYNC TIME
401 013C  3A 01 00    E          LD      A,(SNCTIM+1)
402 013F  18 16 0157             JR      TX150
403 0141
404                         * * * * * * ELSE (COUNT = 6,4, OR 2)
405 0141                        TX110:
406 0141
```

```
407                           * * * * * * OUTPUT 1ST BYTE OF TIME
408 0141 3A 00 00       E           LD    A,(SNCTIM)
409 0144
410                           * * * * * END CASE
411 0144                      TX115:
412 0144 18 11 0157                 JR    TX150
413 0146
414                           * * * * * ELSE
415 0146                      TX120:
416 0146
417                           * * * * * * CASE SYNC BYTES 7 THRU 20
418 0146
419                           * * * * * * WHEN BYTE = DELIMIT BYTE (CT=7)
420 0146 20 05 014D                 JR    NZ,TX130
421 0148
422                           * * * * * * OUTPUT DELIMIT BYTE
423 0148 3A 00 00       E           LD    A,(DELIMT)
424 014B 18 0A 0157                 JR    TX150
425 014D
426                           * * * * * WHEN BYTE = SYNC CHARACTER BYTE (COUNT < 15)
427 014D                      TX130:
428 014D FE 0F                       CP    15
429 014F 30 04 0155                 JR    NC,TX140
430 0151
431                           * * * * * * OUTPUT SYNC CHARACTER
432 0151 3E 00          E           LD    A,.LOW.SNCHAR
433 0153 18 02 0157                 JR    TX150
434 0155
435                           * * * * * * ELSE (BIT SYNC BYTE, DEFAULT > 14)
436 0155                      TX140:
437 0155
438                           * * * * * * OUTPUT BIT SYNC
439 0155 3E 00          E           LD    A,.LOW.BITSNC
440 0157
441                           * * * * * END CASE
442 0157
443                           * * * * * END IF
444 0157
445                           * * * * END IF
446 0157                      TX150:
447 0157
448                           * * * * WRITE BYTE TO USART
449 0157 32 00 00       E           LD    (UTDATA),A
450 015A
451                           * * * * DEC SYNC BYTE COUNTER
452 015A 21 00 00       E           LD    HL,SNCBYT
453 015D 35                          DEC   (HL)
454 015E
455                           * * * * IF COUNT = 0
456 015E 20 39 0199                 JR    NZ,TX250
457 0160
458                           * * * * THEN
459                           * * * * * DEC SYNC FRAME COUNT
460 0160 21 00 00       E           LD    HL,TXFLGS
461 0163 35                          DEC   (HL)
462 0164
463                           * * * * * IF FRAME COUNT = 0
464 0164 20 19 017F                 JR    NZ,TX160
```

```
465 0166
466                     * * * * * THEN
467                     * * * * * * IF TIM1ST FLAG SET
468 0166 3A 00 00    E          LD      A,(TIM1ST)
469 0169 B7                     OR      A
470 016A 28 0B 0177             JR      Z,TX155
471 016C
472                     * * * * * * THEN
473                     * * * * * * * CLEAR 1ST FLAG
474 016C AF                     XOR     A
475 016D 32 00 00    E          LD      (TIM1ST),A
476 0170
477                     * * * * * * * RESET TXFLGS = 4
478 0170 3E 04                  LD      A,4
479 0172 32 00 00    E          LD      (TXFLGS),A
480 0175
481                     * * * * * * ELSE
482 0175 18 08 017F             JR      TX160
483 0177               TX155:
484 0177
485                     * * * * * * * START RCV SIDE OF USART
486 0177 3E 05                  LD      A,05H
487 0179 32 00 00    E          LD      (USART),A
488 017C
489                     * * * * * * * SET DUMMY FLAG
490 017C 3E 08                  LD      A,08H
491 017E 77                     LD      (HL),A
492 017F
493                     * * * * * * END IF
494 017F
495                     * * * * * END IF
496 017F               TX160:
497 017F
498                     * * * * * SET BYTE COUNT = 20
499 017F 3E 14                  LD      A,20
500 0181 32 00 00    E          LD      (SNCBYT),A
501 0184
502                     * * * * END IF
503 0184
504                     * * * END IF
505 0184               TX170:
506 0184 18 13 0199             JR      TX250
507 0186
508 0186
509                     * * ELSE (RX CASE)
510 0186               TX200:
511 0186
512                     * * * OUTPUT DATA BYTE FROM BUFFER
513 0186 2A 00 00    E          LD      HL,(OUTPTR)
514 0189 7E                     LD      A,(HL)
515 018A 32 00 00    E          LD      (UTDATA),A
516 018D
517                     * * * INCREMENT DATA OUT POINTER
518 018D 23                     INC     HL
519 018E
520                     * * * IF POINTER > END OF BUFFER
521 018E 3E 30                  LD      A,48
522 0190 BD                     CP      L
```

```
523 0191 C2 96 01    C            JP      NZ,TX220
524 0194
525                       * * * THEN
526                       * * * * SET POINTER=BEGINNING OF BUFFER
527 0194 2E 00                    LD      L,0
528 0196
529                       * * * END IF
530 0196          TX220:
531 0196 22 00 00    E            LD      (OUTPTR),HL
532 0199
533                       * * END IF
534 0199          TX250:
535 0199
536                       * * RESTORE REGISTERS
537 0199 E1                       POP     HL
538 019A F1                       POP     AF
539 019B
540                       * END PROCEDURE
541 019B FB                       EI
542 019C C9                       RET
543 019D                          END

ERRORS = 0000

ADDRA  E 0020   APRTBC E 0007   BITSNC E 000F   BPRTC  E 0010
CPRTAC E 001C   CPRTAS E 001D   DELIMT E 000D   DUMMY  E 0011
EOM    E 0015   EOMBYT E 0004   EOMFRM E 0016   FRAMES E 001A
INPTR  E 0002   MEMORY M 0000   OUTPTR E 0003   PTTI   E 0000
REDLIM E 0018   SAMPLE E 001F   SNCBYT E 000B   SNCHAR E 000E
SNCTIM E 000C   SOMBYT E 0009   SS1ST  E 0008   STACK  S 0000
TBYTCT E 0019   TIM1ST E 001B   TRLINE E 0014   TX100  C 00F1
TX101  C 010A   TX102  C 0113   TX103  C 011C   TX105  C 0123
TX108  C 0129   TX110  C 0141   TX115  C 0144   TX120  C 0146
TX130  C 014D   TX140  C 0155   TX150  C 0157   TX155  C 0177
TX160  C 017F   TX170  C 0184   TX20   C 0012   TX200  C 0186
TX220  C 0196   TX250  C 0199   TX30   C 0025   TX35   C 0045
TX40   C 004F   TX50   C 0052   TX52   C 0075   TX55   C 0090
TX55B  C 00AF   TX56   C 008D   TX57   C 00CA   TX58   C 00D5
TX59   C 00D7   TX60   C 00DD   TX90   C 00EE   TXCMDW E 0017
TXDUM  E 0012   TXEOMC E 0006   TXFLGS E 0001   TXRDY  C 0000
TXSOMC E 000A   TXTRCK E 001E   USART  E 0013   UTDATA E 0005
```

```
  1              ;************************************************************
  2              ;*                                                          *
  3              ;* NAME: CHKTIM                    (CHKTIM)                 *
  4              ;*                                                          *
  5              ;* FILE NAME: CHKTIM.SRC                                    *
  6              ;*                                                          *
  7              ;* FUNCTION: CHECKS THE REAL TIME CLOCK AND UPDATES THE DISPLAY IF *
  8              ;*           NECESSARY.                                     *
  9              ;*                                                          *
 10              ;* METHOD:                                                  *
 11              ;*                                                          *
 12              ;* INPUT PARAMETERS:                                        *
 13              ;*                                                          *
 14              ;* NAME      DESCRIPTION              TYPE    LENGTH   RANGE *
 15              ;*                                                          *
 16              ;*                                                          *
```

```
17                  ;* OUTPUT PARAMETERS:                                                 *
18                  ;*                                                                    *
19                  ;* NAME     DESCRIPTION             TYPE    LENGTH    RANGE           *
20                  ;*                                                                    *
21                  ;*                                                                    *
22                  ;* DATA ACCESSED OR ALTERED EXTERNAL TO MODULE:                       *
23                  ;* NAME     DESCRIPTION             TYPE    LENGTH    RANGE  DIRECTION*
24                  ;*                                                                    *
25                  ;* TIMEDT   TIME DATA BYTES                 3 BYTES          INPUT    *
26                  ;* UPDATE   UPDATE FLAG (IX POINTS TO IT)   1 BIT            INPUT    *
27                  ;*                                                                    *
28                  ;* RESTRICTIONS:                                                      *
29                  ;*                                                                    *
30                  ;*     USES ACC AND E REGISTER                                        *
31                  ;*                                                                    *
32                  ;* SUPPORTING MODULES:                                                *
33                  ;*      RDTIME - READS DAY,HOUR, AND MINUTES OF RTC (CONTROL)         *
34                  ;*      DISPLY - UPDATES THE DISPLAY (CONTROL)                        *
35                  ;*                                                                    *
36                  ;* COPYRIGHT 1981 ROCKWELL INTERNATIONAL                              *
37                  ;* COLLINS TELECOMMUNICATIONS PRODUCTS DIVISION                       *
38                  ;*                                                                    *
39                  ;* AUTHOR:  C. BONEBRIGHT                      DATE:  02/15/83        *
40                  ;*                                                                    *
41                  ;* VERSION:  1.0                                                      *
42                  ;*                                                                    *
43                  ;* REVISED:                                    DATE:                  *
44                  ;*                                                                    *
45                  ;*********************************************************************/
46 0000             EJECT
47 0000
48 0000                     TITLE   'CHKTIM
49                          NAME    CHKTIM
50                          PUBLIC  CHKTIM
51                          EXTRN   TIMEDT,RDTIME,DISPLY
52                          CSEG
53 0000
54                  * PROCEDURE CHKTIM
55 0000             CHKTIM:
56 0000
57                  * * IF NOT DAY = '0'
58 0000 3A 02 00  E         LD      A,(TIMEDT+2)
59 0003 B7                  OR      A
60 0004 28 17 001D          JR      Z,CTM10
61 0006
62                  * * THEN
63                  * * * CHECK MINUTE ROLLOVER
64 0006 1E 01               LD      E,1
65 0008 CD 00 00  E         CALL    RDTIME
66 000B
67                  * * * IF NEW MINUTE VALUE
68 000B DD CB 02 76         BIT     6,(IX+2)             ;UPDATE FLAG
69 000F 28 0C 001D          JR      Z,CTM10
70 0011
71                  * * * THEN
72                  * * * RESET UPDATE FLAG
73 0011 DD CB 02 B6         RES     6,(IX+2)
74 0015
```

```
75                        * * * * READ FULL TIME
76 0015 1E 03                      LD      E,3
77 0017 CD 00 00    E              CALL    RDTIME
78 001A
79                        * * * * UPDATE THE DISPLAY
80 001A CD 00 00    E              CALL    DISPLY
81 001D
82                        * * * END IF
83 001D
84                        * * END IF
85 001D                   CTM10:
86 001D
87                        * END PROCEDURE
88 001D C9                         RET
89 001E                            END

ERRORS = 0000

CHKTIM  C 0000   CTM10  C 001D   DISPLY E 0002   EJECT    0000
MEMORY  M 0000   RDTIME E 0001   STACK  S 0000   TIMEDT E 0000
```

```
 1      ************************************************************************
 2      *                                                                      *
 3      * NAME: BAND BITS  (BNDBTS)              PPS REF:                      *
 4      *                                                                      *
 5      * FILE NAME: BNDBTS.SRC                                                 *
 6      *                                                                      *
 7      * FUNCTION: SETS APPROPRIATE BAND BITS FOR GIVEN CHANNEL                *
 8      *                                                                      *
 9      * METHOD: N/A                                                           *
10      *                                                                      *
11      * INPUT PARAMETERS:                                                     *
12      * NAME       DESCRIPTION            TYPE    LENGTH    RANGE             *
13      * DE    CHANNEL WITHOUT BAND BITS                    06CC-0FDB          *
14      *                                                                      *
15      * OUTPUT PARAMETERS:                                                    *
16      * NAME       DESCRIPTION            TYPE    LENGTH    RANGE             *
17      * DE    CHANNEL WITH BAND BITS SET                   1A3C-3FDB          *
18      *                                                                      *
19      * DATA ACCESSED OR ALTERED EXTERNAL TO MODULE:                          *
20      *                                                                      *
21      * NAME       DESCRIPTION            TYPE    LENGTH    RANGE     DIR.    *
22      *                                                                      *
23      * RESTRICTIONS: USES B,C,D,E,H & L REGISTERS                            *
24      *                                                                      *
25      * SUPPORTING MODULES:  NONE                                             *
26      *                                                                      *
27      * COPYRIGHT 1982 ROCKWELL INTERNATIONAL                                 *
28      * COLLINS TELECOMMUNICATIONS PRODUCTS DIVISION                          *
29      *                                                                      *
30      * AUTHOR: C. A. BONEBRIGHT            DATE: DEC 2, 1982                 *
31      *                                                                      *
32      * VERSION: 1.0                                                          *
33      *                                                                      *
34      * REVISION:                           DATE:                             *
35      *                                                                      *
36      ************************************************************************
```

```
37 0000
38                              CSEG
39 0000
40 0000                         TITLE   'BNDBTS
41                              NAME    BNDBTS
42                              PUBLIC  BNDBTS
43                              EXTRN   HIBLOW,HIBHI
44 0000
45                      * PROCEDURE BNDBTS
46 0000                BNDBTS:
47 0000
48                      * * SET HALF BAND BIT
49 0000 CB EA                   SET     5,D
50 0002
51                      * * IF CHANNEL > 2619
52 0002 01 00 00    E            LD      BC,HIBLOW          ;HIGH BAND, LOW HALF
53 0005 62                       LD      H,D
54 0006 6B                       LD      L,E
55 0007 ED 42                    SBC     HL,BC
56 0009 38 0D 0018               JR      C,BND50
57 000B
58                      * * THEN
59                      * * * SET HI-LO BAND
60 000B CB E2                    SET     4,D
61 000D
62                      * * * IF < 3800
63 000D 01 00 00    E            LD      BC,HIBHI           ;HIGH BAND, HIGH HALF
64 0010 62                       LD      H,D
65 0011 6B                       LD      L,E
66 0012 ED 42                    SBC     HL,BC
67 0014 30 02 0018               JR      NC,BND50
68 0016
69                      * * * THEN
70                      * * * * CLEAR HALF BAND BIT
71 0016 CB AA                    RES     5,D
72 0018
73                      * * * END IF
74 0018                BND50:
75 0018
76                      * * END IF
77 0018
78                      * END PROCEDURE
79 0018 C9                       RET
80 0019                          END

ERRORS = 0000

BND50  C 0018   BNDBTS C 0000   HIBHI  E 0001   HIBLOW E 0000
MEMORY M 0000   STACK  S 0000
   1          *****************************************************************
   2          *                                                                *
   3          * NAME: PAGE COUNTER (PAGECT)              PPS REF:              *
   4          *                                                                *
   5          * FILE NAME: PAGECT.SRC                                          *
   6          *                                                                *
   7          * FUNCTION: CALCULATES PAGE POSITION COUNTER AND RESYNC PAGE FRAME COUNTER *
   8          *           FOR A GIVEN RECEIVE OR TRANSMIT FRAME TIME           *
```

```
 9          *                                                               *
10          * METHOD:                                                       *
11          *                                                               *
12          * INPUT PARAMETERS:                                              *
13          *                                                               *
14          * NAME    DESCRIPTION              TYPE    LENGTH   RANGE        *
15          *                                                               *
16          * HL     ADDRESS OF LSB OF FRAME TIME  BINARY  2 BYTES           *
17          *                                                               *
18          * OUTPUT PARAMETERS:                                             *
19          *                                                               *
20          * NAME    DESCRIPTION              TYPE    LENGTH   RANGE        *
21          *                                                               *
22          * ACC    PAGE COUNTER              BINARY  1 BYTE   0-24         *
23          * D      RESYNC PAGE COUNTER       BINARY  1 BYTE   0-3          *
24          *                                                               *
25          * DATA ACCESSED OR ALTERED EXTERNAL TO MODULE:                   *
26          *                                                               *
27          * NAME    DESCRIPTION       TYPE    LENGTH   RANGE   DIRECTION   *
28          *                                                               *
29          * WKAREA  WORK AREA                 4 BYTES                      *
30          *                                                               *
31          * RESTRICTIONS: USES ACC, B,C,D,E,H, & L REGISTERS               *
32          *                                                               *
33          * SUPPORTING MODULES: NONE                                       *
34          *                                                               *
35          * COPYRIGHT 1982 ROCKWELL INTERNATIONAL                          *
36          * COLLINS TELECOMMUNICATIONS PRODUCTS DIVISION                   *
37          *                                                               *
38          * AUTHOR: C. A. BONEBRIGHT           DATE: 05-03-82              *
39          *                                                               *
40          * VERSION: 1.0                                                   *
41          *                                                               *
42          * REVISION:                         DATE:                        *
43          *                                                               *
44          ****************************************************************
45 0000
46                  CSEG
47 0000             TITLE   'PAGECT
48                  NAME    PAGECT
49                  PUBLIC  PAGECT
50                  EXTRN   WKAREA
51 0000
52                                          ;ADDRESS OF FRAME TIME IS PASSED IN HL
53                                          ;PAGE COUNTER IS RETURNED IN ACCUMULATOR
54 0000
55                  * PROCEDURE PAGECT
56 0000             PAGECT:
57 0000
58                  * * MOVE FRAME TIME TO WORK AREA
59 0000 11 00 00  E         LD      DE,WKAREA
60 0003 01 04 00            LD      BC,4
61 0006 ED B0               LDIR            ;CALLING ROUTINE FURNISHES HL
62 0008
63                  * * DO WHILE MSB IS NOT EQUAL TO 0
64 0008             PG20:
65 0008 3A 03 00  E         LD      A,(WKAREA+3)
66 000B B7                  OR      A
67 000C 28 19 0027          JR      Z,PG50
```

```
68 000E
69                          * * * SUBTRACT 16,777,200 FROM FRAME TIME
70 000E 2A 00 00    E           LD      HL,(WKAREA)
71 0011 11 F0 FF                LD      DE,0FFF0H
72 0014 ED 52                   SBC     HL,DE
73 0016 22 00 00    E           LD      (WKAREA),HL
74 0019 2A 02 00    E           LD      HL,(WKAREA+2)
75 001C 11 FF 00                LD      DE,00FFH
76 001F ED 52                   SBC     HL,DE
77 0021 22 02 00    E           LD      (WKAREA+2),HL
78 0024
79                          * * END WHILE
80 0024 C3 08 00    C           JP      PG20
81 0027
82                          * * IF 2ND MSB IS NOT EQUAL TO 0
83 0027                     PG50:
84 0027 3A 02 00    E           LD      A,(WKAREA+2)
85 002A B7                      OR      A
86 002B 28 12 003F              JR      Z,PG100
87 002D
88                          * * THEN
89                          * * * DO UNTIL 2ND MSB = 0
90 002D 2A 00 00    E           LD      HL,(WKAREA)
91 0030 11 DC FF                LD      DE,0FFDCH
92 0033                     PG60:
93 0033
94                          * * * * SUBTRACT 65,500
95 0033 ED 52                   SBC     HL,DE
96 0035 30 FC 0033              JR      NC,PG60
97 0037 3D                      DEC     A
98 0038 3F                      CCF
99 0039
100                         * * * END UNTIL
101 0039 C2 33 00   C           JP      NZ,PG60
102 003C 22 00 00   E           LD      (WKAREA),HL
103 003F
104                         * * END IF
105 003F                    PG100:
106 003F
107                         * * IF 2ND LSB IS NOT EQUAL TO 0
108 003F 3A 01 00   E           LD      A,(WKAREA+1)
109 0042 B7                     OR      A
110 0043 28 11 0056             JR      Z,PG150
111 0045
112                         * * THEN
113                         * * * DO UNTIL 2ND LSB=0
114 0045 4F                     LD      C,A
115 0046 3A 00 00   E           LD      A,(WKAREA)
116 0049 06 C8                  LD      B,0C8H
117 004B                    PG120:
118 004B
119                         * * * * SUBTRACT 200
120 004B 98                     SBC     A,B
121 004C 30 FD 004B             JR      NC,PG120
122 004E 0D                     DEC     C
123 004F 3F                     CCF
124 0050
125                         * * * END UNTIL
126 0050 C2 4B 00   C           JP      NZ,PG120
```

```
127 0053 32 00 00       E          LD      (WKAREA),A
128 0056
129                                * * END IF
130 0056                           PG150:
131 0056
132                                * * IF THE LSB > 99
133 0056 3A 00 00       E          LD      A,(WKAREA)
134 0059 FE 64                     CP      100
135 005B 38 08 0065                JR      C,PG160
136 005D
137                                * * THEN
138                                * * * DO UNTIL LSB < 100
139 005D 06 64                     LD      B,100
140 005F                           PG155:
141 005F
142                                * * * * SUBTRACT 100
143 005F 90                        SUB     B
144 0060
145                                * * * END UNTIL
146 0060 FE 64                     CP      100
147 0062 D2 5F 00       C          JP      NC,PG155
148 0065
149                                * * END IF
150 0065                           PG160:
151 0065
152                                * * IF THE LSB < 25
153 0065 FE 19                     CP      25
154 0067 30 05 006E                JR      NC,PG165
155 0069
156                                * * THEN
157                                * * * SET RESYNC PAGE COUNTER = 3
158 0069 16 03                     LD      D,3
159 006B C3 78 00       C          JP      PG200
160 006E
161                                * * ELSE
162 006E                           PG165:
163 006E
164                                * * * SET RESYNC PAGE COUNTER = 0FFH
165 006E 16 FF                     LD      D,0FFH
166 0070
167                                * * * * DO UNTIL LSB < 25
168 0070 06 19                     LD      B,19H
169 0072                           PG170:
170 0072
171                                * * * * INCREMENT RESYNC PAGE COUNTER
172 0072 14                        INC     D
173 0073
174                                * * * * SUBTRACT 25
175 0073 90                        SUB     B
176 0074
177                                * * * END UNTIL
178 0074 B8                        CP      B
179 0075 D2 72 00       C          JP      NC,PG170
180 0078
181                                * * END IF
182 0078                           PG200:
183 0078
184                                * END PROCEDURE
```

```
185 0078 C9              RET
186 0079                 END

ERRORS = 0000

MEMORY M 0000    PAGECT C 0000    PG100  C 003F    PG120  C 004B
PG150  C 0056    PG155  C 005F    PG160  C 0065    PG165  C 006E
PG170  C 0072    PG20   C 0008    PG200  C 0078    PG50   C 0027
PG60   C 0033    STACK  S 0000    WKAREA E 0000
```

```
 1      ***********************************************************************
 2      *                                                                     *
 3      * NAME: SINGLE FREQUENCY HOP  (ONEFRQ)            PPS REF:            *
 4      *                                                                     *
 5      * FILE NAME: ONEFRQ.SRC                                               *
 6      *                                                                     *
 7      * FUNCTION: CONSTRUCT FREQUENCY TABLE OF 512 LEGAL HOPPING FREQUENCIES*
 8      *           WHICH ARE ALL THE SAME FREQUENCY.                         *
 9      *                                                                     *
10      * METHOD:                                                             *
11      *                                                                     *
12      * INPUT PARAMETERS:                                                   *
13      *                                                                     *
14      * NAME       DESCRIPTION                    TYPE     LENGTH    RANGE  *
15      *                                                                     *
16      * DE      SINGLE FREQ THAT TABLE IS TO BE FILLED WITH + BAND BITS     *
17      *                                                                     *
18      * OUTPUT PARAMETERS:                                                  *
19      *                                                                     *
20      * NAME       DESCRIPTION                    TYPE     LENGTH    RANGE  *
21      *                                                                     *
22      * FREQT      TABLE OF FREQUENCIES                    1024 BYTES       *
23      *                                                                     *
24      * DATA ACCESSED OR ALTERED EXTERNAL TO MODULE:                        *
25      *                                                                     *
26      * NAME       DESCRIPTION           TYPE    LENGTH   RANGE    DIR.     *
27      * FREQT      START ADDRESS OF FREQ TABLE   2 BYTES           INPUT    *
28      *                                                                     *
29      * RESTRICTIONS: USES ACC,B,C,D,E,H, AND L REGISTERS                   *
30      *                                                                     *
31      * SUPPORTING MODULES: NONE                                            *
32      *                                                                     *
33      * COPYRIGHT 1982 ROCKWELL INTERNATIONAL                               *
34      * COLLINS TELECOMMUNICATIONS PRODUCTS DIVISION                        *
35      *                                                                     *
36      * AUTHOR: C. A. BONEBRIGHT                    DATE: 05-03-82          *
37      *                                                                     *
38      * VERSION: 1.0                                                        *
39      *                                                                     *
40      * REVISION:                                    DATE:                  *
41      *                                                                     *
42      ***********************************************************************
43 0000
44                       CSEG
45 0000                  TITLE   'ONEFRQ
46                       NAME    ONEFRQ
47                       PUBLIC  ONEFRQ
48                       EXTRN   FREQT
```

```
49 0000
50                              * PROCEDURE ONEFRQ
51 0000                         ONEFRQ:
52 0000 21 00 00    E                   LD      HL,FREQT        ;BEGINNING OF FREQ TABLE
53 0003
54                              * * LOAD FREQUENCY WITH BAND BITS SET
55 0003 CB FA                           SET     7,D             ;SET FREQ STROBE BIT
56 0005 ED 53 00 00 E                   LD      (FREQT),DE
57 0009
58                              * * DO UNTIL TABLE FULL
59 0009                         FRQ10:
60 0009
61                              * * * LOAD CHANNEL IN FREQ TABLE
62 0009 11 02 00   E                    LD      DE,FREQT+2
63 000C 01 FE 03                        LD      BC,1022
64 000F ED B0                           LDIR
65 0011
66                              * * END UNTIL
67 0011
68                              * END PROCEDURE
69 0011                         FRQ80:
70 0011 C9                              RET
71 0012                                 END

ERRORS = 0000

FREQT  E 0000   FRQ10 C 0009   FRQ80 C 0011   MEMORY M 0000
ONEFRQ C 0000   STACK S 0000
```

```
 1      ********************************************************************
 2      *                                                                  *
 3      * NAME: FRAME TIME TO RTC (FTRTC)              PPS REF:            *
 4      *                                                                  *
 5      * FILE NAME: FTRTC.SRC                                             *
 6      *                                                                  *
 7      * FUNCTION:  COPIES THE RECEIVED FRAME TIME INTO THE INTERNAL OR TRANSMIT *
 8      *            FRAME TIME, THEN CONVERTS (RECEIVED) FRAME TIME INTO REAL   *
 9      *            TIME AND WRITES IT INTO THE RTC.                     *
10      *                                                                  *
11      * METHOD:                                                          *
12      *                                                                  *
13      * INPUT PARAMETERS:                                                *
14      *                                                                  *
15      * NAME         DESCRIPTION            TYPE    LENGTH    RANGE      *
16      *                                                                  *
17      * OUTPUT PARAMETERS:                                               *
18      *                                                                  *
19      * NAME         DESCRIPTION            TYPE    LENGTH    RANGE      *
20      *                                                                  *
21      * DATA ACCESSED OR ALTERED EXTERNAL TO MODULE:                     *
22      *                                                                  *
23      * NAME         DESCRIPTION    TYPE    LENGTH    RANGE    DIRECTION *
24      *                                                                  *
25      * RXTIME       RCV'D FRAME TIME        4 BYTES           INPUT     *
26      * WKAREA       WORK AREA               4 BYTES           OUTPUT    *
27      * TXTIME       TX FRAME TIME           4 BYTES           OUTPUT    *
28      * PAGERX       RCV PAGE COUNTER        1 BYTE            INPUT     *
29      * REPAGR       RCV RESYNC PAGE COUNTER 1 BYTE            INPUT     *
```

```
30                 * PAGETX     TX PAGE COUNTER           1 BYTE           OUTPUT      *
31                 * REPAGT     TX RESYNC PAGE COUNTER    1 BYTE           OUTPUT      *
32                 *                                                                   *
33                 * RESTRICTIONS: USES ACC,B,C,D,E,H AND L REGISTERS                  *
34                 *                                                                   *
35                 * SUPPORTING MODULES: NONE                                          *
36                 *                                                                   *
37                 * COPYRIGHT 1982 ROCKWELL INTERNATIONAL                             *
38                 * COLLINS TELECOMMUNICATIONS PRODUCT DIVISION                       *
39                 *                                                                   *
40                 * AUTHOR: C. A. BONEBRIGHT         DATE: 1-18-83                    *
41                 *                                                                   *
42                 * VERSION: 1.0                                                      *
43                 *                                                                   *
44                 * REVISION:                       DATE:                             *
45                 *                                                                   *
46                 *********************************************************************
47 0000
48                             CSEG
49 0000                        TITLE   'FTRTC
50                             NAME    FTRTC
51                             PUBLIC  FTRTC
52                             EXTRN   RXTIME,WKAREA,HUNDRD,TXTIME,PAGETX,REPAGT,PAGERX,REPAGR
53 0000
54                 * PROCEDURE FTRTC
55 0000            FTRTC:
56 0000
57                 * * UPDATE INTERNAL FRAME TIME TO RECEIVED FRAME TIME
58 0000 F3                     DI
59 0001 01 04 00               LD      BC,4
60 0004 11 00 00    E          LD      DE,TXTIME
61 0007 21 00 00    E          LD      HL,RXTIME
62 000A ED B0                  LDIR
63 000C 3A 00 00    E          LD      A,(PAGERX)
64 000F 32 00 00    E          LD      (PAGETX),A              ;TX-FER PAGE COUNT
65 0012 3A 00 00    E          LD      A,(REPAGR)
66 0015 32 00 00    E          LD      (REPAGT),A              ;TX-FER RESYNC PAGE COUNT
67 0018 FB                     EI
68 0019
69                 * * DO UNTIL FRAMES < 9,000,000
70 0019 AF                     XOR     A                       ;CLEAR CARRY IN ONE INSTR
71 001A 3C                     INC     A                       ;START WITH DAY OF WEEK = 1
72 001B ED 4B 00 00 E          LD      BC,(RXTIME)
73 001F
74                 * * * SUBTRACT 9,000,000 FROM FRAME TIME
75 001F 11 40 54       FT20:   LD      DE,5440H
76 0022 60                     LD      H,B
77 0023 69                     LD      L,C
78 0024 ED 52                  SBC     HL,DE
79 0026 44                     LD      B,H
80 0027 4D                     LD      C,L
81 0028 2A 02 00    E          LD      HL,(RXTIME+2)
82 002B 11 89 00               LD      DE,0089H
83 002E ED 52                  SBC     HL,DE
84 0030
85                 * * * INCREMENT DAY COUNTER
86 0030 38 0B 003D             JR      C,FT40
87 0032 22 02 00    E          LD      (RXTIME+2),HL
88 0035 ED 43 00 00 E          LD      (RXTIME),BC
```

```
89 0039 3C                       INC     A               ;DAY COUNT
90 003A
91                        * * END UNTIL
92 003A C3 1F 00    C            JP      FT20
93 003D                  FT40:
94 003D 32 03 00    E            LD      (WKAREA+3),A    ;STORE DAYS
95 0040
96                        * * DO UNTIL FRAMES < 375,000
97 0040 AF                       XOR     A               ;CLEARS CARRY & ZEROS COUNT
98 0041 ED 4B 00 00 E            LD      BC,(RXTIME)
99 0045
100                       * * * SUBTRACT 375,000 FROM FRAME TIME
101 0045 11 D8 B8   FT60:        LD      DE,0B8D8H
102 0048 60                      LD      H,B
103 0049 69                      LD      L,C
104 004A ED 52                   SBC     HL,DE
105 004C 44                      LD      B,H
106 004D 4D                      LD      C,L
107 004E 2A 02 00   E            LD      HL,(RXTIME+2)
108 0051 11 05 00                LD      DE,0005H
109 0054 ED 52                   SBC     HL,DE
110 0056
111                       * * * INCREMENT HOUR COUNTER
112 0056 38 0C 0064              JR      C,FT80
113 0058 22 02 00   E            LD      (RXTIME+2),HL
114 005B ED 43 00 00 E           LD      (RXTIME),BC
115 005F 3C                      INC     A               ;HOUR COUNT
116 0060 27                      DAA                     ;MAINTAIN BCD
117 0061
118                       * * END UNTIL
119 0061 C3 45 00   C            JP      FT60
120 0064                 FT80:
121 0064 32 02 00   E            LD      (WKAREA+2),A    ;STORE HOURS (BCD)
122 0067
123                       * * DO UNTIL FRAMES < 6250
124 0067 AF                      XOR     A
125 0068 ED 4B 02 00 E           LD      BC,(RXTIME+2)
126 006C 11 6A 18                LD      DE,186AH
127 006F 2A 00 00   E            LD      HL,(RXTIME)
128 0072
129                       * * * SUBTRACT 6250 FROM FRAME TIME
130 0072
131 0072                 FT100:
132 0072 ED 52                   SBC     HL,DE
133 0074 30 04 007A              JR      NC,FT120
134 0076 0D                      DEC     C
135 0077 FA 84 00   C            JP      M,FT140
136 007A
137                       * * * INCREMENT MINUTE COUNTER
138 007A                 FT120:
139 007A 37                      SCF
140 007B 3F                      CCF
141 007C 3C                      INC     A
142 007D 27                      DAA                     ;MAINTAIN BCD
143 007E 22 00 00   E            LD      (RXTIME),HL
144 0081
145                       * * END UNTIL
146 0081 C3 72 00   C            JP      FT100
147 0084                 FT140:
148 0084 32 01 00   E            LD      (WKAREA+1),A    ;STORE MINUTES (BCD)
```

```
149 0087
150                     * * DO UNTIL FRAMES < 625
151 0087 AF                     XOR     A
152 0088 11 71 02               LD      DE,0271H
153 008B 2A 00 00    E          LD      HL,(RXTIME)
154 008E
155                     * * * SUBTRACT 625 FROM FRAME TIME
156 008E               FT160:
157 008E ED 52                  SBC     HL,DE
158 0090 38 09 009B             JR      C,FT180
159 0092
160                     * * * ADD 6 TO SECOND COUNTER
161 0092 C6 06                  ADD     A,6
162 0094 27                     DAA                             ;MAINTAIN BCD
163 0095 22 00 00    E          LD      (RXTIME),HL
164 0098
165                     * * END UNTIL
166 0098 C3 8E 00    C          JP      FT160
167 009B               FT180:
168 009B
169                     * * DO UNTIL FRAMES < 104
170 009B 3F                     CCF
171 009C 11 68 00               LD      DE,0068H
172 009F 2A 00 00    E          LD      HL,(RXTIME)
173 00A2
174                     * * * SUBTRACT 104 FROM FRAME TIME
175 00A2               FT200:
176 00A2 ED 52                  SBC     HL,DE
177 00A4 38 08 00AE             JR      C,FT220
178 00A6
179                     * * * INCREMENT SECOND
180 00A6 3C                     INC     A
181 00A7 27                     DAA                             ;MAINTAIN BCD
182 00A8 22 00 00    E          LD      (RXTIME),HL
183 00AB
184                     * * END UNTIL
185 00AB C3 A2 00    C          JP      FT200
186 00AE               FT220:
187 00AE 32 00 00    E          LD      (WKAREA),A              ;STORE SECONDS (BCD)
188 00B1
189                     * * CASE OF # OF FRAMES REMAINING
190 00B1 3A 00 00    E          LD      A,(RXTIME)
191 00B4
192                     * * WHEN > 100
193 00B4 FE 64                  CP      100
194 00B6 38 05 00BD             JR      C,FT240
195 00B8
196                     * * * SUBTRACT 4 FRAMES
197 00B8 D6 04                  SUB     4
198 00BA C3 D4 00    C          JP      FT300
199 00BD
200                     * * WHEN > 75
201 00BD               FT240:
202 00BD FE 4B                  CP      75
203 00BF 38 05 00C6             JR      C,FT260
204 00C1
205                     * * * SUBTRACT 3 FRAMES
206 00C1 D6 03                  SUB     3
207 00C3 C3 D4 00    C          JP      FT300
```

```
208 00C6
209                    * * WHEN > 50
210 00C6               FT260:
211 00C6 FE 32                CP       50
212 00C8 38 05 00CF           JR       C,FT280
213 00CA
214                    * * * SUBTRACT 2 FRAMES
215 00CA D6 02                SUB      2
216 00CC C3 D4 00    C        JP       FT300
217 00CF
218                    * * WHEN > 25
219 00CF               FT280:
220 00CF FE 19                CP       25
221 00D1 38 01 00D4           JR       C,FT300
222 00D3
223                    * * * SUBTRACT 1 FRAME
224 00D3 3D                   DEC      A
225 00D4
226                    * * END CASE
227 00D4               FT300:
228 00D4
229                    * * DO UNTIL FRAMES < 10
230 00D4 0E 00                LD       C,0
231 00D6 47                   LD       B,A
232 00D7
233                    * * * SUBTRACT 10 FRAMES
234 00D7 D6 0A         FT320: SUB      10
235 00D9 38 04 00DF           JR       C,FT340
236 00DB
237                    * * * INCREMENT 10THS OF SECONDS COUNTER
238 00DB 0C                   INC      C
239 00DC 47                   LD       B,A
240 00DD
241                    * * END UNTIL
242 00DD 18 F8 00D7           JR       FT320
243 00DF               FT340:
244 00DF
245                    * * COMBINE 10THS AND 100THS AS A BCD
246 00DF 79                   LD       A,C
247 00E0 07                   RLCA
248 00E1 07                   RLCA
249 00E2 07                   RLCA
250 00E3 07                   RLCA
251 00E4 B0                   OR       B
252 00E5 F3                   DI
253 00E6
254                    * * WRITE NEW TIME INTO RTC
255 00E6 0E 00        E        LD       C,.LOW.HUNDRD
256 00E8 21 00 00     E        LD       HL,WKAREA
257 00EB 06 04                 LD       B,4
258 00ED D3 00        E        OUT      (.LOW.HUNDRD),A
259 00EF               FT350:
260 00EF 0C                   INC      C
261 00F0 ED A3                OUTI
262 00F2 20 FB 00EF           JR       NZ,FT350
263 00F4 FB                   EI
264 00F5
265                    * * END PROCEDURE
```

```
266 00F5 C9              RET
267 00F6                 END

ERRORS = 0000

FT100  C 0072  FT120  C 007A  FT140  C 0084  FT160  C 008E
FT180  C 009B  FT20   C 001F  FT200  C 00A2  FT220  C 00AE
FT240  C 00BD  FT260  C 00C6  FT280  C 00CF  FT300  C 00D4
FT320  C 00D7  FT340  C 00DF  FT350  C 00EF  FT40   C 003D
FT60   C 0045  FT80   C 0064  FTRTC  C 0000  HUNDRD E 0002
MEMORY M 0000  PAGERX E 0006  PAGETX E 0004  REPAGR E 0007
REPAGT E 0005  RXTIME E 0000  STACK  S 0000  TXTIME E 0003
WKAREA E 0001
```

```
 1   ;********************************************************************
 2   ;*                                                                  *
 3   ;*    NAME:  TRANSMIT FAULTS    (TXFLTS)    PPS REF                 *
 4   ;*                                                                  *
 5   ;*    FILE NAME:  TXFLTS.SRC                                        *
 6   ;*                                                                  *
 7   ;*    FUNCTION:  CHECKS STATUS OF FAULTS FOR TRANSMIT HOP AND TIME  *
 8   ;*               MODES AND SETS FLAGS TO REFLECT STATUS.            *
 9   ;*                                                                  *
10   ;*    METHOD:  N/A                                                  *
11   ;*                                                                  *
12   ;*    INPUT PARAMETERS:                                             *
13   ;*                                                                  *
14   ;*    NAME       DESCRIPTION              TYPE    LENGTH    RANGE   *
15   ;*    NONE                                                          *
16   ;*                                                                  *
17   ;*    OUTPUT PARAMETERS:                                            *
18   ;*                                                                  *
19   ;*    NAME       DESCRIPTION              TYPE    LENGTH    RANGE   *
20   ;*    A          STATUS OF FAULTS (DFFLTS)   BOOLEAN 1 BYTE   N/A   *
21   ;*                                                                  *
22   ;*    DATA ACCESSED OR ALTERED EXTERNAL TO MODULE:                  *
23   ;*                                                                  *
24   ;*    NAME       DESCRIPTION           TYPE    LENGTH  RANGE  DIRECT*
25   ;*    DFFLGS     DISPAY/FAULT FLAGS    BOOLEAN 1 BYTE   N/A    BOTH *
26   ;*    SAMPLE     SAMPLE TIME COUNTER   BINARY  1 BYTE   0-20   INPUT*
27   ;*                                                                  *
28   ;*    RETRICTIONS:  USES ACCUMULATOR                                *
29   ;*                                                                  *
30   ;*    SUPPORTING MODULES:  NONE                                     *
31   ;*                                                                  *
32   ;*    COPYRIGHT 1983 ROCKWELL INTERNATIONAL                         *
33   ;*    COLLINS TELECOMMUNICATIONS PRODUCT DIVISION                   *
34   ;*                                                                  *
35   ;*    AUTHOR:  C A BONEBRIGHT         DATE:  JULY 19, 1983          *
36   ;*                                                                  *
37   ;*    VERSION:  1.0                                                 *
38   ;*                                                                  *
39   ;*    REVISION:                       DATE:                         *
40   ;*                                                                  *
41   ;********************************************************************
42 0000
43              CSEG
```

```
44 0000                           TITLE    'TXFLTS
45                                NAME     TXFLTS
46                                PUBLIC   TXFLTS
47.                               EXTRN    BATFLT,DFFLGS,PAFLT,APRTC,APRTA,SAMPLE,SYSSTS
48 0000
49                       ;* PROCEDURE TRANSMIT FAULTS
50 0000                  TXFLTS:
51 0000
52                       ;* * IF SAMPLE TIME COUNTER IS LESS THAN 18
53 0000 3A 00 00     E            LD       A,(SAMPLE)
54 0003 FE 12                     CP       18
55 0005 D2 44 00     C            JP       NC,TXF60
56 0008
57                       ;* * THEN
58                       ;* * * SAMPLE FAULTS
59 0008
60                       ;* * * CASE OF FAULT STATUS
61 0008
62                       ;* * * WHEN BATTERY = FAULT
63 0008 3A 00 00     E            LD       A,(APRTC)
64 000B E6 00        E            AND      .LOW.BATFLT
65 000D 28 0E 001D                JR       Z,TXF10
66 000F
67                       ;* * * * IF BATTERY FAULT NOT ALREADY SET
68 000F 3A 00 00     E            LD       A,(DFFLGS)
69 0012 E6 01                     AND      01H
70 0014 20 2E 0044               JR       NZ,TXF50
71 0016
72                       ;* * * * THEN
73                       ;* * * * * SET DISPLAY BATTERY FAULT FLAG
74 0016 3E 05                     LD       A,05H
75 0018 32 00 00     E            LD       (DFFLGS),A
76 001B
77                       ;* * * * END IF
78 001B 18 27 0044               JR       TXF50
79 001D
80                       ;* * * WHEN PA = FAULT
81 001D                  TXF10:
82 001D 3A 00 00     E            LD       A,(APRTA)
83 0020 E6 00        E            AND      .LOW.PAFLT
84 0022 28 15 0039               JR       Z,TXF20
85 0024
86                       ;* * * * IF RADIO NOT IN LOW POWER MODE
87 0024 21 02 00     E            LD       HL,SYSSTS+2
88 0027 CB 46                     BIT      0,(HL)
89 0029 20 0E 0039               JR       NZ,TXF20
90 002B
91                       ;* * * * THEN
92 002B
93                       ;* * * * * IF R/T FAULT NOT ALREADY SET
94 002B 3A 00 00     E            LD       A,(DFFLGS)
95 002E E6 02                     AND      02H
96 0030 20 12 0044               JR       NZ,TXF50
97 0032
98                       ;* * * * * THEN
99                       ;* * * * * * SET DISPLAY R/T FAULT FLAG
100 0032 3E 06                    LD       A,06H
101 0034 32 00 00    E            LD       (DFFLGS),A
102 0037
```

```
103                             ;* * * * END IF
104 0037 18 0B 0044                     JR      TXF50
105 0039
106                             ;* * * * END IF
107 0039
108                             ;* * * ELSE (NO FAULTS)
109 0039              TXF20:
110 0039
111                             ;* * * * IF FAULT FLAGS SET
112 0039 3A 00 00       E               LD      A,(DFFLGS)
113 003C B7                             OR      A
114 003D 28 05 0044                     JR      Z,TXF30
115 003F
116                             ;* * * * THEN
117                             ;* * * * * SET DISPLAY NET ID FLAG & CLEAR FAULT FLAGS
118 003F 3E 80                          LD      A,80H
119 0041 32 00 00       E               LD      (DFFLGS),A
120 0044
121                             ;* * * * END IF
122 0044              TXF30:
123                             ;* * * END CASE
124 0044              TXF50:
125 0044
126                             ;* * END IF
127 0044              TXF60:
128                             ;* END PROCEDURE
129 0044 C9                             RET
130 0045                                END

ERRORS = 0000

APRTA  E 0004    APRTC  E 0003    BATFLT E 0000    DFFLGS E 0001
MEMORY M 0000    PAFLT  E 0002    SAMPLE E 0005    STACK  S 0000
SYSSTS E 0006    TXF10  C 001D    TXF20  C 0039    TXF30  C 0044
TXF50  C 0044    TXF60  C 0044    TXFLTS C 0000
 1                      ;******************************************************************
 2                      ;*                                                                *
 3                      ;*      NAME:  DISPLAY HOP FAULTS (DSPFLT)      PPS REF           *
 4                      ;*                                                                *
 5                      ;*      FILE NAME:  DSPFLT.SRC                                    *
 6                      ;*                                                                *
 7                      ;*      FUNCTION:  HANLDES DISPLAY OF BATTERY AND R/T FAULTS IN THE *
 8                      ;*                 HOP MODE AND IMPLEMENTS FAULT TONE.            *
 9                      ;*                                                                *
10                      ;*      METHOD:  N/A                                              *
11                      ;*                                                                *
12                      ;*      INPUT PARAMETERS:                                         *
13                      ;*                                                                *
14                      ;*      NAME      DESCRIPTION              TYPE  LENGTH   RANGE   *
15                      ;*      ACC       REPAGT OR REPAGR                                *
16                      ;*                (RESYNC PAGE FRAME COUNTER)  BINARY 1 BYTE  0-3  *
17                      ;*                                                                *
18                      ;*      OUTPUT PARAMETERS:                                        *
19                      ;*                                                                *
20                      ;*      NAME      DESCRIPTION              TYPE  LENGTH   RANGE   *
21                      ;*      NONE                                                      *
22                      ;*                                                                *
```

```
23              ;*     DATA ACESSED OR ALTERED EXTERNAL TO MODULE:                *
24              ;*                                                                 *
25              ;*     NAME      DESCRIPTION        TYPE   LENGTH  RANGE  DIRECT   *
26              ;*     DFFLGS    DISPAY/FAULT FLAGS BOOLEAN 1 BYTE  N/A   BOTH     *
27              ;*                                                                 *
28              ;*     RETRICTIONS:  USES A,B,C,D, & E REGISTERS                   *
29              ;*                                                                 *
30              ;*     SUPPORTING MODULES:  DO - DATA OUT; OUTPUTS DATA TO DISPLAY *
31              ;*                                                                 *
32              ;*     COPYRIGHT 1983 ROCKWELL INTERNATIONAL                       *
33              ;*     COLLINS TELECOMMUNICATIONS PRODUCT DIVISION                 *
34              ;*                                                                 *
35              ;*     AUTHOR:  C A BONEBRIGHT        DATE:  JULY 19, 1983         *
36              ;*                                                                 *
37              ;*     VERSION:  1.0                                               *
38              ;*                                                                 *
39              ;*     REVISION:                      DATE:                        *
40              ;*                                                                 *
41              ;*****************************************************************
42 0000
43                      CSEG
44 0000                 TITLE   'DSPFLT'
45                      NAME    DSPFLT
46                      PUBLIC  DSPFLT
47                      EXTRN   DFFLGS,BATTRY,RT,NETID,DO,TONE
48                      EXTRN   FLTLEG,APRTBC,APRTBS
49 0000
50              ;* PROCEDURE DISPLAY HOP FAULTS
51 0000         DSPFLT:
52              ;* * CASE OF DISPLAY FAULT FLAGS
53 0000 4F              LD      C,A                   ;SAVE COUNTER VALUE
54 0001 3A 00 00   E    LD      A,(DFFLGS)
55 0004
56              ;* * WHEN DISPLAY MESSAGE FLAG SET
57 0004 CB 57           BIT     2,A
58 0006 28 20 0028      JR      Z,DSP40
59 0008
60              ;* * * SET MESSAGE DISPLAYED FLAG & CLEAR DISPLAY MESSAGE FLAG
61 0008 CB E7           SET     4,A
62 000A CB 97           RES     2,A
63 000C 32 00 00   E    LD      (DFFLGS),A
64 000F
65              ;* * * IF BATTERY FAULT FLAG SET
66 000F CB 47           BIT     0,A
67 0011 28 08 001B      JR      Z,DSP20
68 0013
69              ;* * * THEN
70              ;* * * * DISPLAY 'BAT'
71 0013 11 00 00   E    LD      DE,BATTRY
72 0016 CD 00 00   E    CALL    DO
73 0019 18 06 0021      JR      DSP30
74 001B
75              ;* * * ELSE
76 001B         DSP20:
77 001B
78              ;* * * * DISPLAY 'RT'
79 001B 11 00 00   E    LD      DE,RT
80 001E CD 00 00   E    CALL    DO
81 0021
82              ;* * * END IF
```

```
 83 0021                           DSP30:
 84                                ;* * * TRUN TONE ON
 85 0021 3E 00         E                   LD      A,.LOW.TONE
 86 0023 32 00 00      E                   LD      (APRTBC),A
 87 0026 18 5B 0083                        JR      DSP150
 88 0028
 89                                ;* * WHEN DISPLAY FAULT FLAG IS SET
 90 0028                           DSP40:
 91 0028 CB 5F                             BIT     3,A
 92 002A 28 14 0040                        JR      Z,DSP50
 93 002C
 94                                ;* * * SET FAULT DISPLAYED FLAG & CLEAR DISPLAY FAULT FLAG
 95 002C CB EF                             SET     5,A
 96 002E CB 9F                             RES     3,A
 97 0030 32 00 00      E                   LD      (DFFLGS),A
 98 0033
 99                                ;* * * DISPLAY FAULT
100 0033 11 00 00      E                   LD      DE,FLTLEG
101 0036 CD 00 00      E                   CALL    DO
102 0039
103                                ;* * * TURN TONE OFF
104 0039 3E 00         E                   LD      A,.LOW.TONE
105 003B 32 00 00      E                   LD      (APRTBS),A
106 003E 18 43 0083                        JR      DSP150
107 0040
108                                ;* * WHEN MESSAGE DISPLAYED FLAG IS SET
109 0040                           DSP50:
110 0040 CB 67                             BIT     4,A
111 0042 28 14 0058                        JR      Z,DSP80
112 0044
113                                ;* * * IF COUNTER = 0 OR 1
114 0044 47                                LD      B,A             ;SAVE FLAGS
115 0045 79                                LD      A,C             ;FETCH COUNTER
116 0046 FE 00                             CP      0
117 0048 28 04 004E                        JR      Z,DSP60
118 004A FE 01                             CP      1
119 004C 20 35 0083                        JR      NZ,DSP150
120 004E
121                                ;* * * THEN
122 004E                           DSP60:
123 004E
124                                ;* * * SET DISPLAY FAULT FLAG & CLEAR MESSAGE DISPLAYED FLAG
125 004E 78                                LD      A,B
126 004F CB DF                             SET     3,A
127 0051 CB A7                             RES     4,A
128 0053 32 00 00      E                   LD      (DFFLGS),A
129 0056
130                                ;* * * END IF
131 0056                           DSP70:
132 0056 18 2B 0083                        JR      DSP150
133 0058
134                                ;* * WHEN FAULT DISPLAYED FLAG SET
135 0058                           DSP80:
136 0058 CB 6F                             BIT     5,A
137 005A 28 14 0070                        JR      Z,DSP120
138 005C
139                                ;* * * IF COUNTER = 2 OR 3
140 005C 47                                LD      B,A             ;SAVE FLAGS
141 005D 79                                LD      A,C             ;FETCH COUNTER
```

```
142 005E FE 02                    CP      2
143 0060 28 04 0066               JR      Z,DSP90
144 0062 FE 03                    CP      3
145 0064 20 1D 0083               JR      NZ,DSP150
146 0066
147                          ;* * * THEN
148 0066                     DSP90:
149 0066
150                          ;* * * SET DISPLAY MESSAGE FLAG & CLEAR FAUTL DISPLAYED FLAG
151 0066 78                       LD      A,B             ;FETCH FLAGS
152 0067 CB D7                    SET     2,A
153 0069 CB AF                    RES     5,A
154 006B 32 00 00    E            LD      (DFFLGS),A
155 006E
156                          ;* * * END IF
157 006E                     DSP100:
158 006E 18 13 0083               JR      DSP150
159 0070
160                          ;* * WHEN DISPLAY NET ID FLAG IS SET
161 0070                     DSP120:
162 0070 CB 7F                    BIT     7,A
163 0072 28 0F 0083               JR      Z,DSP150
164 0074
165                          ;* * * CLEAR DISPLAY NET ID FLAG
166 0074 AF                       XOR     A
167 0075 32 00 00    E            LD      (DFFLGS),A
168 0078
169                          ;* * * TURN TONE OFF
170 0078 3E 00       E            LD      A,.LOW.TONE
171 007A 32 00 00    E            LD      (APRTBS),A
172 007D
173                          ;* * * DISPLAY NET ID
174 007D 11 00 00    E            LD      DE,NETID
175 0080 CD 00 00    E            CALL    DO
176 0083
177                          ;* * END CASE
178 0083                     DSP150:
179 0083
180                          ;* END PROCEDURE
181 0083 C9                       RET
182 0084                          END

ERRORS = 0000

APRTBC E 0007   APRTBS E 0008   BATTRY E 0001   DFFLGS E 0000
DO     E 0004   DSP100 C 006E   DSP120 C 0070   DSP150 C 0083
DSP20  C 001B   DSP30  C 0021   DSP40  C 0028   DSP50  C 0040
DSP60  C 004E   DSP70  C 0056   DSP80  C 0058   DSP90  C 0066
DSPFLT C 0000   FLTLEG E 0006   MEMORY M 0000   NETID  E 0003
RT     E 0002   STACK  S 0000   TONE   E 0005

1          ***********************************************************************
 2          *                                                                     *
 3          * NAME: STORE FREQUENCY      (STRFRQ)         PPS REF:                *
 4          *                                                                     *
 5          * FILE NAME: STRFRQ.SRC                                               *
 6          *                                                                     *
 7          * FUNCTION:  STORES FREQUENCY IN TABLE & INCREMENTS TABLE POINTER.    *
```

```
 8                *                                                                *
 9                * METHOD: N/A                                                     *
10                *                                                                *
11                * INPUT PARAMETERS:                                               *
12                * NAME        DESCRIPTION              TYPE    LENGTH   RANGE     *
13                * DE          CHANNEL WITHOUT BAND BITS                 06CC-0FDB *
14                *                                                                *
15                * OUTPUT PARAMETERS:                                              *
16                * NAME        DESCRIPTION              TYPE    LENGTH   RANGE     *
17                * DE          CHANNEL WITHOUT BAND BITS                 06CC-0FDB *
18                *                                                                *
19                * DATA ACCESSED OR ALTERED EXTERNAL TO MODULE:                    *
20                *                                                                *
21                * NAME    DESCRIPTION      TYPE     LENGTH    RANGE     DIR.     *
22                * FTPTR   FREQ TABLE PTR   BINARY   2 BYTES   N/A       BOTH     *
23                *                                                                *
24                * RESTRICTIONS: USES ACC,B,C,D,E,H & L REGISTERS                 *
25                *                                                                *
26                * SUPPORTING MODULES: BNDBTS - SETS BAND BITS IN CHANNEL.         *
27                *                                                                *
28                * COPYRIGHT 1984 ROCKWELL INTERNATIONAL                           *
29                * COLLINS TELECOMMUNICATIONS PRODUCTS DIVISION                    *
30                *                                                                *
31                * AUTHOR: C. A. BONEBRIGHT         DATE: JAN 3, 1984              *
32                *                                                                *
33                * VERSION: 1.0                                                    *
34                *                                                                *
35                * REVISION:                        DATE:                          *
36                *                                                                *
37                ***************************************************************
38 0000
39                         CSEG
40 0000
41 0000                    TITLE   'STRFRQ
42                         NAME    STRFRQ
43                         PUBLIC  STRFRQ
44                         EXTRN   FTPTR,BNDBTS
45 0000
46                * PROCEDURE STORE FREQUENCY
47.0000          STRFRQ:
48 0000
49                * * SET BAND BITS
50 0000 CD 00 00   E       CALL    BNDBTS
51 0003
52                * * SET FREQ STROBE BIT
53 0003 CB FA              SET     7,D
54 0005
55                * * LOAD CHANNEL IN FREQ TABLE
56 0005 2A 00 00   E       LD      HL,(FTPTR)
57 0008 73                 LD      (HL),E
58 0009 23                 INC     HL
59 000A 72                 LD      (HL),D
60 000B
61                * * INCREMENT TABLE POINTER
62 000B 23                 INC     HL
63 000C 22 00 00   E       LD      (FTPTR),HL
64 000F
65                * * RESET BAND BITS & STROBE BIT
66 000F 3E 0F              LD      A,0FH
```

```
67 0011 A2              AND   D
68 0012 57              LD    D,A
69 0013
70                    * END PROCEDURE
71 0013 C9              RET
72 0014                 END

ERRORS = 0000

BNDBTS E 0001   FTPTR E 0000   MEMORY M 0000   STACK  S 0000
STRFRQ C 0000
   1          *****************************************************************
   2          *                                                               *
   3          * NAME: GOOD FREQUENCY     (GDFREQ)         PPS REF:             *
   4          *                                                               *
   5          * FILE NAME: GDFREQ.SRC                                          *
   6          *                                                               *
   7          * FUNCTION: FINDS USEABLE FREQUENCY TO BE STORED IN FREQUENCY TABLE BY *
   8          *           SEARCHING FOR USEABLE FREQS (INDICATED BY A ZERO) IN THE  *
   9          *           INCLUDE TABLE.                                       *
  10          *                                                               *
  11          * METHOD: N/A                                                    *
  12          *                                                               *
  13          * INPUT PARAMETERS:                                              *
  14          * NAME       DESCRIPTION        TYPE    LENGTH     RANGE         *
  15          * DE    CHANNEL WITHOUT BAND BITS                  06CC-0FDB     *
  16          *                                                               *
  17          * OUTPUT PARAMETERS:                                             *
  18          * NAME       DESCRIPTION        TYPE    LENGTH     RANGE         *
  19          * DE    CHANNEL WITHOUT BAND BITS                  06CC-0FDB     *
  20          *                                                               *
  21          * DATA ACCESSED OR ALTERED EXTERNAL TO MODULE:                   *
  22          *                                                               *
  23          * NAME       DESCRIPTION     TYPE   LENGTH    RANGE       DIR.   *
  24          *                                                               *
  25          * RESTRICTIONS: USES ACC,B,C,D,E,H & L REGISTER                  *
  26          *                                                               *
  27          * SUPPORTING MODULES:  NONE                                      *
  28          *                                                               *
  29          * COPYRIGHT 1984 ROCKWELL INTERNATIONAL                          *
  30          * COLLINS TELECOMMUNICATIONS PRODUCTS DIVISION                   *
  31          *                                                               *
  32          * AUTHOR: C. A. BONEBRIGHT          DATE: JAN 3, 1984            *
  33          *                                                               *
  34          * VERSION: 1.0                                                   *
  35          *                                                               *
  36          * REVISION:                         DATE:                        *
  37          *                                                               *
  38          *****************************************************************
  39 0000
  40                    CSEG
  41 0000
  42 0000              TITLE  'GDFREQ'
  43                  NAME   GDFREQ
  44                  PUBLIC GDFREQ
  45                  EXTRN  FRQMSK,INTABP,WKAREA,CHNINC,INCEND
  46 0000
```

```
 47                         * PROCEDURE GDFREQ
 48 0000                    GDFREQ:
 49 0000
 50                         * * FETCH FREQ BIT MASK & INCLUDE TABLE POINTER
 51 0000 3A 00 00    E              LD      A,(FRQMSK)
 52 0003 4F                          LD      C,A
 53 0004 2A 00 00    E              LD      HL,(INTABP)
 54 0007
 55                         * * DO UNTIL FREQ TO BE STORED FOUND (CHANNEL INCREMENT = 0)
 56                         * * OR INCLUDE TABLE POINTER > END ADDRESS OF INCLUDE TABLE
 57 0007                    GOOD20:
 58 0007
 59                         * * * DO UNTIL USEABLE FREQ FOUND OR INCLUDE TABLE POINTER >
 60                         * * * END ADDRESS (INCLUDE TABLE ADDRESS + 290)
 61 0007                    GOOD40:
 62 0007
 63                         * * * * INCREMENT CHANNEL
 64 0007 13                          INC     DE
 65 0008
 66                         * * * * ROTATE BIT MASK LEFT
 67 0008 CB 01                       RLC     C
 68 000A
 69                         * * * * IF CARRY SET
 70 000A 30 18 0024                  JR      NC,GOOD70
 71 000C
 72                         * * * * THEN
 73                         * * * * * CLEAR CARRY
 74 000C 3F                          CCF
 75 000D
 76                         * * * * * INCREMENT TABLE POINTER
 77 000D 23                          INC     HL
 78 000E
 79                         * * * * * TEST TABLE POINTER FOR > END ADDRESS
 80 000E ED 53 00 00   E             LD      (WKAREA),DE
 81 0012 22 02 00      E             LD      (WKAREA+2),HL
 82 0015 ED 5B 00 00   E             LD      DE,(INCEND)
 83 0019 ED 52                       SBC     HL,DE
 84 001B ED 5B 00 00   E             LD      DE,(WKAREA)
 85 001F 2A 02 00      E             LD      HL,(WKAREA+2)
 86 0022
 87                         * * * * END IF
 88 0022                    GOOD60:
 89 0022
 90                         * * * END UNTIL
 91 0022 30 06 002A                  JR      NC,GOOD80
 92 0024                    GOOD70:
 93 0024 7E                          LD      A,(HL)
 94 0025 A1                          AND     C
 95 0026 20 DF 0007                  JR      NZ,GOOD40
 96 0028
 97                         * * END UNTIL
 98 0028 10 DD 0007                  DJNZ    GOOD20
 99 002A                    GOOD80:
100 002A
101                         * * STORE FREQ BIT MASK & INCLUDE TABLE POINTER
102 002A 79                          LD      A,C
103 002B 32 00 00      E             LD      (FRQMSK),A
104 002E 22 00 00      E             LD      (INTABP),HL
105 0031
```

```
106                   * END PROCEDURE
107 0031 C9                   RET
108 0032                      END

ERRORS = 0000

CHNINC E 0003   FROMSK E 0000   GDFREQ C 0000   GOOD20 C 0007
GOOD40 C 0007   GOOD60 C 0022   GOOD70 C 0024   GOOD80 C 002A
INCEND E 0004   INTABP E 0001   MEMORY M 0000   STACK  S 0000
WKAREA E 0002

1 0000                TITLE   'PROMDF
  2                     NAME    PROMDF
  3                     PUBLIC  FREQT,DATABF,FILLT,TIME1,TIME2,TXTIME,RXTIME
  4                     PUBLIC  WKAREA,BOUND1,BOUND2,BOUND3,PAGFRQ,NXTFRQ,SEARCH
  5                     PUBLIC  SNCTIM,INPTR,OUTPTR,PTTI,SS1ST,RCVFLG,FILLID,INCT
  6                     PUBLIC  EOMFLG,DSPLPG,RXFLGS,SQULCH,TXFLGS,TIMRXD,PAGETX
  7                     PUBLIC  PAGERX,SYNCTR,BCTR20,RXBYTS,EOMCTR,SOMCTR,TXEOMC
  8                     PUBLIC  TXSOMC,DAYOMO,DAYOWK,MINUTE,HUNDRD,STAT,USART,UTDATA
  9                     PUBLIC  APRTBC,APRTBS,APRTC,BPRTA,BPRTB,BPRTBC,BPRTCC,BPRTCS
 10                     PUBLIC  CPRTCC,CPRTCS,SQMSK,EOMBYT,SOMBYT,DELIMT,SNCHAR,BITSNC
 11                     PUBLIC  SNCBYT,PAGDET,BPRTC,DUMMY,TXDUM,FALSE,ADDRA,ADDRB,ADDRC
 12                     PUBLIC  BDDRA,BDDRB,BDDRC,CDDRC,AMODE,BMODE,CMODE,CLKRST
 13                     PUBLIC  FTPTR,HIBLOW,HIBHI,CHNINC,CHARLM
 14                     PUBLIC  DELCHN,INCCHN,ERRTBL,DATMSK,INCTBL,SQLDIS
 15                     PUBLIC  PNKEY,PNCYCL,HOPMSK,BITRCK,PAFLT,ANTFLT,TRLINE
 16                     PUBLIC  TONE,PTTMSK,PAGE,PGDTCT,RSTINT,RSTRCV,RXCLKS,SRCHST
 17                     PUBLIC  EOM,RXSTRB,BND1LO,BND1HI,BND2LO,BND2HI,BND3LO,BND3HI
 18                     PUBLIC  EOMFRM,BOTHAB,EXITFL,REDLIM,IDELIM,SSPAGE,RETX
 19                     PUBLIC  REPAGT,REPAGR,RESYNC,TMCALC,LEGAL,FILL,PAGEFL,RESTOR
 20                     PUBLIC  BOUNCE,FRQCAL,HYSTRI,SECTMR,NCSTRU,TXFRST,TXTRCK
 21                     PUBLIC  BSTORE,BSYNC,CPRTA,VALSOM,TXCMDW,RXCMDW,RXSOMC,CWDATA
 22                     PUBLIC  TIME3,TIME4,FRAMES,TBYTCT,TIM1ST,FLTMCT,NONNCS,CVOICE
 23                     PUBLIC  RMTDOT,NCSTCT,INCADD,INCEND,INTRLV,FROMSK,INTABP
 24                     PUBLIC  DFFLGS,BATFLT,RMATCH,MISSOM,RESFLG,SAMPLE,CIIF,FPCKSM
 25 0000
 26 0000
 27                   * ECCM DEFINITION MODULE
 28 0000
 29 0000              PROMDF:
 30 0000
 31                   * * TABLES AND BUFFERS
 32                             DSEG
 33 0000
 34 0000              FREQT:  DS    1024   ;TABLE OF 512 HOPPING FREQUENCIES
 35 0400              DATABF: DS    48     ;DATA BUFFER
 36 0430              FILLID: DS    2      ;FILL IDENTIFICATION CODE
 37 0432              INCT:   DS    291    ;FILL DELETE TABLE
 38 0555              FILLT:  DS    112    ;FILL FREQUENCY PLANS TABLE
 39 05C5              TIME1:  DS    8      ;BIT BUFFER FOR 1ST TIME BYTE
 40 05CD              TIME2:  DS    8      ;BIT BUFFER FOR 2ND TIME BYTE
 41 05D5              TIME3:  DS    8      ;BIT BUFFER FOR 3RD TIME BYTE
 42 05DD              TIME4:  DS    8      ;BIT BUFFER FOR 4TH TIME BYTE
 43 05E5              TXTIME: DS    4      ;INTERNAL FRAME TIME
 44 05E9              RXTIME: DS    4      ;RECEIVED FRAME TIME
 45 05ED              WKAREA: DS    4      ;WORK AREA BUFFER
 46 05F1              BOUND1: DS    4      ;1ST (LATEST) MINUTE BOUNDARY
 47 05F5              BOUND2: DS    4      ;2ND MINUTE BOUNDARY
```

```
 48 05F9                   BOUND3: DS      4       ;3RD (EARLIEST) MINUTE BOUNDARY
 49 05FD                   PAGFRQ: DS      2       ;PAGE FREQUENCY STORAGE
 50 05FF                   NXTFRQ: DS      2       ;NEXT RX HOPPING FREQUENCY
 51 0601                   SEARCH: DS      2       ;SYNC SEARCH FREQUENCY
 52 0603                   SNCTIM: DS      2       ;2 LSB'S OF FRAME TIME + 2
 53 0605                   FRAMES: DS      4       ;FULL FRAME COUNT FOR TIME MODE
 54 0609                   PNKEY:  DS      2       ;PN GENERATOR KEY
 55 060B
 56 060B                   BND1LO: DS      2       ;BAND 1 LOW FREQ
 57 060D                   BND1HI: DS      2       ;BAND 1 HIGH FREQ
 58 060F                   BND2LO: DS      2       ;BAND 2 LOW FREQ
 59 0611                   BND2HI: DS      2       ;BAND 2 HIGH FREQ
 60 0613                   BND3LO: DS      2       ;BAND 3 LOW FREQ
 61 0615                   BND3HI: DS      2       ;BAND 3 HIGH FREQ
 62 0617                   CIIF:   DS      1       ;CHANNEL INCREMENT & INTERLEAVE FACTOR
 63 0618                   FPCKSM: DS      1       ;FREQUENCY PLAN CHECK SUM
 64 0619                   CHNINC: DS      1       ;CHANNEL INCREMENT
 65 061A                   INTRLV: DS      1       ;INTERLEAVE FACTOR
 66 061B                   FRQMSK: DS      1       ;FREQUENCY MASK POINTER FOR INCLUDE TABLE
 67 061C
 68 061C                   RXCMDW: DS      1       ;RECEIVED COMMAND WORD STORAGE
 69 061D                   TXCMDW: DS      1       ;TRANSMIT COMMAND WORD STORAGE
 70 061E                   PAGDET: DS      1       ;PAGE DETECT QUICK TEMP STORAGE
 71 061F                   EOM:    DS      1       ;CURRENT EOM BYTE COUNTER
 72 0620                   DELIMT: DS      1       ;DELIMIT BYTE BUFFER
 73 0621                   BSTORE: DS      1       ;BIT SYNC STATE STORAGE
 74 0622
 75 0622
 76                        * * POINTERS
 77 0622
 78 0622                   INPTR:  DS      2       ;DATA BUFFER INPUT POINTER
 79 0624                   OUTPTR: DS      2       ;DATA BUFFER OUTPUT POINTER
 80 0626                   FTPTR:  DS      2       ;FREQ TABLE POINTER FOR TABLE BUILD
 81 0628                   INCADD: DS      2       ;START ADDRESS OF INCLUDE TABLE
 82 062A                   INCEND: DS      2       ;END ADDRESS OF INCLUDE TABLE
 83 062C                   INTABP: DS      2       ;BYTE POINTER FOR INCLUDE TABLE
 84 062E
 85 062E
 86                        * * FLAGS
 87 062E
 88 062E                   PTTI:   DS      1       ;INTERNAL PTT & SYNC SEARCH FREQUENCY CHANGE
 89 062F                   SS1ST:  DS      1       ;SYNC SEARCH 1ST FLAG
 90 0630                   RCVFLG: DS      1       ;RECEIVE MODE INDICATOR
 91 0631                   EOMFLG: DS      1       ;END OF MESSAGE FLAG
 92 0632                   DSPLPG: DS      1       ;DISPLAY PAGE FLAG
 93 0633                   RXFLGS: DS      1       ;RECEIVE MODE FLAGS
 94                                                ;BIT 0 - SYNC CHARACTER
 95                                                ;BIT 1 - DELIMIT
 96                                                ;BIT 2 - COMMAND WORD
 97                                                ;BIT 3 - SOM
 98                                                ;BIT 4 - TX USART
 99                                                ;BIT 5 - RESYNC SOM FRAME
100 0634                   SQULCH: DS      1       ;SQUELCH ON FLAG
101                                                ;EQUATE TO DAVE'S FLAG
102 0635                   TXFLGS: DS      1       ;TRANSMIT MODE FLAGS
103                                                ;BITS 0 - 2  SYNC FRAME COUNT
104                                                ;BIT 3 - DUMMY FRAME FLAG
105                                                ;BIT 4 - SOM FLAG
106                                                ;BIT 5 - DATA FLAG
```

```
107                                            ;BIT 6 -   EOM FLAG
108                                            ;BIT 7 -   KEY (PTT) DROPPED FLAG
109 0636              EXITFL: DS    1    ;EXIT FLAG; USED BY RCVFRM
110 0637              RESYNC: DS    1    ;RESYNC FLAG
111 0638              TMCALC: DS    1    ;CALCULATE SYNC TIME & ERROR CORRECTION FLAG
112 0639              LEGAL:  DS    1    ;RESYNC LEGAL FLAG
113 063A              PAGEFL: DS    1    ;PAGE MODE - CURRENTLY RECEIVING PAGING
114 063B              RESTOR: DS    1    ;RESTORE DISPLAY FLAG (WHEN PAGE ACTIVITY CEASES)
115 063C              FRQCAL: DS    1    ;FREQUENCY ALREADY CALCULATED FLAG (10 SEC BOUNDARY)
116 063D              TXFRST: DS    1    ;TRANSMIT FIRST FLAG - FOR 1ST PASS OF INTFRM
117 063E              TIM1ST: DS    1    ;FIRST TIME TRANSMISSION FLAG FOR TIME MODE
118                                      ;TIME IS SENT TWICE - THREE FRAMES EACH TX
119 063F              VALSOM: DS    1    ;VALID SOM RCV'D FLAG
120 0640
121 0640              DFFLGS: DS    1    ;DISPLAY/FAULT FLAGS
122                                            ;BIT 0 - BATTERY FAULT
123                                            ;BIT 1 - R/T FAULT
124                                            ;BIT 2 - DISPLAY MESSAGE
125                                            ;BIT 3 - DISPLAY FAULT
126                                            ;BIT 4 - MESSAGE DISPLAYED
127                                            ;BIT 5 - FAULT DISPLAYED
128                                            ;BIT 6 - KEY INHIBIT
129                                            ;BIT 7 - DISPLAY NET ID
130 0641
131 0641              RESFLG: DS    1    ;RESYNC SOM FRAME FLAGS
132                                            ;BIT 0 - RESYNC SOM FRAME NEXT
133                                            ;BIT 1 - POST SOM FRAME
134 0642
135 0642
136                   * * COUNTERS
137 0642
138 0642              TIMRXD: DS    1    ;TIME BYTES RECEIVED COUNTER
139 0643              PAGETX: DS    1    ;TX PAGE FRAME POSITION COUNTER
140 0644              PAGERX: DS    1    ;RX PAGE FRAME POSITION COUNTER
141 0645              SNCBYT: DS    1    ;SYNC BYTE COUNTER (TXRDY)
142 0646              SYNCTR: DS    1    ;SYNC FRAME COUNTER TX (INTFRM)
143 0647              BCTR20: DS    1    ;20 BYTE COUNTER
144 0648              RXBYTS: DS    1    ;RECEIVED DATA BYTES COUNTER
145 0649              EOMCTR: DS    1    ;EOM RECEIVED BYTES COUNTER
146 064A              SOMCTR: DS    1    ;SOM RECEIVED BYTES COUNTER
147 064B              TXEOMC: DS    1    ;TX EOM BYTE COUNTER
148 064C              TXSOMC: DS    1    ;TX SOM BYTE COUNTER
149 064D              RXSOMC: DS    1    ;RX SOM BYTE & COMMAND WORD COUNTER
150 064E              TXDUM:  DS    1    ;TX DUMMY BYTE COUNTER
151 064F              FALSE:  DS    1    ;RCV FRAME COUNTER FOR FALSE SYNC PROTECTION
152 0650              CHARLM: DS    1    ;CHAR LIMIT COUNTER FOR FALSE CHAR SYNC PROTECTION
153 0651              EOMFRM: DS    1    ;EOM FRAME COUNTER
154 0652              SSPAGE: DS    1    ;SYNC SEARCH PAGE FRAME COUNTER
155 0653              REPAGT: DS    1    ;RESYNC PAGE COUNTER FOR TX TIME
156 0654              REPAGR: DS    1    ;RESYNC PAGE COUNTER FOR RX TIME
157 0655              BOUNCE: DS    1    ;DEBOUNCE (FOR PTT) COUNTER
158 0656              HYSTRI: DS    1    ;PAGE HYSTERESIS COUNTER
159 0657              SECTMR: DS    1    ;SECOND TIMER/COUNTER FOR PAGE TONE
160 0658              TBYTCT: DS    1    ;TIME BYTE COUNTER FOR TX'ING IN TIME MODE (TXRDY)
161 0659              FLTMCT: DS    1    ;FULL TIME COUNT FOR RCV'ING TIME IN TIME MODE (RXRDY)
162 065A              NCSTCT: DS    1    ;NCS TONE CTR (COUNTS # OF FRAMES DURATION OF TONE)
163 065B              RMATCH: DS    1    ;RECEIVED BYTE MATCHES
164 065C              MISSOM: DS    1    ;MISSED SOM FRAMES COUNTER
165 065D              SAMPLE: DS    1    ;SAMPLE TIME (FOR FAULTS) COUNTER
```

```
166 065E
167 065E
168                 * * ADDRESSES
169 065E
170                                 * *   RTC   * *
171 065E
172 4006           DAYOMO  EQU     4006H   ;DAY OF MONTH RTC REGISTER
173 4005           DAYOWK  EQU     4005H   ;DAY OF WEEK RTC REGISTER
174 4003           MINUTE  EQU     4003H   ;MINUTE RTC REGISTER
175 4001           HUNDRD  EQU     4001H   ;HUNDREDTHS OF SECONDS RTC REGISTER
176 4014           STAT    EQU     4014H   ;STATUS RTC BIT REGISTER
177 4012           CLKRST  EQU     4012H   ;RTC RESET REGISTER
178 065E
179 065E
180                                 * *   USART   * *
181 065E
182 5001           USART   EQU     5001H   ;USART COMMAND & MODE REGISTER
183 5000           UTDATA  EQU     5000H   ;USART DATA REGISTER
184 065E
185 065E
186                                 * *   PORTS   * *
187 065E
188                                 ;831A
189 065E
190 3609           APRTBC  EQU     3609H   ;PORT B - BIT CLEAR
191 360D           APRTBS  EQU     360DH   ;PORT B - BIT SET
192 3602           APRTC   EQU     3602H   ;PORT C - R/W
193 3604           ADDRA   EQU     3604H   ;PORT A DATA DIRECTION REGISTER (DDR)
194 3605           ADDRB   EQU     3605H   ;PORT B DDR
195 3606           ADDRC   EQU     3606H   ;PORT C DDR
196 3607           AMODE   EQU     3607H   ;MODE DEFINITON REGISTER
197 065E
198                                 ;831B
199 065E
200 3A20           BPRTA   EQU     3A20H   ;PORT A - R/W
201 3A21           BPRTB   EQU     3A21H   ;PORT B - R/W
202 3A29           BPRTBC  EQU     3A29H   ;PORT B - BIT CLEAR
203 3A22           BPRTC   EQU     3A22H   ;PORT C - R/W
204 3A2A           BPRTCC  EQU     3A2AH   ;PORT C - BIT CLEAR
205 3A2E           BPRTCS  EQU     3A2EH   ;PORT C - BIT SET
206 3A24           BDDRA   EQU     3A24H   ;PORT A DATA DIRECTION REGISTER (DDR)
207 3A25           BDDRB   EQU     3A25H   ;PORT B DDR
208 3A26           BDDRC   EQU     3A26H   ;PORT C DDR
209 3A27           BMODE   EQU     3A27H   ;MODE DEFINITON REGISTER
210 065E
211                                 ;831C
212 065E
213 3C4A           CPRTCC  EQU     3C4AH   ;PORT C - BIT CLEAR
214 3C4E           CPRTCS  EQU     3C4EH   ;PORT C - BIT SET
215 3C46           CDDRC   EQU     3C46H   ;PORT C - PORT C DDR
216 3C47           CMODE   EQU     3C47H   ;MODE DEFINITION REGISTER
217 3C48           CPRTAC  EQU     3C48H   ;PORT A - BIT CLEAR
218 3C4C           CPRTAS  EQU     3C4CH   ;PORT A - BIT SET
219 3C44           CDDRA   EQU     3C44H   ;PORT A DDR
220 3C40           CPRTA   EQU     3C40H   ;PORT A - R/W
221 065E
222 065E
223                 * * CONSTANTS
224 065E
```

```
225 0004            SQMSK   EQU     04H         ;BIT MASK FOR PAGE TONE ENABLE
226 00E4            EOMBYT  EQU     0E4H        ;EOM BYTE VALUE
227 00A2            SOMBYT  EQU     0A2H        ;SOM BYTE VALUE
228 0083            IDELIM  EQU     83H         ;DELIMITER BYTE VALUE
229 0024            REDLIM  EQU     24H         ;RESYNC DELIMITER BYTE VALUE
230 005A            SNCHAR  EQU     5AH         ;SYNC CHARACTER
231 00AA            BITSNC  EQU     0AAH        ;BIT SYNC PATTERN
232 0033            DUMMY   EQU     33H         ;DUMMY FRAME CHARACTER
233 000B            NCSTRU  EQU     0BH         ;VALUE FOR NCS BITS WHEN IN NCS MODE
234 0004            NONNCS  EQU     04H         ;VALUE FOR NCS BITS WHEN NON NCS
235 0040            CWDATA  EQU     40H         ;VALUE FOR DATA/VOICE BITS WHEN DATA MODE
236 00B0            CVOICE  EQU     0B0H        ;VALUE FOR DATA/VOICE BITS WHEN VOICE MODE
237 2A3C            HIBLOW  EQU     02A3CH      ;HI BAND, LOW HALF BAND (52.0 MHZ)
238 3ED8            HIBHI   EQU     03ED8H      ;HI BAND, HI HALF BAND (81.5 MHZ)
239 0B78            DELCHN  EQU     0B78H       ;DELETE CHANNEL VALUE
240 0C48            INCCHN  EQU     0C48H       ;INCLUDE CHANNEL VALUE
241 0010            PNCYCL  EQU     10H         ;# OF CYCLES IN PN GENERATOR
242 0008            SQLDIS  EQU     08H         ;PORT MASK FOR SQUELCH DISABLE
243 0004            DATMSK  EQU     04H         ;PORT MASK FOR DATA LINE (INPUT)
244 0002            HOPMSK  EQU     02H         ;PORT MASK TO SET OR CLEAR HOP LINE
245 0001            BITRCK  EQU     01H         ;PORT MASK FOR BIT TRACKING DISSABLE
246 0002            PAFLT   EQU     02H         ;PORT MASK FOR PA FAULT
247 0001            ANTFLT  EQU     01H         ;PORT MASK FOR ANTENNA FAULT
248 0010            TRLINE  EQU     10H         ;PORT MASK FOR T/R LINE
249 0004            TONE    EQU     04H         ;PORT MASK FOR NOT TONE
250 0001            PTTMSK  EQU     01H         ;PORT MASK FOR PTT LINE FROM HANDSET
251 0040            PAGE    EQU     40H         ;PORT MASK FOR PAGE LINE
252 0001            PGDTCT  EQU     01H         ;PORT MASK FOR PAGE DETECT
253 0008            RSTINT  EQU     08H         ;PORT MASK FOR RESET INTERNAL FRAME MARK
254 0004            RSTRCV  EQU     04H         ;PORT MASK FOR RESET RECEIVE FRAME MARK
255 000C            BOTHAB  EQU     0CH         ;PORT MASK FOR RESETTING BOTH RCV & INT FRAME MARK
256 0002            RXCLKS  EQU     02H         ;PORT MASK FOR RECEIVE CLOCK START
257 0001            SRCHST  EQU     01H         ;PORT MASK FOR SEARCH START
258 0080            RXSTRB  EQU     80H         ;PORT MASK FOR RECEIVE STROBE (FREQ LATCH)
259 0004            BSYNC   EQU     04H         ;PORT MASK FOR BIT SYNC
260 0020            TXTRCK  EQU     20H         ;PORT MASK FOR TX TRACKING ENABLE
261 0002            RMTDOT  EQU     02H         ;PORT MASK FOR REMOTE DATA OUT
262 0002            RETX    EQU     02H         ;PORT MASK FOR RETRANSMIT LINE
263 0004            BATFLT  EQU     04H         ;PORT MASK FOR BATTERY FAULT
264 065E
265 065E
266 2E6A            FILL    EQU     2E6AH       ;START ADDRESS OF FREQUENCY PLANS
267 2ED2            INCTBL  EQU     2ED2H       ;START ADDRESS OF INCLUDE TABLE
268 065E
269 065E
270                 * * BIT ERROR CORRECTION TABLE
271 065E
272                         CSEG
273 0000
274 0000 00         ERRTBL: DB      00H
275 0001 00                 DB      00H
276 0002 00                 DB      00H
277 0003 10                 DB      10H         ;BIT 12
278 0004 00                 DB      00H
279 0005 20                 DB      20H         ;BIT 13
280 0006 01                 DB      01H
281 0007 00                 DB      00H         ;BIT 0
282 0008 00                 DB      00H
283 0009 40                 DB      40H         ;BIT 14
```

```
284 000A 10              DB    10H
285 000B 00              DB    00H     ;BIT 4
286 000C 02              DB    02H
287 000D 00              DB    00H     ;BIT 1
288 000E 40              DB    40H
289 000F 00              DB    00H     ;BIT 6
290 0010 00              DB    00H
291 0011 80              DB    80H     ;BIT 15
292 0012 00              DB    00H
293 0013 04              DB    04H     ;BIT 10
294 0014 20              DB    20H
295 0015 00              DB    00H     ;BIT 5
296 0016 08              DB    08H
297 0017 00              DB    00H     ;BIT 3
298 0018 04              DB    04H
299 0019 00              DB    00H     ;BIT 2
300 001A 00              DB    00H
301 001B 02              DB    02H     ;BIT 9
302 001C 80              DB    80H
303 001D 00              DB    00H     ;BIT 7
304 001E 00              DB    00H
305 001F 01              DB    01H     ;BIT 8
306 0020
307 0020                 END
```

ERRORS = 0000

```
ADDRA    3604    ADDRB   3605    ADDRC    3606    AMODE    3607
ANTFLT   0001    APRTBC  3609    APRTBS   360D    APRTC    3602
BATFLT   0004    BCTR20 D 0647   BDDRA    3A24    BDDRB    3A25
BDDRC    3A26    BITRCK  0001    BITSNC   00AA    BMODE    3A27
BND1HI D 060D    BND1LO D 060B   BND2HI D 0611   BND2LO D 060F
BND3HI D 0615    BND3LO D 0613   BOTHAB   000C    BOUNCE D 0655
BOUND1 D 05F1    BOUND2 D 05F5   BOUND3 D 05F9   BPRTA    3A20
BPRTB    3A21    BPRTBC  3A29    BPRTC    3A22    BPRTCC   3A2A
BPRTCS   3A2E    BSTORE D 0621   BSYNC    0004    CDDRA    3C44
CDDRC    3C46    CHARLM D 0650   CHNINC D 0619   CIIF   D 0617
CLKRST   4012    CMODE   3C47    CPRTA    3C40    CPRTAC   3C48
CPRTAS   3C4C    CPRTCC  3C4A    CPRTCS   3C4E    CVOICE   00B0
CWDATA   0040    DATABF D 0400   DATMSK   0004    DAYOMO   4006
DAYOWK   4005    DELCHN  0B78    DELIMT D 0620   DFFLGS D 0640
DSPLPG D 0632    DUMMY   0033    EOM    D 061F    EOMBYT   00E4
EOMCTR D 0649    EOMFLG D 0631   EOMFRM D 0651   ERRTBL C 0000
EXITFL D 0636    FALSE  D 064F   FILL     2E6A   FILLID D 0430
FILLT  D 0555    FLTMCT D 0659   FPCKSM D 0618   FRAMES D 0605
FREQT  D 0000    FRQCAL D 063C   FRQMSK D 061B   FTPTR  D 0626
HIBHI    3ED8    HIBLOW  2A3C    HOPMSK   0002    HUNDRD   4001
HYSTRI D 0656    IDELIM  0083    INCADD D 0628   INCCHN   0C48
INCEND D 062A    INCT   D 0432   INCTBL   2ED2    INPTR  D 0622
INTABP D 062C    INTRLV D 061A   LEGAL  D 0639   MEMORY M 0000
MINUTE   4003    MISSOM D 065C   NCSTCT D 065A   NCSTRU   000B
NONNCS.  0004    NXTFRQ D 05FF   OUTPTR D 0624   PAFLT    0002
PAGDET D 061E    PAGE    0040    PAGEFL D 063A   PAGERX D 0644
PAGETX D 0643    PAGFRQ D 05FD   PGDTCT   0001    PNCYCL   0010
PNKEY  D 0609    PROMDF  0000    PTTI   D 062E   PTTMSK   0001
RCVFLG D 0630    REDLIM  0024    REPAGR D 0654   REPAGT D 0653
```

```
RESFLG D 0641    RESTOR D 063B    RESYNC D 0637    RETX       0002
RMATCH D 065B    RMTDOT    0002   RSTINT    0008   RSTRCV    0004
RXBYTS D 0648    RXCLKS    0002   RXCMDW D 061C    RXFLGS D 0633
RXSOMC D 064D    RXSTRB    0080   RXTIME D 05E9    SAMPLE D 065D
SEARCH D 0601    SECTMR D 0657    SNCBYT D 0645    SNCHAR    005A
SNCTIM D 0603    SOMBYT    00A2   SOMCTR D 064A    SOLDIS    0008
SQMSK     0004   SQULCH D 0634    SRCHST    0001   SS1ST D 062F
SSPAGE D 0652    STACK  S 0000    STAT      4014   SYNCTR D 0646
TBYTCT D 0658    TIM1ST D 063E    TIME1  D 05C5    TIME2  D 05CD
TIME3  D 05D5    TIME4  D 05DD    TIMRXD D 0642    TMCALC D 0638
TONE      0004   TRLINE    0010   TXCMDW D 061D    TXDUM  D 064E
TXEOMC D 064B    TXFLGS D 0635    TXFRST D 063D    TXSOMC D 064C
TXTIME D 05E5    TXTRCK    0020   USART     5001   UTDATA    5000
VALSOM D 063F    WKAREA D 05ED
```

```
 1 0000                        TITLE       'MODE CHANGE.SRC
 2                ;****************************************************************
 3                ;*                                                               *
 4                ;*    NAME: MODE CHANGE                          PPS REF 3.1.1.1 *
 5                ;*                                                       3.2.2.1 *
 6                ;*                                                               *
 7                ;*    FILENAME: MDCHNG.SRC                                       *
 8                ;*                                                               *
 9                ;*    FUNCTION: THIS ROUTINE RESPONDS TO THE NMI INTERRUPT LINE. IT CHECKS *
10                ;*              TO SEE IF THE INTERRUPT WAS THE RESULT OF THE OPERATOR    *
11                ;*              HITTING THE PTT ON THE HANDSET. IF IT WAS THEN THE ROUTINE *
12                ;*              ISSUES THE TRANSMIT MODE DATA TO THE RADIO SYSTEM.        *
13                ;*                                                               *
14                ;*    METHOD:                                                    *
15                ;*                                                               *
16                ;*    INPUT PARAMETERS:                                          *
17                ;*    NAME    DESCRIPTION                TYPE    LENGTH   RANGE  *
18                ;*                                                               *
19                ;*    NONE                                                       *
20                ;*                                                               *
21                ;*    OUTPUT PARAMETERS:                                         *
22                ;*    NAME    DESCRIPTION                TYPE    LENGTH   RANGE  *
23                ;*                                                               *
24                ;*    NONE                                                       *
25                ;*                                                               *
26                ;*    DATA ACCESSED OF ALTERED EXTERNAL TO MODULE:               *
27                ;*    NAME    DESCRIPTION           TYPE     LENGTH   RANGE   DIRECTION *
28                ;*                                                               *
29                ;*    SLWBUF  SLEW SWITCH BUFFER    ARRAY    36 BYTES  N/A     OUTPUT *
30                ;*    ENDBUF  END SLEW BUFFER PNTR  INTEGER  2 BYTES   0-65536 OUTPUT *
31                ;*    PWRSTK  POWER MODE DATA (IX+2) INTEGER 2 BITS    0-2     INPUT  *
32                ;*    RUNLUP  RUN LOOP FLAG (IX+7)  BOOLEAN  1 BIT     N/A     OUTPUT *
33                ;*    RMTINP  REMOTE DATA IN LINE   BOOLEAN  1 BIT     N/A     INPUT  *
34                ;*    PTT     PUSH-TO-TALK LINE     BOOLEAN  1 BIT     N/A     INPUT  *
35                ;*    SYSSTS  SYSTEM MODE DATA (IX) INTEGER  2 BITS    0-2     INPUT  *
36                ;*    TESTLN  RADIO TEST LINE       BOOLEAN  1 BIT     N/A     INPUT  *
37                ;*    ENDBUF  END SLEW BUFFER POINTER INTEGER 2 BYTES  0-65536 BOTH   *
38                ;*    PAGFLT  PAGE FAULT FLAG (FLTFLG)BOOLEAN 1 BIT    N/A     OUTPUT *
39                ;*    HOPFLT  HOP FAULT FLAG  (IX+11) BOOLEAN 1 BIT    N/A     INPUT  *
40                ;*    A3FLT   A3 FAULT FLAG (FLTFLG) BOOLEAN  1 BIT    N/A     OUTPUT *
41                ;*    OLDSTK  OLD STACK VALUE       INTEGER  2 BYTES  0-65536  INPUT  *
42                ;*    BLANK   BLANKING CONTROL LINE BOOLEAN  1 BIT    N/A      OUTPUT *
43                ;*    CHANNEL SYSTEM CHANNEL NUMBER INTEGER  1 BYTE   0-9      INPUT  *
44                ;*    TIR     TXMT/RCV CONTROL LINE BOOLEAN  1 BIT    N/A      OUTPUT *
```

```
45          ;*    HPA     APA CONTROL LINE        BOOLEAN  1 BIT    N/A      OUTPUT   *
46          ;*    TXFRST  TX FIRST INTFRM FLAG    BOOLEAN  1 BYTE   N/A      OUTPUT   *
47          ;*    PAGEFL  DISPLAY PAGE MODE FLAG  BOOLEAN  1 BYTE   N/A      OUTPUT   *
48          ;*    DSPLPG  DISPLAY PAGE FLAG       BOOLEAN  1 BYTE   N/A      OUTPUT   *
49          ;*    LEGAL   RESYNC LEGAL FLAG       BOOLEAN  1 BYTE   N/A      OUTPUT   *
50          ;*    BOUNCE  PTT DEBOUNCE COUNTER    INTEGER  1 BYTE   0-100    OUTPUT   *
51          ;*    SYNCTR  SYNC FRAME COUNTER      INTEGER  1 BYTE   0-6      OUTPUT   *
52          ;*    TXCMDW  TRANSMIT COMMAND WORD   BINARY   1 BYTE   N/A      BOTH     *
53          ;*    TIM1ST  TIME 1ST FLAG (TX MODE) BOOLEAN  1 BYTE   N/A      OUTPUT   *
54          ;*    TBYTCT  TIME BYTE COUNTER       INTEGER  1 BYTE   0-4      OUTPUT   *
55          ;*    TXFLGS  TRANSMIT MODE FLAGS     BOOLEAN  1 BYTE   N/A      OUTPUT   *
56          ;*    DELIMT  DELIMIT BYTE BUFFER     BINARY   1 BYTE   N/A      OUTPUT   *
57          ;*    TMCALC  CALCULATE SYNC TIME FLG BOOLEAN  1 BYTE   N/A      OUTPUT   *
58          ;*    PTTI    PTT INTERNAL FLAG       BOOLEAN  1 BIT    N/A      OUTPUT   *
59          ;*    SNCBYT  SYNC BYTE COUNTER       INTEGER  1 BYTE   0-20     OUTPUT   *
60          ;*    TXEOMC  TX EOM COUNTER          INTEGER  1 BYTE   0-21     OUTPUT   *
61          ;*    TXSOMC  TX SOM COUNTER          INTEGER  1 BYTE   0-20     OUTPUT   *
62          ;*    TXDUM   TX DUMMY BYTE COUNTER   INTEGER  1 BYTE   0-20     OUTPUT   *
63          ;*    EOMFRM  EOM FRAME COUNTER       INTEGER  1 BYTE   0-8      OUTPUT   *
64          ;*    DATABF  DATA BYTES BUFFER       BINARY   48 BYTES N/A      INPUT    *
65          ;*    INPTR   INPUT DATA POINTER      INTEGER  2 BYTES  N/A      OUTPUT   *
66          ;*    OUTPTR  OUTPUT DATA POINTER     INTEGER  2 BYTES  N/A      OUTPUT   *
67          ;*                                                                        *
68          ;*    RESTRICTIONS:                                                       *
69          ;*                                                                        *
70          ;*    SUPPORTING MODULES: MANINP - MANCHESTER INPUT READ FROM REMOTE UNITS *
71          ;*                        INCPTR - INCREMENT SLEW DATA BUFFER POINTER     *
72          ;*                        DELAY  - DELAY FOR REQUIRED AMOUNT OF TIME      *
73          ;*                        EXITRX - EXITS THE RECEIVE MODE                 *
74          ;*                                                                        *
75          ;*    COPYRIGHT 1983  ROCKWELL INTERNATIONAL                              *
76          ;*    COLLINS TELECOMMUNICATIONS PRODUCTS DIVISION                        *
77          ;*                                                                        *
78          ;*    AUTHOR: D E EICHER                     DATE: 06/16/83               *
79          ;*                                                                        *
80          ;*    VERSION: 1.1                                                        *
81          ;*                                                                        *
82          ;*    REVISIONS: 1.1 EOM HPA MODE FIX        DATE: 03/08/84               *
83          ;*                                                                        *
84          ;***********************************************************************
   85 0000
=  86 0000           INCLUD        :F1:DEFINE.SRC
=  87 0000           EJECT
=  88        ;***********************************************************************
=  89        ;*    DEFINE BIT NUMBERS FOR USE IN BIT TEST, SET, AND RESET OPERATIONS *
=  90        ;***********************************************************************
=  91        ;***** SYSTEM FLAG REGISTER AND RT FLAG BIT ASSIGNMENTS ****************
=  92 0000
=  93        ;              -- REGISTER 0 --
=  94 0007   BANDBT  EQU          7       ;REFLECTS CURRENT BAND OF OPERATION 1 = HI
=  95 0006   COMFLG  EQU          6       ;TIME ALARM TONE DURNG SCAN RECEIVE 1 = ON
=  96 0005   SQL     EQU          5       ;SQUELCH IS SELECTED TO BE ON       1 = TRUE
=  97 0004   NCS     EQU          4       ;THIS RADIO HAS BEEN SELECTED AS THE NCS
=  98 0003   PHASE3  EQU          3       ;PHASE THREE OF TEST MODE           1 = TRUE
=  99 0002   ABORT   EQU          2       ;ABORT MANCHESTER READ FROM SERIAL  1 = TRUE
= 100 0001   MD1     EQU          1       ;MSB OF MODE DATA FOR RADIO
= 101 0000   MD0     EQU          0       ;LSB OF MODE DATA FOR RADIO
= 102 0000
```

```
= 103                   ;              -- REGISTER 2 --
= 104 0007      ALTMES  EQU     7       ;ALTERNATE FAULT MESSAGE   1=TRUE
= 105 0006      UPDATE  EQU     6       ;UPDATE RADIO MODULES      1=TRUE
= 106 0005      TESTFG  EQU     5       ;RADIO STATUS TEST MODE    1=TRUE
= 107 0004      OLDTST  EQU     4       ;OLD COPY OF TEST STATUS   1=TRUE
= 108 0003      PHASE1  EQU     3       ;PHASE ONE OF TEST MODE    1=TRUE
= 109 0002      PHASE2  EQU     2       ;PHASE TWO OF TEST MODE    1=TRUE
= 110 0001      RMTMD   EQU     1       ;POWER STACK BIT B  1=REMOTE MODE
= 111 0000      PWRMD   EQU     0       ;POWER STACK BIT A  1=LOW POWER 0=HIGH
= 112 0000
= 113                   ;              -- REGISTER 3 --
= 114 0007      CHNGFG  EQU     7       ;SLEW SWITCH DATA HAS CHANGED
= 115 0006      INCRCV  EQU     6       ;INCLUDE TABLE RECEIVED FROM EXTERNAL UNIT
= 116 0005      SCANFG  EQU     5       ;SCAN MODE HAS BEEN SELECTED
= 117 0004      OLDSCN  EQU     4       ;THIS MEANS TWO OR MORE PASSES THRU SCAN
= 118 0003      RCVFLG  EQU     3       ;A SIGNAL IS BEING RECEIVED DURING SCAN
= 119 0002      PAGE    EQU     2       ;1 = PAGING HAS BEEN ENABLED
= 120 0001      SCNSKB  EQU     1       ;MSB OF SCAN STACK MODE DATA
= 121 0000      SCNSKA  EQU     0       ;LSB OF SCAN STACK MODE DATA
= 122 0000
= 123                   ;              -- REGISTER 7 --
= 124 0007      WHLLUP  EQU     7       ;BE SURE THE WHOLE LOOP IS EXECUTED
= 125 0006      FIRSTK  EQU     6       ;RECORD FIRST PASS THRU LOOP AFTER PTT
= 126 0005      BLKKEY  EQU     5       ;ZERO OUT KEY WORD CONTENTS ON FIRST PASS
= 127 0004      CHGDLY  EQU     4       ;REDUCE DELAY BECAUSE OF WAIT FOR PAGE DETECT
= 128 0003      SECNDK  EQU     3       ;RECORD FIRST TIME KEY IS HIT IN SCAN
= 129 0002      UNKEYD  EQU     2       ;RECORD WHEN KEY HAS BEEN RELEASED IN SCAN
= 130 0001      CMDTON  EQU     1       ;SOUND ALERT TONE DURING RECEIVE IN SCAN
= 131 0000      RUNLUP  EQU     0       ;RUN LOOP ONCE MORE BEFORE CALLING HOP
= 132 0000
= 133                   ;              -- REGISTER 11 --
= 134 0007      KYSTAT  EQU     7       ;RECORD PTTD STATUS ON LAST PASS THRU LOOP
= 135 0006      PWRBLK  EQU     6       ;CONTROL BLANKING ON POWER LEVEL CHANGES
= 136 0005      RCVBAT  EQU     5       ;BATTERY FAULT AND RECEIVE MODE  1 = TRUE
= 137 0004      FILRCV  EQU     4       ;FILL TAB RECEIVED FROM EXTERNAL UNIT 1 = TRUE
= 138 0003      HOPFLT  EQU     3       ;DON'T CALL HOP WHEN CSTAT IS CALLED BY HOP
= 139 0002      PASONE  EQU     2       ;RECORD WHEN PTT FIRST OCCURS TO SET COUNTER
= 140 0001      TIMOUT  EQU     1       ;INDICATES 3 SECOND TIMER <> 0  1 = TRUE
= 141 0000      PTTTST  EQU     0       ;LATCHES PTT FOR EXECUTING TRANSMIT TEST
= 142 0000              EJECT
  143 0000
  144                   CSEG
  145                   NAME    MDCHNG
  146 0000
  147                   PUBLIC  MDCHNG
  148 0000
  149                   EXTRN   APRTC,APRTBC,APRTBS,CPRTA,TXDUM,EXITRX,MANINP
  150                   EXTRN   TXFLGS,INPTR,DATABF,SNCBYT,TXSONC,TXEOMC,APRTAC
  151                   EXTRN   PTTI,SYNCTR,OUTPTR,USART,UTDATA,CPRTCC,STRBUF
  152                   EXTRN   OLDSTK,BITSNC,EOMFRM,APRTA,OLDCHN,PAGEFL,ADJTSW
  153                   EXTRN   DSPLPG,FLTFLG,LEGAL,IDELIM,TMCALC,DELINT,ABTHOP
  154                   EXTRN   BOUNCE,BPRTBS,SRCHST,TXFRST,TIM1ST,TBYTCT
  155                   EXTRN   TXCMDW,CMDATA,CVOICE,DATMSK,BPRTC,APRTB
  156                   EXTRN   ENDBUF,INCPTR,DELAY,CPRTAC,CPRTAS,DFFLGS
  157 0000
  158           ;* PROCEDURE MDCHNG
  159 0000
  160 0000      MDCHNG:
  161 0000
```

```
162                     ;* * SAVE ACCUMULATOR AND FLAG DATA
163 0000
164 0000 F5                     PUSH    AF
165 0001
166                     ;* * REPROGRAM TEST LINE INPUT TO AN OUTPUT
167 0001
168 0001 3E 08                  LD      A,8
169 0003 32 04 36               LD      (3604H),A
170 0006
171                     ;* * DRIVE TEST LINE LOW TO INHIBIT NMI
172 0006
173 0006 32 00 00    E          LD      (APRTAC),A
174 0009
175                     ;* * IF
176                     ;* * * REMOTE DATA IN LINE = HIGH
177 0009
178 0009 3A 00 00    E          LD      A,(APRTB)
179 000C E6 01                  AND     01H
180 000E CA 3E 01    C          JP      Z,RMANCH
181 0011
182                     ;* * THEN
183                     ;* * * SAVE PROCESSOR REGISTERS FOR RETURN
184 0011
185 0011 E5                     PUSH    HL
186 0012 C5                     PUSH    BC
187 0013 D5                     PUSH    DE
188 0014 FD E5                  PUSH    IY
189 0016
190                     ;* * * LOAD I/O POINTER FOR PTT TEST
191 0016
192 0016 21 00 00    E          LD      HL,APRTC
193 0019
194                     ;* * * IF
195                     ;* * * * ( PTT LINE = TRUE )
196 0019
197 0019 CB 46                  BIT     0,(HL)
198 001B 3E 10                  LD      A,10H
199 001D C2 11 01    C          JP      NZ,CHKSWT
200 0020
201                     ;* * * AND
202                     ;* * * * ( RADIO SYSTEM <> TEST )
203 0020
204 0020 DD CB 02 6E            BIT     TESTFG,(IX+2)
205 0024 C2 11 01    C          JP      NZ,CHKSWT
206 0027
207                     ;* * * THEN
208                     ;* * * * IF
209                     ;* * * * * ( RADIO SYSTEM MODE <> NOHOP )
210 0027
211 0027 DD CB 00 46            BIT     0,(IX)
212 002B C2 37 01    C          JP      NZ,NOPTT
213 002E
214                     ;* * * * AND
215                     ;* * * * * ( SYSTEM OPERATING CHANNEL <> 0 )
216 002E
217 002E DD 7E 01               LD      A,(IX+1)
218 0031 E6 0F                  AND     0FH
219 0033 CA 37 01    C          JP      Z,NOPTT
220 0036
```

```
221                             ;* * * * THEN
222                             ;* * * * * IF
223                             ;* * * * * * KEY INHIBIT FLAG = FALSE
224 0036
225 0036 3A 00 00    E          LD      A,(DFFLGS)
226 0039 CB 77                  BIT     6,A
227 003B C2 37 01    C          JP      NZ,NOPTT
228 003E
229                             ;* * * * * THEN
230                             ;* * * * * * SET PAGE BIT ON PORT TO FORCE IMMEDIATE BLANKING
231 003E
232 003E 3E 40                  LD      A,40H                   ;PAGE BIT IS BIT 6
233 0040 32 00 00    E          LD      (BPRTBS),A
234 0043
235                             ;* * * * * * TRANSMIT/RECEIVE LINE = TRANSMIT
236 0043
237 0043 3E 10                  LD      A,10H
238 0045 32 00 00    E          LD      (APRTBS),A
239 0048
240                             ;* * * * * * IF
241                             ;* * * * * * * POWER SETTING = HPA
242 0048
243 0048 DD CB 02 4E            BIT     1,(IX+2)
244 004C 28 08 0056             JR      Z,CHNZER
245 004E
246                             ;* * * * * * THEN
247                             ;* * * * * * * TOGGLE HPA LINE
248 004E
249 004E 3E 10                  LD      A,10H
250 0050 32 00 00    E          LD      (CPRTAC),A
251 0053 32 00 00    E          LD      (CPRTAS),A
252 0056
253                             ;* * * * * * END IF
254 0056
255 0056             CHNZER:
256 0056
257                             ;* * * * * * SET TX FIRST FLAG
258 0056
259 0056 3E FF                  LD      A,0FFH
260 0058 32 00 00    E          LD      (TXFRST),A
261 005B
262                             ;* * * * * * ABORT RECEIVE MODE
263 005B
264 005B CD 00 00    E          CALL    EXITRX
265 005E
266                             ;* * * * * * SET SEARCH START LINE = 0
267 005E
268 005E 3E 00       E          LD      A,.LOW.SRCHST
269 0060 32 00 00    E          LD      (CPRTCC),A
270 0063
271                             ;* * * * * * PAGE FLAG = FALSE
272 0063
273 0063 AF                     XOR     A
274 0064 32 00 00    E          LD      (PAGEFL),A
275 0067
276                             ;* * * * * * DISPLAY PAGE FLAG = FALSE
277 0067
278 0067 32 00 00    E          LD      (DSPLPG),A
279 006A
```

```
280                       ;* * * * * * LEGAL (RESYNC) FLAG = FALSE
281 006A
282 006A 32 00 00    E         LD      (LEGAL),A
283 006D
284                       ;* * * * * * INIT DEBOUNCE COUNTER = 100
285 006D
286 006D 3E 64                 LD      A,100
287 006F 32 00 00    E         LD      (BOUNCE),A
288 0072
289                       ;* * * * * * INITIALIZE SYNC FRAME COUNTER
290 0072
291 0072 3E 06                 LD      A,6
292 0074 32 00 00    E         LD      (SYNCTR),A
293 0077
294                       ;* * * * * * IF
295                       ;* * * * * * DATA MODE
296 0077
297 0077 3A 00 00    E         LD      A,(BPRTC)
298 007A E6 00       E         AND     .LOW.DATMSK
299 007C 07                    RLCA
300 007D 32 00 00    E         LD      (BPRTC),A              ;COPY DATA BIT INTO HOP & VOICE BIT
301 0080 3A 00 00    E         LD      A,(TXCMDW)
302 0083 20 06 008B            JR      NZ,VOICE
303 0085
304                       ;* * * * * * THEN
305                       ;* * * * * * LOAD COMMAND WORD WITH DATA VALUE
306 0085
307 0085 E6 0F                 AND     0FH
308 0087 F6 00       E         OR      .LOW.CWDATA
309 0089 18 04 008F            JR      LDCMDW
310 008B
311                       ;* * * * * * ELSE
312 008B
313 008B               VOICE:
314 008B
315                       ;* * * * * * LOAD COMMAND WORD WITH VOICE VALUE
316 008B
317 008B E6 0F                 AND     0FH
318 008D F6 00       E         OR      .LOW.CVOICE
319 008F
320                       ;* * * * * * END IF
321 008F
322 008F               LDCMDW:
323 008F 32 00 00    E         LD      (TXCMDW),A
324 0092
325                       ;* * * * * * IF
326                       ;* * * * * * RADIO SYSTEM MODE = TIME
327 0092
328 0092 DD CB 00 4E           BIT     1,(IX)
329 0096 28 11 00A9            JR      Z,NOTTIM
330 0098
331                       ;* * * * * * THEN
332                       ;* * * * * * INITIALIZE TIM1ST = TRUE
333 0098
334 0098 3E FF                 LD      A,0FFH
335 009A 32 00 00    E         LD      (TIM1ST),A
336 009D
337                       ;* * * * * * INITIALIZE TIME BYTE COUNTER
338 009D
```

```
339 009D 3E 01                    LD      A,1
340 009F 32 00 00      E          LD      (TBYTCT),A
341 00A2
342                               ;* * * * * * INITIALIZE TRANSMIT FLAGS = 4 SYNC FRAMES
343 00A2
344 00A2 3E 04                    LD      A,4
345 00A4 32 00 00      E          LD      (TXFLGS),A
346 00A7 18 05 00AE               JR      LDDLMT
347 00A9
348                               ;* * * * * * ELSE
349 00A9
350 00A9               NOTTIM:
351 00A9
352                               ;* * * * * * INITIALIZE TRANSMIT FLAGS = 6 SYNC FRAMES
353 00A9
354 00A9 3E 06                    LD      A,6
355 00AB 32 00 00      E          LD      (TXFLGS),A
356 00AE
357                               ;* * * * * * END IF
358 00AE
359 00AE               LDDLMT:
360 00AE
361                               ;* * * * * * LOAD DELIMIT BUFFER WITH INITIAL VALUE
362 00AE
363 00AE 3E 00         E          LD      A,.LOW.IDELIM
364 00B0 32 00 00      E          LD      (DELIMT),A
365 00B3
366                               ;* * * * * * SET TIME CALCULATION FLAG
367 00B3
368 00B3 3E FF                    LD      A,0FFH
369 00B5 32 00 00      E          LD      (TMCALC),A
370 00B8
371                               ;* * * * * * SET INTERNAL PTT
372 00B8
373 00B8 3E 01                    LD      A,1
374 00BA 32 00 00      E          LD      (PTTI),A
375 00BD
376                               ;* * * * * * INIT BYTE COUNT FOR SYNC FRAME = 19
377 00BD
378 00BD 3E 13                    LD      A,19
379 00BF 32 00 00      E          LD      (SNCBYT),A
380 00C2
381                               ;* * * * * * INIT TRANSMIT EOM BYTE COUNTER
382 00C2
383 00C2 3E 15                    LD      A,21
384 00C4 32 00 00      E          LD      (TXEOMC),A
385 00C7
386                               ;* * * * * * INIT TRANSMIT SOM BYTE COUNTER
387 00C7
388 00C7 3D                       DEC     A
389 00C8 32 00 00      E          LD      (TXSOMC),A
390 00CB
391                               ;* * * * * * INIT TRANSMIT DUMMY BYTE COUNTER
392 00CB
393 00CB 32 00 00      E          LD      (TXDUM),A
394 00CE
395                               ;* * * * * * INIT EOM FRAME COUNTER
396 00CE
397 00CE 3E 08                    LD      A,8
```

```
398 00D0 32 00 00     E           LD      (EOMFRM),A
399 00D3
400                           ;* * * * * * INITIALIZE DATA BUFFER POINTERS
401 00D3
402 00D3 21 00 00     E           LD      HL,DATABF
403 00D6 22 00 00     E           LD      (INPTR),HL
404 00D9 23                       INC     HL
405 00DA 22 00 00     E           LD      (OUTPTR),HL
406 00DD
407                           ;* * * * * * RESET USART
408 00DD
409 00DD 3E 40                    LD      A,40H
410 00DF 32 00 00     E           LD      (USART),A
411 00E2
412                           ;* * * * * * OUTPUT MODE BYTE TO USART
413 00E2
414 00E2 3E CC                    LD      A,0CCH
415 00E4 32 00 00     E           LD      (USART),A
416 00E7
417                           ;* * * * * * LOAD BIT SYNC CHARACTER
418 00E7
419 00E7 3E 00        E           LD      A,.LOW.BITSNC
420 00E9 32 00 00     E           LD      (USART),A
421 00EC
422                           ;* * * * * * RESET ERROR FLAGS IN USART
423 00EC
424 00EC 3E 10                    LD      A,10H
425 00EE 32 00 00     E           LD      (USART),A
426 00F1
427                           ;* * * * * * LOAD FIRST BYTE OF DATA IN USART
428 00F1
429 00F1 3E 00        E           LD      A,.LOW.BITSNC
430 00F3 32 00 00     E           LD      (UTDATA),A
431 00F6
432                           ;* * * * * * RESET USART
433 00F6
434 00F6 3E 40                    LD      A,40H
435 00F8 32 00 00     E           LD      (USART),A
436 00FB
437                           ;* * * * * * OUTPUT MODE BYTE TO USART
438 00FB
439 00FB 3E CC                    LD      A,0CCH
440 00FD 32 00 00     E           LD      (USART),A
441 0100
442                           ;* * * * * * LOAD BIT SYNC CHARACTER
443 0100
444 0100 3E 00        E           LD      A,.LOW.BITSNC
445 0102 32 00 00     E           LD      (USART),A
446 0105
447                           ;* * * * * * RESET ERROR FLAGS IN USART
448 0105
449 0105 3E 10                    LD      A,10H
450 0107 32 00 00     E           LD      (USART),A
451 010A
452                           ;* * * * * * LOAD FIRST BYTE OF DATA IN USART
453 010A
454 010A 3E 00        E           LD      A,.LOW.BITSNC
455 010C 32 00 00     E           LD      (UTDATA),A
456 010F 18 26 0137               JR      NOPTT
```

```
457 0111
458                       ;* * * * * END IF
459                       ;* * * * END IF
460 0111
461 0111                  CHKSWT:
462 0111
463                       ;* * * ELSE
464                       ;* * * * DELAY 3 MILLISECOND BEFORE READING SWITCHES
465 0111
466 0111 01 26 01                LD      BC,3*98
467 0114 CD 00 00     E          CALL    DELAY
468 0117
469                       ;* * * * IF
470                       ;* * * * * SLEW SWITCH POSITION HAS CHANGED
471 0117
472 0117 3A 00 00     E          LD      A,(APRTA)
473 011A E6 F0                   AND     0F0H
474 011C 57                      LD      D,A
475 011D CD 00 00     E          CALL    ADJTSW
476 0120 2A 00 00     E          LD      HL,(STRBUF)
477 0123 7E                      LD      A,(HL)
478 0124 BA                      CP      D
479 0125 28 0D 0134             JR      Z,TRYHOP
480 0127
481                       ;* * * * THEN
482                       ;* * * * * BUFFER POINTER = BUFFER POINTER + 1
483 0127
484 0127 2A 00 00     E          LD      HL,(ENDBUF)
485 012A CD 00 00     E          CALL    INCPTR
486 012D 22 00 00     E          LD      (ENDBUF),HL
487 0130
488                       ;* * * * * READ AND STORE SWITCH DATA
489 0130
```

What is claimed is:

1. A frequency hopping communication system comprising:
   means for receiving an input signal representing transmitted digital data having a synchronization portion and a message portion;
   a bit sync tracking circuit coupled to receive said input signal and provide a sync signal output when synchronization with said input signal has been detected;
   a universal synchronous/asynchronous receiver-transmitter coupled to receive said digital data and provide data to be transmitted and further responsive to said sync output for detecting character synchronization of said received data;
   an input/output means for coupling data to and receiving data from said universal synchronous/asynchronous receiver-transmitter; and
   a microprocessor coupled to said universal synchronous/asynchronous receiver-transmitter and said tracking circuit to monitor synchronization and control data transfer between said universal synchronous/asynchronous receiver-transmitter and said input/out means and to reset said tracking circuit when character synchronization has not been detected by said universal synchronous/asynchronous receiver-transmitter within a specified time.

2. The system of claim 1 wherein said received signal is provided on a frequency hopping carrier signal and further including means responsive to said microprocessor detection of synchronization for controlling said means for receiving to hop with said carrier signal.

3. The system of claim 2 wherein said means for receiving includes a synthesizer which controls said received carrier frequency in response to said input signal and a pseudorandom code.

4. In a frequency hopping system having a synthesizer coupled to control the transmitting and receiving carrier frequencies to enable modulation and demodulation of data and an input/output device coupled to provide user generation and reception of data to be transmitted and received, the improvement in said communication system comprising:
   a universal synchronous/asynchronous receiver-transmitter coupled to receive demodulated input data and provide output data fro modulation;
   a bit sync tracking circuit for receiving demodulated input data and detecting bit synchronization with said input data to provide a sync output, said universal synchronous/asynchronous receiver-transmitter being coupled to receive said bit sync output to detect character synchronization of said input data; and
   a microprocessor coupled to said USART, synthesizer, and bit sync tracking circuit, for controlling the synthesizer frequency to receive input data in accordance with the frequency hopping carrier of said input data and provide that input data to the input/output device for user reception from said universal synchronous/asynchronous receiver-transmitter, and to reset said bit sync tracking circuit upon a failure to detect bit and character synchronization within a predetermined time period.

* * * * *